US007483867B2

(12) United States Patent
Ansari et al.

(10) Patent No.: US 7,483,867 B2
(45) **Date of Patent: *Jan. 27, 2009**

(54) PROCESSING DEVICE WITH INTUITIVE LEARNING CAPABILITY

(75) Inventors: Arif M Ansari, Los Angeles, CA (US); Yusuf Sulaiman M Shiek Ansari, Costa Mesa, CA (US)

(73) Assignee: Intuition Intelligence, Inc., Costa Mesa, CA (US)

( * ) Notice: Subject to any disclaimer, the term of this patent is extended or adjusted under 35 U.S.C. 154(b) by 1119 days.

This patent is subject to a terminal disclaimer.

(21) Appl. No.: 10/231,875

(22) Filed: Aug. 30, 2002

(65) Prior Publication Data

US 2003/0149675 A1 Aug. 7, 2003

Related U.S. Application Data

(63) Continuation-in-part of application No. 10/185,239, filed on Jun. 26, 2002, now abandoned.

(60) Provisional application No. 60/301,381, filed on Jun. 26, 2001, provisional application No. 60/316,923, filed on Aug. 31, 2001, provisional application No. 60/378,255, filed on May 6, 2002.

(51) Int. Cl.
*G06F 15/18* (2006.01)

(52) U.S. Cl. .............................. 706/25; 706/14; 706/45

(58) Field of Classification Search ................... 706/21, 706/25; 379/114.01, 114.28, 114.29
See application file for complete search history.

(56) References Cited

U.S. PATENT DOCUMENTS 5,448,681 A * 9/1995 Khan .......................... 706/23
5,561,738 A * 10/1996 Kinerk et al. .................. 706/4

(Continued)

FOREIGN PATENT DOCUMENTS

JP 03-218559 * 9/1999

OTHER PUBLICATIONS

Tirri et al, "MDL Learning of Probabilistic Neural Networks for Discrete Problem Domains", IEEE ICNN, Jun. 27-Jul. 2, 1994.*

(Continued)

*Primary Examiner*—David R Vincent
*Assistant Examiner*—Lut Wong
(74) *Attorney, Agent, or Firm*—Michael J. Bolan

(57) ABSTRACT

A method and apparatus for providing learning capability to processing device, such as a computer game, educational toy, telephone, or television remote control, is provided to achieve one or more objective. One of a plurality of actions (e.g., game actions, educational prompts, listed phone numbers, or listed television channels) to be performed on the processing device is selected. A user input indicative of a user action (e.g., a player action, educational input, called phone number, or watched television channel) is received. An outcome of the selected action and/or user action is determined. An action probability distribution having probability values corresponding to the plurality of actions is then updated based on the determined outcome. The next action will then be selected based on this updated action probability distribution. The foregoing steps can be modified based on a performance index to achieve the objective of the processing device so that it learns.

20 Claims, 67 Drawing Sheets

U.S. PATENT DOCUMENTS

| | | | | |
|---|---|---|---|---|
| 5,682,317 | A * | 10/1997 | Keeler et al. | 701/101 |
| 5,748,848 | A * | 5/1998 | Tresp | 706/25 |
| 5,871,194 | A * | 2/1999 | Morley | 248/345.1 |
| 6,125,339 | A * | 9/2000 | Reiser et al. | 702/181 |
| 6,182,133 | B1 * | 1/2001 | Horvitz | 709/223 |
| 6,192,317 | B1 * | 2/2001 | Yazici et al. | 702/58 |
| 6,323,807 | B1 * | 11/2001 | Golding et al. | 342/419 |
| 6,363,289 | B1 * | 3/2002 | Keeler et al. | 700/48 |
| 2001/0020136 | A1 * | 9/2001 | Sweeney et al. | 600/515 |
| 2001/0032029 | A1 * | 10/2001 | Kauffman | 700/99 |

OTHER PUBLICATIONS

Arif Ansari,George P. Papavassilopoulos "A Generalized Learning Algorithm for an Automaton Operating in a Multiteacher Environment" IEEE Transactions on Systems, Man, and Cybernetics Part B: Cybernetics, vol. 29, No. 5, Oct. 1999.*

Automaton—Wikipedia p. 1-7 http://en.wikipedia.org/wiki/automaton.* http://web.archive.org/web/20000824072046/www.20q.net/avm.article.html.* http://web.archive.org/web/20000304200031/www.20q.net/avmdesc.html.* http://web.archive.org/web/20000229091147/http://www.20q.net/index.html.*

Cem Unsal ("Intelligent Navigation of Autonomous Vehicles in an Automated Highway System: Learning Methods and Interacting Vehicles Approach" 1997). Only pp. i-xiv, 1-8, 29-45, 92-115 are included, a total of 63 pages.*

Abdel-Fattah: "Fairness and Mutual Profitability in Collective Behavior of Automata," IEEE Transactions on Systems, Man, and Cybernetics, vol. SMC-13, No. 3, Mar./Apr. 1983, pp. 236-241.

Ansari: "A Generalized Learning Algorithm for an Automaton Operating in a Multiteacher Environment," IEEE Transactions on Systems, Man, and Cybernetics—Part B: Cybernetics, vol. 29, No. 5, Oct. 1999, pp. 592-600.

Ansari: "Learning Algorithms for Different Learning Strategies in a Multi-teacher Environment," A Dissertation Presented to the Faculty of the Graduate School University of Southern California, Aug. 2001.

Ansari and Papavassilopoulos: "Learning Behavior of a Stochastic Automaton Operating Under a Multi-Input Multi-Output Learning Algorithm," Presented at the World Multiconference on Systems, Cybernetics and Informatics, Caracas, Venezuela, Jul. 1997.

Ansari and Papavassilopoulos: "A Pruning Technique to Increase the Rate of Convergence of Learning Algorithms," Presented at the World Multiconference on Systems, Cybernetics and Informatics, Orlando, Florida, Jul. 1999.

Ansari and Papavassilopoulos: "A Study on the Convergence of Different Learning Strategies in a Multi-teacher Environment,", Presented at the World Multiconference on Systems, Cybernetics and Informatics, Orlando, Florida, Jul. 2000.

Baba: "On the Learning Behavior of the $SL_{R-1}$ Reinforcement Scheme for Stochastic Automata," IEEE Transactions on Systems, Man, and Cybernetics, Aug. 1976, pp. 580-582.

Baba: "Learning Behaviour of Stochastic Automata Under Unknown Nonstationary Multi-Teacher Environments and Its Application to Economic Problems," International Conference of Systems, Man and Cybernetics, 1983, pp. 607-613.

Baba: "The Absolutely Expedient Nonlinear Reinforcement Schemes Under the Unknown Multiteacher Environment," IEEE Transactions on Systems, Man, and Cybernetics, vol. SMC-13, No. 1, Jan./Feb. 1983, pp. 100-107.

Baba: "On the Learning Behaviors of Variable-Structure Stochastic Automaton in the General *N*-Teacher Environment," IEEE Transactions on Systems, Man, and Cybernetics, vol. SMC-13, No. 3, Mar./Apr. 1983, pp. 224-230.

Baba: "$\epsilon$-Optimal Nonlinear Reinforcement Scheme Under a Nonstationary Multiteacher Environment," IEEE Transactions on Systems, Man, and Cybernetics, vol. SMC-14, No. 3, May/Jun. 1984, pp. 538-541.

Baba: "Learning Behaviors of Hierarchical Structure Stochastic Automata Operating in a General Multiteacher Environment," IEEE Transactions on Systems, Man, and Cybernetics, vol. SMC-15, No. 4, Jul./Aug. 1985, pp. 585-587.

Baba: "Learning Behaviors of the Hierarchical Structure Stochastic Automata under the Nonstationary Multiteacher Environments and Their Applications to Intelligent Robot Manipulators," IEEE Transactions on Systems, Man, and Cybernetics, vol. SMC-17, No. 5, Sep./Oct. 1987, pp. 868-873.

Baba and Sawaragi: "On the Learning Behavior of Stochastic Automata Under a Nonstationary Random Environment," IEEE Transactions on Systems, Man, and Cybernetics, Mar. 1975, pp. 273-275.

Barto, Anderson, and Sutton: "Synthesis of Nonlinear Control Surfaces by a Layered Associative Search Network," Biological Cybernetics, vol. 43, 1982, pp. 175-185.

Barto and Sutton, "Landmark Learning: An Illustration of Associative Search," Biological Cybernetics, vol. 42, 1981, pp. 1-8.

Barto, Sutton, and Brouwer, "Associative Search Network: A Reinforcement Learning Associative Memory," Biological Cybernetics, vol. 40, 1981, pp. 201-211.

Bucy: "Stability and Positive Supermartingales," Journal of Differential Equations, vol. 1, 1965, pp. 151-155.

Chandrasekaran and Shen: "Stochastic Automata Games," IEEE Transactions on Systems Science and Cybernetics, vol. SSC-5, No. 2, Apr. 1969.

El-Fattah: "Stochastic Automata Modeling of Certain Problems of Collective Behavior," IEEE Transactions on Systems, Man, and Cybernetics, vol. SMC-10, No. 6, Jun. 1980, pp. 304-309.

Har-El and Rubinstein: "Optimal Performance of Stochastic Automata in Switched Random Environments," IEEE Transactions on Systems, Man, and Cybernetics, vol. SMC-7, No. 9, Sep. 1977, pp. 674-677.

Koditschek and Narendra: "Fixed Structure Automata in a Multi-Teacher Environment," IEEE Transactions on Systems, Man, and Cybernetics, vol. SMC-7, No. 8, Aug. 1977, pp. 616-624.

Kumar and Young: "Distributed Learning of the Global Maximum in a Two-Player Stochastic Game with Identical Payoffs," IEEE Transactions on Systems, Man, and Cybernetics, vol. SMC-15, No. 6, Nov./Dec. 1985, pp. 743-752.

Lakshmivarahan and Thathachar: "Absolutely Expedient Learning Algorithms for Stochastic Automata," IEEE Transactions on Systems, Man, and Cybernetics, May 1973, pp. 281-286.

Lakshmivarahan and Thathachar: "Absolute Expediency of Q- and S-Model Learning Algorithms," IEEE Transactions on Systems, Man, and Cybernetics, Mar. 1976, pp. 222-226.

Lakshmivarahan and Thathachar: "Bounds on the Convergence Probabilities of Learning Automata," IEEE Transactions on Systems, Man, and Cybernetics, Nov. 1976, pp. 756-783.

Lanctöt and Oommen: "Discretized Estimator Learning Automata," IEEE Transactions on Systems, Man, and Cybernetics, vol. 22, No. 6, Nov./Dec. 1992, pp. 1473-1482.

Li and Basar: "Asymptotic Agreement and Convergence of Asynchronous Stochastic Algorithms," IEEE Transactions on Automatic Control, vol. AC-32, No. 7, Jul. 1987, pp. 612-618.

Mars, Chen, and Nambiar, "Learning Algorithms: Theory and Applications in Signal Processing, Control and Communications," CRC Press, Inc., Boca Raton, Florida, 1996.

Metropolis, Rosenbluth, A., Rosenbluth, M., Teller, A., and Teller, E.: "Equation of State Calculations by Fast Computing Machines," The Journal of Chemical Physics, vol. 21, No. 6, Jun. 1953, pp. 1087-1092.

Mitchell and Koutanis: "A Reorganization Scheme for a Hierarchical System of Learning Automata," IEEE Transactions on Systems, Man, and Cybernetics, vol. SMC-14, No. 2, Mar./Apr. 1984, pp. 328-334.

Najim and Poznyak: "Learning Automata: Theory and Applications," Pergamon, Elsevier Science, New York, 1994.

Najim and Poznyak: "Multimodal Searching Technique Based on Learning Automata with Continuous Input and Changing Number of Actions," IEEE Transactions on Systems, Man, and Cybernetics—Part B: Cybernetics, vol. 26, No. 4, Aug. 1996, pp. 666-673.

Narendra and Lakshmivarahan: "Learning Automata—A Critique," Journal of Cybernetics and Information Science, vol. 1, 1977, pp. 53-65.
Narendra and Parthasarathy: "Learning Automata Approach to Hierarchical Multiobjective Analysis," IEEE Transactions on Systems, Man, and Cybernetics, vol. 21, No. 1, Jan./Feb. 1991, pp. 263-273.
Narendra and Thathachar: "Learning Automata—A Survey," IEEE Transactions on Systems, Man, and Cybernetics, vol. SMC-4, No. 4, Jul. 1974, pp. 323-334.
Narendra and Thathachar: "On the Behavior of a Learning Automaton in a Changing Environment with Application to Telephone and Traffic Routing," IEEE Transactions on Systems, Man, and Cybernetics, vol. SMC-10, No. 5, May 1980, pp. 262-269.
Narendra and Thathachar: "Learning Automata: An Introduction," Prentice-Hall, Inc., 1989.
Narendra and Viswanathan: "A Two-Level System of Stochastic Automata for Periodic Random Environments," IEE Transactions on Systems, Man, and Cybernetics, Apr. 1972, pp. 285-288.
Narendra and Wheeler: "An *N*-Player Sequential Stochastic Game with Identical Payoffs," IEEE Transactions on Systems, Man, and Cybernetics, vol. SMC-13, No. 6, Nov./Dec. 1983, pp. 1154-1158.
Narendra, Wright, and Mason: "Application of Learning Automata to Telephone Traffic Routing and Control," IEEE Transactions on Systems, Man, and Cybernetics, vol. SMC-7, No. 11, Nov. 1977, pp. 785-792.
Nedzelnitsky and Narendra:: "Nonstationary Models of Learning Automata Routing in Data Communication Networks," IEEE Transactions on Systems, Man, and Cybernetics, vol. SMC-17, No. 6, Nov./Dec. 1987, pp. 1004-1015.
Norman: "A Central Limit Theorem for Markov Processes That Move by Small Steps," Annals of Probability, vol. 2, No. 6, 1973, pp. 1065-1074.
Norman: "Markovian Learning Processes," SIAM Review, vol. 16, No. 2, Apr. 1974, pp. 143-162.
Okamura, Kanaoka, Okada, and Tomita: "Learning Behavior of Variable-Structure Stochastic Automata in a Three-Person Zero-Sum Game," IEEE Transactions on Systems, Man, and Cybernetics, vol. SMC-14, No. 6, Nov./Dec. 1984, pp. 924-932.
Oommen: "Absorbing and Ergodic Discretized Two-Action Learning Automata," IEEE Transactions on Systems, Man, and Cybernetics, vol. SMC-16, No. 2, Mar./Apr. 1986, pp. 282-293.
Oommen: "On How Two-Action Ergodic Learning Automata Can Utilize Apriori Information," IEEE International Conference on Systems, Man and Cybernetics, Atlanta, GA, 1986, pp. 308-312.
Oommen and Christensen: "Optimal Discretized Linear Reward-Penalty Learning Automata," IEEE Transactions on Systems, Man, and Cybernetics, vol. 18, No. 3, May/Jun. 1988, pp. 451-458.
Oommen and Hansen: "The Asymptotic Optimality of Discretized Linear Reward-Inaction Learning Automata," IEEE Transactions on Systems, Man, and Cybernetics, vol. SMC-14, No. 3, May/Jun. 1984, pp. 542-545.
Oommen and Ma, "Fast Object Partitioning Using Stochastic Learning Automata," International Conference on Research and Development in Information Retrieval, Jun. 1987, pp. 111-122.
Oommen, Valiveti, and Zgierski: "An Adaptive Learning Solution to the Keyboard Optimization Problem," IEEE Transactions on Systems, Man, and Cybernetics, vol. 21, No. 6, Nov./Dec. 1991, pp. 1608-1618.
Rajaraman and Sastry: "Finite Time Analysis of the Pursuit Algorithm for Learning Automata," IEEE Transactions on Systems, Man, and Cybernetics,—Part B: Cybernetics, vol. 26, No. 4, Aug. 1996, pp. 590-598.
Sacks: "Asymptotic Distribution of Stochastic Approximation Procedures," Annuals of Mathematical Statistics, 1957, pp. 373-405.
Sato, Abe, and Takeda: "A Learning Algorithm for the Finite-Time Two-Armed Bandit Problem," IEEE Transactions on Systems, Man, and Cybernetics, vol. SMC-14, No. 3, May/Jun. 1984, pp. 528-534.
Sawaragi and Baba: "Two E-Optimal Nonlinear Reinforcement Scheme Stochastic Automata," IEEE Transactions on Systems, Man, and Cybernetics, Jan. 1974, pp. 126-130.
Shapiro and Narendra: "Use of Stochastic Automata for Parameter Self-Optimization with Multimodal Performance Criteria," IEEE Transaction on Systems Science and Cybernetics, vol. SSC-5, No. 4, Oct. 1969, pp. 352-360.
Thathachar and Harita: "Learning Automata with Changing Number of Actions," IEEE Transactions on Systems, Man. and Cybernetics, vol. SMC-17, No. 6, Nov./Dec. 1987, pp. 1095-1100.
Thathachar and John: "Discretized Reward-Inaction Learning Automata," Journal of Cybernetics and Information Science, vol. 2, No. 1, Spring 1979, pp. 24-29.
Thathachar, and Oommen: "Learning Automata Processing Ergodicity of the Mean: The Two-Action Case," IEEE Transactions on Systems, Man, and Cybernetics, vol. SMC-13, No. 6, Nov./Dec. 1983, pp. 1143-1148.
Thathachar and Ramakrishnan: "A Hierarchical System of Learning Automata," IEEE Transactions on Systems, Man, and Cybernetics, vol. SMC-11, No. 3, Mar. 1981, pp. 236-241.
Thathachar and Sastry: "A Class of Rapidly Converging Algorithms for Learning Automata," IEEE Proceedings of the International Conference on Systems, Man, and Cybernetics, Bombay, India vol.-1, 1983, pp. 602-606.
Thathachar and Sastry: "A New Approach to the Design of Reinforcement Schemes for Learning Automata," IEEE Transactions on Systems, Man, and Cybernetics, vol. SMC-15, No. 1, Jan./Feb. 1985, pp. 168-175.
Thathachar and Sastry: "Learning Optimal Discriminant Functions Through a Cooperative Game of Automata," IEEE Transactions on Systems, Man, and Cybernetics, vol. SMC-17, No. 1, Jan./Feb. 1987, pp. 73-85.
Tsetlin: "On the Behavior of Finite Automata in Random Media," Automation of Remote Control, vol. 22, 1962, pp. 1210-1219, Translated from Avtomatika I Telemekhanika, vol. 22, No. 10, Oct. 1961, pp. 1345-1354.
Tsypkin and Poznyak: "Finite Learning Automata," Engineering Cybernetics, vol. 10, 1972, pp. 478-490.
Viswanathan and Narendra: "A Note on the Linear Reinforcement Scheme for Variable-Structure Stochastic Automata," IEEE Transactions on Systems, Man, and Cybernetics, Apr. 1972, pp. 292-294.
Viswanathan and Narendra: "Stochastic Automata Models with Applications to Learning Systems," IEEE Transactions on Systems, Man, and Cybernetics, Jan. 1973, pp. 107-111.
Viswanathan and Narendra: "Games of Stochastic Automata," IEEE Transactions on Systems, Man, and Cybernetics, Jan. 1974, pp. 131-135.

* cited by examiner

PROCESSING DEVICE WITH INTUITIVE LEARNING CAPABILITY

RELATED APPLICATIONS

This application is a continuation-in-part of U.S. application Ser. No. 10/185,239, filed Jun. 26, 2002 now abandoned, which claims priority from U.S. Provisional Application Ser. No. 60/301,381, filed Jun. 26, 2001, U.S. Provisional Application Ser. No. 60/316,923, filed Aug. 31, 2001, and U.S. Provisional Application Ser. No. 60/378,255, filed May 6, 2002, all of which are hereby fully and expressly incorporated herein by reference.

COMPUTER PROGRAM LISTING APPENDIX

A Computer Program Listing Appendix is filed herewith, which comprises an original compact disc (and duplicate compact disc containing the same) containing the MS Word files (1) "Intuition Intelligence-duckgame1.doc" of size 119 Kbytes, created on Aug. 23, 2001, and written in Visual Basic 6.0; (2) "Intuition Intelligence-duckgame2.doc" of size 119 Kbytes, created on Aug. 23, 2001, and written in Visual Basic 6.0; (3) "Intuition Intelligence-incomingphone.doc" of size 81 Kbytes, created on Apr. 28, 2002, and written in PHP; (4) "Intuition Intelligence-outgoing-phone.doc" of size 61 Kbytes, created on Apr. 28, 2002, and written in PHP; (5) "Intuition Intelligence-remote.doc" of size 129 Kbytes, created on Aug. 30, 2002, and written in Visual Basic 5.0; and (6) and "Intuition Intelligence-simonsays.doc" of size 60 Kbytes, created on Aug. 30, 2002, and written in Visual Basic 5.0. The Computer Program Listing Appendix is fully and expressly incorporated herein by reference.

TECHNICAL FIELD OF THE INVENTION

The present inventions relate to methodologies for providing learning capability to processing devices, e.g., computers, microprocessors, microcontrollers, embedded systems, network processors, and data processing systems, and those products containing such devices.

BACKGROUND OF THE INVENTION

The era of smart interactive computer-based devices has dawned. There is a demand to increasingly develop common household items, such as computerized games and toys, smart gadgets and home appliances, personal digital assistants (PDA's), and mobile telephones, with new features, improved functionality, and built-in intelligence and/or intuition, and simpler user interfaces. The development of such products, however, has been hindered for a variety of reasons, including high cost, increased processing requirements, speed of response, and difficulty of use.

For example, in order to attain a share in the computer market today, computer game manufacturers must produce games that are challenging and maintain the interest of players over a significant period of time. If not, the games will be considered too easy, and consumers as a whole will opt not to purchase such games. In order to maintain a player's interest in single-player games (i.e., the player plays against the game program), manufacturers design different levels of difficulty into the game program. As the player learns the game, thus improving his or her skill level, he or she moves onto the next level. In this respect, the player learns the moves and strategy of the game program, but the game program does not learn the moves and strategy of the player, but rather increases its skill level in discrete step. Thus, most of today's commercial computer games cannot learn or, at the most, have rudimentary learning capacity. As a result, player's interest in the computer game will not be sustained, since, once mastered, the player will no longer be interested in the game. Even if the computer games do learn, the learning process is generally slow, ineffective, and not instantaneous, and does not have the ability to apply what has been learned.

Even if the player never attains the highest skill level, the ability of the game program to change difficulty levels does not dynamically match the game program's level of play with the game player's level of play, and thus, at any given time, the difficulty level of the game program is either too low or too high for the game player. As a result, the game player is not provided with a smooth transition from novice to expert status. As for multi-player computer games (i.e., players that play against each other), today's learning technologies are not well understood and are still in the conceptual stage. Again, the level of play amongst the multiple players are not matched with other, thereby making it difficult to sustain the players' level of interest in the game.

As for PDA's and mobile phones, their user applications, which are increasing at an exponential rate, cannot be simultaneously implemented due to the limitation in memory, processing, and display capacity. As for smart gadgets and home appliances, the expectations of both the consumers and product manufacturers that these new advanced products will be easier to use have not been met. In fact, the addition of more features in these devices has forced the consumer to read and understand an often-voluminous user manual to program the product. Most consumers find it is extremely hard to understand the product and its features, and instead use a minimal set of features, so that they do not have to endure the problem of programming the advanced features. Thus, instead of manufacturing a product that adapts to the consumers' needs, the consumers have adapted to a minimum set of features that they can understand.

Audio/video devices, such as home entertainment systems, provide an added dimension of problems. A home entertainment system, which typically comprises a television, stereo, audio and video recorders, digital videodisc player, cable or satellite box, and game console is commonly controlled by a single remote control or other similar device. Because individuals in a family typically have differing preferences, however, the settings of the home entertainment system must be continuously reset through the remote control or similar device to satisfy the preferences of the particular individual that is using the system at the time. Such preferences may include, e.g., sound level, color, choice of programs and content, etc. Even if only a single individual is using the system, the hundreds of television channels provided by satellite and cable television providers makes it difficult for such individual to recall and store all of his or her favorite channels in the remote control. Even if stored, the remote control cannot dynamically update the channels to fit the individual's ever changing preferences.

To a varying extent, current learning technologies, such as artificial intelligence, neural networks, and fuzzy logic, have attempted to solve the afore-described problems, but have been generally unsuccessful because they are either too costly, not adaptable to multiple users (e.g., in a family), not versatile enough, unreliable, exhibit a slow learning capability, require too much time and effort to design into a particular product, require increased memory, or cost too much to implement. In addition, learning automata theory, whereby a single unique optimum action is to be determined over time, has been applied to solve certain problems, e.g., economic problems, but have not been applied to improve the functionality of the afore-mentioned electronic devices. Rather, the sole function of the processing devices incorporating this learning automata theory is the determination of the optimum action.

There, thus, remains a need to develop an improved learning technology for processors.

SUMMARY OF THE INVENTION

The present inventions are directed to an enabling technology that utilizes sophisticated learning methodologies that can be applied intuitively to improve the performance of most computer applications. This enabling technology can either operate on a stand-alone platform or co-exist with other technologies. For example, the present inventions can enable any dumb gadget/device (i.e., a basic device without any intelligence or learning capacity) to learn in a manner similar to human learning without the use of other technologies, such as artificial intelligence, neural networks, and fuzzy logic based applications. As another example, the present inventions can also be implemented as the top layer of intelligence to enhance the performance of these other technologies.

The present inventions can give or enhance the intelligence of almost any product. For example, it may allow a product to dynamically adapt to a changing environment (e.g., a consumer changing style, taste, preferences, and usage) and learn on-the-fly by applying efficiently what it has previously learned, thereby enabling the product to become smarter, more personalized, and easier to use as its usage continues. Thus, a product enabled with the present inventions can self-customize itself to its current user or each of a group of users (in the case of multiple-users), or can program itself in accordance with a consumer's needs, thereby eliminating the need for the consumer to continually program the product. As further examples, the present inventions can allow a product to train a consumer to learn more complex and advanced features or levels quickly, can allow a product to replicate or mimic the consumer's actions, or can assist or advise the consumer as to which actions to take.

The present inventions can be applied to virtually any computer-based device, and although the mathematical theory used is complex, the present inventions provide an elegant solution to the foregoing problems. In general, the hardware and software overhead requirements for the present inventions are minimal compared to the current technologies, and although the implementation of the present inventions within most every products takes very little time, the value that they add to a product increases exponentially.

In accordance with a first aspect of the present inventions, a method of providing learning capability to a processing device comprises receiving an action performed by a user, and selecting one of a plurality of processor actions. By way of non-limiting example, the processing device can be a computer game, in which case, the user action can be a player move, and the processor actions can be game moves. Or the processing device can be an educational toy, in which case, the user action can be a child action, and the processor actions and be toy actions. Or the processing device can be a telephone system, in which case, the user action can be a called phone number, and the processor actions can be listed phone numbers. Or the processing device can be a television channel control system, in which case, the user action can be a watched television channel, and the processor actions can be listed television channels. The processing device can be operated in a single user environment, multiple user environment, or both. The processor action can be selected in response to the received user action or in response to some other information or event.

In any event, the processor action selection is based on an action probability distribution that contains a plurality of probability values corresponding to the plurality of processor actions. For example, the selected processor action can correspond to the highest probability value within the action probability distribution, or can correspond to a pseudo-random selection of a value within the action probability distribution. The action probability distribution may be initially generated with equal probability values (e.g., if it is not desired that the processing device learn more quickly of if no assumptions are made as to which processor actions are more likely to be selected in the near future) or unequal probability values (if it is desired that the processing device learn more quickly, and if it is assumed that there are certain processor actions that are more likely to be selected in the near future). Preferably, the action probability distribution is normalized.

The method further comprises determining an outcome of one or both of the received user action and selected processor action. By way of non-limiting example, the outcome can be represented by one of two values (e.g., zero if outcome is not successful, and one if outcome is successful), one of a finite range of real numbers (e.g., higher numbers may mean outcome is more successful), or one of a range of continuous values (e.g., the higher the number, the more successful the outcome may be). It should be noted that the outcome can provide an indication of events other than successful and unsuccessful events. If the outcome is based thereon, the selected processor action can be a currently selected processor action, previously selected processor action (lag learning), or subsequently selected processor action (lead learning).

The method further comprises updating the action probability distribution based on the outcome. A learning automaton can optionally be utilized to update the action probability distribution. A learning automaton can be characterized in that any given state of the action probability distribution determines the state of the next action probability distribution. That is, the next action probability distribution is a function of the current action probability distribution. Advantageously, updating of the action probability distribution using a learning automaton is based on a frequency of the processor actions and/or user actions, as well as the time ordering of these actions. This can be contrasted with purely operating on a frequency of processor actions or user actions, and updating the action probability distribution based thereon. Although the present inventions, in their broadest aspects, should not be so limited, it has been found that the use of a learning automaton provides for a more dynamic, accurate, and flexible means of teaching the processing device. The action probability distribution can be updated using any of a variety of learning methodologies, e.g., linear or non-linear updates, absolutely expedient update, reward-penalty update, reward-inaction update, or inaction-penalty update.

Lastly, the method comprises modifying one or more of the processor action selection, outcome determination, and action probability distribution update steps based on the objective(s). This modification can be performed, e.g., deterministically, quasi-deterministically, or probabilistically. It can be performed using, e.g., artificial intelligence, expert systems, neural networks, fuzzy logic, or any combination thereof. These steps can be modified in any combination of a variety of ways. For example, one of a predetermined plurality of algorithms used when updating the action probability distribution can be selected. One or more parameters within an algorithm used when updating the action probability distribution can be selected. The action probability distribution, itself, can be modified or transformed. Selection of an action can be limited to or expanded to a subset of probability values contained within the action probability distribution. The nature of the outcome or otherwise the algorithms used to determine the outcome can be modified.

Optionally, the method may further comprise determining a performance index indicative of a performance of the processing device relative to one or more objectives of the processing device, wherein the modification is based on the performance index. The performance index may be updated when the outcome is determined, and may be derived either directly or indirectly from the outcome. The performance index can even be derived from the action probability distribution. The performance index may be an instantaneous value or a cumulative value.

In accordance with a second aspect of the present inventions, a processing device comprises a probabilistic learning module having a learning automaton configured for learning a plurality of processor actions in response to a plurality of actions performed by a user, and an intuition module configured for modifying a functionality of the probabilistic learning module based on one or more objectives of the processing device, e.g., by selecting one of a plurality of algorithms used by the learning module, or modifying a parameter of an algorithm employed by the learning module. The processing device can be operated in a single user, multiple user environment, or both. Optionally, the intuition module can be further configured for determining a performance index indicative of a performance of the probabilistic learning module relative to the objective(s), and for modifying the probabilistic learning module functionality based on the performance index. The intuition module can be, e.g., deterministic, quasi-deterministic, or probabilistic. It can use, e.g., artificial intelligence, expert systems, neural networks, or fuzzy logic.

In the preferred embodiment, the probabilistic learning module may include an action selection module configured for selecting one of a plurality of processor actions. The action selection can be based on an action probability distribution comprising a plurality of probability values corresponding to the plurality of processor actions. The probabilistic learning module may further comprise an outcome evaluation module configured for determining an outcome of either or both of the received user action and selected processor action. The probabilistic learning module may further comprise a probability update module configured for updating the action probability distribution based on the outcome. When modifying the functionality of the learning module, the intuition module may modify a functionality of any combination of the action selection module, outcome evaluation module, and probability update module.

BRIEF DESCRIPTION OF THE DRAWINGS

In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Generalized Single-User Program (Single Processor Action-Single User Action)

Figure 1:
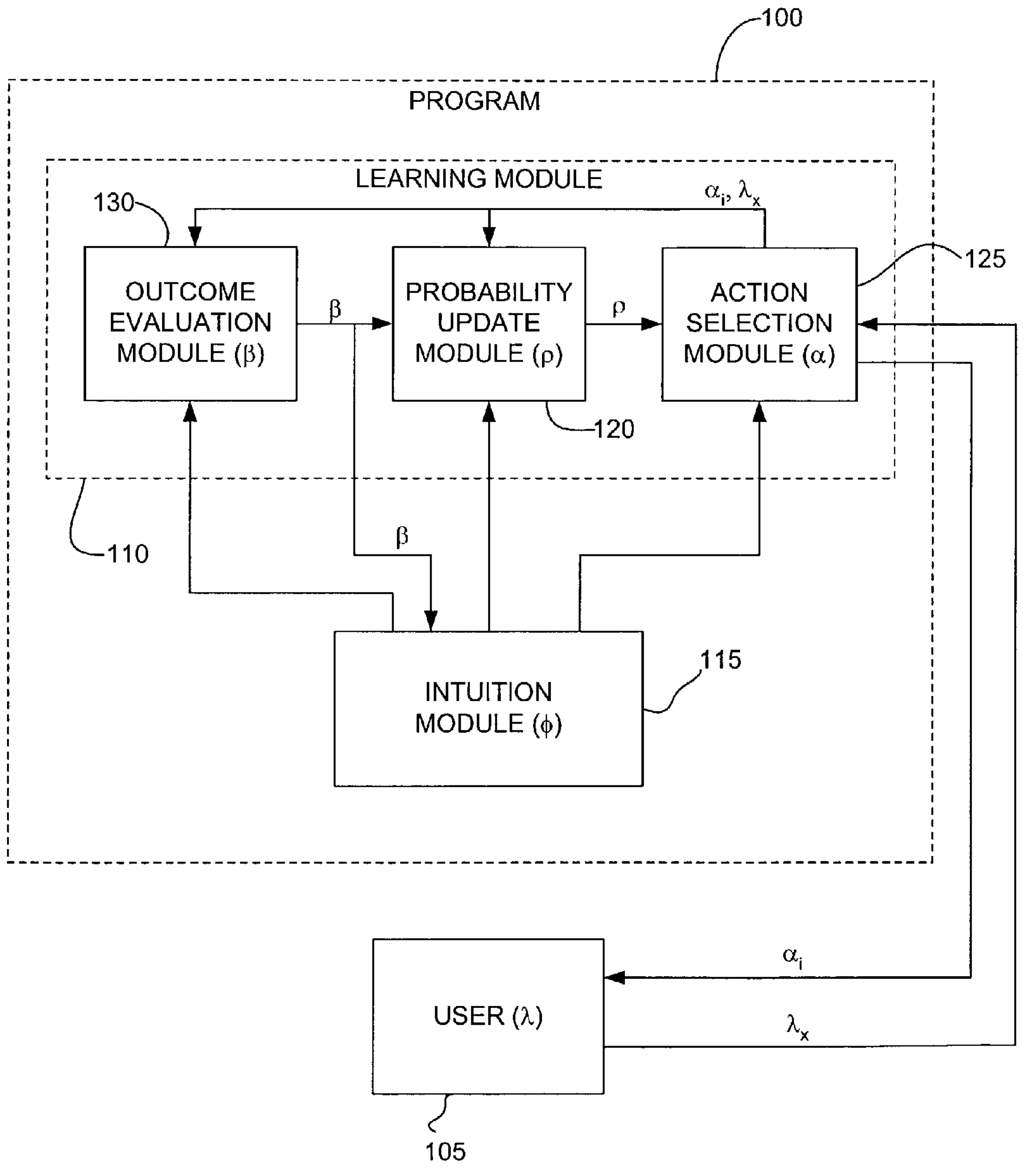
FIG. 1 is a block diagram of a generalized single-user learning software program constructed in accordance with the present inventions, wherein a single-input, single output (SISO) model is assumed.

Referring to FIG. 1, a single-user learning program 100 developed in accordance with the present inventions can be generally implemented to provide intuitive learning capability to any variety of processing devices, e.g., computers, microprocessors, microcontrollers, embedded systems, network processors, and data processing systems. In this embodiment, a single user 105 interacts with the program 100 by receiving a processor action $\alpha_i$ from a processor action set a within the program 100, selecting a user action $\lambda_i$ from a user action set A based on the received processor action $\alpha_i$, and transmitting the selected user action $\lambda_i$ to the program 100. It should be noted that in alternative embodiments, the user 105 need not receive the processor action $\alpha_l$ to select a user action $\lambda_l$, the selected user action $\lambda_l$ need not be based on the received processor action $\alpha_l$, and/or the processor action $\alpha_l$ may be selected in response to the selected user action $\lambda_l$. The significance is that a processor action $\alpha_l$ and a user action $\lambda_l$ are selected.

The program 100 is capable of learning based on the measured performance of the selected processor action $\alpha_l$ relative to a selected user action $\lambda_l$, which, for the purposes of this specification, can be measured as an outcome value $\beta$. It should be noted that although an outcome value $\beta$ is described as being mathematically determined or generated for purposes of understanding the operation of the equations set forth herein, an outcome value $\beta$ need not actually be determined or generated for practical purposes. Rather, it is only important that the outcome of the processor action $\alpha_l$ relative to the user action $\lambda_l$ be known. In alternative embodiments, the program 100 is capable of learning based on the measured performance of a selected processor action $\alpha_l$ and/or selected user action $\lambda_l$ relative to other criteria. As will be described in further detail below, program 100 directs its learning capability by dynamically modifying the model that it uses to learn based on a performance index $\phi$ to achieve one or more objectives.

To this end, the program 100 generally includes a probabilistic learning module 110 and an intuition module 115. The probabilistic learning module 110 includes a probability update module 120, an action selection module 125, and an outcome evaluation module 130. Briefly, the probability update module 120 uses learning automata theory as its learning mechanism with the probabilistic learning module 110 configured to generate and update an action probability distributions based on the outcome value $\beta$. The action selection module 125 is configured to pseudo-randomly select the processor action $\alpha_l$ based on the probability values contained within the action probability distribution p internally generated and updated in the probability update module 120. The outcome evaluation module 130 is configured to determine and generate the outcome value $\beta$ based on the relationship between the selected processor action $\alpha_l$ and user action $\lambda_l$. The intuition module 115 modifies the probabilistic learning module 110 (e.g., selecting or modifying parameters of algorithms used in learning module 110) based on one or more generated performance indexes $\phi$ to achieve one or more objectives. A performance index $\phi$ can be generated directly from the outcome value $\beta$ or from something dependent on the outcome value $\beta$, e.g., the action probability distribution p, in which case the performance index $\phi$ may be a function of the action probability distribution p, or the action probability distribution p may be used as the performance index $\phi$. A performance index $\phi$ can be cumulative (e.g., it can be tracked and updated over a series of outcome values $\beta$ or instantaneous (e.g., a new performance index $\phi$ can be generated for each outcome value $\beta$).

Modification of the probabilistic learning module 110 can be accomplished by modifying the functionalities of (1) the probability update module 120 (e.g., by selecting from a plurality of algorithms used by the probability update module 120, modifying one or more parameters within an algorithm used by the probability update module 120, transforming, adding and subtracting probability values to and from, or otherwise modifying the action probability distribution p); (2) the action selection module 125 (e.g., limiting or expanding selection of the action $\alpha$ corresponding to a subset of probability values contained within the action probability distribution p); and/or (3) the outcome evaluation module 130 (e.g., modifying the nature of the outcome value $\beta$ or otherwise the algorithms used to determine the outcome value $\beta$).

Having now briefly discussed the components of the program 100, we will now describe the functionality of the program 100 in more detail. Beginning with the probability update module 120, the action probability distribution p that it generates can be represented by the following equation:

$$p(k)=[p_1(k),p_2(k),p_3(k)\ldots p_n(k)], \quad [1]$$

where $p_l$ is the action probability value assigned to a specific processor action $\alpha_l$; n is the number of processor actions $\alpha_l$ within the processor action set $\alpha_l$ and k is the incremental time at which the action probability distribution was updated.

Preferably, the action probability distribution p at every time k should satisfy the following requirement:

$$\sum_{i=1}^{n} p_i(k) = 1, \quad 0 \le p_i(k) \le 1. \quad [2]$$

Thus, the internal sum of the action probability distribution p, i.e., the action probability values $p_l$ for all processor actions $\alpha_l$ within the processor action set $\alpha$ is always equal "1," as dictated by the definition of probability. It should be noted that the number n of processor actions $\alpha_l$ need not be fixed, but can be dynamically increased or decreased during operation of the program 100.

The probability update module 120 uses a stochastic learning automaton, which is an automaton that operates in a random environment and updates its action probabilities in accordance with inputs received from the environment so as to improve its performance in some specified sense. A learning automaton can be characterized in that any given state of the action probability distribution p determines the state of the next action probability distribution p. For example, the probability update module 120 operates on the action probability distribution p(k) to determine the next action probability distributionp(k+1), i.e., the next action probability distribution p(k+1) is a function of the current action probability distribution p(k). Advantageously, updating of the action probability distribution p using a learning automaton is based on a frequency of the processor actions $\alpha_l$ and/or user actions $\lambda_l$, as well as the time ordering of these actions. This can be contrasted with purely operating on a frequency of processor actions $\alpha_l$ or user actions $\lambda_l$, and updating the action probability distribution p(k) based thereon. Although the present inventions, in their broadest aspects, should not be so limited, it has been found that the use of a learning automaton provides for a more dynamic, accurate, and flexible means of teaching the probabilistic learning module 110.

In this scenario, the probability update module 120 uses a single learning automaton with a single input to a single-teacher environment (with the user 105 as the teacher), and thus, a single-input, single-output (SISO) model is assumed.

To this end, the probability update module 120 is configured to update the action probability distribution p based on the law of reinforcement, the basic idea of which is to reward a favorable action and/or to penalize an unfavorable action. A specific processor action $\alpha_l$ is rewarded by increasing the corresponding current probability value $p_l(k)$ and decreasing all other current probability values $p_j(k)$, while a specific processor action $\alpha_l$ is penalized by decreasing the corresponding current probability value $p_l(k)$ and increasing all other current probability values $p_j(k)$. Whether the selected processor action $\alpha_l$ is rewarded or punished will be based on the outcome value β generated by the outcome evaluation module 130. For the purposes of this specification, an action probability distribution p is updated by changing the probability values $p_l$ within the action probability distribution p, and does not contemplate adding or subtracting probability values $p_l$.

To this end, the probability update module 120 uses a learning methodology to update the action probability distribution p, which can mathematically be defined as:

$$p(k+1)=T[p(k),\alpha_l(k),\beta(k)], \quad [3]$$

where p(k+1) is the updated action probability distribution, T is the reinforcement scheme, p(k) is the current action probability distribution, $\alpha_l$(k) is the previous processor action, β(k) is latest outcome value, and k is the incremental time at which the action probability distribution was updated.

Alternatively, instead of using the immediately previous processor action a,(k), any set of previous processor action, e.g., α(k−1), α(k−2), α(k−3), etc., can be used for lag learning, and/or a set of future processor action, e.g., α(k+1), α(k+2), α(k+3), etc., can be used for lead learning. In the case of lead learning, a future processor action is selected and used to determine the updated action probability distribution p(k+1).

The types of learning methodologies that can be utilized by the probability update module 120 are numerous, and depend on the particular application. For example, the nature of the outcome value β can be divided into three types: (1) P-type, wherein the outcome value β can be equal to "1" indicating success of the processor action $\alpha_l$, and "0" indicating failure of the processor action $\alpha_l$; (2) Q-type, wherein the outcome value β can be one of a finite number of values between "0" and "1" indicating a relative success or failure of the processor action $\alpha_l$; or (3) S-Type, wherein the outcome value β can be a continuous value in the interval [0,1] also indicating a relative success or failure of the processor action $\alpha_l$.

The outcome value β can indicate other types of events besides successful and unsuccessful events. The time dependence of the reward and penalty probabilities of the actions a can also vary. For example, they can be stationary if the probability of success for a processor action $\alpha_l$ does not depend on the index k, and non-stationary if the probability of success for the processor action $\alpha_l$ depends on the index k. Additionally, the equations used to update the action probability distribution p can be linear or non-linear. Also, a processor action $\alpha_l$ can be rewarded only, penalized only, or a combination thereof. The convergence of the learning methodology can be of any type, including ergodic, absolutely expedient, or optimal, or optimal. The learning methodology can also be a discretized, estimator, pursuit, hierarchical, pruning, growing or any combination thereof.

Of special importance is the estimator learning methodology, which can advantageously make use of estimator tables and algorithms should it be desired to reduce the processing otherwise requiring for updating the action probability distribution for every processor action $\alpha_l$ that is received. For example, an estimator table may keep track of the number of successes and failures for each processor action $\alpha_l$ received, and then the action probability distribution p can then be periodically updated based on the estimator table by, e.g., performing transformations on the estimator table. Estimator tables are especially useful when multiple users are involved, as will be described with respect to the multi-user embodiments described later.

In the preferred embodiment, a reward function $g_j$ and a penalization function $h_j$ is used to accordingly update the current action probability distribution p(k). For example, a general updating scheme applicable to P-type, Q-type and S-type methodologies can be given by the following SISO equations:

$$p_j(k+1)=p_j(k)-\beta(k)g_j(p_j(k))+(1-\beta(k))h_j(p(k)), \quad \text{if } \alpha(k)\neq\alpha_l$$

$$p_i(k+1) = p_i(k) + \beta(k)\sum_{\substack{j=1\\j\neq i}}^{n} g_j(p(k)) - (1-\beta(k))\sum_{\substack{j=1\\j\neq i}}^{n} h_j(p(k)), \quad \text{if } \alpha(k) = \alpha_i \quad [5]$$

where i is an index for a processor action $\alpha_l$, selected to be rewarded or penalized, and j is an index for the remaining processor actions $\alpha_l$ Assuming a P-type methodology, equations [4] and [5] can be broken down into the following equations:

$$p_i(k+1) = p_i(k) + \sum_{\substack{j=1\\j\neq i}}^{n} g_j(p(k)); \text{ and} \quad [6]$$

$$p_j(k+1)=p_j(k)-g_j(p(k)), \text{ when } \beta(k)=1 \text{ and } \alpha_l \text{ is selected} \quad [7]$$

$$p_i(k+1) = p_i(k) - \sum_{\substack{j=1\\j\neq i}}^{n} h_j(p(k)); \text{ and} \quad [8]$$

$$p_j(k+1)=p_j(k)+h_j(p(k)), \text{ when } \beta(k)=0 \text{ and } \alpha_l \text{ is selected} \quad [9]$$

Preferably, the reward function $g_j$ and penalty function $h_j$ are continuous and nonnegative for purposes of mathematical convenience and to maintain the reward and penalty nature of the updating scheme. Also, the reward function $g_j$ and penalty function $h_j$ are preferably constrained by the following equations to ensure that all of the components of p(k+1) remain in the (0, 1) interval when p(k) is in the (0,1) interval:

$$0<g_j(p)<p_j;$$

$$0 < \sum_{j\neq i}^{n} (p_j + h_j(p)) < 1$$

for all $p_j \in(0,1)$ and all j=1, 2, . . . n.

The updating scheme can be of the reward-penalty type, in which case, both $g_j$ and $h_j$ are non-zero. Thus, in the case of a P-type methodology, the first two updating equations [6] and [7] will be used to reward the processor action $\alpha_l$, e.g., when successful, and the last two updating equations [8] and [9] will be used to penalize processor action $\alpha_l$, e.g., when unsuccessful. Alternatively, the updating scheme is of the reward-inaction type, in which case, $g_j$ is nonzero and $h_j$ is zero. Thus, the first two general updating equations [6] and [7] will be used to reward the processor action $\alpha_l$, e.g., when successful, whereas the last two general updating equations [8] and [9] will not be used to penalize processor action $\alpha_l$, e.g., when unsuccessful. More alternatively, the updating scheme is of the penalty-inaction type, in which case, $g_j$ is zero and $h_j$ is nonzero. Thus, the first two general updating equations [6] and [7] will not be used to reward the processor action $\alpha_i$, e.g., when successful, whereas the last two general updating equations [8] and [9] will be used to penalize processor action $\alpha_i$, e.g., when unsuccessful. The updating scheme can even be of the reward-reward type (in which case, the processor action $\alpha_i$ is rewarded more, e.g., when it is more successful than when it is not) or penalty-penalty type (in which case, the processor action $\alpha_i$ is penalized more, e.g., when it is less successful than when it is).

It should be noted that with respect to the probability distribution p as a whole, any typical updating scheme will have both a reward aspect and a penalty aspect to the extent that a particular processor action $\alpha_i$ that is rewarded will penalize the remaining processor actions $\alpha_i$, and any particular processor action $\alpha_i$ that penalized will reward the remaining processor actions $\alpha_i$. This is because any increase in a probability value $p_i$ will relatively decrease the remaining probability values $p_i$, and any decrease in a probability value $p_i$ will relatively increase the remaining probability values $p_i$. For the purposes of this specification, however, a particular processor action $\alpha_i$ is only rewarded if its corresponding probability value $p_i$ is increased in response to an outcome value $\beta$ associated with it, and a processor action $\alpha_i$ is only penalized if its corresponding probability value $p_i$ is decreased in response to an outcome value $\beta$ associated with it.

The nature of the updating scheme is also based on the functions $g_j$ and $h_j$ themselves. For example, the functions $g_j$ and $h_j$ can be linear, in which case, e.g., they can be characterized by the following equations:

$$g_j(p(k))=ap_j(k),\ 0<\alpha<1;\ \text{and} \quad [10]$$

$$h_j(p(k))=\frac{b}{n-1}-bp_j(k),\ 0<b<1 \quad [11]$$

where $\alpha$ is the reward parameter, and b is the penalty parameter.

The functions $g_j$ and $h_j$ can alternatively be absolutely expedient, in which case, e.g., they can be characterized by the following equations:

$$\frac{g_1(p)}{p_1}=\frac{g_2(p)}{p_2}=\ldots=\frac{g_n(p)}{p_n}; \quad [12]$$

$$\frac{h_1(p)}{p_1}=\frac{h_2(p)}{p_2}=\ldots=\frac{h_n(p)}{p_n} \quad [13]$$

The functions $g_j$ and $h_j$ can alternatively be non-linear, in which case, e.g., they can be characterized by the following equations:

$$g_j(p(k))=p_j(k)-F(p_j(k));$$

$$h_j(p(k))=\frac{p_i(k)-F(p_i(k))}{n-1} \quad [15]$$

and $F(x)=ax^m$, m=2, 3, . . . .

It should be noted that equations [4] and [5] are not the only general equations that can be used to update the current action probability distribution p(k) using a reward function $g_j$ and a penalization function $h_j$. For example, another general updating scheme applicable to P-type, Q-type and S-type methodologies can be given by the following SISO equations:

$$p_j(k+1)=p_j(k)-\beta(k)c_jg_i(p(k))+(1-\beta(k))d_jh_i(p(k)),\ \text{if}\ \alpha(k)\neq\alpha_i \quad [16]$$

$$p(k+1)=p_i(k)+\beta(k)g_i(p(k))-(1-\beta(k))h_i(p(k)),\ \text{if}\ \alpha(k)=\alpha_i \quad [17]$$

where c and d are constant or variable distribution multipliers that adhere to the following constraints:

$$\sum_{\substack{j=1\\ i\neq j}}^{n} c_jg_i(p(k))=g_i(p(k));$$

$$\sum_{\substack{j=1\\ i\neq j}}^{n} d_jh_i(p(k))=h_i(p(k))$$

In other words, the multipliers c and d are used to determine what proportions of the amount that is added to or subtracted from the probability value $p_i$ is redistributed to the remaining probability values $p_j$.

Assuming a P-type methodology, equations [16] and [17] can be broken down into the following equations:

$$p_i(k+1)=p_i(k)+g_i(p(k));\ \text{and} \quad [18]$$

$$p_j(k+1)=p_j(k)-c_jg_i(p(k)),\ \text{when}\ \beta(k)=1\ \text{and}\ \alpha_i\ \text{is selected} \quad [19]$$

$$p_i(k+1)=p_i(k)-h_i(p(k));\ \text{and} \quad [20]$$

$$p_j(k+1)=p_j(k)+d_jh_i(p(k)),\ \text{when}\ \beta(k)=0\ \text{and}\ \alpha_i\ \text{is selected} \quad [21]$$

It can be appreciated that equations [4]-[5] and [16]-[17] are fundamentally similar to the extent that the amount that is added to or subtracted from the probability value $p_i$ is subtracted from or added to the remaining probability values $p_j$. The fundamental difference is that, in equations [4]-[5], the amount that is added to or subtracted from the probability value $p_i$ is based on the amounts that are subtracted from or added to the remaining probability values $p_j$ (i.e., the amounts added to or subtracted from the remaining probability values $p_{ij}$ are calculated first), whereas in equations [16]-[17], the amounts that are added to or subtracted from the remaining probability values $p_j$ are based on the amount that is subtracted from or added to the probability value $p_i$ (i.e., the amount added to or subtracted from the probability value $p_i$ is calculated first). It should also be noted that equations [4]-[5] and [16]-[17] can be combined to create new learning methodologies. For example, the reward portions of equations [4]-[5] can be used when an action $\alpha_i$ is to be rewarded, and the penalty portions of equations [16]-[17] can be used when an action $\alpha_i$ is to be penalized.

Previously, the reward and penalty functions $g_j$ and $h_j$ and multipliers $c_j$ and $d_j$ have been described as being one-dimensional with respect to the current action $\alpha_i$ that is being rewarded or penalized. That is, the reward and penalty functions $g_j$ and $h_j$ and multipliers $c_j$ and $d_j$ are the same given any action $\alpha_i$. It should be noted, however, that multi-dimensional reward and penalty functions $g_{ijx}$ and $h_{ijx}$ and multipliers $c_{ijx}$ and $d_{ijx}$ can be used.

In this case, the single dimensional reward and penalty functions $g_j$ and $h_j$ of equations [6]-[9] can be replaced with the two-dimensional reward and penalty functions $g_{ijx}$ and $h_{ijx}$, resulting in the following equations:

$$p_i(k+1) = p_i(k) + \sum_{\substack{j=1 \\ j\neq i}}^{n} g_{ij}(p(k)); \text{ and} \quad [6a]$$

$$p_j(k+1) = p_j(k) - g_{ij}(p(k)), \text{ when } \beta(k) = 1 \text{ and } \alpha_i \text{ is selected} \quad [7a]$$

$$p_i(k+1) = p_i(k) - \sum_{\substack{j=1 \\ j\neq i}}^{n} h_{ij}(p(k)); \text{ and} \quad [8a]$$

$$p_j(k+1)=p_j(k)+h_{ijx}(p(k)), \text{ when } \beta(k)=0 \text{ and } \alpha_l \text{ is selected} \quad [9a]$$

The single dimensional multipliers $c_j$ and $d_j$ of equations [19] and [21] can be replaced with the two-dimensional multipliers $c_{ijx}$ and $d_{ijx}$, resulting in the following equations:

$$p_j(k+1)=p_j(k)-c_{ijx}g_l(p(k)), \text{ when } \beta(k)=1 \text{ and } \alpha_i \text{ is selected} \quad [19a]$$

$$p_j(k+1)=p_j(k)+d_{ijx}h_l(p(k)), \text{ when } \beta(k)=0 \text{ and } \alpha_i \text{ is selected} \quad [21a]$$

Thus, it can be appreciated, that equations [19a] and [21a] can be expanded into many different learning methodologies based on the particular action $\alpha_l$ that has been selected.

Further details on learning methodologies are disclosed in "Learning Automata An Introduction," Chapter 4, Narendra, Kumpati, Prentice Hall (1989) and "Learning Algorithms-Theory and Applications in Signal Processing, Control and Communications," Chapter 2, Mars, Phil, CRC Press (1996), which are both expressly incorporated herein by reference.

The intuition module 115 directs the learning of the program 100 towards one or more objectives by dynamically modifying the probabilistic learning module 110. The intuition module 115 specifically accomplishes this by operating on one or more of the probability update module 120, action selection module 125, or outcome evaluation module 130 based on the performance index φ, which, as briefly stated, is a measure of how well the program 100 is performing in relation to the one or more objective to be achieved. The intuition module 115 may, e.g., take the form of any combination of a variety of devices, including an (1) evaluator, data miner, analyzer, feedback device, stabilizer; (2) decision maker; (3) expert or rule-based system; (4) artificial intelligence, fuzzy logic, neural network, or genetic methodology; (5) directed learning device; (6) statistical device, estimator, predictor, regressor, or optimizer. These devices may be deterministic, pseudo-deterministic, or probabilistic.

Figure 2:
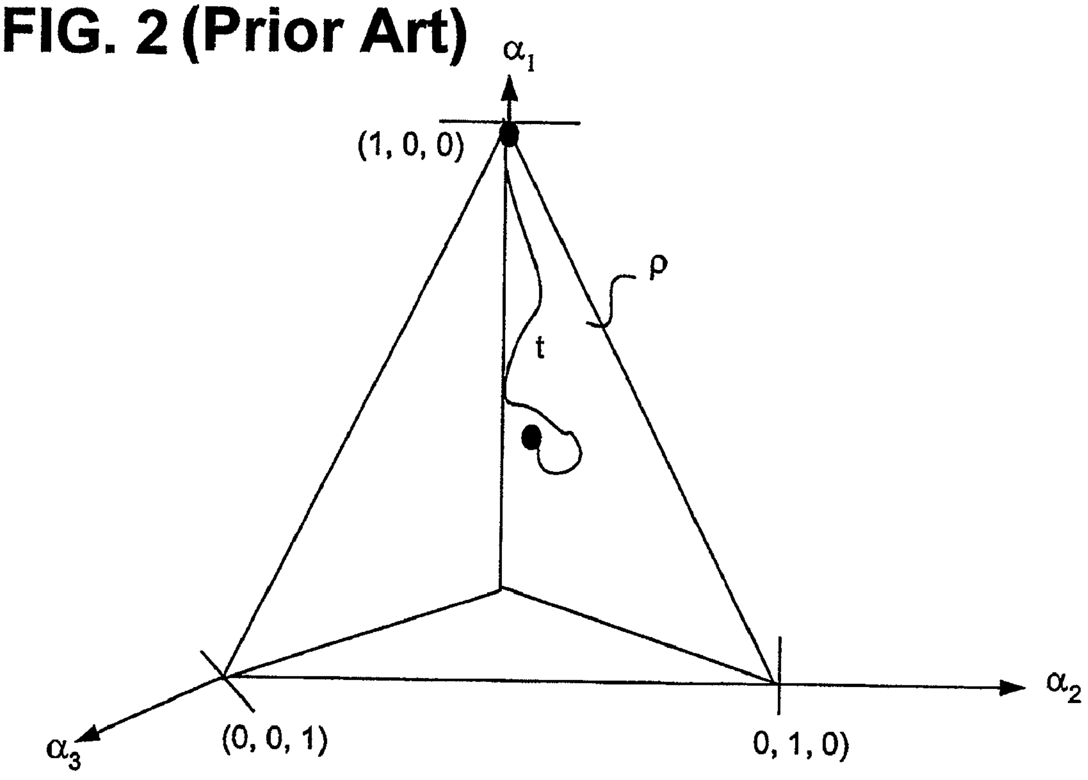
FIG. 2 is a diagram illustrating the generation of probability values for three actions over time in a prior art learning automaton.
Figure 3:
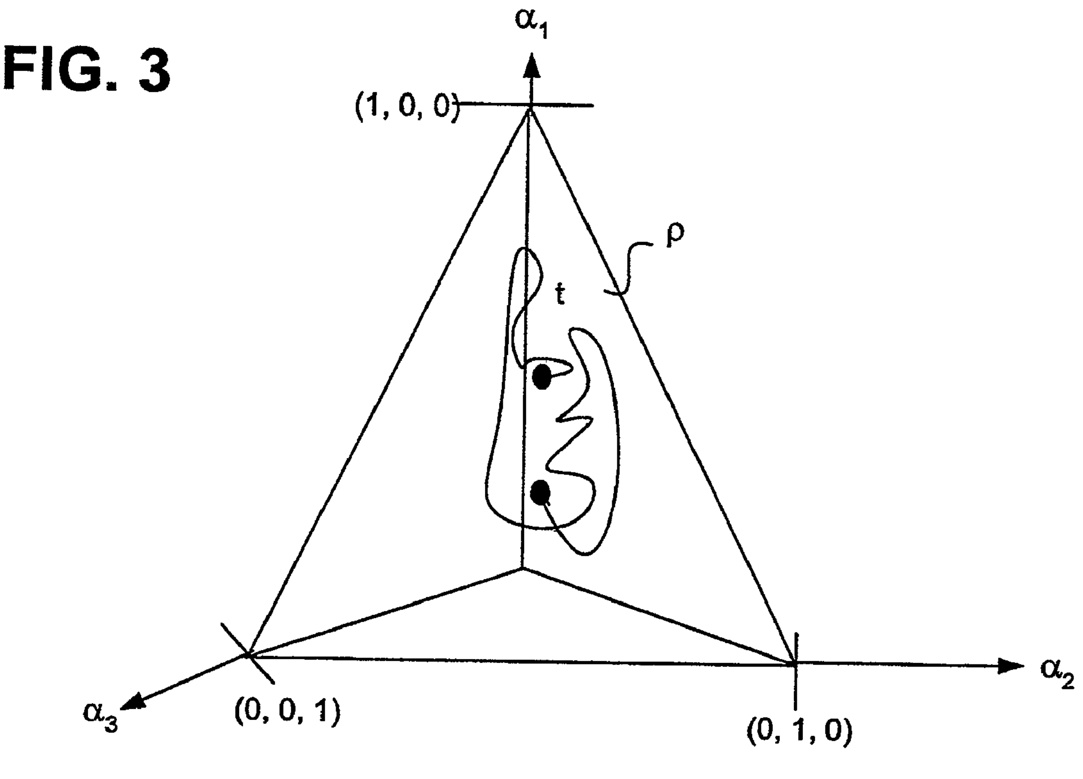
FIG. 3 is a diagram illustrating the generation of probability values for three actions over time in the single-user learning software program of FIG. 1.

It is worth noting that absent modification by the intuition module 115, the probabilistic learning module 110 would attempt to determine a single best action or a group of best actions for a given predetermined environment as per the objectives of basic learning automata theory. That is, if there is a unique action that is optimal, the unmodified probabilistic learning module 110 will substantially converge to it. If there is a set of actions that are optimal, the unmodified probabilistic learning module 110 will substantially converge to one of them, or oscillate (by pure happenstance) between them. In the case of a changing environment, however, the performance of an unmodified learning module 110 would ultimately diverge from the objectives to be achieved. FIGS. 2 and 3 are illustrative of this point. Referring specifically to FIG. 2, a graph illustrating the action probability values $p_l$ of three different actions $\alpha_l$, $\alpha_2$, and $\alpha_3$, as generated by a prior art learning automaton over time t, is shown. As can be seen, the action probability values $p_l$ for the three actions are equal at the beginning of the process, and meander about on the probability plane $p_l$ until they eventually converge to unity for a single action, in this case, $\alpha_l$. Thus, the prior art learning automaton assumes that there is always a single best action over time t and works to converge the selection to this best action. Referring specifically to FIG. 3, a graph illustrating the action probability values $p_l$ of three different actions $\alpha_l$, $\alpha_2$, and $\alpha_3$, as generated by the program 100 over time t, is shown. Like with the prior art learning automaton, action probability values $p_l$ for the three action are equal at t=0. Unlike with the prior art learning automaton, however, the action probability values $p_l$ for the three actions meander about on the probability plane p without ever converging to a single action. Thus, the program 100 does not assume that there is a single best action over time t, but rather assumes that there is a dynamic best action that changes over time t. Because the action probability value for any best action will not be unity, selection of the best action at any given time t is not ensured, but will merely tend to occur, as dictated by its corresponding probability value. Thus, the program 100 ensures that the objective(s) to be met are achieved over time t.

Figure 4:
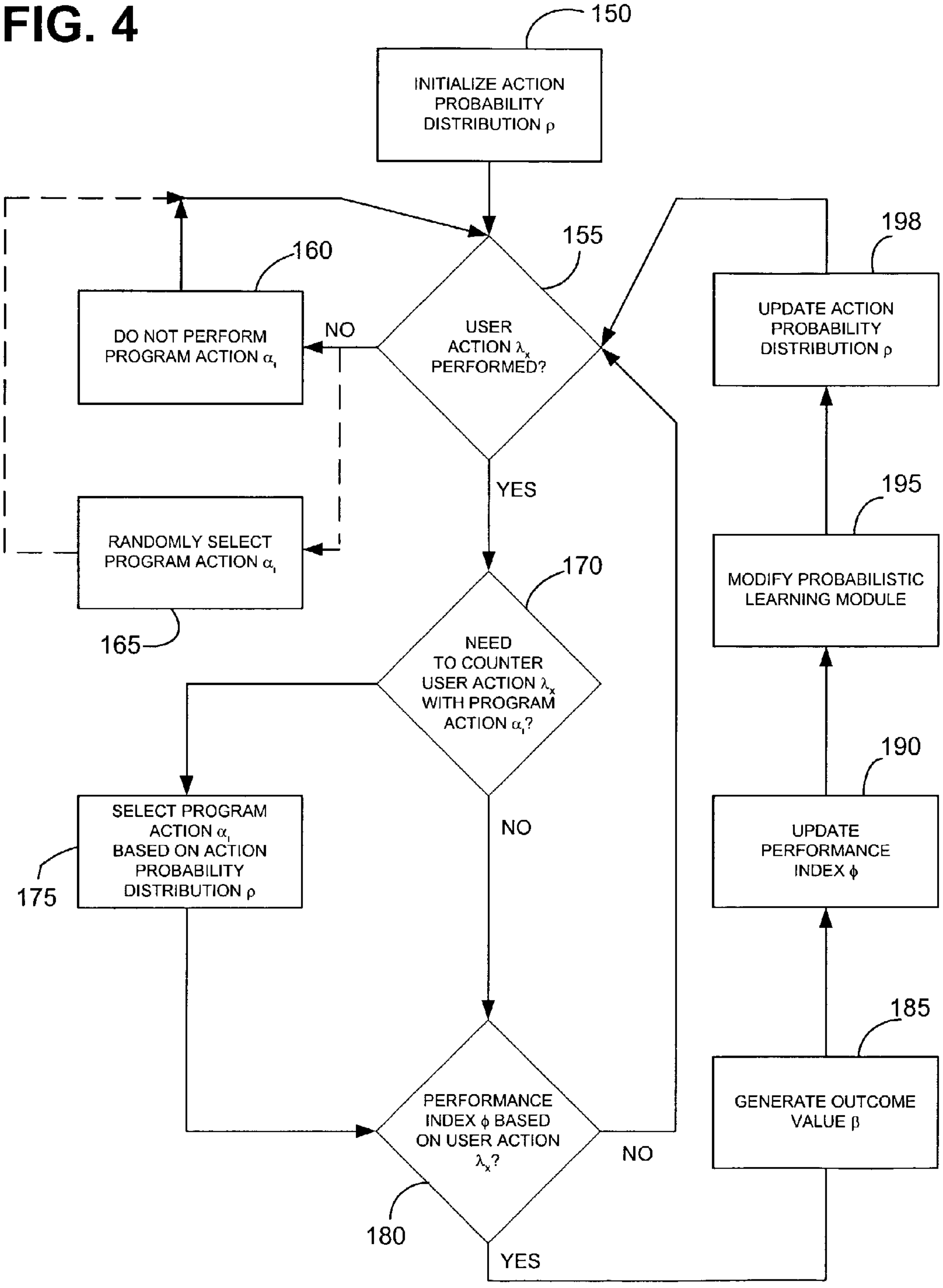
FIG. 4 is a flow diagram illustrating a preferred method performed by the program of FIG. 1.

Having now described the interrelationships between the components of the program 100 and the user 105, we now generally describe the methodology of the program 100. Referring to FIG. 4, the action probability distributions is initialized (step 150). Specifically, the probability update module 120 initially assigns equal probability values to all processor actions $\alpha_l$ in which case, the initial action probability distribution p(k) can be represented by $p_1(0)=p_2(0)=p_2(0)= \ldots p_n(0)=1/n$. Thus, each of the processor actions $\alpha_l$ has an equal chance of being selected by the action selection module 125. Alternatively, the probability update module 120 initially assigns unequal probability values to at least some of the processor actions $\alpha_i$, e.g., if the programmer desires to direct the learning of the program 100 towards one or more objectives quicker. For example, if the program 100 is a computer game and the objective is to match a novice game player's skill level, the easier processor action $\alpha_l$, and in this case game moves, may be assigned higher probability values, which as will be discussed below, will then have a higher probability of being selected. In contrast, if the objective is to match an expert game player's skill level, the more difficult game moves may be assigned higher probability values.

Once the action probability distributionp is initialized at step 150, the action selection module 125 determines if a user action $\lambda_l$ has been selected from the user action set λ (step 155). If not, the program 100 does not select a processor action $\alpha_l$ from the processor action set α (step 160), or alternatively selects a processor action $\alpha_l$, e.g., randomly, notwithstanding that a user action $\lambda_l$ has not been selected (step 165), and then returns to step 155 where it again determines if a user action $\lambda_l$ has been selected. If a user action $\lambda_l$ as been selected at step 155, the action selection module 125 determines the nature of the selected user action $\lambda_l$, i.e., whether the selected user action $\lambda_l$ is of the type that should be countered with a processor action $\alpha_l$ and/or whether the performance index φ can be based, and thus whether the action probability distribution p should be updated. For example, again, if the program 100 is a game program, e.g., a shooting game, a selected user action $\lambda_l$ that merely represents a move may not be a sufficient measure of the performance index φ, but should be countered with a processor action $\alpha_i$, while a selected user action Ax that represents a shot may be a sufficient measure of the performance index φ.

Specifically, the action selection module 125 determines whether the selected user action $\lambda_l$ is of the type that should be countered with a processor action $\alpha$ (step 170). If so, the action selection module 125 selects a processor action $\alpha_l$ from the processor action set a based on the action probability distributions (step 175). After the performance of step 175 or if the action selection module 125 determines that the selected user action Ax is not of the type that should be countered with a processor action $\alpha_l$, the action selection module 125 determines if the selected user action $\lambda_l$ is of the type that the performance index $\phi$ is based on (step 180).

If so, the outcome evaluation module 130 quantifies the performance of the previously selected processor action $\alpha_l$ (or a more previous selected processor action $\alpha_l$ in the case of lag learning or a future selected processor action $\alpha_l$ in the case of lead learning) relative to the currently selected user action $\lambda_l$ by generating an outcome value $\beta$ (step 185). The intuition module 115 then updates the performance index $\phi$ based on the outcome value $\alpha$, unless the performance index $\phi$ is an instantaneous performance index that is represented by the outcome value $\beta$ itself (step 190). The intuition module 115 then modifies the probabilistic learning module 110 by modifying the functionalities of the probability update module 120, action selection module 125, or outcome evaluation module 130 (step 195). It should be noted that step 190 can be performed before the outcome value $\beta$ is generated by the outcome evaluation module 130 at step 180, e.g., if the intuition module 115 modifies the probabilistic learning module 110 by modifying the functionality of the outcome evaluation module 130. The probability update module 120 then, using any of the updating techniques described herein, updates the action probability distribution p based on the generated outcome value $\beta$ (step 198).

The program 100 then returns to step 155 to determine again whether a user action $\lambda_l$ has been selected from the user action set $\lambda$. It should be noted that the order of the steps described in FIG. 4 may vary depending on the specific application of the program 100.

Single-Player Game Program (Single Game Move-Single Player Move)

Figure 5:
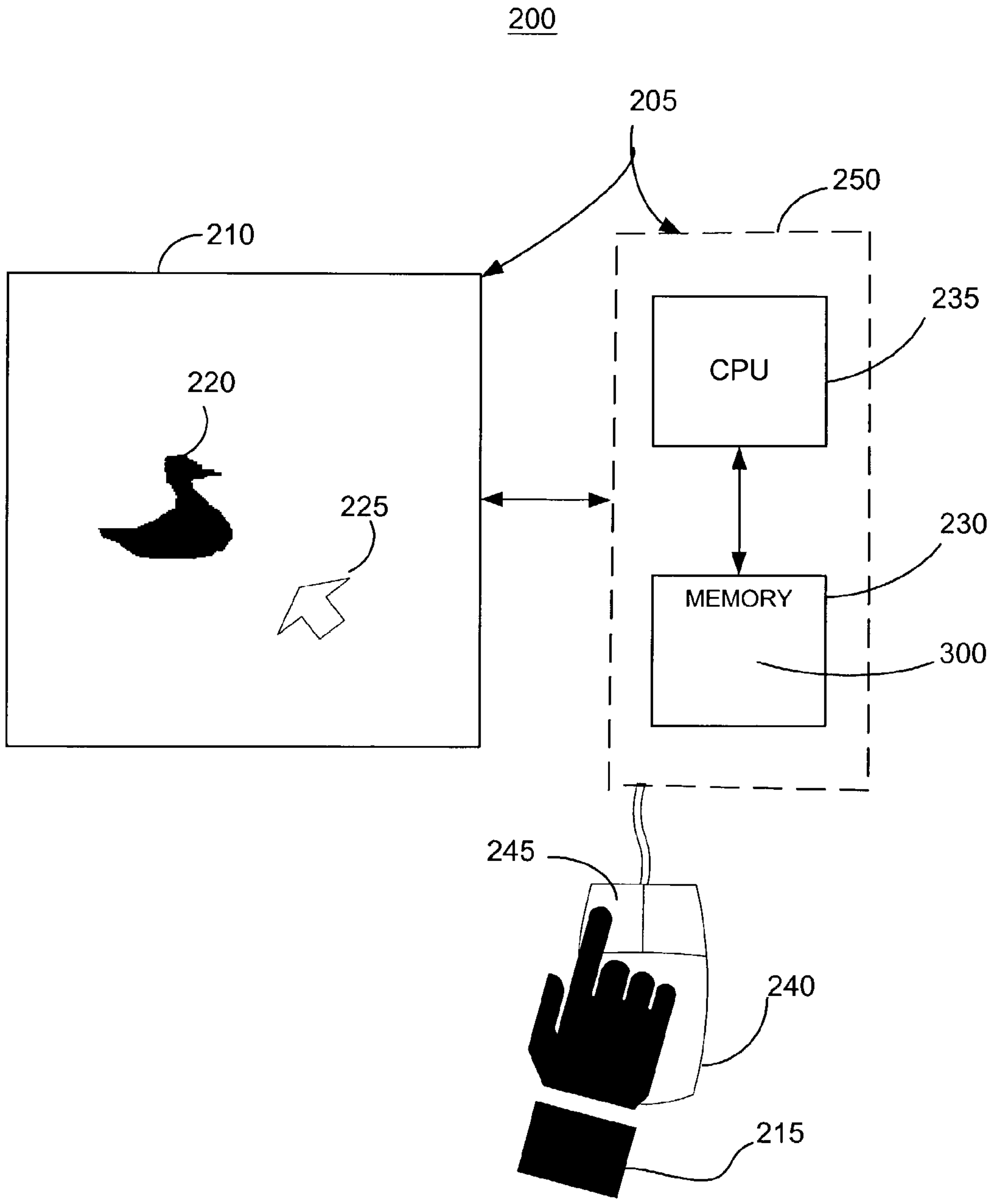
FIG. 5 is a block diagram of a single-player duck hunting game to which the generalized program of FIG. 1 can be applied.

Having now generally described the components and functionality of the learning program 100, we now describe one of its various applications. Referring to FIG. 5, a single-player game program 300 (shown in FIG. 8) developed in accordance with the present inventions is described in the context of a duck hunting game 200. The game 200 comprises a computer system 205, which, e.g., takes the form of a personal desktop or laptop computer. The computer system 205 includes a computer screen 210 for displaying the visual elements of the game 200 to a player 215, and specifically, a computer animated duck 220 and a gun 225, which is represented by a mouse cursor. For the purposes of this specification, the duck 220 and gun 225 can be broadly considered to be computer and user-manipulated objects, respectively. The computer system 205 further comprises a computer console 250, which includes memory 230 for storing the game program 300, and a CPU 235 for executing the game program 300. The computer system 205 further includes a computer mouse 240 with a mouse button 245, which can be manipulated by the player 215 to control the operation of the gun 225, as will be described immediately below. It should be noted that although the game 200 has been illustrated as being embodied in a standard computer, it can very well be implemented in other types of hardware environments, such as a video game console that receives video game cartridges and connects to a television screen, or a video game machine of the type typically found in video arcades.

Figure 6:
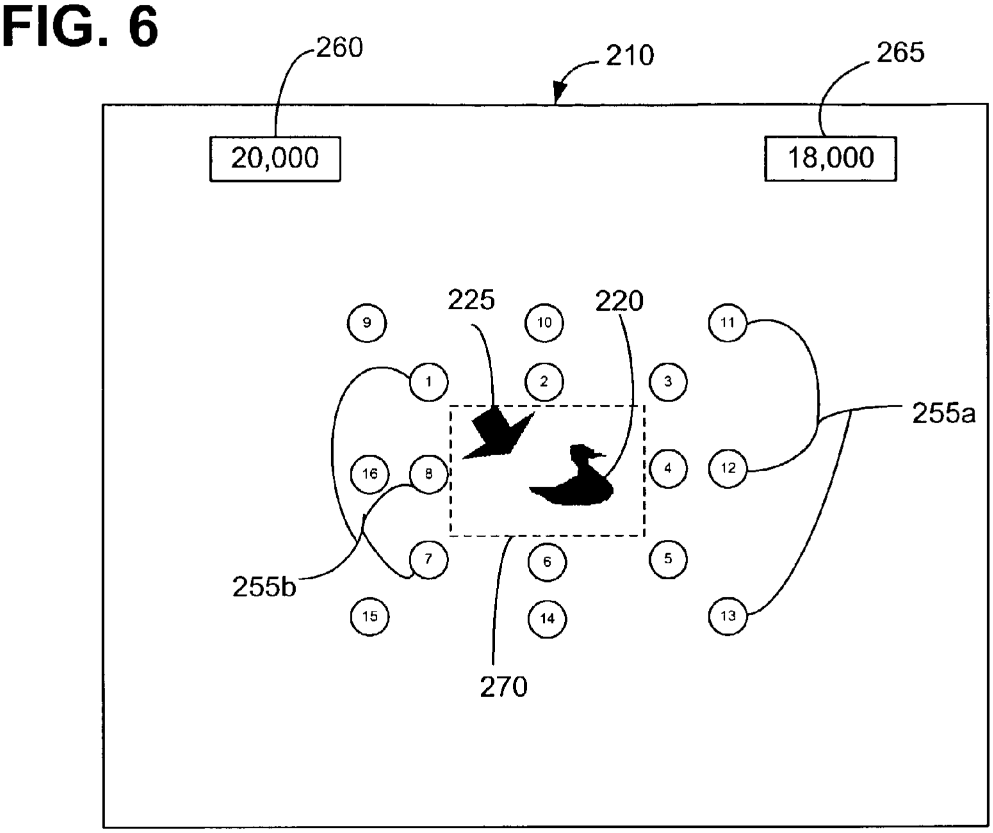
FIG. 6 is a plan view of a computer screen used in the duck hunting game of FIG. 5, wherein a gun is particularly shown shooting a duck.
Figure 7:
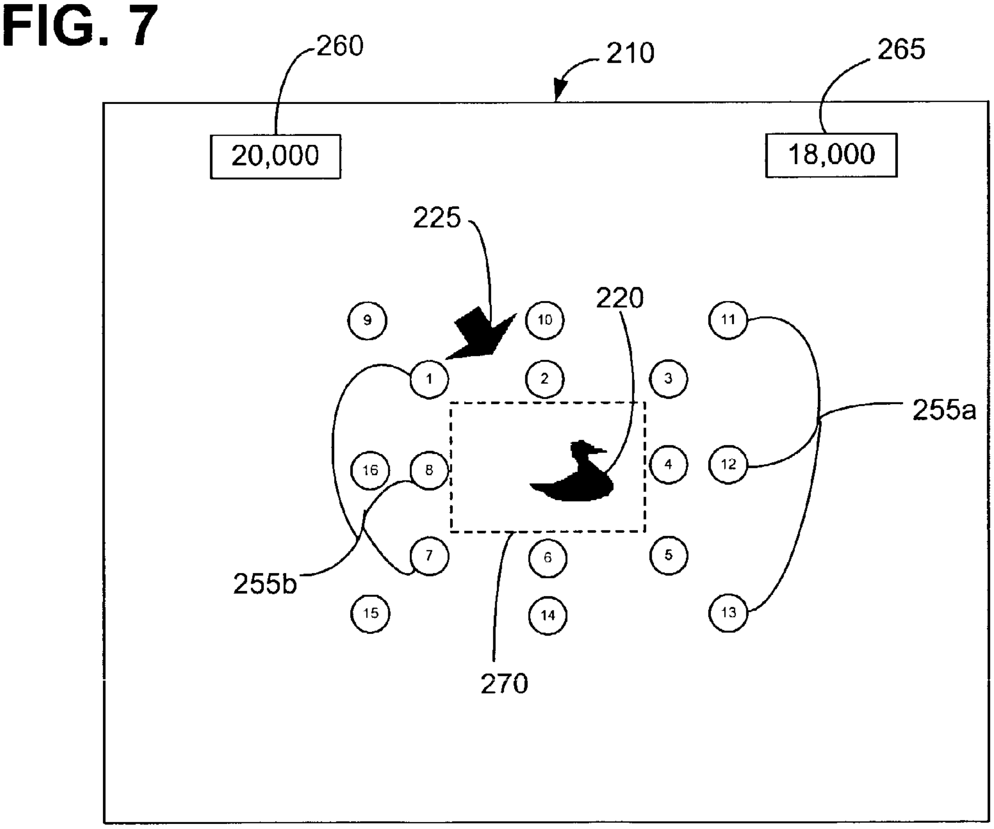
FIG. 7 is a plan view of a computer screen used in the duck hunting game of FIG. 5, wherein a duck is particularly shown moving away from the gun.

Referring specifically to the computer screen 210 of FIGS. 6 and 7, the rules and objective of the duck hunting game 200 will now be described. The objective of the player 215 is to shoot the duck 220 by moving the gun 225 towards the duck 220, intersecting the duck 220 with the gun 225, and then firing the gun 225 (FIG. 6). The player 215 accomplishes this by laterally moving the mouse 240, which correspondingly moves the gun 225 in the direction of the mouse movement, and clicking the mouse button 245, which fires the gun 225. The objective of the duck 220, on the other hand, is to avoid from being shot by the gun 225. To this end, the duck 220 is surrounded by a gun detection region 270, the breach of which by the gun 225 prompts the duck 220 to select and make one of seventeen moves 255 (eight outer moves **255*a*, eight inner moves 255*b*, and a non-move) after a preprogrammed delay (move 3 in FIG. 7). The length of the delay is selected, such that it is not so long or short as to make it too easy or too difficult to shoot the duck 220. In general, the outer moves 255*a* more easily evade the gun 225 than the inner moves 255*b*, thus, making it more difficult for the player 215 to shot the duck 220**.

For purposes of this specification, the movement and/or shooting of the gun 225 can broadly be considered to be a player move, and the discrete moves of the duck 220 can broadly be considered to be computer or game moves, respectively. Optionally or alternatively, different delays for a single move can also be considered to be game moves. For example, a delay can have a low and high value, a set of discrete values, or a range of continuous values between two limits. The game 200 maintains respective scores 260 and 265 for the player 215 and duck 220. To this end, if the player 215 shoots the duck 220 by clicking the mouse button 245 while the gun 225 coincides with the duck 220, the player score 260 is increased. In contrast, if the player 215 fails to shoot the duck 220 by clicking the mouse button 245 while the gun 225 does not coincide with the duck 220, the duck score 265 is increased. The increase in the score can be fixed, one of a multitude of discrete values, or a value within a continuous range of values.

As will be described in further detail below, the game 200 increases its skill level by learning the player's 215 strategy and selecting the duck's 220 moves based thereon, such that it becomes more difficult to shoot the duck 220 as the player 215 becomes more skillful. The game 200 seeks to sustain the player's 215 interest by challenging the player 215. To this end, the game 200 continuously and dynamically matches its skill level with that of the player 215 by selecting the duck's 220 moves based on objective criteria, such as, e.g., the difference between the respective player and game scores 260 and 265. In other words, the game 200 uses this score difference as a performance index $\phi$ in measuring its performance in relation to its objective of matching its skill level with that of the game player. In the regard, it can be said that the performance index $\phi$ is cumulative. Alternatively, the performance index $\phi$ can be a function of the game move probability distribution p.

Figure 8:
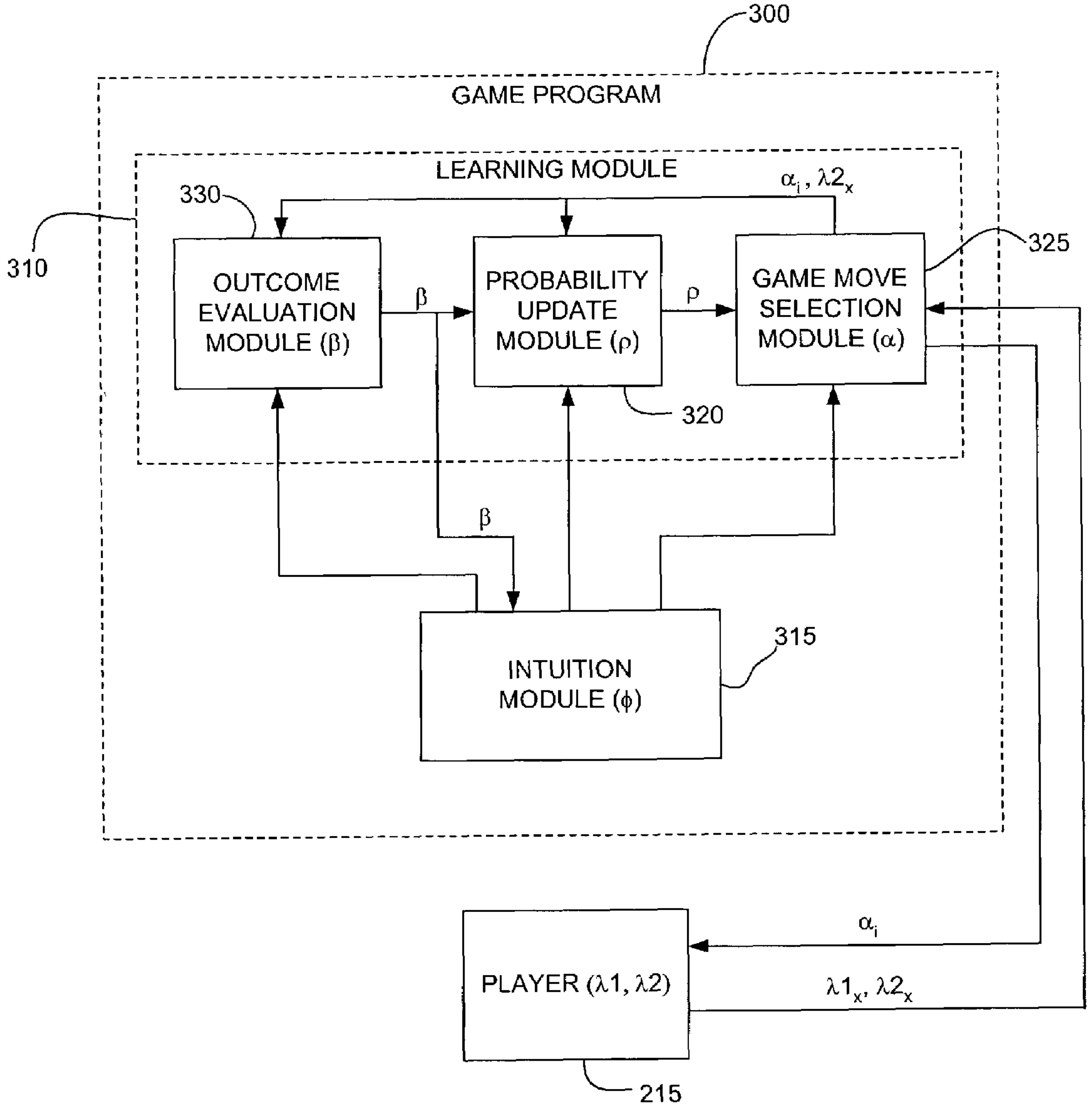
FIG. 8 is a block diagram of a single-player game program employed in the duck hunting game of FIG. 5.

Referring further to FIG. 8, the game program 300 generally includes a probabilistic learning module 310 and an intuition module 315, which are specifically tailored for the game 200. The probabilistic learning module 310 comprises a probability update module 320, a game move selection module 325, and an outcome evaluation module 330. Specifically, the probability update module 320 is mainly responsible for learning the player's 215 strategy and formulating a counterstrategy based thereon, with the outcome evaluation module 330 being responsible for evaluating moves performed by the game 200 relative to moves performed by the player 215. The game move selection module 325 is mainly responsible for using the updated counterstrategy to move the duck 220 in response to moves by the gun 225. The intuition module 315 is responsible for directing the learning of the game program 300 towards the objective, and specifically, dynamically and continuously matching the skill level of the game 200 with that of the player 215. In this case, the intuition module 315 operates on the game move selection module 325, and specifically selects the methodology that the game move selection module 325 will use to select a game move $\alpha_l$ from the game move set a as will be discussed in further detail below. In the preferred embodiment, the intuition module 315 can be considered deterministic in that it is purely rule-based. Alternatively, however, the intuition module 315 can take on a probabilistic nature, and can thus be quasi-deterministic or entirely probabilistic.

To this end, the game move selection module 325 is configured to receive a player move $\lambda 1_l$ from the player 215, which takes the form of a mouse 240 position, i.e., the position of the gun 225, at any given time. In this embodiment, the player move $\lambda 1_l$ can be selected from a virtually infinite player move set $\lambda 1_l$, i.e., the number of player moves $\lambda 1_l$ are only limited by the resolution of the mouse 240. Based on this, the game move selection module 325 detects whether the gun 225 is within the detection region 270, and if so, selects a game move $\alpha_l$ from the game move set $\alpha_l$ and specifically, one of the seventeen moves 255 that the duck 220 can make. The game move $\alpha_l$ manifests itself to the player 215 as a visible duck movement.

The game move selection module 325 selects the game move $\alpha_l$ based on the updated game strategy. To this end, the game move selection module 325 is further configured to receive the game move probability distribution p from the probability update module 320, and pseudo-randomly selecting the game move $\alpha_l$ based thereon. The game move probability distribution p is similar to equation [1] and can be represented by the following equation:

$$p(k)=[p_1(k),p_2(k),p_3(k) \ldots p_n(k)], \quad [1\text{-}1]$$

where $p_l$ is the game move probability value assigned to a specific game move $\alpha_i$; n is the number of game moves $\alpha_l$ within the game move set $\alpha_l$ and k is the incremental time at which the game move probability distribution was updated.

It is noted that pseudo-random selection of the game move $\alpha_l$ allows selection and testing of any one of the game moves $\alpha_l$, with those game moves $\alpha_l$ corresponding to the highest probability values being selected more often. Thus, without the modification, the game move selection module 325 will tend to more often select the game move $\alpha_l$ to which the highest probability value $p_l$ corresponds, so that the game program 300 continuously improves its strategy, thereby continuously increasing its difficulty level.

Because the objective of the game 200 is sustainability, i.e., dynamically and continuously matching the respective skill levels of the game 200 and player 215, the intuition module 315 is configured to modify the functionality of the game move selection module 325 based on the performance index $\phi$, and in this case, the current skill level of the player 215 relative to the current skill level of the game 200. In the preferred embodiment, the performance index $\phi$ is quantified in terms of the score difference value $\Delta$ between the player score 260 and the duck score 265. The intuition module 315 is configured to modify the functionality of the game move selection module 325 by subdividing the game move set $\alpha$ into a plurality of game move subsets $\alpha_s$, one of which will be selected by the game move selection module 325. In an alternative embodiment, the game move selection module 325 may also select the entire game move set $\alpha$. In another alternative embodiment, the number and size of the game move subsets $\alpha_s$ can be dynamically determined.

In the preferred embodiment, if the score difference value $\Delta$ is substantially positive (i.e., the player score 260 is substantially higher than the duck score 265), the intuition module 315 will cause the game move selection module 325 to select a game move subset $\alpha_l$, the corresponding average probability value of which will be relatively high, e.g., higher than the median probability value of the game move probability distribution p. As a further example, a game move subset $\alpha_s$ corresponding to the highest probability values within the game move probability distribution p can be selected. In this manner, the skill level of the game 200 will tend to quickly increase in order to match the player's 215 higher skill level.

If the score difference value $\Delta$ is substantially negative (i.e., the player score 260 is substantially lower than the duck score 265), the intuition module 315 will cause the game move selection module 325 to select a game move subset $\alpha_s$, the corresponding average probability value of which will be relatively low, e.g., lower than the median probability value of the game move probability distribution p. As a further example, a game move subset $\alpha_s$, corresponding to the lowest probability values within the game move probability distribution p can be selected. In this manner, the skill level of the game 200 will tend to quickly decrease in order to match the player's 215 lower skill level.

If the score difference value A is substantially low, whether positive or negative (i.e., the player score 260 is substantially equal to the duck score 265), the intuition module 315 will cause the game move selection module 325 to select a game move subset $\alpha_s$, the average probability value of which will be relatively medial, e.g., equal to the median probability value of the game move probability distribution p. In this manner, the skill level of the game 200 will tend to remain the same, thereby continuing to match the player's 215 skill level. The extent to which the score difference value A is considered to be losing or winning the game 200 may be provided by player feedback and the game designer.

Alternatively, rather than selecting a game move subset $\alpha_s$, based on a fixed reference probability value, such as the median probability value of the game move probability distribution p, selection of the game move set $\alpha_s$ can be based on a dynamic reference probability value that moves relative to the score difference value $\Delta$. To this end, the intuition module 315 increases and decreases the dynamic reference probability value as the score difference value A becomes more positive or negative, respectively. Thus, selecting a game move subset $\alpha_l$, the corresponding average probability value of which substantially coincides with the dynamic reference probability value, will tend to match the skill level of the game 200 with that of the player 215. Without loss of generality, the dynamic reference probability value can also be learning using the learning principles disclosed herein.

In the illustrated embodiment, (1) if the score difference value $\Delta$ is substantially positive, the intuition module 315 will cause the game move selection module 325 to select a game move subset $\alpha_s$ composed of the top five corresponding probability values; (2) if the score difference value $\Delta$ is substantially negative, the intuition module 315 will cause the game move selection module 325 to select a game move subset $\alpha_s$ composed of the bottom five corresponding probability values; and (3) if the score difference value $\Delta$ is substantially low, the intuition module 315 will cause the game move selection module 325 to select a game move subset $\alpha_s$ composed of the middle seven corresponding probability values, or optionally a game move subset $\alpha_s$ composed of all seventeen corresponding probability values, which will reflect a normal game where all game moves are available for selection.

Whether the reference probability value is fixed or dynamic, hysteresis is preferably incorporated into the game move subset $\alpha_s$ selection process by comparing the score difference value A to upper and lower score difference thresholds $N_{S1}$ and $N_{S2}$, e.g., −1000 and 1000, respectively. Thus, the intuition module 315 will cause the game move selection module 325 to select the game move subset $\alpha_s$ in accordance with the following criteria:

If $\Delta<N_{S1}$, then select game move subset $\alpha_s$ with relatively low probability values;

If $\Delta>N_{S2}$, then select game move subset $\alpha_s$ with relatively high probability values; and If $N_{S1}\leqq\Delta\leqq N_{S2}$, then select game move subset $\alpha_s$ with relatively medial probability values.

Alternatively, rather than quantify the relative skill level of the player 215 in terms of the score difference value Δ between the player score 260 and the duck score 265, as just previously discussed, the relative skill level of the player 215 can be quantified from a series (e.g., ten) of previous determined outcome values β. For example, if a high percentage of the previous determined outcome values β is equal to "0," indicating a high percentage of unfavorable game moves $\alpha_i$, the relative player skill level can be quantified as be relatively high. In contrast, if a low percentage of the previous determined outcome values β is equal to "0," indicating a low percentage of unfavorable game moves $\alpha_i$, the relative player skill level can be quantified as be relatively low. Thus, based on this information, a game move $\alpha_i$ can be pseudo-randomly selected, as hereinbefore described.

The game move selection module 325 is configured to pseudo-randomly select a single game move $\alpha_i$ from the game move subset $\alpha_s$, thereby minimizing a player detectable pattern of game move $\alpha_i$ selections, and thus increasing interest in the game 200. Such pseudo-random selection can be accomplished by first normalizing the game move subset $\alpha_s$, and then summing, for each game move $\alpha_i$ within the game move subset $\alpha_s$, the corresponding probability value with the preceding probability values (for the purposes of this specification, this is considered to be a progressive sum of the probability values). For example, the following Table 1 sets forth the unnormalized probability values, normalized probability values, and progressive sum of an exemplary subset of five game moves:

TABLE 1

Progressive Sum of Probability Values For Five Exemplary Game Moves in SISO Format

| Game Move | Unnormalized Probability Value | Normalized Probability Value | Progressive Sum |
|---|---|---|---|
| $\alpha_1$ | 0.05 | 0.09 | 0.09 |
| $\alpha_2$ | 0.05 | 0.09 | 0.18 |
| $\alpha_3$ | 0.10 | 0.18 | 0.36 |
| $\alpha_4$ | 0.15 | 0.27 | 0.63 |
| $\alpha_5$ | 0.20 | 0.37 | 1.00 |

The game move selection module 325 then selects a random number between "0" and "1," and selects the game move $\alpha_i$ corresponding to the next highest progressive sum value. For example, if the randomly selected number is 0.38, game move $\alpha_4$ will be selected.

The game move selection module 325 is further configured to receive a player move $\lambda 2_l$ from the player 215 in the form of a mouse button 245 click/mouse 240 position combination, which indicates the position of the gun 225 when it is fired. The outcome evaluation module 330 is configured to determine and output an outcome value β that indicates how favorable the game move $\alpha_i$ is in comparison with the received player move $\lambda 2_l$.

To determine the extent of how favorable a game move $\alpha_i$ is, the outcome evaluation module 330 employs a collision detection technique to determine whether the duck's 220 last move was successful in avoiding the gunshot. Specifically, if the gun 225 coincides with the duck 220 when fired, a collision is detected. On the contrary, if the gun 225 does not coincide with the duck 220 when fired, a collision is not detected. The outcome of the collision is represented by a numerical value, and specifically, the previously described outcome value β. In the illustrated embodiment, the outcome value β equals one of two predetermined values: "1" if a collision is not detected (i.e., the duck 220 is not shot), and "0" if a collision is detected (i.e., the duck 220 is shot). Of course, the outcome value β can equal "0" if a collision is not detected, and "1" if a collision is detected, or for that matter one of any two predetermined values other than a "0" or "1," without straying from the principles of the invention. In any event, the extent to which a shot misses the duck 220 (e.g., whether it was a near miss) is not relevant, but rather that the duck 220 was or was not shot. Alternatively, the outcome value β can be one of a range of finite integers or real numbers, or one of a range of continuous values. In these cases, the extent to which a shot misses or hits the duck 220 is relevant. Thus, the closer the gun 225 comes to shooting the duck 220, the less the outcome value β is, and thus, a near miss will result in a relatively low outcome value β, whereas a far miss will result in a relatively high outcome value β. Of course, alternatively, the closer the gun 225 comes to shooting the duck 220, the greater the outcome value β is. What is significant is that the outcome value β correctly indicates the extent to which the shot misses the duck 220. More alternatively, the extent to which a shot hits the duck 220 is relevant. Thus, the less damage the duck 220 incurs, the less the outcome value β is, and the more damage the duck 220 incurs, the greater the outcome value β is.

The probability update module 320 is configured to receive the outcome value β from the outcome evaluation module 330 and output an updated game strategy (represented by game move probability distribution p) that the duck 220 will use to counteract the player's 215 strategy in the future. In the preferred embodiment, the probability update module 320 utilizes a linear reward-penalty P-type update. As an example, given a selection of the seventeen different moves 255, assume that the gun 125 fails to shoot the duck 120 after it takes game move $\alpha_3$, thus creating an outcome value β=1. In this case, general updating equations [6] and [7] can be expanded using equations [10] and [11], as follows:

$$p_3(k+1) = p_3(k) + \sum_{\substack{j=1 \\ j\neq 3}}^{17} ap_j(k);$$

$$p_1(k+1)=p_1(k)-ap_1(k);$$

$$p_2(k+1)=p_2(k)-ap_2(k);$$

$$p_4(k+1)=p_4(k)-ap_4(k);$$

$$p_{17}(k+1)=p_{17}(k)-ap_{17}(k)$$

Thus, since the game move $\alpha_3$ resulted in a successful outcome, the corresponding probability value p3 is increased, and the game move probability values $p_l$ corresponding to the remaining game moves $\alpha_l$ are decreased.

If, on the other hand, the gun 125 shoots the duck 120 after it takes game move $\alpha_3$, thus creating an outcome value $\beta=0$, general updating equations [8] and [9] can be expanded, using equations [10] and [11], as follows:

$$p_3(k+1) = p_3(k) - \sum_{\substack{j=1 \\ j\neq 3}}^{17}\left(\frac{b}{16} - bp_j(k)\right)$$

$$p_1(k+1) = p_1(k) + \frac{b}{16} - bp_1(k);$$

$$p_2(k+1) = p_2(k) + \frac{b}{16} - bp_2(k);$$

$$p_4(k+1) = p_4(k) + \frac{b}{16} - bp_4(k);$$

$$\vdots$$

$$p_{17}(k+1) = p_{17}(k) + \frac{b}{16} - bp_{17}(k)$$

It should be noted that in the case where the gun 125 shoots the duck 120, thus creating an outcome value $\beta=0$, rather than using equations [8], [9], and [11], a value proportional to the penalty parameter b can simply be subtracted from the selection game move, and can then be equally distributed among the remaining game moves $\alpha_j$. It has been empirically found that this method ensures that no probability value $p_l$ converges to "1," which would adversely result in the selection of a single game move $\alpha_l$ every time. In this case, equations [8] and [9] can be modified to read:

$$p_i(k+1)=p_i(k)-bp_i(k) \quad [8b]$$

$$p_j(k+1) = p_j(k) + \frac{1}{n-1}bp_i(k) \quad [9b]$$

Assuming game move $\alpha_3$ results in an outcome value $\beta=0$, equations [8b] and [9b] can be expanded as follows:

$$p_3(k+1)=p_3(k)-bp_3(k)$$

$$p_1(k+1) = p_1(k) + \frac{b}{16}p_1(k);$$

$$p_2(k+1) = p_2(k) + \frac{b}{16}p_2(k);$$

$$p_4(k+1) = p_4(k) + \frac{b}{16}p_4(k);$$

$$\vdots$$

$$p_{17}(k+1) = p_{17}(k) + \frac{b}{16}p_{17}(k)$$

In any event, since the game move a3 resulted in an unsuccessful outcome, the corresponding probability value p3 is decreased, and the game move probability values $p_l$ corresponding to the remaining game moves $\alpha_j$ are increased. The values of a and b are selected based on the desired speed and accuracy that the learning module 310 learns, which may depend on the size of the game move set $\alpha$. For example, if the game move set $\alpha$ is relatively small, the game 200 preferably must learn quickly, thus translating to relatively high a and b values. On the contrary, if the game move set a is relatively large, the game 200 preferably learns more accurately, thus translating to relatively low a and b values. In other words, the greater the values selected for a and b, the faster the game move probability distribution p changes, whereas the lesser the values selected for a and b, the slower the game move probability distribution p changes. In the preferred embodiment, the values of a and b have been chosen to be 0.1 and 0.5, respectively.

In the preferred embodiment, the reward-penalty update scheme allows the skill level of the game 200 to track that of the player 215 during gradual changes in the player's 215 skill level. Alternatively, a reward-inaction update scheme can be employed to constantly make the game 200 more difficult, e.g., if the game 200 has a training mode to train the player 215 to become progressively more skillful. More alternatively, a penalty-inaction update scheme can be employed, e.g., to quickly reduce the skill level of the game 200 if a different less skillful player 215 plays the game 200. In any event, the intuition module 315 may operate on the probability update module 320 to dynamically select any one of these update schemes depending on the objective to be achieved.

It should be noted that rather than, or in addition to, modifying the functionality of the game move selection module 325 by subdividing the game move set a into a plurality of game move subsets $\alpha_s$, the respective skill levels of the game 200 and player 215 can be continuously and dynamically matched by modifying the functionality of the probability update module 320 by modifying or selecting the algorithms employed by it. For example, the respective reward and penalty parameters a and b may be dynamically modified.

For example, if the difference between the respective player and game scores 260 and 265 (i.e., the score difference value $\Delta$) is substantially positive, the respective reward and penalty parameters a and b can be increased, so that the skill level of the game 200 more rapidly increases. That is, if the gun 125 shoots the duck 120 after it takes a particular game move $\alpha_l$, thus producing an unsuccessful outcome, an increase in the penalty parameter b will correspondingly decrease the chances that the particular game move $\alpha_l$ is selected again relative to the chances that it would have been selected again if the penalty parameter b had not been modified. If the gun 125 fails to shoot the duck 120 after it takes a particular game move $\alpha_l$, thus producing a successful outcome, an increase in the reward parameter a will correspondingly increase the chances that the particular game move $\alpha_l$ is selected again relative to the chances that it would have been selected again if the penalty parameter a had not been modified. Thus, in this scenario, the game 200 will learn at a quicker rate.

On the contrary, if the score difference value $\Delta$ is substantially negative, the respective reward and penalty parameters a and b can be decreased, so that the skill level of the game 200 less rapidly increases. That is, if the gun 125 shoots the duck 120 after it takes a particular game move $\alpha_l$, thus producing an unsuccessful outcome, a decrease in the penalty parameter b will correspondingly increase the chances that the particular game move $\alpha_l$ is selected again relative to the chances that it would have been selected again if the penalty parameter b had not been modified. If the gun 125 fails to shoot the duck 120 after it takes a particular game move $\alpha_l$, thus producing a successful outcome, a decrease in the reward parameter a will correspondingly decrease the chances that the particular game move $\alpha_i$ is selected again relative to the chances that it would have been selected again if the reward parameter a had not been modified. Thus, in this scenario, the game 200 will learn at a slower rate.

If the score difference value Δ is low, whether positive or negative, the respective reward and penalty parameters a and b can remain unchanged, so that the skill level of the game 200 will tend to remain the same. Thus, in this scenario, the game 200 will learn at the same rate.

It should be noted that an increase or decrease in the reward and penalty parameters a and b can be effected in various ways. For example, the values of the reward and penalty parameters a and b can be incrementally increased or decreased a fixed amount, e.g., 0.1. Or the reward and penalty parameters a and b can be expressed in the functional form y=f(x), with the performance index φ being one of the independent variables, and the penalty and reward parameters a and b being at least one of the dependent variables. In this manner, there is a smoother and continuous transition in the reward and penalty parameters a and b.

Optionally, to further ensure that the skill level of the game 200 rapidly decreases when the score difference value Δ substantially negative, the respective reward and penalty parameters a and b can be made negative. That is, if the gun 125 shoots the duck 120 after it takes a particular game move $\alpha_i$, thus producing an unsuccessful outcome, forcing the penalty parameter b to a negative number will increase the chances that the particular game move $\alpha_i$ is selected again in the absolute sense. If the gun 125 fails to shoot the duck 120 after it takes a particular game move $\alpha_i$, thus producing a successful outcome, forcing the reward parameter a to a negative number will decrease the chances that the particular game move $\alpha_i$ is selected again in the absolute sense. Thus, in this scenario, rather than learn at a slower rate, the game 200 will actually unlearn. It should be noted in the case where negative probability values $p_i$ result, the probability distribution p is preferably normalized to keep the game move probability values $p_i$ within the [0,1] range.

More optionally, to ensure that the skill level of the game 200 substantially decreases when the score difference value Δ is substantially negative, the respective reward and penalty equations can be switched. That is, the reward equations, in this case equations [6] and [7], can be used when there is an unsuccessful outcome (i.e., the gun 125 shoots the duck 120). The penalty equations, in this case equations [8] and [9] (or [8b] and [9b]), can be used when there is a successful outcome (i.e., when the gun 125 misses the duck 120). Thus, the probability update module 320 will treat the previously selected $\alpha_i$ as producing an unsuccessful outcome, when in fact, it has produced a successful outcome, and will treat the previously selected $\alpha_i$ as producing a successful outcome, when in fact, it has produced an unsuccessful outcome. In this case, when the score difference value Δ is substantially negative, the respective reward and penalty parameters a and b can be increased, so that the skill level of the game 200 more rapidly decreases.

Alternatively, rather than actually switching the penalty and reward equations, the functionality of the outcome evaluation module 330 can be modified with similar results. For example, the outcome evaluation module 330 may be modified to output an outcome value β=0 when the current game move a is successful, i.e., the gun 125 does not shoot the duck 120, and to output an outcome value β=1 when the current game move $\alpha_i$ is unsuccessful, i.e., the gun 125 shoots the duck 120. Thus, the probability update module 320 will interpret the outcome value β as an indication of an unsuccessful outcome, when in fact, it is an indication of a successful outcome, and will interpret the outcome value β as an indication of a successful outcome, when in fact, it is an indication of an unsuccessful outcome. In this manner, the reward and penalty equations are effectively switched.

Rather than modifying or switching the algorithms used by the probability update module 320, the game move probability distributions can be transformed. For example, if the score difference value Δ is substantially positive, it is assumed that the game moves $\alpha_i$ corresponding to a set of the highest probability values $p_i$ are too easy, and the game moves $\alpha_i$ corresponding to a set of the lowest probability values $p_i$ are too hard. In this case, the game moves $\alpha_i$ corresponding to the set of highest probability values $p_i$ can be switched with the game moves corresponding to the set of lowest probability values $p_i$, thereby increasing the chances that that the harder game moves $\alpha_i$ (and decreasing the chances that the easier game moves $\alpha_i$) are selected relative to the chances that they would have been selected again if the game move probability distribution p had not been transformed. Thus, in this scenario, the game 200 will learn at a quicker rate. In contrast, if the score difference value Δ is substantially negative, it is assumed that the game moves $\alpha_i$ corresponding to the set of highest probability values $p_i$ are too hard, and the game moves $\alpha_i$ corresponding to the set of lowest probability values $p_i$ are too easy. In this case, the game moves $\alpha_i$ corresponding to the set of highest probability values $p_i$ can be switched with the game moves corresponding to the set of lowest probability values $p_i$, thereby increasing the chances that that the easier game moves $\alpha_i$ (and decreasing the chances that the harder game moves $\alpha_i$) are selected relative to the chances that they would have been selected again if the game move probability distribution p had not been transformed. Thus, in this scenario, the game 200 will learn at a slower rate. If the score difference value Δ is low, whether positive or negative, it is assumed that the game moves $\alpha_i$ corresponding to the set of highest probability values $p_i$ are not too hard, and the game moves $\alpha_i$ corresponding to the set of lowest probability values $p_i$ are not too easy, in which case, the game moves $\alpha_i$ corresponding to the set of highest probability values $p_i$ and set of lowest probability values $p_i$ are not switched. Thus, in this scenario, the game 200 will learn at the same rate.

It should be noted that although the performance index φ has been described as being derived from the score difference value Δ, the performance index φ can also be derived from other sources, such as the game move probability distribution p. If it is known that the outer moves **255*a* or more difficult than the inner moves 255*b*, the performance index φ, and in this case, the skill level of the player 215 relative to the skill level the game 200, may be found in the present state of the game move probability values $p_i$ assigned to the moves 255. For example, if the combined probability values $p_i$ corresponding to the outer moves 255*a* is above a particular threshold value, e.g., 0.7 (or alternatively, the combined probability values $p_i$ corresponding to the inner moves 255*b* is below a particular threshold value, e.g., 0.3), this may be an indication that the skill level of the player 215 is substantially greater than the skill level of the game 200. In contrast, if the combined probability values $p_i$ corresponding to the outer moves 255*a* is below a particular threshold value, e.g., 0.4 (or alternatively, the combined probability values $p_i$ corresponding to the inner moves 255*b* is above a particular threshold value, e.g., 0.6), this may be an indication that the skill level of the player 215 is substantially less than the skill level of the game 200. Similarly, if the combined probability values $p_i$ corresponding to the outer moves 255*a* is within a particular threshold range, e.g., 0.4-0.7 (or alternatively, the combined probability values $p_i$ corresponding to the inner moves 255*b* is within a particular threshold range, e.g., 0.3-0.6), this may be an indication that the skill level of the player 215 and skill level of the game 200** are substantially matched. In this case, any of the afore-described probabilistic learning module modification techniques can be used with this performance index $\phi$.

Alternatively, the probabilities values $p_l$ corresponding to one or more game moves $\alpha_l$ can be limited to match the respective skill levels of the player 215 and game 200. For example, if a particular probability value $p_l$ is too high, it is assumed that the corresponding game move $\alpha_l$ may be too hard for the player 215. In this case, one or more probabilities values $p_l$ can be limited to a high value, e.g., 0.4, such that when a probability value $p_l$ reaches this number, the chances that that the corresponding game move $\alpha_l$ is selected again will decrease relative to the chances that it would be selected if the corresponding game move probability $p_l$ had not been limited. Similarly, one or more probabilities values p, can be limited to a low value, e.g., 0.01, such that when a probability value $p_l$ reaches this number, the chances that that the corresponding game move $\alpha_l$ is selected again will increase relative to the chances that it would be selected if the corresponding game move probability $p_l$ had not been limited. It should be noted that the limits can be fixed, in which case, only the performance index $\phi$ that is a function of the game move probability distribution p is used to match the respective skill levels of the player 215 and game 200, or the limits can vary, in which case, such variance may be based on a performance index $\phi$ external to the game move probability distribution p.

Having now described the structure of the game program 300, the steps performed by the game program 300 will be described with reference to FIG. 9. First, the game move probability distributions is initialized (step 405). Specifically, the probability update module 320 initially assigns an equal probability value to each of the game moves $\alpha_l$, in which case, the initial game move probability distribution p(k) can be represented by

$$p_1(0) = p_2(0) = p_2(0) = \dots p_n(0) = \frac{1}{n}.$$

Thus, all of the game moves $\alpha_l$ have an equal chance of being selected by the game move selection module 325. Alternatively, probability update module 320 initially assigns unequal probability values to at least some of the game moves $\alpha_l$ For example, the outer moves 255*a* may be initially assigned a lower probability value than that of the inner moves 255*b*, so that the selection of any of the outer moves 255*a* as the next game move $\alpha_l$ will be decreased. In this case, the duck 220 will not be too difficult to shoot when the game 200 is started. In addition to the game move probability distribution p, the current game move $\alpha_l$ to be updated is also initialized by the probability update module 320 at step 405.

Then, the game move selection module 325 determines whether a player move $\lambda 2_l$ has been performed, and specifically whether the gun 225 has been fired by clicking the mouse button 245 (step 410). If a player move $\lambda 2_l$ has been performed, the outcome evaluation module 330 determines whether the last game move $\alpha_l$ was successful by performing a collision detection, and then generates the outcome value $\beta$ in response thereto (step 415). The intuition module 315 then updates the player score 260 and duck score 265 based on the outcome value $\beta$ (step 420). The probability update module 320 then, using any of the updating techniques described herein, updates the game move probability distribution p based on the generated outcome value $\beta$ (step 425).

After step 425, or if a player move $\lambda 2_l$ has not been performed at step 410, the game move selection module 325 determines if a player move $\lambda 1_l$ has been performed, i.e., gun 225, has breached the gun detection region 270 (step 430). If the gun 225 has not breached the gun detection region 270, the game move selection module 325 does not select any game move $\alpha_l$ from the game move subset $\alpha$ and the duck 220 remains in the same location (step 435). Alternatively, the game move $\alpha_l$ may be randomly selected, allowing the duck 220 to dynamically wander. The game program 300 then returns to step 410 where it is again determined if a player move $\lambda 2_l$ has been performed. If the gun 225 has breached the gun detection region 270 at step 430, the intuition module 315 modifies the functionality of the game move selection module 325 based on the performance index $\phi$, and the game move selection module 325 selects a game move $\alpha_l$ from the game move set a.

Specifically, the intuition module 315 determines the relative player skill level by calculating the score difference value $\Delta$ between the player score 260 and duck score 265 (step 440). The intuition module 315 then determines whether the score difference value $\Delta$ is greater than the upper score difference threshold $N_{S2}$ (step 445). If A is greater than $N_{S2}$, the intuition module 315, using any of the game move subset selection techniques described herein, selects a game move subset $\alpha_S$, a corresponding average probability of which is relatively high (step 450). If $\Delta$ is not greater than $N_{S2}$, the intuition module 315 then determines whether the score difference value $\Delta$ is less than the lower score difference threshold $N_{S1}$ (step 455). If $\Delta$ is less than $N_{S1}$, the intuition module 315, using any of the game move subset selection techniques described herein, selects a game move subset $\alpha_s$, a corresponding average probability of which is relatively low (step 460). If $\Delta$ is not less than $N_{S1}$, it is assumed that the score difference value $\Delta$ is between $N_{S1}$ and $N_{S2}$, in which case, the intuition module 315, using any of the game move subset selection techniques described herein, selects a game move subset $\alpha_s$, a corresponding average probability of which is relatively medial (step 465). In any event, the game move selection module 325 then pseudo-randomly selects a game move $\alpha_l$ from the selected game move subset $\alpha_s$, and accordingly moves the duck 220 in accordance with the selected game move $\alpha_l$ (step 470). The game program 300 then returns to step 410, where it is determined again if a player move $\lambda 2_l$ has been performed.

It should be noted that, rather than use the game move subset selection technique, the other afore-described techniques used to dynamically and continuously match the skill level of the player 215 with the skill level of the game 200 can be alternatively or optionally be used as well. For example, and referring to FIG. 10, the probability update module 320 initializes the game move probability distribution p and current game move $\alpha_l$ similarly to that described in step 405 of FIG. 9. The initialization of the game move probability distribution p and current game move $\alpha_l$ is similar to that performed in step 405 of FIG. 9. Then, the game move selection module 325 determines whether a player move $\lambda 2_l$ has been performed, and specifically whether the gun 225 has been fired by clicking the mouse button 245 (step 510). If a player move $\lambda 2_l$ has been performed, the intuition module 315 modifies the functionality of the probability update module 320 based on the performance index $\phi$.

Specifically, the intuition module 315 determines the relative player skill level by calculating the score difference value $\Delta$ between the player score 260 and duck score 265 (step 515). The intuition module 315 then determines whether the score difference value $\Delta$ is greater than the upper score difference threshold $N_{S2}$ (step 520). If A is greater than $N_{S2}$, the intuition module 315 modifies the functionality of the probability update module 320 to increase the game's 200 rate of learning using any of the techniques described herein (step 525). For example, the intuition module 315 may modify the parameters of the learning algorithms, and specifically, increase the reward and penalty parameters a and b.

If $\Delta$ is not greater than $N_{S2}$, the intuition module 315 then determines whether the score difference value $\Delta$ is less than the lower score difference threshold $N_{S1}$ (step 530). If $\Delta$ is less than $N_{S1}$, the intuition module 315 modifies the functionality of the probability update module 320 to decrease the game's 200 rate of learning (or even make the game 200 unlearn) using any of the techniques described herein (step 535). For example, the intuition module 315 may modify the parameters of the learning algorithms, and specifically, decrease the reward and penalty parameters a and b. Alternatively or optionally, the intuition module 315 may assign the reward and penalty parameters a and b negative numbers, switch the reward and penalty learning algorithms, or even modify the outcome evaluation module 330 to output an outcome value $\beta$=0 when the selected game move $\alpha_i$ is actually successful, and output an outcome value $\beta$=1 when the selected game move $\alpha_i$ is actually unsuccessful.

If $\Delta$ is not less than $N_{S2}$, it is assumed that the score difference value $\Delta$ is between $N_{S1}$ and $N_{S2}$, in which case, the intuition module 315 does not modify the probability update module 320 (step 540).

In any event, the outcome evaluation module 330 then determines whether the last game move $\alpha_i$ was successful by performing a collision detection, and then generates the outcome value $\alpha_i$ in response thereto (step 545). Of course, if the intuition module 315 modifies the functionality of the outcome evaluation module 330 during any of the steps 525 and 535, step 545 will preferably be performed during these steps. The intuition module 315 then updates the player score 260 and duck score 265 based on the outcome value $\beta$ (step 550). The probability update module 320 then, using any of the updating techniques described herein, updates the game move probability distributionp based on the generated outcome value $\beta$ (step 555).

After step 555, or if a player move $\lambda 2_i$ has not been performed at step 510, the game move selection module 325 determines if a player move $\lambda 1_i$ has been performed, i.e., gun 225, has breached the gun detection region 270 (step 560). If the gun 225 has not breached the gun detection region 270, the game move selection module 325 does not select a game move $\alpha_i$ from the game move set $\alpha$ and the duck 220 remains in the same location (step 565). Alternatively, the game move $\alpha_i$ may be randomly selected, allowing the duck 220 to dynamically wander. The game program 300 then returns to step 510 where it is again determined if a player move $\lambda 2_i$ has been performed. If the gun 225 has breached the gun detection region 270 at step 560, the game move selection module 325 pseudo-randomly selects a game move $\alpha_i$ from the game move set $\alpha$ and accordingly moves the duck 220 in accordance with the selected game move $\alpha_i$ (step 570). The game program 300 then returns to step 510, where it is determined again if a player move $\lambda 2_i$ has been performed.

More specific details on the above-described operation of the duck game 100 can be found in the Computer Program Listing Appendix attached hereto and previously incorporated herein by reference. It is noted that each of the files "Intuition Intelligence-duckgame1.doc" and "Intuition Intelligence-duckgame2.doc" represents the game program 300, with file "Intuition Intelligence-duckgame1.doc" utilizing the game move subset selection technique to continuously and dynamically match the respective skill levels of the game 200 and player 215, and file "Intuition "Intuition Intelligence-duckgame2.doc" utilizing the learning algorithm modification technique (specifically, modifying the respective reward and penalty parameters a and b when the score difference value $\Delta$ is too positive or too negative, and switching the respective reward and penalty equations when the score difference value $\Delta$ is too negative) to similarly continuously and dynamically match the respective skill levels of the game 200 and player 215.

Single-Player Educational Program (Single Game Move-Single Player Move)

Figure 11:
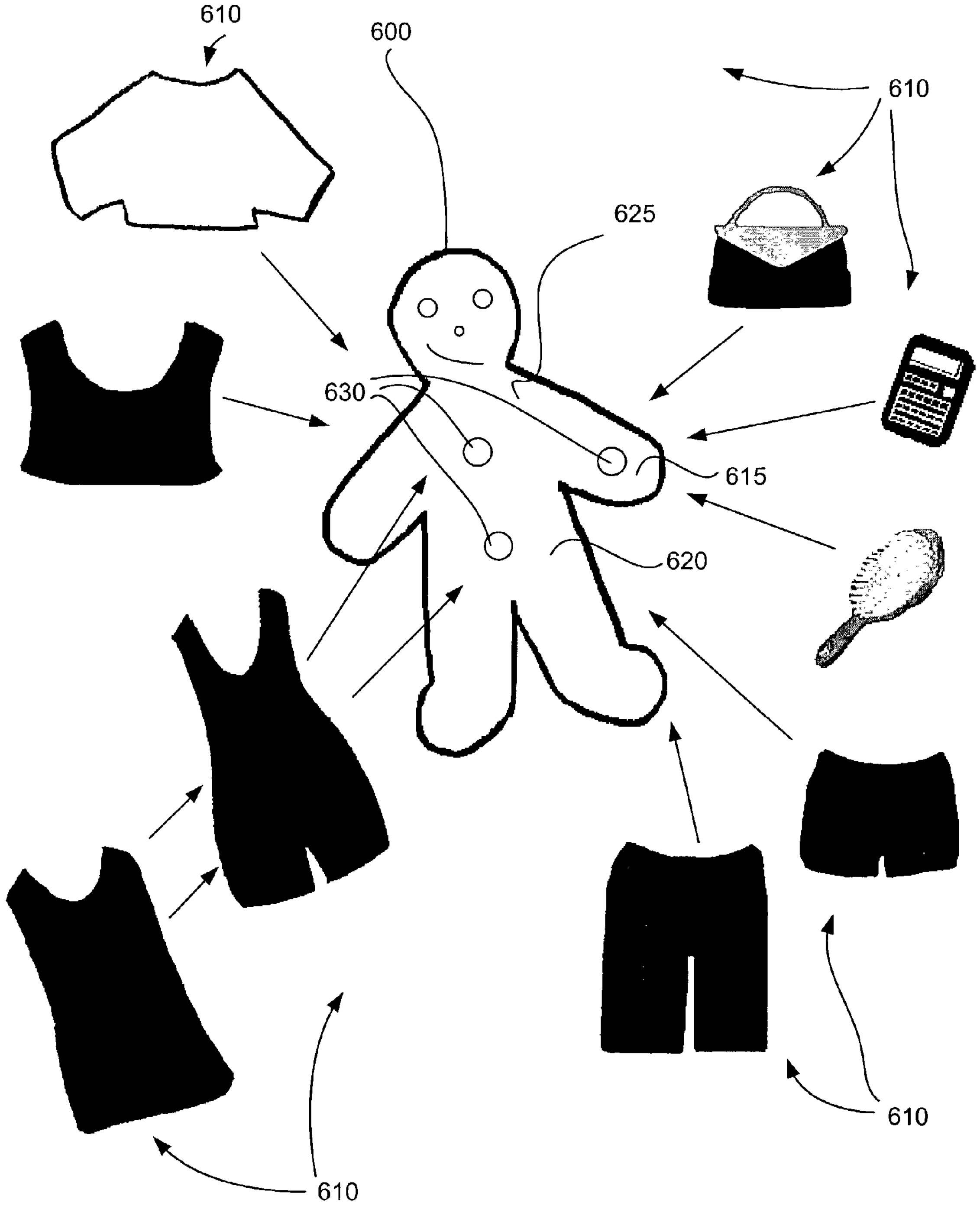
FIG. 11 is a cartoon of a single-user educational child's toy to which the generalized program of FIG. 1 can be applied.
Figure 12:
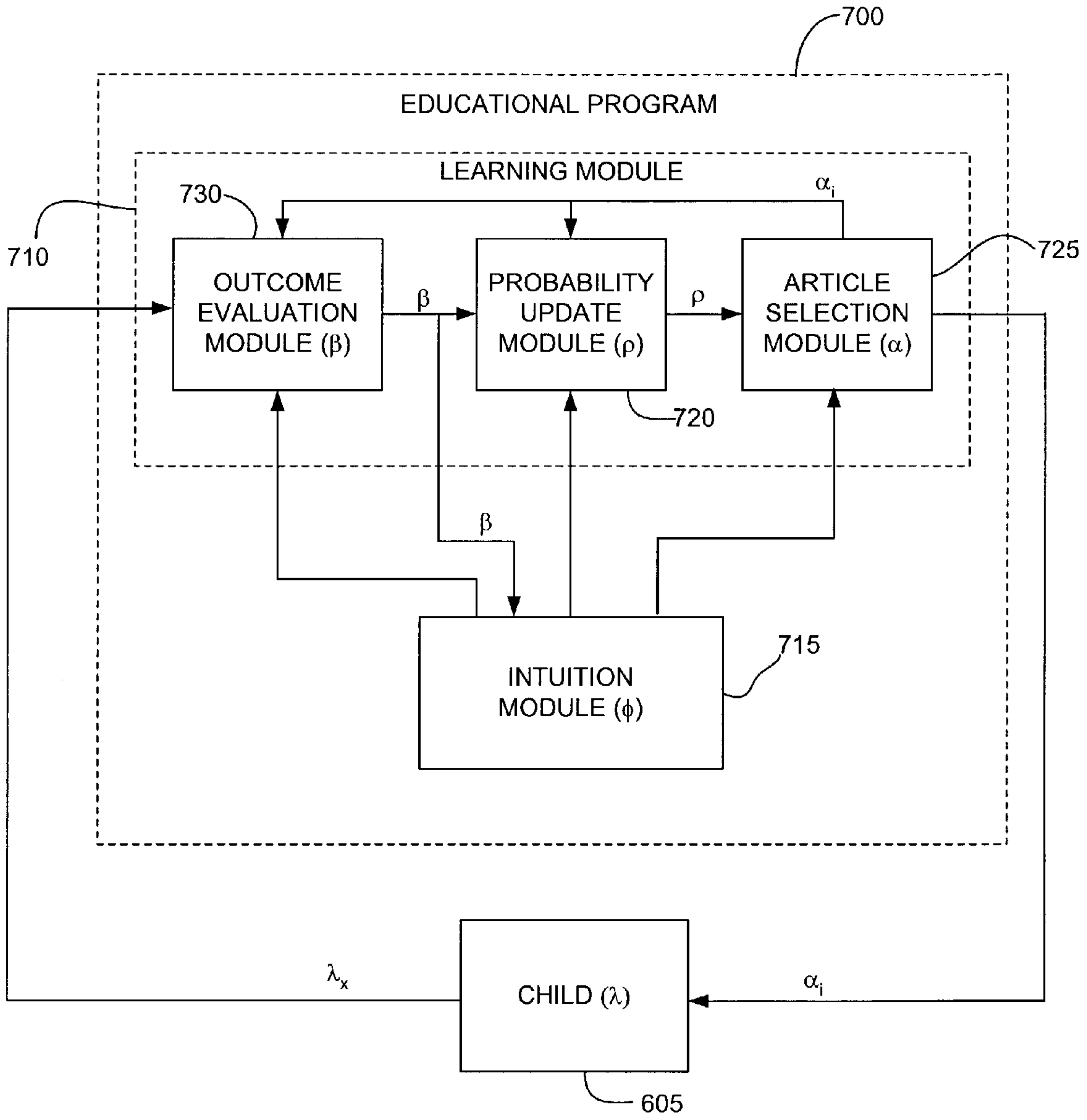
FIG. 12 is a block diagram of a single-user educational program employed in the educational child's toy of FIG. 11.

The learning program 100 can be applied to other applications besides game programs. A single-player educational program 700 (shown in FIG. 12) developed in accordance with the present inventions is described in the context of a child's learning toy 600 (shown in FIG. 11), and specifically, a doll 600 and associated articles of clothing and accessories 610 that are applied to the doll 600 by a child 605 (shown in FIG. 12). In the illustrated embodiment, the articles 610 include a (1) purse, calculator, and hairbrush, one of which can be applied to a hand 615 of the doll 600; (2) shorts and pants, one of which can be applied to a waist 620 of the doll 600; (3) shirt and tank top, one of which can be applied to a chest 625 of the doll 600; and (4) dress and overalls, one of which can be applied to the chest 625 of the doll 600. Notably, the dress and overalls cover the waist 620, so that the shorts and pants cannot be applied to the doll 600 when the dress or overalls are applied. Depending on the measured skill level of the child 605, the doll 600 will instruct the child 605 to apply either a single article, two articles, or three articles to the doll 600. For example, the doll 600 may say "Simon says, give me my calculator, pants, and tank top."

In accordance with the instructions given by the doll 600, the child 605 will then attempt to apply the correct articles 610 to the doll 600. For example, the child 605 may place the calculator in the hand 615, the pants on the waist 620, and the tank top on the chest 625. To determine which articles 610 the child 605 has applied, the doll 600 comprises sensors 630 located on the hand 615, waist 620, and chest 625. These sensors 630 sense the unique resistance values exhibited by the articles 610, so that the doll 600 can determine which of the articles 610 are being applied.

As illustrated in Tables 2-4, there are 43 combinations of articles 610 that can be applied to the doll 600. Specifically, actions $\alpha_1$-$\alpha_9$ represent all of the single article combinations, actions $\alpha_{10}$-$\alpha_{31}$ represent all of the double article combinations, and actions $\alpha_{32}$-$\alpha_{43}$ represent all of the triple article combinations that can be possibly applied to the doll 600.

TABLE 2

Exemplary Single Article Combinations for Doll

| Action ($\alpha$) | Hand | Waist | Chest |
|---|---|---|---|
| $\alpha_1$ | Purse | x | x |
| $\alpha_2$ | Calculator | x | x |
| $\alpha_3$ | Hairbrush | x | x |
| $\alpha_4$ | x | Shorts | x |
| $\alpha_5$ | x | Pants | x |
| $\alpha_6$ | x | x | Shirt |
| $\alpha_7$ | x | x | Tanktop |
| $\alpha_8$ | x | x | Dress |
| $\alpha_9$ | x | x | Overalls |

TABLE 3

Exemplary Double article combinations for Doll

| Action (α) | Hand | Waist | Chest |
|---|---|---|---|
| $\alpha_{10}$ | Purse | Shorts | x |
| $\alpha_{11}$ | Purse | Pants | x |
| $\alpha_{12}$ | Purse | x | Shirt |
| $\alpha_{13}$ | Purse | x | Tanktop |
| $\alpha_{14}$ | Purse | x | Dress |
| $\alpha_{15}$ | Purse | x | Overalls |
| $\alpha_{16}$ | Calculator | Shorts | x |
| $\alpha_{17}$ | Calculator | Pants | x |
| $\alpha_{18}$ | Calculator | x | Shirt |
| $\alpha_{19}$ | Calculator | x | Tanktop |
| $\alpha_{20}$ | Calculator | x | Dress |
| $\alpha_{21}$ | Calculator | x | Overalls |
| $\alpha_{22}$ | Hairbrush | Shorts | x |
| $\alpha_{23}$ | Hairbrush | Pants | x |
| $\alpha_{24}$ | Hairbrush | x | Shirt |
| $\alpha_{25}$ | Hairbrush | x | Tanktop |
| $\alpha_{26}$ | Hairbrush | x | Dress |
| $\alpha_{27}$ | Hairbrush | x | Overalls |
| $\alpha_{28}$ | x | Shorts | Shirt |
| $\alpha_{29}$ | x | Shorts | Tanktop |
| $\alpha_{30}$ | x | Pants | Shirt |
| $\alpha_{31}$ | x | Pants | Tanktop |

TABLE 4

Exemplary Three Article Combinations for Doll

| Action (α) | Hand | Waist | Chest |
|---|---|---|---|
| $\alpha_{32}$ | Purse | Shorts | Shirt |
| $\alpha_{33}$ | Purse | Shorts | Tanktop |
| $\alpha_{34}$ | Purse | Pants | Shirt |
| $\alpha_{35}$ | Purse | Pants | Tanktop |
| $\alpha_{36}$ | Calculator | Shorts | Shirt |
| $\alpha_{37}$ | Calculator | Shorts | Tanktop |
| $\alpha_{38}$ | Calculator | Pants | Shirt |
| $\alpha_{39}$ | Calculator | Pants | Tanktop |
| $\alpha_{40}$ | Hairbrush | Shorts | Shirt |
| $\alpha_{41}$ | Hairbrush | Shorts | Tanktop |
| $\alpha_{42}$ | Hairbrush | Pants | Shirt |
| $\alpha_{43}$ | Hairbrush | Pants | Tanktop |

In response to the selection of one of these actions $\alpha_l$, i.e., prompting the child 605 to apply one of the 43 article combinations to the doll 600, the child 605 will attempt to apply the correct article combinations to the doll 600, represented by corresponding child actions $\lambda_1$-$\lambda_{43}$. It can be appreciated an article combination $\lambda_l$ will be correct if it corresponds to the article combination $\alpha_l$ prompted by the doll 600 (i.e., the child action λ corresponds with the doll action α), and will be incorrect if it corresponds to the article combination $\alpha_l$ prompted by the doll 600 (i.e., the child action λ does not correspond with the doll action Δ).

The doll 600 seeks to challenge the child 605 by prompting him or her with more difficult article combinations as the child 605 applies correct combinations to the doll 600. For example, if the child 605 exhibits a proficiency at single article combinations, the doll 600 will prompt the child 605 with less single article combinations and more double and triple article combinations. If the child 605 exhibits a proficiency at double article combinations, the doll 600 will prompt the child 605 with less single and double article combinations and more triple article combinations. If the child 605 exhibits a proficiency at three article combinations, the doll 600 will prompt the child 605 with even more triple article combinations.

The doll 600 also seeks to avoid over challenging the child 605 and frustrating the learning process. For example, if the child 605 does not exhibit a proficiency at triple article combinations, the doll 600 will prompt the child 605 with less triple article combinations and more single and double article combinations. If the child 605 does not exhibit a proficiency at double article combinations, the doll 600 will prompt the child 605 with less double and triple article combinations and more single article combinations. If the child 605 does not exhibit a proficiency at single article combinations, the doll 600 will prompt the child 605 with even more single article combinations.

To this end, the educational program 700 generally includes a probabilistic learning module 710 and an intuition module 715, which are specifically tailored for the doll 600. The probabilistic learning module 710 comprises a probability update module 720, an article selection module 725, and an outcome evaluation module 730. Specifically, the probability update module 720 is mainly responsible for learning the child's current skill level, with the outcome evaluation module 730 being responsible for evaluating the article combinations $\alpha_l$ prompted by the doll 600 relative to the article combinations $\lambda_l$, selected by the child 605. The article selection module 725 is mainly responsible for using the learned skill level of the child 605 to select the article combinations $\alpha_l$ that are used to prompt the child 605. The intuition module 715 is responsible for directing the learning of the educational program 700 towards the objective, and specifically, dynamically pushing the skill level of the child 605 to a higher level. In this case, the intuition module 715 operates on the probability update module 720, and specifically selects the methodology that the probability update module 720 will use to update an article probability distribution p.

To this end, the outcome evaluation module 730 is configured to receive an article combination $\alpha_l$ from the article selection module 725 (i.e., one of the forty-three article combinations that are prompted by the doll 600), and receive an article combination $\lambda_l$ from the child 605 (i.e., one of the forty-three article combinations that can be applied to the doll 600). The outcome evaluation module 730 is also configured to determine whether each article combination $\lambda_l$ received from the child 605 matches the article combination $\alpha_l$ prompted by the doll 600, with the outcome value β equaling one of two predetermined values, e.g., "0" if there is a match and "1" if there is not a match. In this case, a P-type learning methodology is used. Optionally, the outcome evaluation module 730 can generate an outcome value β equaling a value between "0" and "1." For example, if the child 605 is relatively successful by matching most of the articles within the prompted article combination $\alpha_l$, the outcome value β can be a lower value, and if the child 605 is relatively unsuccessful by not matching most of the articles within the prompted article combination $\alpha_l$, the outcome value β can be a higher value. In this case, Q- and S-type learning methodologies can be used. In contrast to the duck game 200 where the outcome value β measured the success or failure of a duck move relative to the game player, the performance of a prompted article combination $\alpha_l$ is not characterized as being successful or unsuccessful, since the doll 600 is not competing with the child 605, but rather serves to teach the child 605.

The probability update module 720 is configured to generate and update the article probability distribution p in a manner directed by the intuition module 715, with the article probability distribution p containing forty-three probability values $p_l$ corresponding to the forty-three article combinations $\alpha_l$. In the illustrated embodiment, the forty-three article combinations $\alpha_i$ are divided amongst three article combination subsets $\alpha_s$: $\alpha_{s1}$ for the nine single article combinations; $\alpha_{s2}$ for the twenty-two double article combinations; and $\alpha_{s3}$ for the twelve three article combinations. When updating the article probability distribution p, the three article combination subsets $\alpha_s$ are updated as three actions, with the effects of each updated article combination subset $\alpha_s$ being evenly distributed amongst the article combinations $\alpha_s$ in the respective subset $\alpha_s$. For example, if the single article combination subset $\alpha_{s1}$ is increased by ten percent, each of the single article combinations $\alpha_1$-$\alpha_9$ will be correspondingly increased by ten percent.

The article selection module 725 is configured for receiving the article probability distribution p from the probability update module 720, and pseudo-randomly selecting the article combination $\alpha_l$ therefrom in the same manner as the game move selection module 325 of the program 300 selects a game move $\alpha_l$ from a selected game move subset $\alpha_s$. Specifically, pseudo-random selection can be accomplished by first generating a progressive sum of the probability values $p_l$ For example, Table 5 sets forth exemplary normalized probability values and a progressive sum for the forty-three article combinations $\alpha_l$ of the article probability distribution p:

TABLE 5

Progressive Sum of Probability Values For Forty-Three Exemplary Article Combinations

| Game Move | Normalized Probability Value | Progressive Sum |
|---|---|---|
| $\alpha_1$ | 0.059 | 0.059 |
| $\alpha_2$ | 0.059 | 0.118 |
| $\alpha_3$ | 0.059 | 0.187 |
| . | . | . |
| . | . | . |
| . | . | . |
| $\alpha_9$ | 0.059 | 0.531 |
| $\alpha_{10}$ | 0.014 | 0.545 |
| $\alpha_{11}$ | 0.014 | 0.559 |
| $\alpha_{12}$ | 0.014 | 0.573 |
| . | . | . |
| . | . | . |
| . | . | . |
| $\alpha_{31}$ | 0.014 | 0.839 |
| $\alpha_{32}$ | 0.013 | 0.852 |
| $\alpha_{33}$ | 0.013 | 0.865 |
| . | . | . |
| . | . | . |
| . | . | . |
| $\alpha_{43}$ | 0.013 | 1.000 |

The article selection module 725 then selects a random number between "0" and "1," and selects the article combination $\alpha_l$ corresponding to the next highest progressive sum value. For example, if the randomly selected number is 0.562, article combination $\alpha_{11}$ (i.e., purse and pants) will be selected.

In an alternative embodiment, the article probability distribution p contains three probability values $p_l$ respectively corresponding to three article combination subsets $\alpha_s$, one of which can then be pseudo-randomly selected therefrom. In a sense, the article combination subsets $\alpha_s$ are treated as actions to be selected. For example, Table 6 sets forth exemplary normalized probability values and a progressive sum for the three article combination subsets $\alpha_s$ of the article probability distribution p:

TABLE 6

Progressive Sum of Probability Values For Three Exemplary Article Combination Subsets

| Game Move | Normalized Probability Value | Progressive Sum |
|---|---|---|
| $\alpha_1$ | 0.65 | 0.65 |
| $\alpha_2$ | 0.25 | 0.90 |
| $\alpha_3$ | 0.10 | 1.00 |

The article selection module 725 then selects a random number between "0" and "1," and selects the article combination subset $\alpha_s$ corresponding to the next highest progressive sum value. For example, if the randomly selected number is 0.78, article combination subset $\alpha_{s2}$ will be selected. After the article combination subset $\alpha_s$ has been pseudo-randomly selected, the article selection module 725 then randomly selects an article combination $\alpha_l$ from that selected combination subset $\alpha_s$. For example, if the second article combination subset $\alpha_s$ was selected, the article selection module 725 will randomly select one of the twenty-two double article combinations $\alpha_{10}$-$\alpha_{31}$.

The intuition module 715 is configured to modify the functionality of the probability update module 720 based on the performance index $\phi$, and in this case, the current skill level of the child 605 relative to the current teaching level of the doll 600. In the preferred embodiment, the performance index $\phi$ is quantified in terms of the degree of difficulty of the currently prompted article combination $\alpha_l$ and the outcome value $\beta$ (i.e., whether or not the child 605 successfully matched the article combination $\alpha_l$). In this respect, the performance index $\phi$ is instantaneous. It should be appreciated, however, that the performance of the educational program 700 can also be based on a cumulative performance index $\phi$. For example, the educational program 700 can keep track of a percentage of the child's matching article combinations $\lambda_l$ broken down by difficulty level of the prompted article combinations $\alpha_l$.

It can be appreciated, that applying only one article to the doll 600 is an easier task than applying two articles to the doll 600, which is in turn an easier task then applying three articles to the doll 600 in an given time. The intuition module 715 will attempt to "push" the child's skill level higher, so that the child 605 will consistently be able to correctly apply two articles, and then three articles 610, to the doll 600.

The intuition module 715 modifies the functionality of the probability update module 720 by determining which updating methodology will be used. The intuition module 715 also determines which article combination a will be rewarded or penalized, which is not necessarily the article combination that was previously selected by the article selection module 725.

Referring to FIGS. 13*a-f*, various methodologies can be selected by the intuition module 715 to update the article probability distribution p, given a currently prompted article combination $\alpha_l$ and outcome value $\beta$. Although, the probability values $p_l$ in the article probability distribution p have been described as corresponding to the individual article combinations $\alpha$, for purposes of simplicity and brevity, the probability values $p_l$ depicted in FIGS. 13*a-f* respectively correspond with the single, double and triple article combination subsets $\alpha_s$. As will be described in further detail below, the intuition module 715 directs the probability update module 720 to shift the article probability distribution p from probability value(s) p, corresponding to article combinations $\alpha_l$ associated with lesser difficult levels to probability value(s) $p_l$ corresponding to article combinations $\alpha_l$ associated with greater difficult levels when the child 605 is relatively successful at matching the prompted article combination $\alpha_l$, and to shift the article probability distribution p from probability value(s) $p_l$ corresponding to article combinations $\alpha_l$ associated with greater difficult levels to probability value(s) $p_l$ corresponding to article combinations $\pi_l$ associated with lesser difficult levels when the child 605 is relatively unsuccessful at matching the prompted article combination $\alpha_l$. In the illustrated embodiment, P-type learning methodologies ($\beta$ equals either "0" or "1") are used, in which case, it is assumed that the child 605 is absolutely successful or unsuccessful at matching the prompted article combination $\alpha_l$. Alternatively, Q- and S-type learning methodologies ($\beta$ is between "0" and "1") are used, in which case, it is assumed that the child 605 can partially match or not match the prompted article combination $\alpha_l$. For example, the outcome value $\beta$ may be a lesser value if the child 605 matches most of the articles in the prompted article combination $\alpha_l$, (relatively successful), and may be a greater value if the child 605 does not match most of the articles in the prompted article combination $\alpha_l$, (relatively unsuccessful).

Figure 13A:
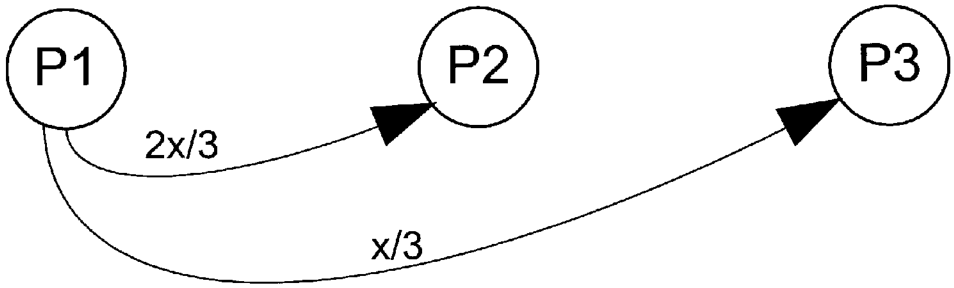
FIGS. 13*a*-13*f* are diagrams illustrating probability distribution modifications performed by the educational program of FIG. 12.

FIG. 13*a* illustrates a methodology used to update the article probability distribution p when a single article combination subset $\alpha_{s1}$ is currently selected, and the child 605 succeeds in matching the prompted article combination $\alpha$ (i.e., $\beta$=0). In this case, the intuition module 715 will attempt to drive the child's skill level from the single article combination subset $\alpha_{s1}$ to the double article combination subset $\alpha_{s2}$ by increasing the probability that the child 605 will subsequently be prompted by the more difficult double subset combination sets $\alpha_{s2}$ and triple subset combination sets $\alpha_{s3}$. The intuition module 715 accomplishes this be shifting the probability distribution p from the probability value $p_l$ to the probability values $p_2$ and $p_3$. Specifically, the single article combination subset $\alpha_{s1}$ is penalized by subtracting a proportionate value equal to "x" (e.g., ⅕ of $p_l$) from probability value $p_l$ and distributing it to the probability values $p_2$ and $p_3$.

Since the child's success with a single article combination set $\alpha_{s1}$ indicates that the child 605 may be relatively proficient at double article combinations $\alpha_{s2}$, but not necessarily the more difficult triple article combinations $\alpha_{s3}$, the probability value $p_2$ is increased more than the probability value $p_3$ to ensure that the child's skill level is driven from the single article combination subset $\alpha_{s1}$ to the double article combination subset $\alpha_{s2}$, and not overdriven to the third article combination subset $\alpha_{s3}$. For example, the proportions of "x" added to the probability values $p_2$ and $p_3$ can be ⅔ and ⅓, respectively. In effect, the learning process will be made smoother for the child 605. Notably, the methodology illustrated in FIG. 13*a* allows control over the relative amounts that are added to the probability values $p_2$ and $p_3$. That is, the amount added to the probability value $p_2$ will always be greater than the amount added to the probability value $p_3$ irrespective of the current magnitudes of the probability values $p_2$ and $p_3$, thereby ensuring a smooth learning process.

General equations [20] and [21a] can be used to implement the learning methodology illustrated in FIG. 13*a*. Given that $h_l(p(k))=(1/5)p_l(k)$, $d_{l2}=2/3$, and $d_{13}=1/3$, equations [20] and [21a] can be broken down into:

$$p_2(k+1)=p_2(k)+\left(\frac{2}{3}\right)\left(\frac{1}{5}\right)p_1(k)=p_2(k)+\frac{2}{15}p_1(k);\text{ and}\qquad[21a\text{-}1]$$

$$p_3(k+1)=p_3(k)+\left(\frac{1}{3}\right)\left(\frac{1}{5}\right)p_1(k)=p_3(k)+\frac{1}{15}p_1(k)\qquad[21a\text{-}2]$$

Figure 13B:
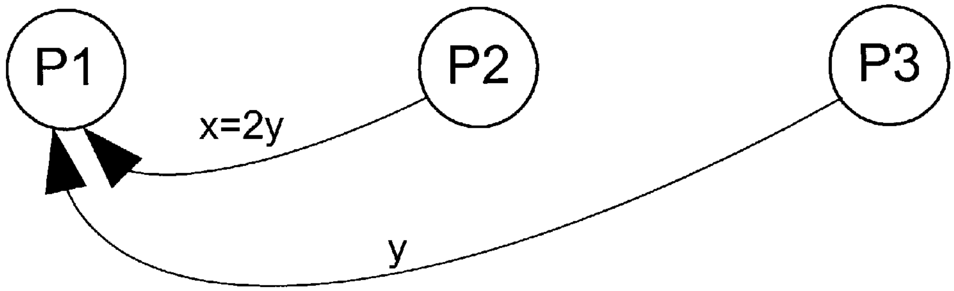

FIG. 13*b* illustrates a methodology used to update the article probability distribution p when a single article combination subset $\alpha_{s1}$ is currently selected, and the child 605 does not succeed in matching the prompted article combination $\alpha$ (i.e., $\beta$=1). In this case, the intuition module 715 will attempt to prevent over-challenging the child 605 by decreasing the probability that the child 605 will subsequently be prompted by the more difficult double and triple subset combination sets $\alpha_{s2}$ and $\alpha_{s3}$. The intuition module 715 accomplishes this be shifting the probability distribution p from the probability values $p_2$ and $p_3$ to the probability value p1. Specifically, the single article combination subset $\alpha_{s1}$ is rewarded by subtracting a proportional value equal to "x" from probability value P2 and adding it to the probability value $p_l$, and subtracting a proportionate value equal to "y" from probability value $p_3$ and adding it to the probability value $p_l$.

Since the child's failure with a single article combination set $\alpha_{s1}$ indicates that the child 605 may not be proficient at double and triple article combinations $\alpha_{s2}$ and $\alpha_{s3}$, the intuition module 715 attempts to adapt to the child's apparently low skill level by decreasing the probability values $p_2$ and $p_3$ as quickly as possible. Because the probability value $p_2$ will most likely be much greater than the probability value $p_3$ if the child 605 is not proficient at the single article combination sets $\alpha_{s2}$, the intuition module 715 adapts to the child's low skill level by requiring that the proportionate amount that is subtracted from the probability value $p_2$ be greater than that subtracted from the probability value p3, i.e., the proportionate value "x" is set higher than the proportional value "y". For example, "x" can equal 2/15 and "y" can equal 1/15.

Notably, the methodology illustrated in FIG. 13*b* allows control over the proportionate amounts that are subtracted from the probability values $p_2$ and $p_3$ and added to the probability value $p_l$, so that the doll 600 can quickly adapt to a child's lower skill level in a stable manner. That is, if the probability values $p_2$ and $p_3$ are relatively high, a proportionate amount subtracted from these probability values will quickly decrease them and increase the probability value pi, whereas if the probability values $p_2$ and $p_3$ are relatively low, a proportionate amount subtracted from these probability values will not completely deplete them.

General equations [6a]-[7a] can be used to implement the learning methodology illustrated in FIG. 13*b*. Given that $g_{l2}(p(k))=(2/15)p_2(k)$ and $g_{l3}(p(k))=(1/15)p_3(k)$, equations [6a]-[7a] can be broken down into:

$$p_1(k+1)=p_1(k)+\sum_{j=2}^{3}g_{1j}(p(k))=p_1(k)+\frac{2}{15}p_2(k)+\frac{1}{15}p_3(k);\qquad[6a\text{-}1]$$

$$p_2(k+1)=p_2(k)-g_{12}(p(k))=p_2(k)-\frac{2}{15}p_2(k)=\frac{13}{15}p_2(k);\text{ and}\qquad[7a\text{-}1]$$

$$p_3(k+1)=p_3(k)-g_{13}(p(k))=p_3(k)-\frac{1}{15}p_3(k)=\frac{14}{15}p_3(k)\qquad[7a\text{-}2]$$

Figure 13C:
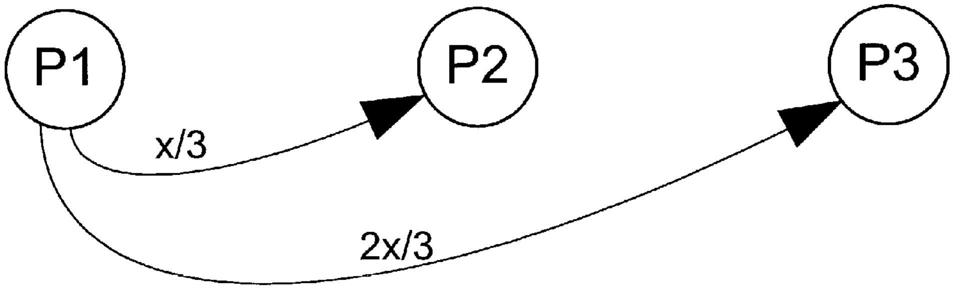

FIG. 13*c* illustrates a methodology used to update the article probability distribution p when a double article combination subset $\alpha_{s2}$ is currently selected, and the child 605 succeeds in matching the prompted article combination a (i.e., $\beta$=0). In this case, the intuition module 715 will attempt to drive the child's skill level from the double article combination subset a$\alpha_{s2}$ to the triple article combination subset $\alpha_{s3}$ by increasing the probability that the child 605 will subsequently be prompted by the more difficult triple subset combination sets $\alpha_{s3}$. The intuition module 715 accomplishes this be shifting the probability distribution p from the probability value p to the probability values $p_2$ and $p_3$. Specifically, the single article combination subset $\alpha_{s1}$ is penalized by subtracting a proportionate value equal to "x" (e.g., ⅕ of $p_l$) from probability value $p_l$ and distributing it to the probability values $p_2$ and $p_3$.

Since the child's success with a double article combination set $\alpha_{s2}$ indicates that the child 605 may be relatively proficient at triple article combinations $\alpha_{s2}$, the probability value $p_3$ is increased more than the probability value $p_2$ to ensure that the child's skill level is driven from the double article combination subset $\alpha_{s2}$ to the triple article combination subset $\alpha_{s3}$. For example, the proportions of "x" added to the probability values $p_2$ and $p_3$ can be ⅓ and ⅔, respectively. Notably, the methodology illustrated in FIG. 13*c* allows control over the relative amounts that are added to the probability values $p_2$ and $p_3$. That is, the amount added to the probability value $p_3$ will always be greater than the amount added to the probability value $p_2$ irrespective of the current magnitudes of the probability values $p_2$ and $p_3$, thereby ensuring that the child's skill level is driven towards the triple article combination subset $\alpha_{s3}$, rather than maintaining the child's skill level at the double article combination subset $\alpha_{s2}$.

General equations [20] and [21a] can be used to implement the learning methodology illustrated in FIG. 13*c*. Given that $h_l(p(k))=(1/15)p_l(k)$, $d_{l2}=1/3$, and $d_{13}=2/3$, equations [20] and [21a] can be broken down into:

$$p_1(k+1) = p_1(k) - h_1(p(k)) = p_1(k) - \frac{1}{5}p_1(k) = \frac{4}{5}p_1(k); \quad [20\text{-}2]$$

$$p_2(k+1) = p_2(k) + \left(\frac{1}{3}\right)\left(\frac{1}{5}\right)p_1(k) = p_2(k) + \frac{1}{15}p_1(k); \text{ and} \quad [21a\text{-}3]$$

$$p_3(k+1) = p_3(k) + \left(\frac{2}{3}\right)\left(\frac{1}{5}\right)p_1(k) = p_3(k) + \frac{2}{15}p_1(k) \quad [21a\text{-}4]$$

Figure 13D:
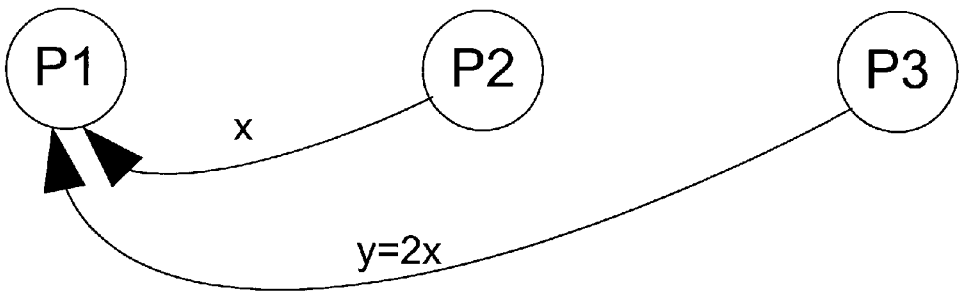

FIG. 13*d* illustrates a methodology used to update the article probability distributions when a double article combination subset $\alpha_{s2}$ is currently selected, and the child 605 does not succeed in matching the prompted article combination $\alpha$ ($\beta$=1). In this case, the intuition module 715 will attempt to prevent over-challenging the child 605 by decreasing the probability that the child 605 will subsequently be prompted by the more difficult double and triple subset combination sets $\alpha_{s2}$ and $\alpha_{s3}$. The intuition module 715 accomplishes this by shifting the probability distribution p from the probability values $p_2$ and $p_3$ to the probability value $p_l$. Specifically, the single article combination subset $\alpha_{s1}$ is rewarded by subtracting a proportional value equal to "x" from probability value $p_2$ and adding it to the probability value pi, and subtracting a proportionate value equal to "y" from probability value $p_3$ and adding it to the probability value $p_l$.

Since the child's failure with a double article combination set $\alpha_{s2}$ indicates that the child 605 may not be proficient at triple article combinations $\alpha_{s2}$, the probability value $p_3$ is decreased more than the probability value $p_2$. The intuition module 715 accomplishes this by requiring that the proportionate amount that is subtracted from the probability value $p_3$ be greater than that subtracted from the probability value $p_2$, i.e., the proportionate value "y" is set higher than the proportional value "x". For example, "x" can equal 1/15 and "y" can equal 2/15.

Notably, the methodology illustrated in FIG. 13*d* allows control over the proportionate amounts that are subtracted from the probability values $p_2$ and $p_3$ and added to the probability value $p_l$, so that the doll 600 can quickly adapt to a child's lower skill level in a stable manner. That is, if the probability values $p_2$ and $p_3$ are relatively high, a proportionate amount subtracted from these probability values will quickly decrease them and increase the probability value $p_l$, whereas if the probability values $p_2$ and $p_3$ are relatively low, a proportionate amount subtracted from these probability values will not completely deplete them.

General equations [6a]-[7a] can be used to implement the learning methodology illustrated in FIG. 13*d*. Given that $g_{l2}(p(k))=(1/15)p_2(k)$ and $g_{l3}(p(k))=(2/15)p_3(k)$, equations [6a]-[7a] can be broken down into:

$$p_1(k+1) = p_1(k) + \sum_{j=2}^{3} g_{1j}(p(k)) = p_1(k) + \frac{1}{15}p_2(k) + \frac{2}{15}p_3(k); \quad [6a\text{-}2]$$

$$p_2(k+1) = p_2(k) - g_{12}(p(k)) = p_2(k) - \frac{1}{15}p_2(k) = \frac{14}{15}p_2(k); \text{ and} \quad [7a\text{-}3]$$

$$p_3(k+1) = p_3(k) - g_{13}(p(k)) = p_3(k) - \frac{2}{15}p_3(k) = \frac{13}{15}p_3(k) \quad [7a\text{-}4]$$

Figure 13E:
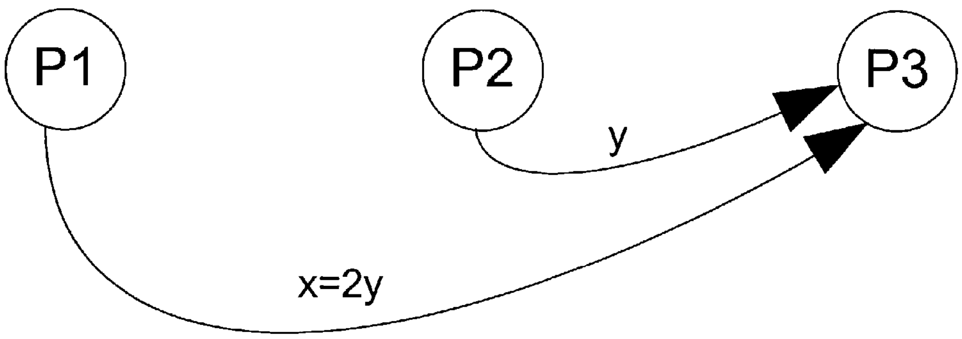

FIG. 13*e* illustrates a methodology used to update the article probability distribution p when a triple article combination subset $\alpha_{s3}$ is currently selected, and the child 605 succeeds in matching the prompted article combination $\alpha$ (i.e., $\beta$=0). In this case, the intuition module 715 will attempt to drive the child's skill level further to the triple article combination subset $\alpha_{s3}$ by increasing the probability that the child 605 will subsequently be prompted by the more difficult triple subset combination sets $\alpha_{s3}$. The intuition module 715 accomplishes this be shifting the probability distribution p from the probability values $p_l$ and $p_2$ to the probability value p3 Specifically, the triple article combination subset $\alpha_{s1}$ is rewarded by subtracting a proportional value equal to "x" from probability value $p_l$ and adding it to the probability value $p_3$, and subtracting a proportionate value equal to "y" from probability value $p_2$ and adding it to the probability value $p_3$.

Since the child 605 is much more proficient at single article combinations $\alpha_{s1}$ than with double article combinations $\alpha_{s2}$, the intuition module 715 attempts to reduce the probability value $p_l$ more than the probability value $p_2$. The intuition module 715 accomplishes this by requiring that the proportionate amount that is subtracted from the probability value $p_l$ be greater than that subtracted from the probability value $p_2$, i.e., the proportionate value "x" is set higher than the proportional value "y". For example, "x" can equal 2/15 and "y" can equal 1/15.

Notably, the methodology illustrated in FIG. 13*e* allows control over the proportionate amounts that are subtracted from the probability values $p_2$ and $p_3$ and added to the probability value $p_l$, so that the doll 600 can quickly adapt to a child's higher skill level in a stable manner. That is, if the probability values $p_l$ and $p_2$ are relatively high, a proportionate amount subtracted from these probability values will quickly decrease them and increase the probability value $p_3$, whereas if the probability values $p_l$ and $p_2$ are relatively low, a proportionate amount subtracted from these probability values will not completely deplete them.

General equations [6a]-[7a] can be used to implement the learning methodology illustrated in FIG. 13*e*. Given that $g_{31}(p(k))=(2/15)p_l(k)$ and $g_{32}(p(k))=(1/15)p_2(k)$, equations [6a]-[7a] can be broken down into:

$$p_3(k+1) = p_3(k) + \sum_{j=1}^{2} g_{3j}(p(k)) = p_3(k) + \frac{2}{15}p_1(k) + \frac{1}{15}p_2(k); \quad [6a\text{-}3]$$

$$p_1(k+1) = p_1(k) + g_{31}(p(k)) = p_1(k) - \frac{2}{15}p_1(k) = \frac{13}{15}p_1(k); \text{ and} \quad [7a\text{-}5]$$

$$p_2(k+1) = p_2(k) - g_{32}(p(k)) = p_2(k) - \frac{1}{15}p_2(k) = \frac{14}{15}p_2(k) \quad [7a\text{-}6]$$

Figure 13F:
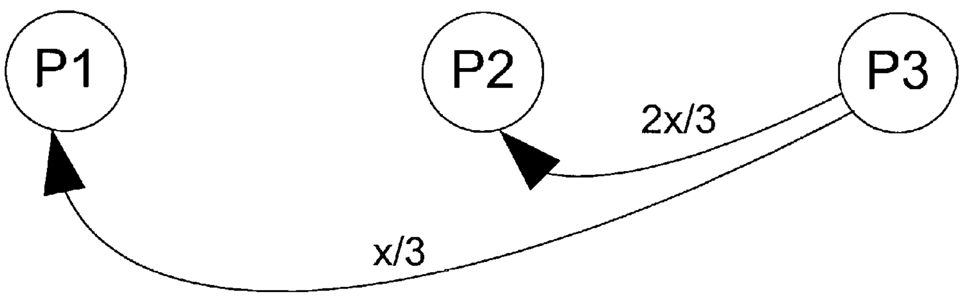

FIG. 13*f* illustrates a methodology used to update the article probability distribution p when a triple article combination subset $\alpha_{s3}$ is currently selected, and the child 605 does not succeed in matching the prompted article combination $\alpha$ (i.e., $\beta$=1). In this case, the intuition module 715 will attempt to prevent over-challenging the child 605 by decreasing the probability that the child 605 will subsequently be prompted by the more difficult triple subset combination set $\alpha_{s3}$. The intuition module 715 accomplishes this be shifting the probability distribution p from the probability value $p_3$ to the probability values $p_l$ and $p_2$. Specifically, the triple article combination subset $\alpha_{s3}$ is penalized by subtracting a proportionate value equal to "x" (e.g., ⅕ of $p_3$) from probability value $p_3$ and distributing it to the probability values $p_l$ and $p_2$.

Since the child's failure with a triple article combination set $\alpha_{s1}$ indicates that the child 605 may not be relatively proficient at double article combinations $\alpha_{s2}$, but not necessarily not proficient with the easier single article combinations $\alpha_{s1}$, the probability value $p_2$ is increased more than the probability value pi to ensure that the child 605 is not under-challenged with single article combination subsets $\alpha_{s1}$. For example, the proportions of "x" added to the probability values $p_l$ and $p_2$ can be ⅓ and ⅔, respectively. Notably, the methodology illustrated in FIG. 13*f* allows control over the relative amounts that are added to the probability values $p_l$ and $p_2$. That is, the amount added to the probability value $p_2$ will always be greater than the amount added to the probability value $p_l$ irrespective of the current magnitudes of the probability values $p_l$ and $p_2$, thereby ensuring that the child 605 is not under-challenged with single article combination subsets $\alpha_{s1}$.

General equations [20] and [21 a] can be used to implement the learning methodology illustrated in FIG. 13*f*. Given that $h_3p(k))=(⅕)p_3(k)$, $d_{31}$=⅓, and $d_{32}$=⅔, equations [20] and [21a] can be broken down into:

$$p_3(k+1) = p_3(k) - h_3(p(k)) = p_3(k) - \frac{1}{5}p_3(k) = \frac{4}{5}p_3(k); \quad [20\text{-}3]$$

$$p_1(k+1) = p_1(k) + \left(\frac{1}{3}\right)\left(\frac{1}{5}\right)p_3(k) = p_1(k) + \frac{1}{15}p_3(k); \text{ and} \quad [21a\text{-}5]$$

$$p_2(k+1) = p_2(k) + \left(\frac{2}{3}\right)\left(\frac{1}{5}\right)p_3(k) = p_2(k) + \frac{2}{15}p_3(k) \quad [21a\text{-}6]$$

Although the intuition module 715 has been previously described as selecting the learning methodologies based merely on the difficulty of the currently prompted article combination $\alpha_l$ and the outcome value $\beta$, the intuition module 715 may base its decision on other factors, such as the current probability values $p_l$. For example, assuming a single article combination subset $\alpha_{s1}$ is currently selected, and the child 605 succeeds in matching the prompted article combination $\alpha$ (i.e., $\beta$=0), if probability value $p_3$ is higher than probability value $p_2$, a modified version of the learning methodology illustrated in FIG. 13*a* can be selected, wherein the all of the amount subtracted from probability value $p_l$ can be added to probability value $p_2$ to make the learning transition smoother.

Figure 14:
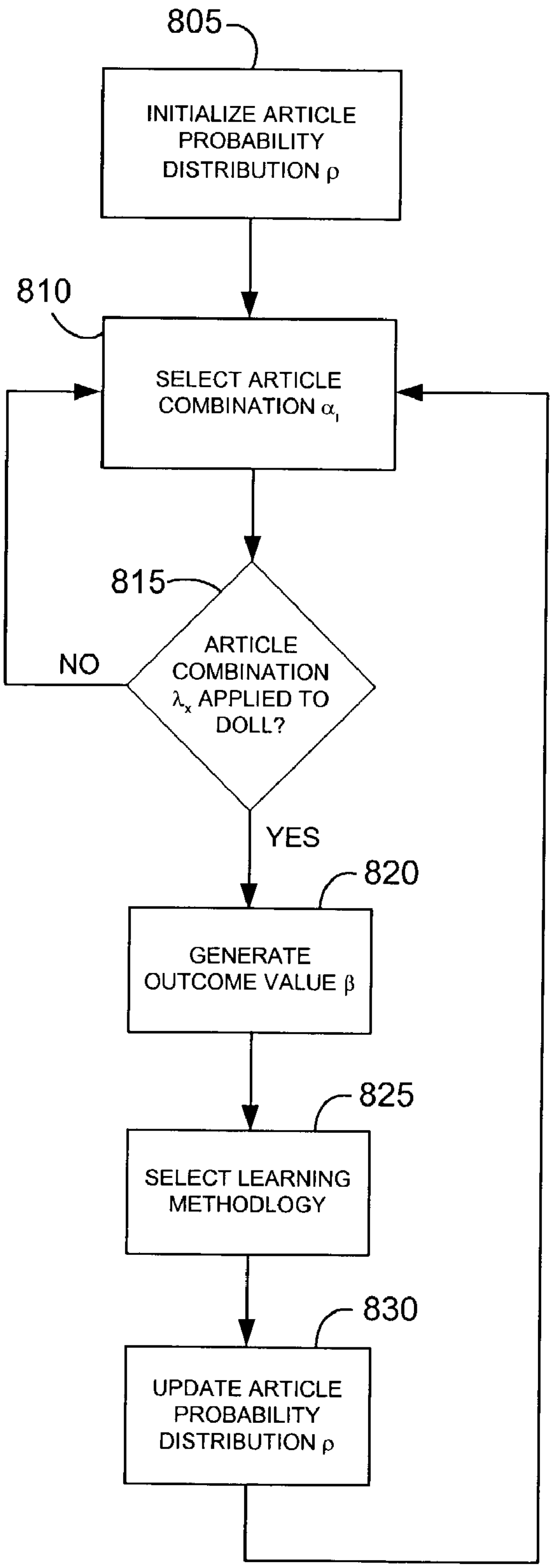
FIG. 14 is a flow diagram illustrating a preferred method performed by the educational program of FIG. 12.

Having now described the structure of the educational program 700, the steps performed by the educational program 700 will be described with reference to FIG. 14. First, the probability update module 720 initializes the article probability distribution p (step 805). For example, the educational program 700 may assume that the child 605 initially exhibits a relatively low skill level with the doll 600, in which case, the initial combined probability values $p_l$ corresponding to the single article combination subset $\alpha_{s1}$ can equal 0.80, and the initial combined probability values $p_l$ corresponding to the double article combination subset $\alpha_{s2}$ can equal 0.20. Thus, the probability distribution p is weighted towards the single article combination subset $\alpha_{s1}$, so that, initially, there is a higher probability that the child 605 will be prompted with the easier single article combinations $\alpha_l$.

The article selection module 725 then pseudo-randomly selects an article combination $\alpha_l$ from the article probability distribution $p_l$ and accordingly prompts the child 605 with that selected article combination $\alpha_l$ (step 810). In the alternative case where the article probability distribution p only contains three probability values $p_l$ for the respective three article combination subsets $\alpha_s$, the article section module 725 pseudo-randomly selects an article combination subset $\alpha_s$, and then from the selected article combination subset $\alpha_s$, randomly selects an article combination $\alpha_l$.

After the article combination $\alpha_l$ has been selected, the outcome evaluation module 730 then determines whether the article combination $\lambda_l$ has been selected by the child 605, i.e., whether the child has applied the articles 610 to the doll 600 (step 815). To allow the child 605 time to apply the articles 610 to the doll 600 or to change misapplied articles 610, this determination can be made after a certain period of time has expired (e.g., 10 seconds). If an article combination $\lambda_l$ has not been selected by the child 605 at step 815, the educational program 700 then returns to step 815 where it is again determined if an article combination $\lambda_l$ has been selected. If an article combination $\lambda_l$ has been selected by the child 605, the outcome evaluation module 730 then determines if it matches the article combination $\alpha_l$ prompted by the doll 600, and generates the outcome value $\beta$ in response thereto (step 820).

The intuition module 715 then modifies the functionality of the probability update module 720 by selecting the learning methodology that is used to update the article probability distribution p based on the outcome value $\beta$ and the number of articles contained within the prompted article combination $\alpha_l$ (step 825). Specifically, the intuition module 715 selects (1) equations [20-1], [21a-1], and [21a-2] if the article combination $\lambda_l$, selected by the child 605 matches a prompted single article combination $\alpha_l$; (2) equations [6a-1], [7a-1], and [7a-2] if the article combination $\lambda_l$ selected by the child 605 does not match a prompted single article combination $\alpha_l$; (3) equations [20-2], [21a-3], and [21a-4] if the article combination $\lambda_l$ selected by the child 605 matches a prompted double article combination $\alpha_l$; (4) equations [6a-2], [7a-3], and [7a-4] if the article combination $\lambda_l$ selected by the child 605 does not match a prompted double article combination $\alpha_l$; (5) equations [6a-3], [7a-5], and [7a-6] if the article combination $\lambda_l$ selected by the child 605 matches a prompted triple article combination $\alpha_l$; and (6) equations [20-3], [21a-5], and [21a-6] if the article combination $\lambda_l$ selected by the child 605 does not match a prompted triple article combination $\alpha_l$.

The probability update module 720 then, using equations selected by the intuition module 715, updates the article probability distributionp(step 830). Specifically, when updating the article probability distribution p, the probability update module 720 initially treats the article probability distribution p as having three probability values p, corresponding to the three article combination subsets $\alpha_s$. After the initial update, the probability update module 720 then evenly distributes the three updated probability values $p_l$ among the probability values $p_l$ corresponding to the article combinations α. That is, the probability value $p_l$ corresponding to the single article combination subset $\alpha_{s1}$ is distributed among the probability values $p_l$ corresponding to the nine single article combinations $\alpha_l$; the probability value $p_l$ corresponding to the double article combination subset $\alpha_{s2}$ is distributed among the probability values $p_l$ corresponding to the twenty-two double article combinations a,; and the probability value $p_l$ corresponding to the triple article combination subset $as_3$ is distributed among the probability values $p_l$ corresponding to the twelve triple article combinations $\alpha_l$. In the alternative embodiment where the article probability distribution p actually contains three article probability values $p_l$ corresponding to the three article combination subsets $\alpha_s$, the probability update module 720 simply updates the three article probability values $p_l$, which are subsequently selected by the article selection module 725. The program 700 then returns to step 810.

Figure 15:
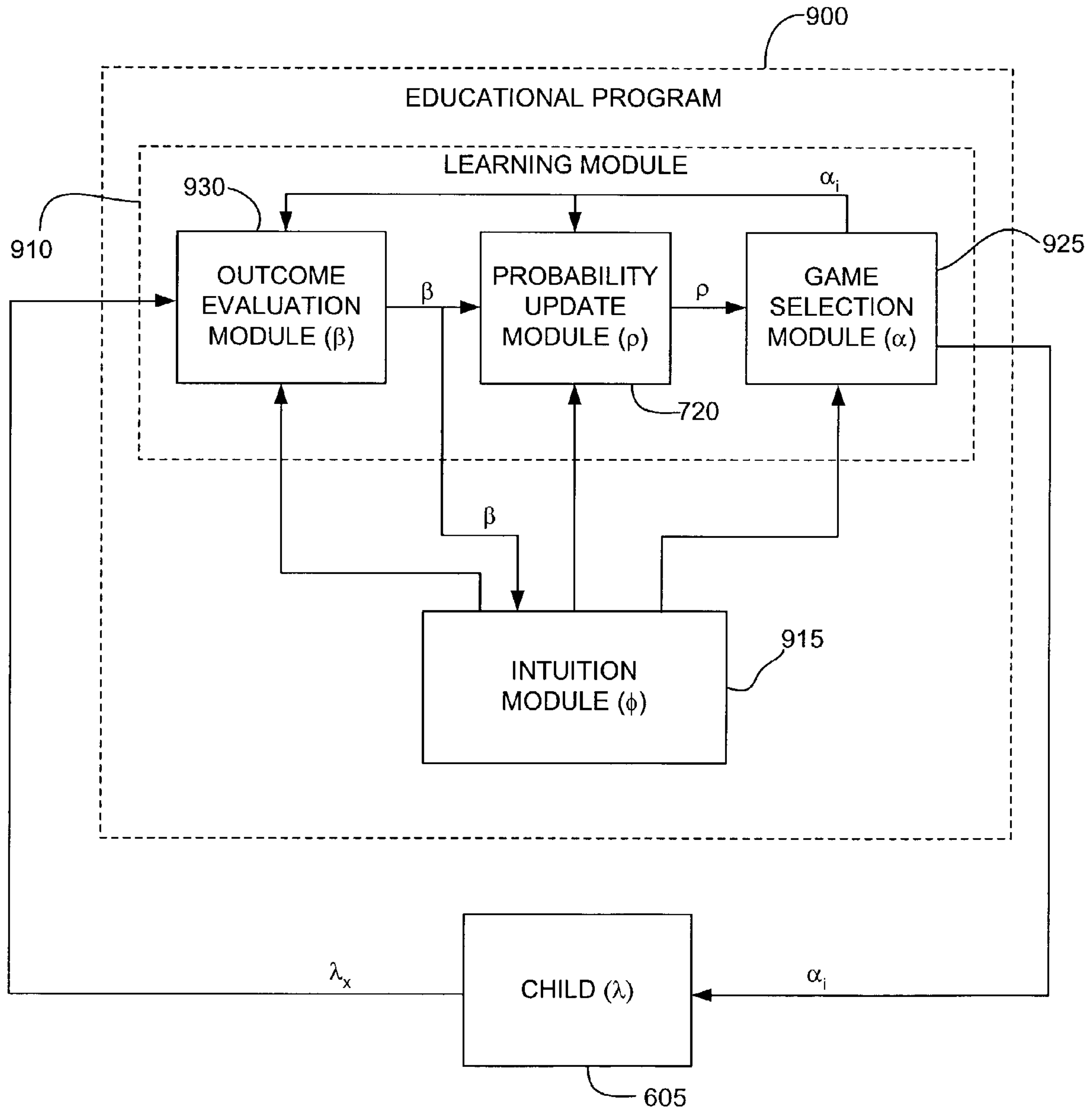
FIG. 15 is a block diagram of another single-user educational program that can be employed in a modification of the educational child's toy of FIG. 11.

Although the actions on which the program 700 operates has previously been described as related to prompted tasks, e.g., article combinations, the actions can also relate to educational games that can be played by the child 605. Another single-player educational program 900 (shown in FIG. 15) developed in accordance with the present inventions is described in the context of a modification of the previously described child's learning toy 600 (shown in FIG. 11).

The modified doll 600 can contain three educational games (represented by games $\alpha_l$-$\alpha_3$) that can be presented to the child 605. These educational games will have different degrees of difficulty. For example, the first game $\alpha_l$ can be a relatively easy article matching game that prompts the child 605 to apply the articles one at a time to the doll 600. The second game $\alpha_2$ can be a more difficult color matching memory game that prompts the child 605 with a series of colors that the child 605 could input using a color keypad (not shown). The third game $\alpha_3$ can be an even more difficult cognition game that prompts the child 605 with a number that the child 605 responds with color coded numbers the sum of which should add up to the prompted number.

In this case, the doll 600 seeks to challenge the child 605 by presenting him or her with more difficult games as the child 605 masters the doll 600. For example, if the child 605 exhibits a proficiency at the article matching game $\alpha_l$, the doll 600 will less frequently present the child 605 with the article matching game $\alpha_l$, and more frequently present the child 605 with color matching memory game $\alpha_2$ and cognition game $\alpha_3$. If the child 605 exhibits a proficiency at the color matching memory game $\alpha_2$, the doll 600 will less frequently present the child 605 with the article matching game al and color matching memory game $\alpha_2$, and more frequently present the child 605 with the cognition game $\alpha_3$. If the child 605 exhibits a proficiency at the cognition game $\alpha_3$, the doll 600 will even more frequently present the cognition game $\alpha_3$ to the child 605.

The doll 600 also seeks to avoid over challenging the child 605 and frustrating the learning process. For example, if the child 605 does not exhibit a proficiency at the cognition game $\alpha_3$, the doll 600 will less frequently present the child 605 with the cognition game $\alpha_3$ and more frequently present the child 605 with the article matching game $\alpha_l$ and color matching memory game $\alpha_2$. If the child 605 does not exhibit a proficiency at the color matching memory game $\alpha_2$, the doll 600 will less frequently present the child 605 with the color matching memory game $\alpha_2$ and cognition game $\alpha_3$, and more frequently present the child 605 with the article matching game $\alpha_l$. If the child 605 does not exhibit a proficiency at the article matching game $\alpha_l$, the doll 600 will even more frequently present the article matching game $\alpha_l$ to the child 605.

The educational program 900 is similar to the previously described educational program 700 with the exception that it treats the actions $\alpha_l$ as educational games, rather than article combinations, and treats the child actions $\lambda_l$ as actions to be input by the child 605 as specified by the currently played educational game, i.e., inputting articles in the case of the article matching game $\alpha_l$, inputting colors in the case of the color matching memory game $\alpha_2$, and inputting number coded colors in the case of the cognition game $\alpha_3$.

To this end, the educational program 900 generally includes a probabilistic learning module 910 and an intuition module 915, which are specifically tailored for the modified doll 600. The probabilistic learning module 910 comprises a probability update module 920, a game selection module 925, and an outcome evaluation module 930. Specifically, the probability update module 920 is mainly responsible for learning the child's current skill level, with the outcome evaluation module 930 being responsible for evaluating the educational games $\alpha_l$ presented by the doll 600 relative to the actions $\lambda_l$ selected by the child 605. The game selection module 925 is mainly responsible for using the learned skill level of the child 605 to select the games $\alpha_l$ that presented to the child 605. The intuition module 915 is responsible for directing the learning of the educational program 900 towards the objective, and specifically, dynamically pushing the skill level of the child 605 to a higher level. In this case, the intuition module 915 operates on the probability update module 920, and specifically selects the methodology that the probability update module 920 will use to update a game probability distribution p.

To this end, the outcome evaluation module 930 is configured to receive an educational game $\alpha_l$ from the game selection module 925 (i.e., one of the three educational games to be presented to the child 605 by the doll 600), and receive actions $\lambda_l$ from the child 605 (i.e., actions that the child 605 inputs into doll 600 during the current educational game $\alpha_l$). The outcome evaluation module 930 is also configured to determine whether the actions $\lambda_l$ received from the child 605 are successful within the selected educational game $\alpha_l$, with the outcome value β equaling one of two predetermined values, e.g., "0" if the child actions $\lambda_l$ are successful within the selected educational game $\alpha_l$, and "1" if the child actions $\lambda_l$ is not successful within the selected educational game $\alpha_l$. In this case, a P-type learning methodology is used. Optionally, Q- and S-type learning methodologies can be used to quantify child actions $\lambda_l$ that are relatively successful or unsuccessful.

The probability update module 920 is configured to generate and update the game probability distribution p in a manner directed by the intuition module 915, with the article probability distribution p containing three probability values $p_l$ corresponding to the three educational games $\alpha_l$. The game selection module 925 is configured for receiving the article probability distribution p from the probability update module 920, and pseudo-randomly selecting the education game $\alpha_l$ therefrom in the same manner as the article selection module 725 of the program 700 selects article combination subsets $\alpha_s$.

The intuition module 915 is configured to modify the functionality of the probability update module 920 based on the performance index φ, and in this case, the current skill level of the child 605 relative to the current teaching level of the doll 600. In the preferred embodiment, the performance index $\phi$ is quantified in terms of the degree of difficulty of the currently selected educational game $\alpha_l$ and the outcome value $\beta$ (i.e., whether or not the actions $\lambda_l$ selected by the child 605 are successful). In this respect, the performance index $\phi$ is instantaneous. It should be appreciated, however, that the performance of the educational program 900 can also be based on a cumulative performance index $\phi$. For example, the educational program 900 can keep track of a percentage of the child's successful with the educational games $\alpha_l$.

The intuition module 915 modifies the functionality of the probability update module 920 is the same manner as the previously described intuition module 715 modifies the functionality of the probability update module 720. That is, the intuition module 915 determines which updating methodology will be used and which educational game a will be rewarded or penalized in a manner similar to that described with respect to FIGS. 13*a-f*. For example, the intuition module 915 directs the probability update module 920 to shift the game probability distribution p from probability value(s) $p_l$ corresponding to educational games $\alpha_l$ associated with lesser difficult levels to probability value(s) $p_l$ corresponding to educational games $\alpha_l$ associated with greater difficult levels when the child 605 is relatively successful at the currently selected education game $\alpha_l$, and to shift the game probability distribution p from probability value(s) p, corresponding to educational games $\alpha_l$ associated with greater difficult levels to probability value(s) $p_l$ corresponding to educational games $\alpha_l$ associated with lesser difficult levels when the child 605 is relatively unsuccessful at the currently selected education game $\alpha_l$.

In the illustrated embodiment, P-type learning methodologies ($\beta$ equals either "0" or "1") are used, in which case, it is assumed that the child 605 is absolutely successful or unsuccessful in any given educational game $\alpha_l$. Alternatively, Q- and S-type learning methodologies ($\beta$ is between "0" and "1") are used, in which case, it is assumed that the child 605 can be partially successful or unsuccessful in any given educational game $\alpha_l$. For example, the outcome value $\beta$ may be a lesser value if most of the child actions $\lambda_l$ are successful, and may be a greater value if most of the child actions $\lambda_l$ are unsuccessful.

The intuition module 915 can select from the learning methodologies illustrated in FIGS. 13*a-f*. For example, the intuition module 915 can select (1) the methodology illustrated in FIG. 13*a* if the child 605 succeeds in the article matching game $\alpha_l$; (2) the methodology illustrated in FIG. 13*b* if the child 605 does not succeed in the article matching game $\alpha_l$; (3) the methodology illustrated in FIG. 13*c* if the child 605 succeeds in the color matching memory game $\alpha_2$; (4) the methodology illustrated in FIG. 13*d* if the child 605 does not succeed in the color matching memory game $\alpha_2$; (5) the methodology illustrated in FIG. 13*e* if the child 605 succeeds in the cognition game $\alpha_3$; and (6) the methodology illustrated in FIG. 13*f* if the child 605 does not succeed in the cognition game $\alpha_3$.

So that selection of the educational games $\alpha_l$ is not too erratic, the intuition module 915 may optionally modify the game selection module 925, so that it does not select the relatively easy article matching game $\alpha_l$ after the relatively difficult cognition game $\alpha_3$ has been selected, and does not select the relatively difficult cognition game $\alpha_3$ after the relatively easy article matching game $\alpha_l$ has been selected. Thus, the teaching level of the doll 600 will tend to play the article matching game $\alpha_l$, then the color matching memory game $\alpha_2$, and then the cognition game $\alpha_3$, as the child 605 learns.

Figure 16:
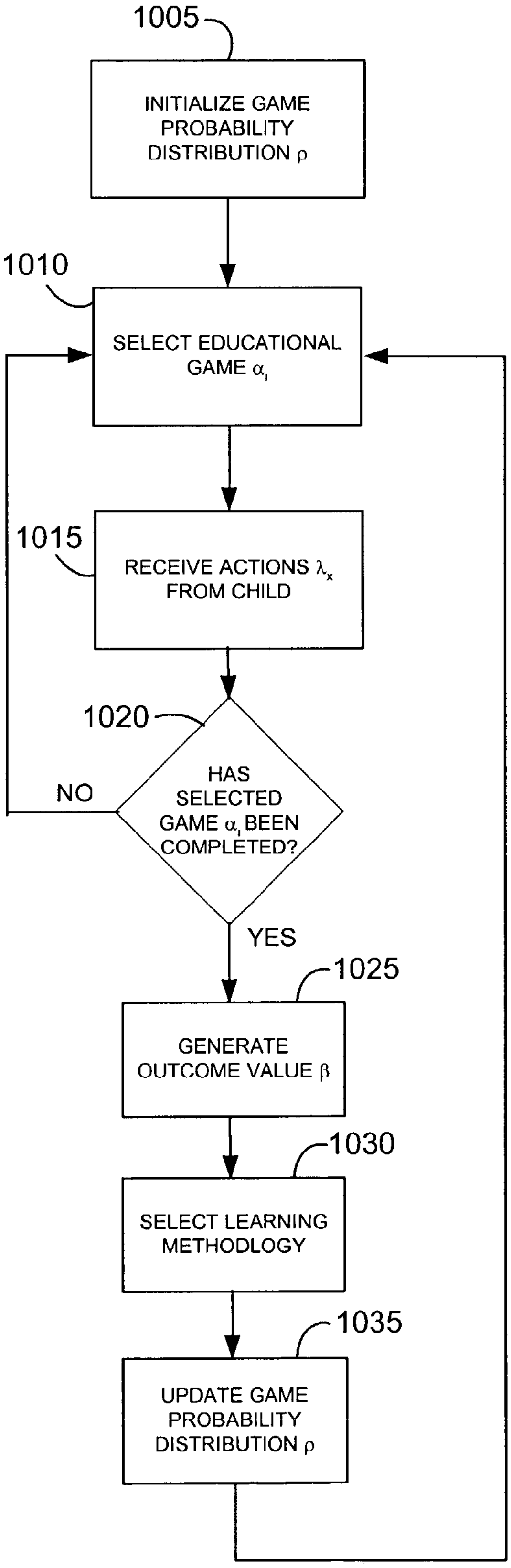
FIG. 16 is a flow diagram illustrating a preferred method performed by the educational program of FIG. 15.

Having now described the structure of the educational program 900, the steps performed by the educational program 900 will be described with reference to FIG. 16. First, the probability update module 920 initializes the game probability distribution p (step 1005). For example, the educational program 900 may assume that the child 605 initially exhibits a relatively low skill level with the doll 600, in which case, the initial probability values $p_l$ corresponding to the relatively easy article matching game $\alpha_l$ can equal 0.80, and the initial probability value p, corresponding to the color matching memory game $\alpha_2$ can equal 0.20. Thus, the probability distribution p is weighted towards the article matching game $\alpha_l$, so that, initially, there is a higher probability that the child 605 will be prompted with the easier article matching game $\alpha_l$.

The game selection module 925 then pseudo-randomly selects an educational game $\alpha_l$ from the game probability distribution $p_l$ and accordingly presents the child 605 with that selected game $\alpha_l$ (step 1010).

After the educational game $\alpha_l$ has been selected, the outcome evaluation module 930 then receives actions $\lambda_l$ from the child 605 (step 1015) and determines whether the game $\alpha_l$ has been completed (step 1020). If the selected educational game $\alpha_l$ has not been completed at step 1015, the educational program 900 then returns to step 1015 where it receives actions $\lambda_l$ from the child 605. If the selected educational game $\alpha_l$ has been completed at step 1015, the outcome evaluation module 930 then determines whether the actions $\lambda_l$ from the child 605 are successful, and generates the outcome value $\beta$ in response thereto (step 1025).

The intuition module 915 then modifies the functionality of the probability update module 920 by selecting the learning methodology that is used to update the article probability distribution p based on the outcome value $\beta$ and the currently played educational game $\alpha_l$ (step 1030). Specifically, the intuition module 915 selects (1) equations [20-1], [21a-1], and [21a-2] if the actions $\lambda_l$ selected by the child 605 within the article matching game $\alpha_l$ are relatively successful; (2) equations [6a-1], [7a-1], and [7a-2] if the actions $\lambda_l$ selected by the child 605 within the article matching game $\alpha_l$ are relatively unsuccessful; (3) equations [20-2], [21a-3], and [21a-4] if the actions $\lambda_l$ selected by the child 605 within the color matching memory game $\alpha_2$ are relatively successful; (4) equations [6a-2], [7a-3], and [7a-4] if the actions $\lambda_l$ selected by the child 605 within the color matching memory game $\alpha_2$ are relatively unsuccessful; (5) equations [6a-3], [7a-5], and [7a-6] if the actions $\lambda_l$ selected by the child 605 within the cognition game $\alpha_3$ are relatively successful; and (6) equations [20-3], [21a-5], and [21a-6] if the actions Ax selected by the child 605 within the cognition game $\alpha_3$ are relatively unsuccessful.

The probability update module 920 then, using equations selected by the intuition module 915, updates the article probability distribution p (step 1035). The program 900 then returns to step 1010 where the game selection module 925 again pseudo-randomly selects an educational game $\alpha_l$ from the game probability distribution $p_l$ and accordingly presents the child 605 with that selected game $\alpha_l$.

More Specific details on the above-described operation of the toy 600 can be found in the computer program listing appendix attached hereto and previously incorporated herein by reference. It is noted that the file "Intuition Intelligence-simonsays.doc" shows that the game can be played in two modes.

Specifically, in the hardware mode (communication through USB), the toy is connected to a digital logic board on a USB Controller board. A USB cable connects the USB port on the PC and the USB Controller board. A simple USB software driver on the PC aids in reading the "code" that is generated by the digital logic. The digital logic is connected to the various switches and the sensor points of the toy. The sensors are open circuits that are closed when an accessory is placed (or connected to a sensor) on the toy. Each article or accessory of the toy has different resistor values. The digital logic determines which sensors circuits are closed and open, which switches are ON and OFF, and the resistor value of the article connected to the sensor. Based on these inputs digital logic generates different codes. Digital logic generated code is processed by the program in the PC.

In the software mode, the hardware communication is simulated by typing in the code directly to a text box. The software version emulation eliminates the need for USB communication and the digital logic circuit code generation. The code that is needed for the game play is pre-initialized in variables for different prompts. The code that is expected by the toy is also shown on the screen, so that the toy can be tested. If the code expected and the code typed in the text box (or the hardware generated code) are the same, it is consider a success for the child.

Single-User Phone Number Listing Program

Figure 17:
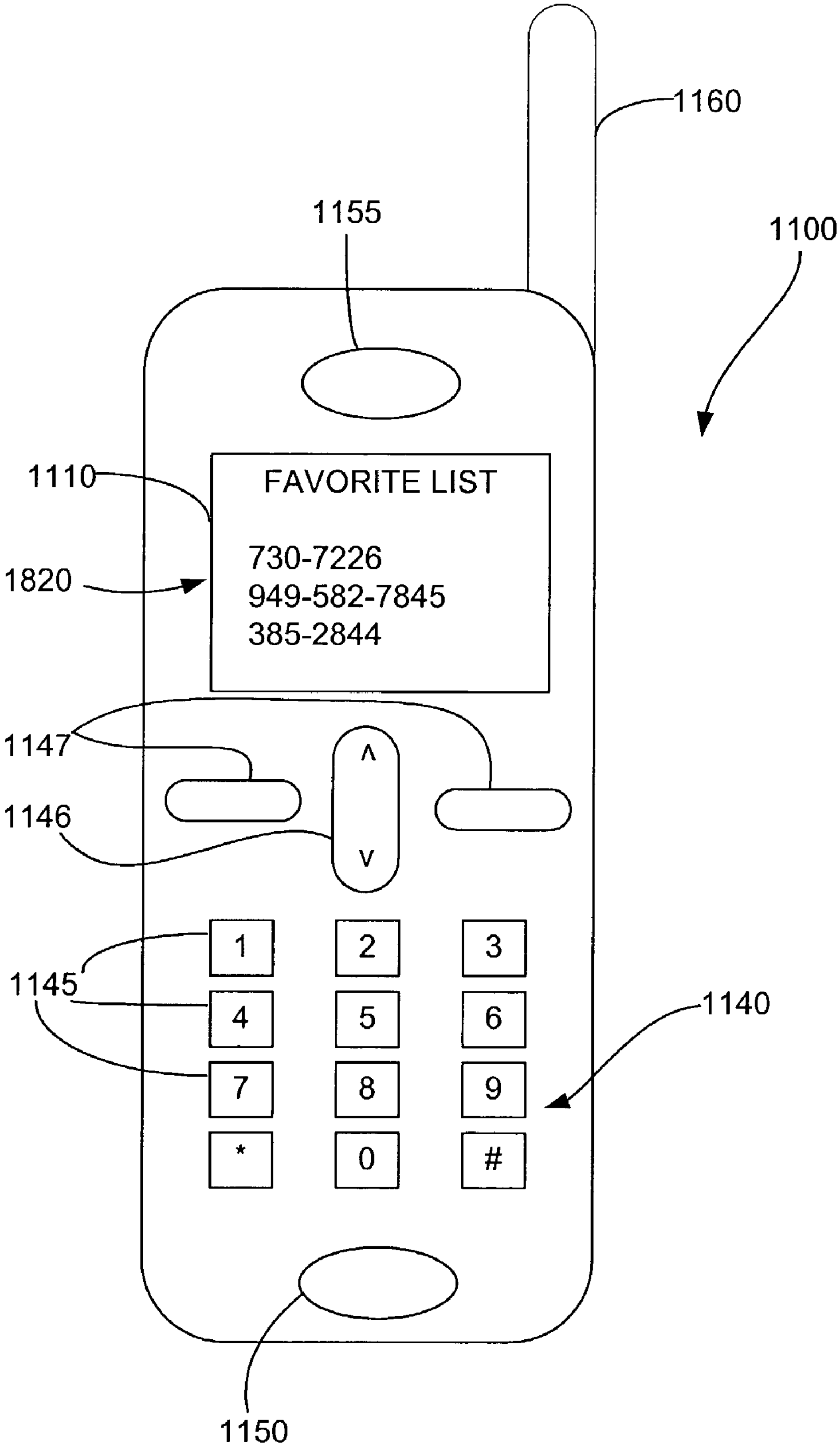
FIG. 17 is a plan view of a mobile phone to which the generalized program of FIG. 1 can be applied.
Figure 18:
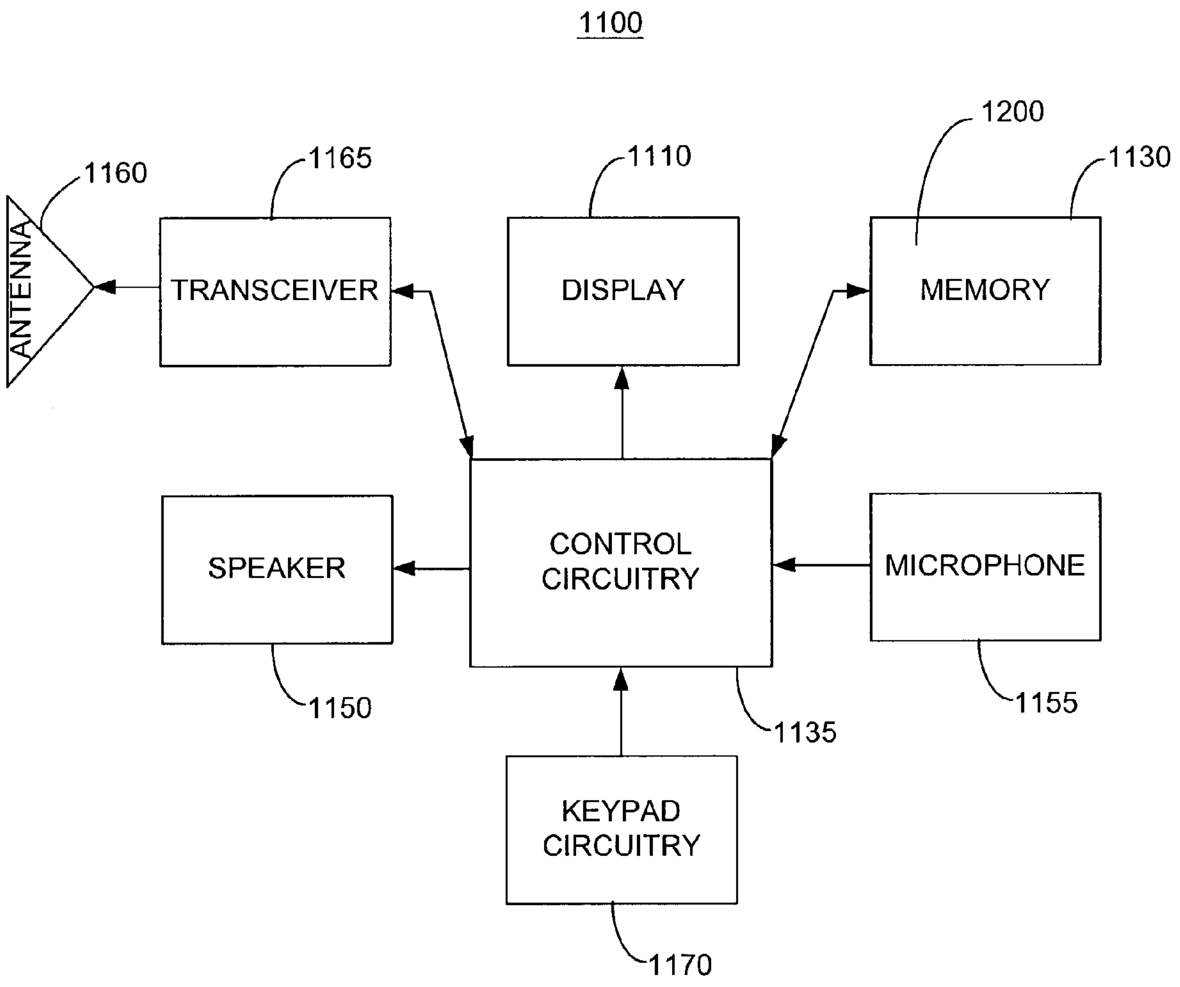
FIG. 18 is a block diagram illustrating the components of the mobile phone of FIG. 17.

Although game and toy applications have only been described in detail so far, the learning program 100 can have even more applications. For example, referring to FIGS. 17 and 18, a priority listing program 1200 (shown in FIG. 19) developed in accordance with the present inventions is described in the context of a mobile phone 1100. The mobile phone 1100 comprises a display 1110 for displaying various items to a phone user 1115 (shown in FIG. 19). The mobile phone 1100 further comprises a keypad 1140 through which the phone user 1115 can dial phone numbers and program the functions of the mobile phone 1100. To the end, the keypad 1140 includes number keys 1145, a scroll key 1146, and selection keys 1147. The mobile phone 1100 further includes a speaker 1150, microphone 1155, and antenna 1160 through which the phone user 1115 can wirelessly carry on a conversation. The mobile phone 1100 further includes keypad circuitry 1170, control circuitry 1135, memory 1130, and a transceiver 1165.

The keypad circuitry 1170 decodes the signals from the keypad 1140, as entered by the phone user 1115, and supplies them to the control circuitry 1135. The control circuitry 1135 controls the transmission and reception of call and voice signals. During a transmission mode, the control circuitry 1135 provides a voice signal from the microphone 1155 to the transceiver 1165. The transceiver 1165 transmits the voice signal to a remote station (not shown) for communication through the antenna 1160. During a receiving mode, the transceiver 1165 receives a voice signal from the remote station through the antenna 1160. The control circuitry 1135 then provides the received voice signal from the transceiver 1165 to the speaker 1150, which provides audible signals for the phone user 1115. The memory 1130 stores programs that are executed by the control circuitry 1135 for basic functioning of the mobile phone 1100. In many respects, these elements are standard in the industry, and therefore their general structure and operation will not be discussed in detail for purposes of brevity.

In addition to the standard features that typical mobile phones have, however, the mobile phone 1100 displays a favorite phone number list 1120 from which the phone user 1115 can select a phone number using the scroll and select buttons 1146 and 1147 on the keypad 1140. In the illustrated embodiment, the favorite phone number list 1120 has six phone numbers 1820 at any given time, which can be displayed to the phone user 1115 in respective sets of two and four numbers. It should be noted, however, that the total number of phone numbers within the list 1120 may vary and can be displayed to the phone user 1115 in any variety of manners.

The priority listing program 1200, which is stored in the memory 1130 and executed by the control circuitry 1135, dynamically updates the telephone number list 1120 based on the phone user's 1115 current calling habits. For example, the program 1200 maintains the favorite phone number list 1120 based on the number of times a phone number has been called, the recent activity of the called phone number, and the time period (e.g., day, evening, weekend, weekday) in which the phone number has been called, such that the favorite telephone number list 1120 will likely contain a phone number that the phone user 1115 is anticipated to call at any given time. As will be described in further detail below, the listing program 1200 uses the existence or non-existence of a currently called phone number on a comprehensive phone number list as a performance index $\phi$ in measuring its performance in relation to its objective of ensuring that the favorite phone number list 1120 will include future called phone numbers, so that the phone user 1115 is not required to dial the phone number using the number keys 1145. In this regard, it can be said that the performance index $\phi$ is instantaneous. Alternatively or optionally, the listing program 1200 can also use the location of the phone number on the comprehensive phone number list as a performance index $\phi$.

Figure 19:
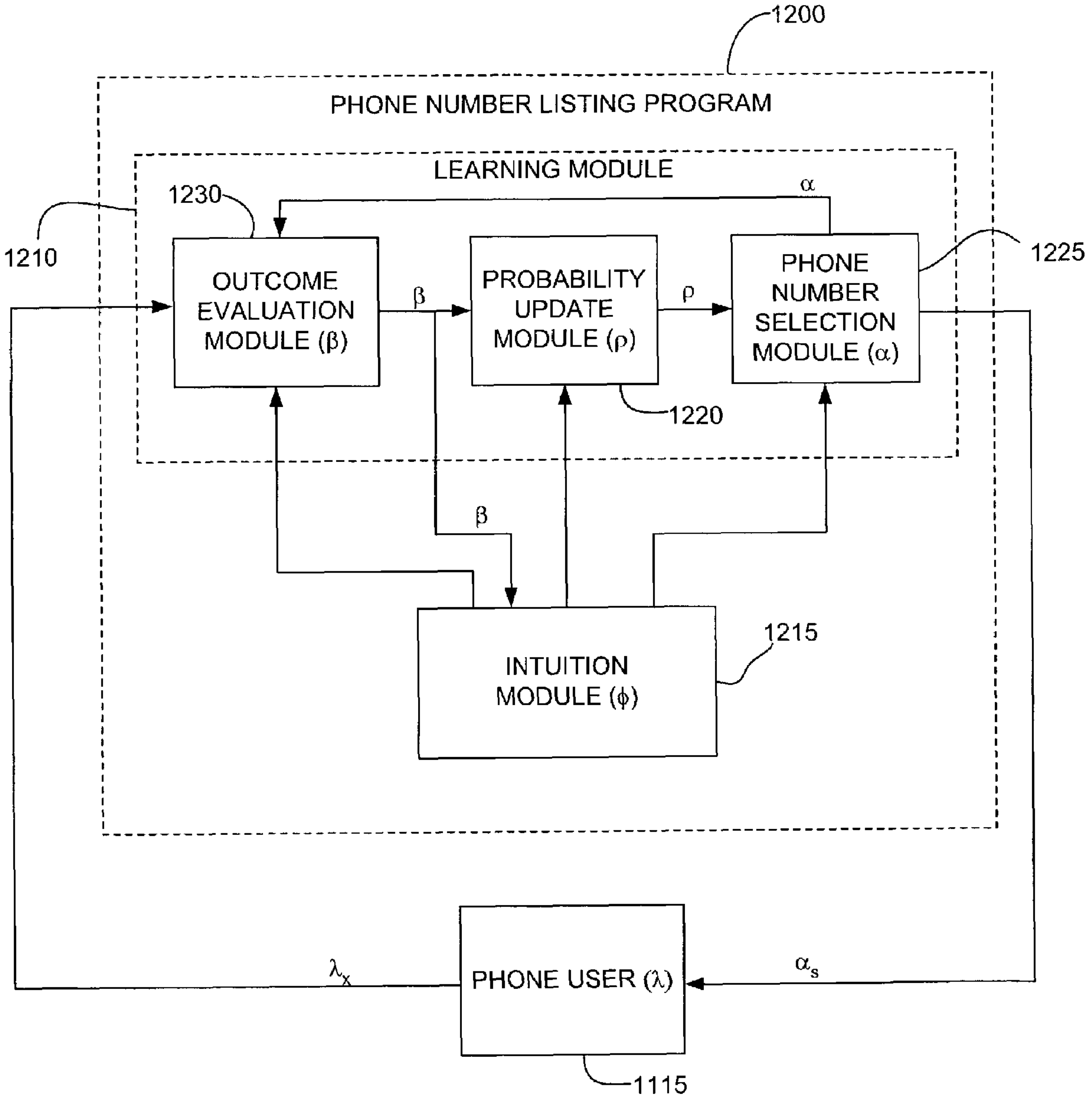
FIG. 19 is a block diagram of a priority listing program employed in the mobile phone of FIG. 17.

Referring now to FIG. 19, the listing program 1200 generally includes a probabilistic learning module 1210 and an intuition module 1215, which are specifically tailored for the mobile phone 1100. The probabilistic learning module 1210 comprises a probability update module 1220, a phone number selection module 1225, and an outcome evaluation module 1230. Specifically, the probability update module 1220 is mainly responsible for learning the phone user's 1115 calling habits and updating a comprehensive phone number list a that places phone numbers in the order that they are likely to be called in the future during any given time period. The outcome evaluation module 1230 is responsible for evaluating the comprehensive phone number list a relative to current phone numbers $\lambda_x$ called by the phone user 1115. The phone number selection module 1225 is mainly responsible for selecting a phone number subset $\alpha_l$ from the comprehensive phone number list $\alpha$ for eventual display to the phone user 1115 as the favorite phone number list 1120. The intuition module 1215 is responsible for directing the learning of the listing program 1200 towards the objective, and specifically, displaying the favorite phone number list 1120 that is likely to include the phone user's 1115 next called phone number. In this case, the intuition module 1215 operates on the probability update module 1220, the details of which will be described in further detail below.

To this end, the phone number selection module 1225 is configured to receive a phone number probability distribution p from the probability update module 1220, which is similar to equation [1] and can be represented by the following equation:

$$p(k)=[p_1(k),p_2(k),p_3(k)\ldots p_n(k)], \qquad [1\text{-}2]$$

where $p_l$ is the probability value assigned to a specific phone number $\alpha_l$; n is the number of phone numbers $\alpha_l$ within the comprehensive phone number list $\alpha_l$ and k is the incremental time at which the phone number probability distribution p was updated. Based on the phone number probability distribution p, the phone number selection module 1225 generates the comprehensive phone number list $\alpha$, which contains the listed phone numbers $\alpha_l$ ordered in accordance with their associated probability values $p_l$. For example, the first listed phone number $\alpha_l$ will be associated with the highest probability value $p_l$, while the last listed phone number $\alpha_l$ will be associated with the lowest probability value $p_l$. Thus, the comprehensive phone number list a contains all phone numbers ever called by the phone user 1115 and is unlimited. Optionally, the comprehensive phone number list α can contain a limited amount of phone numbers, e.g., 100, so that the memory 1130 is not overwhelmed by seldom called phone numbers. In this case, seldom called phone numbers $\alpha_l$ may eventually drop off of the comprehensive phone number list α.

It should be noted that a comprehensive phone number list α need not be separate from the phone number probability distribution p, but rather the phone number probability distribution p can be used as the comprehensive phone number list α to the extent that it contains a comprehensive list of phone numbers $\alpha_l$ corresponding to all of the called phone numbers $\lambda_x$. However, it is conceptually easier to explain the aspects of the listing program 1200 in the context of a comprehensive phone number list that is ordered in accordance with the corresponding probability values $p_l$, rather than in accordance with the order in which they are listed in the phone number probability distribution p.

From the comprehensive phone number list α, the phone number selection module 1225 selects the phone number subset $\alpha_s$ (in the illustrated embodiment, six phone numbers $\alpha_l$) that will be displayed to the phone user 1115 as the favorite phone number list 1120. In the preferred embodiment, the selected phone number subset $\alpha_s$ will contain those phone numbers $\alpha_l$ that correspond to the highest probability values $p_l$, i.e., the top six phone numbers $\alpha_l$ on the comprehensive phone number list α.

As an example, consider Table 7, which sets forth in exemplary comprehensive phone number list α with associated probability values $p_l$.

TABLE 7

Exemplary Probability Values for Comprehensive Phone Number List

| Number | Listed Phone Numbers ($\alpha_1$) | Probability Values ($p_1$) |
|---|---|---|
| 1 | 949-339-2932 | 0.253 |
| 2 | 343-3985 | 0.183 |
| 3 | 239-3208 | 0.128 |
| 4 | 239-2908 | 0.102 |
| 5 | 343-1098 | 0.109 |
| 6 | 349-0085 | 0.073 |
| 7 | 239-3833 | 0.053 |
| 8 | 239-4043 | 0.038 |
| . | . | . |
| . | . | . |
| . | . | . |
| 96 | 213-483-3343 | 0.009 |
| 97 | 383-303-3838 | 0.007 |
| 98 | 808-483-3984 | 0.007 |
| 99 | 398-3838 | 0.005 |
| 100 | 239-3409 | 0.002 |

In this exemplary case, phone numbers 949-339-2932, 343-3985, 239-3208, 239-2908, 343-1098, and 349-0085 will be selected as the favorite phone number list 1220, since they are associated with the top six probability values $p_l$.

The outcome evaluation module 1230 is configured to receive a called phone number $\lambda_x$ from the phone user 1115 via the keypad 1140 and the comprehensive phone number list α from the phone number selection module 1225. For example, the phone user 1115 can dial the phone number $\lambda_x$ using the number keys 1145 of the keypad 1140, selecting the phone number $\lambda_x$, from the favorite phone number list 1120 by operating the scroll and selection keys 1146 and 1147 of the keypad 1140, or through any other means. In this embodiment, the phone number $\lambda_x$, can be selected from a virtually infinite set of phone numbers λ, i.e., all valid phone numbers that can be called by the mobile phone 1100. The outcome evaluation module 1230 is further configured to determine and output an outcome value β that indicates if the currently called phone number $\lambda_x$ is on the comprehensive phone number list a. In the illustrated embodiment, the outcome value β equals one of two predetermined values: "1" if the currently called phone number $\lambda_x$ matches a phone number $\alpha_l$ on the comprehensive phone number list $\alpha_l$ and "0" if the currently called phone number $\lambda_x$ does not match a phone number $\alpha_l$ on the comprehensive phone number list a.

It can be appreciated that unlike in the duck game 300 where the outcome value β is partially based on the selected game move $\alpha_i$, the outcome value β is technically not based on listed phone numbers $\alpha_l$ selected by the phone number selection module 1225, i.e., the phone number subset $\alpha_s$, but rather whether a called phone number $\lambda_x$ is on the comprehensive phone number list α irrespective of whether it is in the phone number subset $\alpha_s$. It should be noted, however, that the outcome value β can optionally or alternatively be partially based on the selected phone number subset $\alpha_s$, as will be described in further detail below.

The intuition module 1215 is configured to receive the outcome value β from the outcome evaluation module 1230 and modify the probability update module 1220, and specifically, the phone number probability distribution p, based thereon. Specifically, if the outcome value β equals "0," indicating that the currently called phone number $\lambda_x$ was not found on the comprehensive phone number list α, the intuition module 1215 adds the called phone number $\lambda_x$ to the comprehensive phone number list α as a listed phone number $\alpha_l$.

The phone number $\alpha_l$ can be added to the comprehensive phone number list a in a variety of ways. In general, the location of the added phone number $\alpha_l$ within the comprehensive phone number list a depends on the probability value $p_l$ assigned or some function of the probability value $p_l$ assigned.

For example, in the case where the number of phone numbers $\alpha_l$ is not limited or has not reached its limit, the phone number $\alpha_l$ may be added by assigning a probability value $p_l$ to it and renormalizing the phone number probability distribution p in accordance with the following equations:

$$p_i(k+1) = f(x); \quad [22]$$

$$p_j(k+1) = p_j(k)(1 - f(x)); \; j \neq i \quad [23]$$

where i is the added index corresponding to the newly added phone number $\alpha_l$, $p_l$ is the probability value corresponding to phone number $\alpha_l$ added to the comprehensive phone number list α, f(x) is the probability value $p_l$ assigned to the newly added phone number $\alpha_l$, $p_j$ is each probability value corresponding to the remaining phone numbers $\alpha_j$ on the comprehensive phone number list α, and k is the incremental time at which the phone number probability distribution was updated.

In the illustrated embodiment, the probability value $p_l$ assigned to the added phone number $\alpha_l$ is simply the inverse of the number of phone numbers $\alpha_l$ on the comprehensive phone number list $\alpha_l$ and thus f(x) equals 1/(n+1), where n is the number of phone numbers on the comprehensive phone number list a prior to adding the phone number $\alpha_l$. Thus, equations [22] and [23] break down to:

$$p_i(k+1) = \frac{1}{n+1}; \qquad [22\text{-}1]$$

$$p_j(k+1) = p_j(k)\frac{n}{n+1}; \; j \neq i \qquad [23\text{-}1]$$

In the case where the number of phone numbers $\alpha_l$ is limited and has reached its limit, the phone number $\alpha$ with the lowest corresponding priority value $p_l$ is replaced with the newly called phone number $\lambda_x$ by assigning a probability value $p_l$ to it and renormalizing the phone number probability distribution p in accordance with the following equations:

$$p_l(k+1)=f(x) \qquad [24];$$

$$p_j(k+1) = \frac{p_j(k)}{\sum_{j\neq i}^{n} p_j(k)}(1 - f(x)); \; j \neq i \qquad [25]$$

where i is the index used by the removed phone number $\alpha_l$, $p_l$ is the probability value corresponding to phone number $\alpha_l$ added to the comprehensive phone number list $\alpha$,f(x) is the probability value $p_m$ assigned to the newly added phone number $\alpha_l$, $p_j$ is each probability value corresponding to the remaining phone numbers $\alpha_j$ on the comprehensive phone number list $\alpha_l$ and k is the incremental time at which the phone number probability distribution was updated.

As previously stated, in the illustrated embodiment, the probability value $p_l$ assigned to the added phone number $\alpha_l$ is simply the inverse of the number of phone numbers $\alpha_l$ on the comprehensive phone number list $\alpha_l$ and thus f(x) equals 1/n, where n is the number of phone numbers on the comprehensive phone number list $\alpha$. Thus, equations [24] and [25] break down to:

$$p_i(k+1) = \frac{1}{n}; \qquad [24\text{-}1]$$

$$p_j(k+1) = \frac{p_j(k)}{\sum_{j\neq i}^{n} p_j(k)}\left(\frac{n-1}{n}\right); \; j \neq i \qquad [25\text{-}1]$$

It should be appreciated that the speed in which the automaton learns can be controlled by adding the phone number $\alpha_l$ to specific locations within the phone number probability distribution p. For example, the probability value $p_l$ assigned to the added phone number $\alpha_l$ can be calculated as the mean of the current probability values $p_l$, such that the phone number $\alpha_l$ will be added to the middle of the comprehensive phone number list $\alpha$ to effect an average learning speed. The probability value $p_l$ assigned to the added phone number $\alpha_l$ can be calculated as an upper percentile (e.g. 25%) to effect a relatively quick learning speed. Or the probability value $p_l$ assigned to the added phone number $\alpha_l$ can be calculated as a lower percentile (e.g. 75%) to effect a relatively slow learning speed. It should be noted that if there is a limited number of phone numbers $\alpha_l$ on the comprehensive phone number list $\alpha_l$ thereby placing the lowest phone numbers $\alpha_l$ in the likelihood position of being deleted from the comprehensive phone number list $\alpha$, the assigned probability value $p_l$ should be not be so low as to cause the added phone number $\alpha_l$ to oscillate on and off of the comprehensive phone number list $\alpha$ when it is alternately called and not called.

In any event, if the outcome value $\beta$ received from the outcome evaluation module 1230 equals "1," indicating that the currently called phone number $\lambda_x$ was found on the comprehensive phone number list $\alpha$, the intuition module 1215 directs the probability update module 1220 to update the phone number probability distribution p using a learning methodology. In the illustrated embodiment, the probability update module 1220 utilizes a linear reward-inaction P-type update.

As an example, assume that a currently called phone number $\lambda_x$, matches a phone number $\alpha_{10}$ on the comprehensive phone number list $\alpha$, thus creating an outcome value $\beta$=1. Assume also that the comprehensive phone number list a currently contains 50 phone numbers $\alpha_l$. In this case, general updating equations [6] and [7] can be expanded using equations [10] and [11], as follows:

$$p_{10}(k+1) = p_{10}(k) + \sum_{\substack{j=1\\ j\neq 10}}^{50} ap_j(k);$$

$$p_1(k+1)=p_1(k)-ap_1(k);$$

$$p_2(k+1)=p_2(k)-ap_2(k);,$$

$$p_4(k+1)=p_4(k)-ap_4(k);$$

$$p_{50}(k+1)=p_{50}(k)-ap_{50}(k)$$

Thus, the corresponding probability value $p_{10}$ is increased, and the phone number probability values $p_l$ corresponding to the remaining phone numbers $\alpha_l$ are decreased. The value of a is selected based on the desired learning speed. The lower the value of $\alpha_l$ the slower the learning speed, and the higher the value of $\alpha_l$ the higher the learning speed. In the preferred embodiment, the value of a has been chosen to be 0.02. It should be noted that the penalty updating equations [8] and [9] will not be used, since in this case, a reward-penalty P-type update is not used.

Thus, it can be appreciated that, in general, the more a specific listed phone number $\alpha_l$ is called relative to other listed phone numbers $\alpha_l$, the more the corresponding probability value p, is increased, and thus the higher that listed phone number $\alpha_l$ is moved up on the comprehensive phone number list $\alpha$. As such, the chances that the listed phone number $\alpha_l$ will be contained in the selected phone number subset $\alpha_s$ and displayed to the phone user 1115 as the favorite phone number list 1120 will be increased. In contrast, the less a specific listed phone number $\alpha_l$ is called relative to other listed phone numbers $\alpha_l$, the more the corresponding probability value p, is decreased (by virtue of the increased probability values $p_l$ corresponding to the more frequently called listed phone numbers $\alpha_l$), and thus the lower that listed phone number $\alpha_l$ is moved down on the comprehensive phone number list $\alpha$. As such, the chances that the listed phone number $\alpha_l$ will be contained in the phone number subset $\alpha_s$ selected by the phone number selection module 1225 and displayed to the phone user 1115 as the favorite phone number list 1120 will be decreased.

It can also be appreciated that due to the nature of the learning automaton, the relative movement of a particular listed phone number $\alpha_l$ is not a matter of how many times the phone number $\alpha_l$ is called, and thus, the fact that the total number of times that a particular listed phone number $\alpha_l$ has been called is high does not ensure that it will be contained in the favorite phone number list 1120. In reality, the relative placement of a particular listed phone number $\alpha_l$ within the comprehensive phone number list $\alpha_s$ is more of a function of the number of times that the listed phone number $\alpha_l$ has been recently called. For example, if the total number of times a listed phone number $\alpha_l$ is called is high, but has not been called in the recent past, the listed phone number $\alpha_l$ may be relatively low on the comprehensive phone number list $\alpha$ and thus it may not be contained in the favorite phone number list 1120. In contrast, if the total number of times a listed phone number $\alpha_l$ is called is low, but it has been called in the recent past, the listed phone number $\alpha_l$ may be relatively high on the comprehensive phone number list $\alpha$ and thus it may be contained in the favorite phone number list 1120. As such, it can be appreciated that the learning automaton quickly adapts to the changing calling patterns of a particular phone user 1115.

It should be noted, however, that a phone number probability distribution p can alternatively be purely based on the frequency of each of the phone numbers $\lambda_x$. For example, given a total of n phone calls made, and a total number of times that each phone number is received $f_1$, $f_2$, $f_3$ . . . , the probability values $p_l$ for the corresponding listed phone calls $\alpha_i$ can be:

$$p_i(k+1) = \frac{fi}{n} \qquad [26]$$

Noteworthy, each probability value $p_l$ is not a function of the previous probability value $p_l$ (as characterized by learning automaton methodology), but rather the frequency of the listed phone number $\alpha_l$ and total number of phone calls n. With the purely frequency-based learning methodology, when a new phone number $\alpha_l$ is added to the phone list $\alpha_l$ its corresponding probability value $p_l$ will simply be 1/n, or alternatively, some other function of the total number of phone calls n. Optionally, the total number of phone calls n is not absolute, but rather represents the total number of phone calls n made in a specific time period, e.g., the last three months, last month, or last week. In other words, the phone number probability distribution p can be based on a moving average. This provides the frequency-based learning methodology with more dynamic characteristics.

In any event, as described above, a single comprehensive phone number list $\alpha$ that contains all phone numbers called regardless of the time and day of the week is generated and updated. Optionally, several comprehensive phone number lists a can be generated and updated based on the time and day of the week. For example, Tables 8 and 9 below set forth exemplary comprehensive phone number lists $\alpha 1$ and $\alpha 2$ that respectively contain phone numbers a1, and $\alpha 2_l$ are called during the weekdays and weekend.

TABLE 8

Exemplary Probability Values for Comprehensive Weekday Phone Number List

| Number | Listed Weekday Phone Numbers ($\alpha 1_l$) | Probability Values ($p_l$) |
|---|---|---|
| 1 | 349-0292 | 0.223 |
| 2 | 349-0085 | 0.213 |
| 3 | 343-3985 | 0.168 |
| 4 | 343-2922 | 0.122 |
| 5 | 328-2302 | 0.111 |
| 6 | 928-3882 | 0.086 |
| 7 | 343-1098 | 0.073 |
| 8 | 328-4893 | 0.032 |
| . | . | . |
| . | . | . |
| . | . | . |
| 96 | 493-3832 | 0.011 |
| 97 | 383-303-3838 | 0.005 |
| 98 | 389-3898 | 0.005 |
| 99 | 272-3483 | 0.003 |
| 100 | 213-483-3343 | 0.001 |

TABLE 9

Exemplary Probability Values for Comprehensive Weekend Phone Number List

| Number | Listed Weekend Phone Numbers ($\alpha 2_l$) | Probability Values ($p_l$) |
|---|---|---|
| 1 | 343-3985 | 0.238 |
| 2 | 343-1098 | 0.194 |
| 3 | 949-482-2382 | 0.128 |
| 4 | 343-2922 | 0.103 |
| 5 | 483-4838 | 0.085 |
| 6 | 349-0292 | 0.073 |
| 7 | 349-4929 | 0.062 |
| 8 | 493-4893 | 0.047 |
| . | . | . |
| . | . | . |
| . | . | . |
| 96 | 202-3492 | 0.014 |
| 97 | 213-403-9232 | 0.006 |
| 98 | 389-3893 | 0.003 |
| 99 | 272-3483 | 0.002 |
| 100 | 389-3898 | 0.001 |

Notably, the top six locations of the exemplary comprehensive phone number lists $\alpha 1$ and $\alpha 2$ contain different phone numbers $\alpha 1_l$ and $\alpha 2_l$, presumably because certain phone numbers $\alpha 1_l$(e.g., 349-0085, 328-2302, and 928-3882) were mostly only called during the weekdays, and certain phone numbers $\alpha 2_l$ (e.g., 343-1098, 949-482-2382 and 483-4838) were mostly only called during the weekends. The top six locations of the exemplary comprehensive phone number lists $\alpha 1$ and $\alpha 2$ also contain common phone numbers $\alpha 1_l$ and $\alpha 2_l$, presumably because certain phone numbers $\alpha 1_l$ and $\alpha 2_l$ (e.g., 349-0292, 343-3985, and 343-2922) were called the weekdays and weekends. Notably, these common phone numbers $\alpha 1_l$ and $\alpha 2_l$ are differently ordered in the exemplary comprehensive phone number lists $\alpha 1$ and $\alpha 2$, presumably because the phone user's 1115 weekday and weekend calling patterns have differently influenced the ordering of these phone numbers. Although not shown, the comprehensive phone number lists $\alpha 1$ and $\alpha 2$ can be further subdivided, e.g., by day and evening.

When there are multiple comprehensive phone number lists a that are divided by day and/or time, the phone selection module 1225, outcome evaluation module 1230, probability update module 1220, and intuition module 1215 operate on the comprehensive phone number lists α based on the current day and/or time (as obtained by a clock or calendar stored and maintained by the control circuitry 1135). Specifically, the intuition module 1215 selects the particular comprehensive list α that will be operated on. For example, during a weekday, the intuition module 1215 will select the comprehensive phone number lists α1, and during the weekend, the intuition module 1215 will select the comprehensive phone number lists α2.

The phone selection module 1225 will maintain the ordering of all of the comprehensive phone number lists α, but will select the phone number subset $\alpha_s$ from the particular comprehensive phone number lists α selected by the intuition module 1215. For example, during a weekday, the phone selection module 1225 will select the favorite phone number list $\alpha_s$ from the comprehensive phone number list α1, and during the weekend, the phone selection module 1225 will select the favorite phone number list $\alpha_l$ from the comprehensive phone number list α2. Thus, it can be appreciated that the particular favorite phone number list 1120 displayed to the phone user 1115 will be customized to the current day, thereby increasing the chances that the next phone number $\lambda_x$ called by the phone user 1115 will be on the favorite phone number list 1120 for convenient selection by the phone user 1115.

The outcome evaluation module 1230 will determine if the currently called phone number $\lambda_x$ matches a phone number $\alpha_l$ contained on the comprehensive phone number list a selected by the intuition module 1215 and generate an outcome value β based thereon, and the intuition module 1215 will accordingly modify the phone number probability distribution p corresponding to the selected comprehensive phone number list α. For example, during a weekday, the outcome evaluation module 1230 determines if the currently called phone number $\lambda_x$ matches a phone number $\alpha_l$ contained on the comprehensive phone number list α1, and the intuition module 1215 will then modify the phone number probability distribution p corresponding to the comprehensive phone number list α1. During a weekend, the outcome evaluation module 1230 determines if the currently called phone number $\lambda_x$ matches a phone number $\alpha_l$ contained on the comprehensive phone number list α2, and the intuition module 1215 will then modify the phone number probability distribution p corresponding to the comprehensive phone number list α2.

In the illustrated embodiment, the outcome evaluation module 1230, probability update module 1220, and intuition module 1215 only operate on the comprehensive phone number list α and were not concerned with the favorite phone number list $\alpha_s$. It was merely assumed that a phone number $\alpha_l$ corresponding to a frequently and recently called phone number $\alpha_l$ that was not currently in the selected phone number subset $\alpha_s$ would eventually work its way into the favorite phone number list 1120, and a phone number $\alpha_l$ corresponding to a seldom called phone number $\alpha_i$ that was currently in the selected phone number subset $\alpha_l$ would eventually work its way off of the favorite phone number list 1120.

Optionally, the outcome evaluation module 1230, probability update module 1220, and intuition module 1215 can be configured to provide further control over this process to increase the chances that the next called phone number $\lambda_x$ will match a phone number $\alpha_l$ in the selected phone number list $\alpha_s$ for display to the user 1115 as the favorite phone number list 1120.

For example, the outcome evaluation module 1230 may generate an outcome value β equal to "1" if the currently called phone number $\lambda_x$ matches a phone number $\alpha_l$ in the previously selected phone number subset $\alpha_s$, "0" if the currently called phone number $\lambda_x$ does not match a phone number $\alpha_l$ on the comprehensive phone number list α, and "2" if the currently called phone number $\lambda_x$ matches a phone number $\alpha_l$ on the comprehensive phone number list α, but not in the previously selected phone number subset $\alpha_s$. If the outcome value is "0" or "1", the intuition module 1215 will direct the probability update module 1220 as previously described. If the outcome value is "2", however, the intuition module 1215 will not direct the probability update module 1220 to update the phone number probability distribution p using a learning methodology, but instead will assign a probability value $p_l$ to the listed phone number $\alpha_l$. For example, the assigned probability value $p_l$ may be higher than that corresponding to the last phone number $\alpha_l$ in the selected phone number subset $\alpha_s$, in effect, replacing that last phone number $\alpha_l$ with the listed phone number $\alpha_l$ corresponding to the currently called phone number $\lambda_x$. The outcome evaluation module 1230 may generate an outcome value equal to other values, e.g., "3" if the a phone number $\lambda_x$ corresponding to a phone number $\alpha_l$ not in the selected phone number subset $\alpha_s$ has been called a certain number of times within a defined period, e.g., 3 times in one day or 24 hours. In this case, the intuition module 1215 may direct the probability update module 1220 to assign a probability value $p_l$ to the listed phone number $\alpha_l$, perhaps placing the corresponding phone number $\alpha_l$ on the favorite phone number list $\alpha_s$.

As another example to provide better control over the learning process, the phone number probability distribution p can be subdivided into two sub-distributions $p_1$ and $P_2$, with the first sub-distribution $p_1$ corresponding to the selected phone number subset $\alpha_s$, and the second sub-distribution $p_2$ corresponding to the remaining phone numbers $\alpha_l$ on the comprehensive phone number list α. In this manner, the first and second sub-distributions $p_1$ and $p_2$ will not affect each other, thereby preventing the relatively high probability values $p_l$ corresponding to the favorite phone number list $\alpha_s$ from overwhelming the remaining probability values $p_l$, which might otherwise slow the learning of the automaton. Thus, each of the first and second sub-distributions $p_1$ and $p_2$ are independently updated with the same or even different learning methodologies. Modification of the probability update module 1220 can be accomplished by the intuition module 1215 in the foregoing manners.

The intuition module 1215 may also prevent any one probability value $p_l$ from overwhelming the remaining probability values $p_l$ by limiting it to a particular value, e.g., 0.5. In this sense, the learning module 1210 will not converge to any particular probability value $p_l$, which is not the objective of the mobile phone 1100. That is, the objective is not to find a single favorite phone number, but rather a list of favorite phone numbers that dynamically changes with the phone user's 1115 changing calling patterns. Convergence to a single probability value $p_l$ would defeat this objective.

So far, it has been explained that the listing program 1200 uses the instantaneous outcome value β as a performance index φ in measuring its performance in relation to its objective of maintaining favorite phone number list 1120 to contain future called telephone numbers. It should be appreciated, however, that the performance of the listing program 1200 can also be based on a cumulative performance index φ. For example, the listing program 1200 can keep track of a percentage of the called phone numbers $\alpha_l$ that match phone numbers $\alpha_l$ in the selected phone number subset $\alpha_s$ or a consecutive number of called phone numbers $\lambda_x$ that do not match phone numbers $\alpha_l$ not found in the selected phone number subset $\alpha_s$, based on the outcome value β, e.g., whether the outcome value β equals "2." Based on this cumulative performance index $\phi$, the intuition module 1215 can modify the learning speed or nature of the learning module 1210.

It has also been described that the phone user 1115 actions encompass phone numbers $\lambda_x$ from phone calls made by the mobile phone 1100 (i.e., outgoing phone calls) that are used to generate the outcome values $\beta$. Alternatively or optionally, the phone user 1115 actions can also encompass other information to improve the performance of the listing program 1200. For example, the phone user 1115 actions can include actual selection of the called phone numbers $\lambda_x$ from the favorite phone number list $\alpha_s$. With this information, the intuition module 1215 can, e.g., remove phone numbers $\alpha_l$ that have not been selected by the phone user 1115, but are nonetheless on the favorite phone number list 1120. Presumably, in these cases, the phone user 1115 prefers to dial this particular phone number $\lambda_x$ using the number keys 1145 and feels he or she does not need to select it, e.g., if the phone number is well known to the phone user 1115. Thus, the corresponding listed phone number $\alpha_l$ will be replaced on the favorite phone number list $\alpha_s$ with another phone number $\alpha_l$.

As another example, the phone user 1115 actions can include phone numbers from phone calls received by the mobile phone 1100 (i.e., incoming phone calls), which presumably correlate with the phone user's 1115 calling patterns to the extent that the phone number that is received represents a phone number that will likely be called in the future. In this case, the listing program 1200 may treat the received phone number similar to the manner in which it treats a called phone number $\lambda_x$, e.g., the outcome evaluation module 1230 determines whether the received phone number is found on the comprehensive phone number list $\alpha$ and/or the selected phone number subset $\alpha_s$, and the intuition module 1215 accordingly modifies the phone number probability distribution p based on this determination. Alternatively, a separate comprehensive phone number list can be maintained for the received phone numbers, so that a separate favorite phone number list associated with received phone numbers can be displayed to the user.

As still another example, the outcome value $\beta$ can be time-based in that the cumulative time of a specific phone call (either incoming or outgoing) can be measured to determine the quality of the phone call, assuming that the importance of a phone call is proportional to its length. If the case of a relatively lengthy phone call, the intuition module 1215 can assign a probability value (if not found on the comprehensive phone number list $\alpha$) or increase the probability value (if found on the comprehensive phone number list $\alpha$) of the corresponding phone number higher than would otherwise be assigned or increased. In contrast, in the case of a relatively short phone call, the intuition module 1215 can assign a probability value (if not found on the comprehensive phone number list $\alpha$) or increase the probability value (if found on the comprehensive phone number list $\alpha$) of the corresponding phone number lower than would otherwise be assigned or increased. When measuring the quality of the phone call, the processing can be performed after the phone call is terminated.

Figure 20:
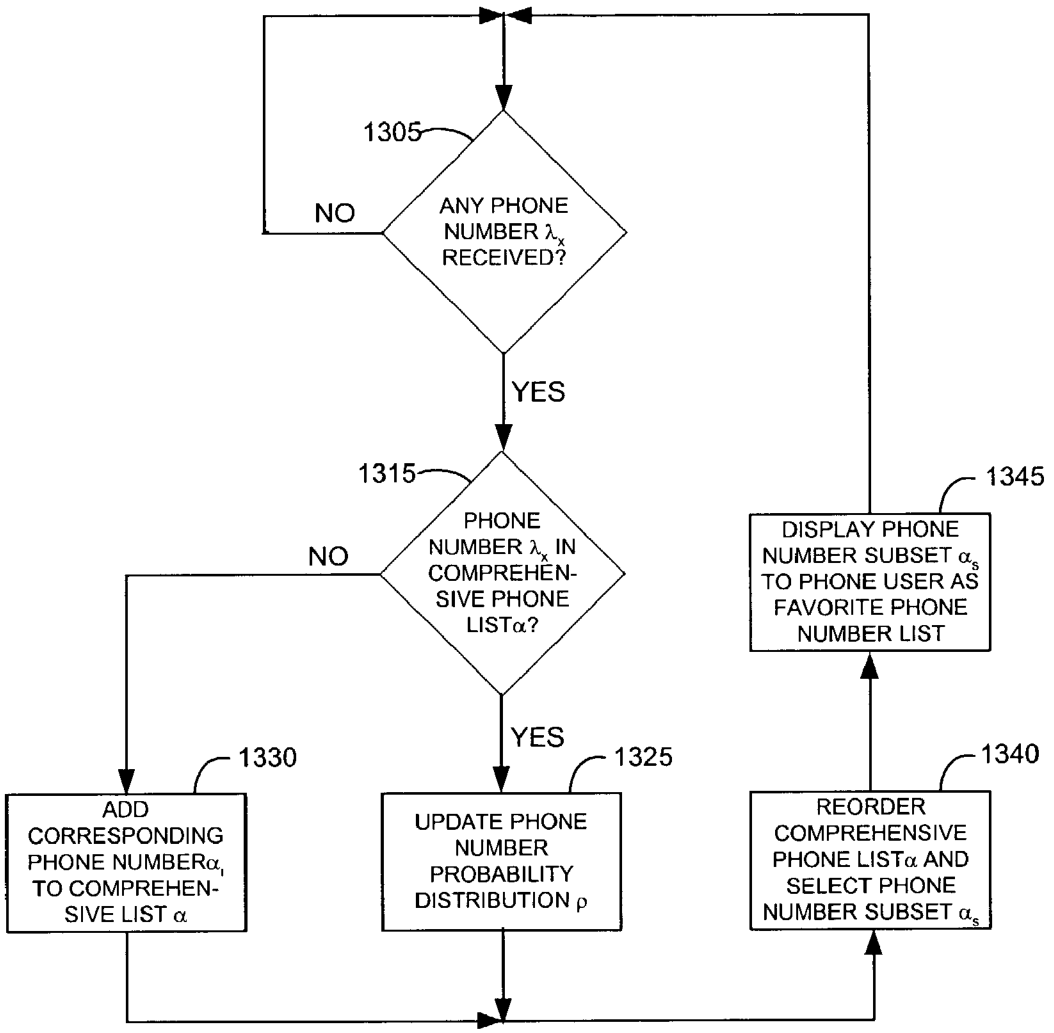
FIG. 20 is a flow diagram illustrating a preferred method performed by the priority listing program of FIG. 19.

Having now described the structure of the listing program 1200, the steps performed by the listing program 1200 will be described with reference to FIG. 20. In this process, the intuition module 1215 does not distinguish between phone numbers $\alpha_l$ that are listed in the phone number subset $\alpha_s$ and those that are found on the remainder of the comprehensive phone number list a.

First, the outcome evaluation module 1230 determines whether a phone number $\lambda_x$ has been called (step 1305). Alternatively or optionally, the evaluation module 1230 may also determine whether a phone number $\lambda_x$ has been received. If a phone number $\lambda_x$ has not been received, the program 1200 goes back to step 1305. If a phone number $\lambda_x$ has been called and/or received, the outcome evaluation module 1230 determines whether it is on the comprehensive phone number list $\alpha$ and generates an outcome value $\lambda$ in response thereto (step 1315). If so ($\beta$=1), the intuition module 1215 directs the probability update module 1220 to update the phone number probability distribution p using a learning methodology to increase the probability value $p_{iix}$ corresponding to the listed phone number $\alpha_l$ (step 1325). If not ($\beta$=0), the intuition module 1215 generates a corresponding phone number $\alpha_l$ and assigns a probability value $p_l$ to it, in effect, adding it to the comprehensive phone number list $\alpha$ (step 1330).

The phone number selection module 1225 then reorders the comprehensive phone number list $\alpha_l$ and selects the phone number subset $\alpha_l$ therefrom, and in this case, the listed phone numbers $\alpha_l$ with the highest probability values $p_l$ (e.g., the top six) (step 1340). The phone number subset $\alpha_l$ is then displayed to the phone user 1115 as the favorite phone number list 1120 (step 1345). The listing program 1200 then returns to step 1305, where it is determined again if phone number $\lambda_x$ has been called and/or received.

Figure 21:
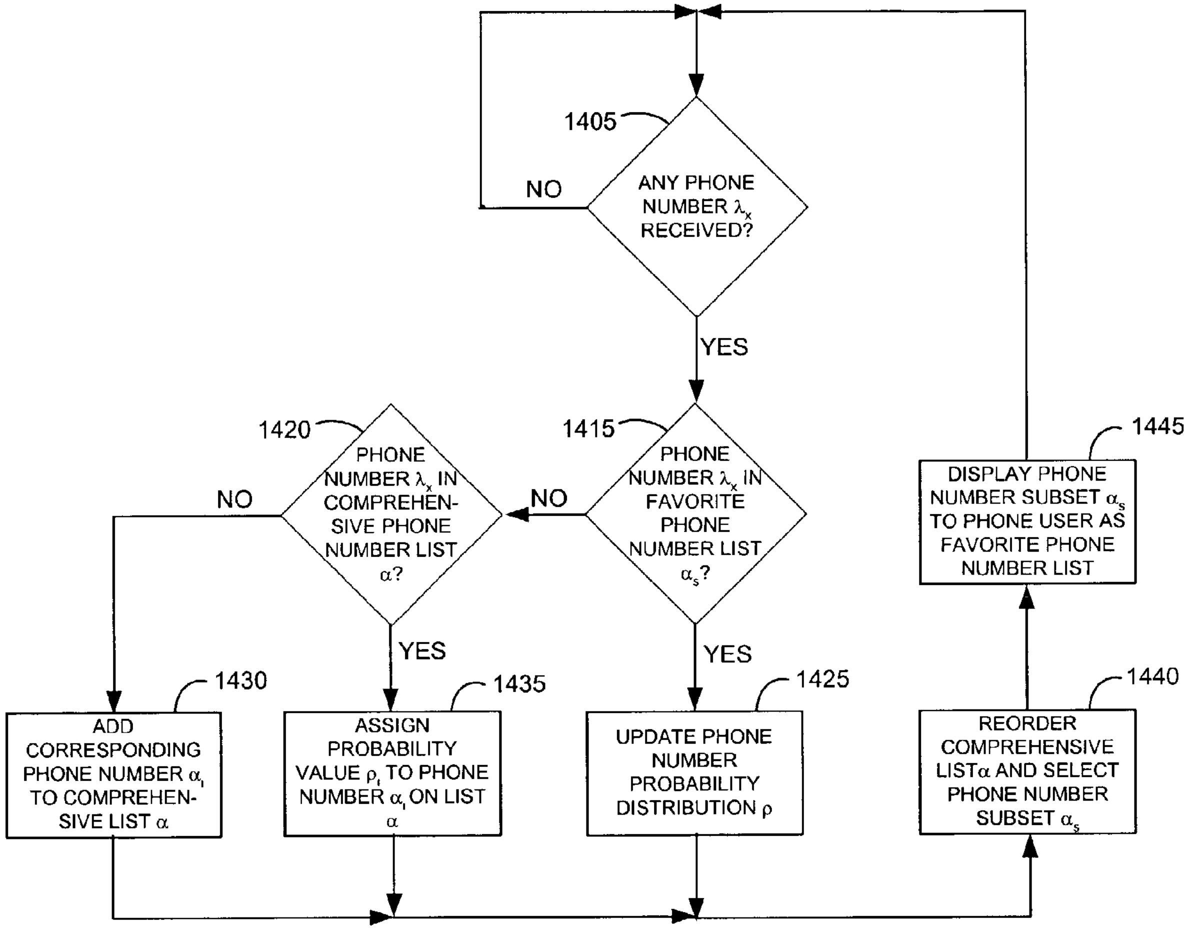
FIG. 21 is a flow diagram illustrating an alternative preferred method performed by the priority listing program of FIG. 19.

Referring to FIG. 21, the operation of the listing program 1200 will be described, wherein the intuition module 1215 does distinguish between phone numbers $\alpha_l$ that are listed in the phone number subset $\alpha_l$ and those that are found on the remainder of the comprehensive phone number list $\alpha$.

First, the outcome evaluation module 1230 determines whether a phone number $\lambda_x$ has been called and/or received (step 1405). If a phone number $\lambda_x$ has been called and/or received, the outcome evaluation module 1230 determines whether it matches a phone number $\alpha_l$ in either of the phone number subset $\alpha_s$ (in effect, the favorite phone number list 1120) or the comprehensive phone number list $\alpha$ and generates an outcome value $\beta$ in response thereto (steps 1415 and 1420). If the phone number $\lambda_x$, matches a phone number $\alpha_l$ on the favorite phone number list $\alpha_s$ ($\beta$=1), the intuition module 1215 directs the probability update module 1220 to update the phone number probability distribution p (or phone number probability sub-distributions p1 and p2) using a learning methodology to increase the probability value $p_l$ corresponding to the listed phone number $\alpha_l$ (step 1425). If the called phone number $\lambda_x$ does not match a phone number $\alpha_l$ on the comprehensive phone number list ($\beta$=0), the intuition module 1215 generates a corresponding phone number $\alpha_l$ and assigns a probability value $p_l$ to it, in effect, adding it to the comprehensive phone number list $\alpha$ (step 1430). If the called phone number $\lambda_x$ does not match a phone number $\alpha_l$ on the favorite phone number list $\alpha_s$, but matches one on the comprehensive phone number list $\alpha$ ($\beta$=2), the intuition module 1215 assigns a probability value $p_l$ to the already listed phone number $\alpha_l$ to, e.g., place the listed phone number $\alpha_l$ within or near the favorite phone number list $\alpha_s$ (step 1435).

The phone number selection module 1225 then reorders the comprehensive phone number list $\alpha$, and selects the phone number subset $\alpha_s$ therefrom, and in this case, the listed phone numbers $\alpha_l$ with the highest probability values $p_l$ (e.g., the top six) (step 1440). The phone number subset $\alpha_s$ is then displayed to the phone user 1115 as the favorite phone number list 1120 (step 1445). The listing program 1200 then returns to step 1405, where it is determined again if phone number $\lambda_x$ has been called and/or received.

Figure 22:
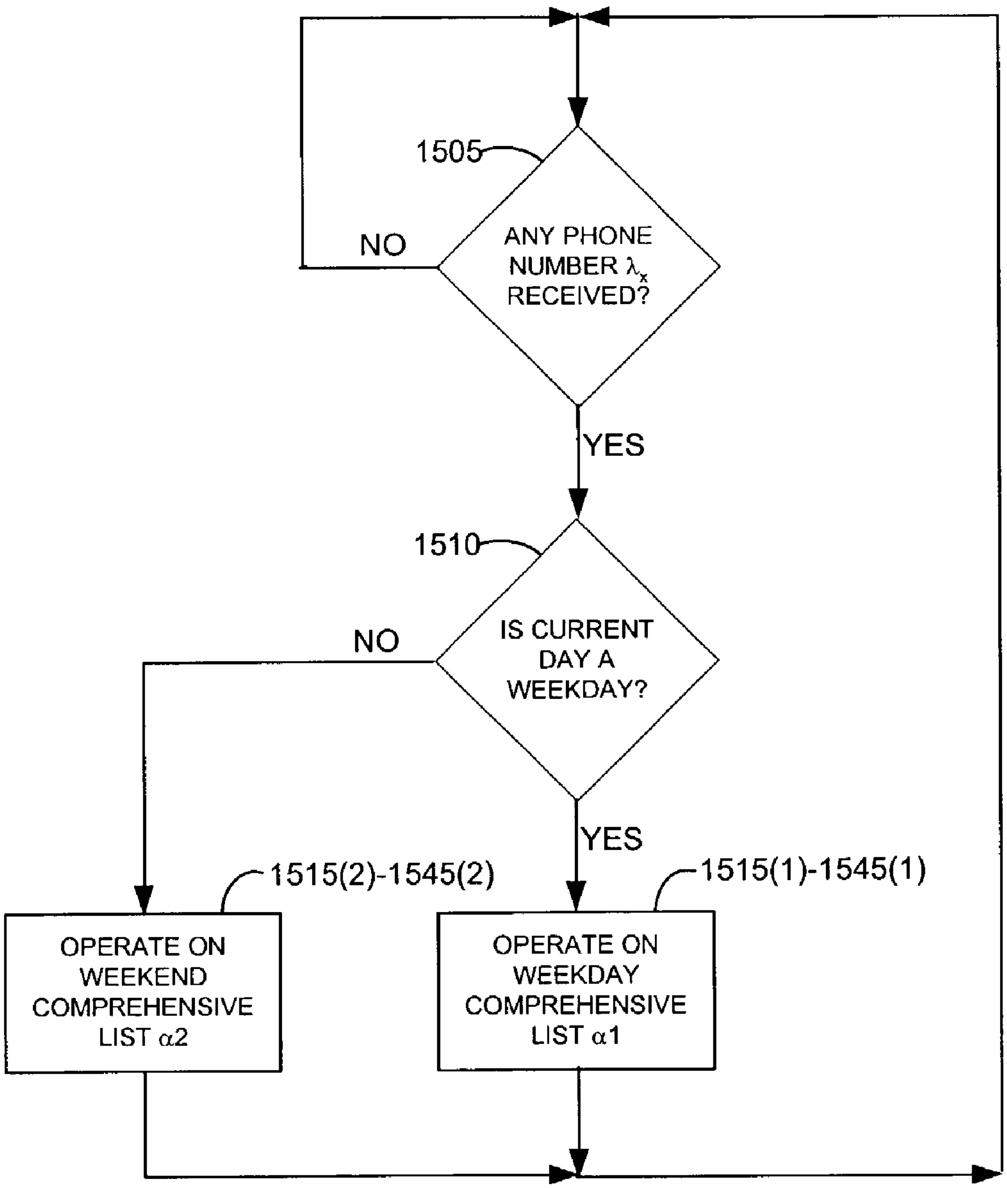
FIG. 22 is a flow diagram illustrating still another preferred method performed by the priority listing program of FIG. 19.

Referring to FIG. 22, the operation of the listing program 1200 will be described, wherein the intuition module 1215 distinguishes between weekday and weekend phone calls.

First, the outcome evaluation module 1230 determines whether a phone number $\lambda_x$ has been called (step 1505). Alternatively or optionally, the evaluation module 1230 may also determine whether a phone number $\lambda_x$ has been received. If a phone number $\lambda_x$ has not been received, the program 1200 goes back to step 1505. If a phone number $\lambda_x$ has been called and/or received, the intuition module 1215 determines whether the current day is a weekend day or a weekend (step 1510). If the current day is a weekday, the weekday comprehensive phone list $\alpha 1$ is operated on in steps 1515(1)-1545(1) in a similar manner as the comprehensive phone list $\alpha$ is operated on in steps 1415-1440 in FIG. 21. In this manner, a favorite phone number list 1120 customized to weekday calling patterns is displayed to the phone user 1115. If the current day is a weekend day, the weekend comprehensive phone list $\alpha 2$ is operated on in steps 1515(2)-1545(2) in a similar manner as the comprehensive phone list $\alpha$ is operated on in steps 1415-1440 in FIG. 21. In this manner, a favorite phone number list 1120 customized to weekend calling patterns is displayed to the phone user 11 15. Optionally, rather than automatically customizing the favorite phone number list 1120 to the weekday or weekend for display to the phone user 1115, the phone user 1115 can select which customized favorite phone number list 1120 will be displayed. The listing program 1200 then returns to step 1505, where it is determined again if phone number $\lambda_x$ has been called and/or received.

More specific details on the above-described operation of the mobile phone 1100 can be found in the Computer Program Listing Appendix attached hereto and previously incorporated herein by reference. It is noted that the file "Intuition Intelligence-mobilephone-outgoing.doc" generates a favorite phone number list only for outgoing phone calls, that is, phone calls made by the mobile phone. It does not distinguish between the favorite phone number list and the remaining phone numbers on the comprehensive list when generating outcome values, but does distinguish between weekday phone calls and weekend phone calls. The file "Intuition Intelligence-mobilephone-incoming.doc" generates a favorite phone number list only for incoming phone calls; that is, phone calls received by the mobile phone. It does not distinguish between the favorite phone number list and the remaining phone numbers on the comprehensive list when generating outcome values, and does not distinguish between weekday phone calls and weekend phone calls.

It should be noted that the files "Intuition Intelligence-mobilephone-outgoing.doc" and "Intuition Intelligence-mobilephone-incoming.doc" simulation programs were designed to emulate real-world scenarios and to demonstrate the learning capability of the priority listing program. To this end, the software simulation is performed on a personal computer with Linux Operating System Mandrake Version 8.2. This operating system was selected because the MySQL database, PHP and Apache Web Server are natively built in. The MySQL database acts as a repository and stores the call logs and tables utilized in the programs. The MySQL database is a very fast, multi-user relational database management system that is used for storing and retrieving information. The PHP is a cross-platform, Hyper Text Markup Language (HTML)-embedded, server-side, web scripting language to provide and process dynamic content. The Apache Web Server is a public-domain web server that receives a request, processes a request, and sends the response back to the requesting entity. Because a phone simulator was not immediately available, the phone call simulation was performed using a PyWeb Deckit Wireless Application Protocol (WAP) simulator, which is a front-end tool/browser that emulates the mobile phone, and is used to display wireless language content debug the code. It is basically a browser for handheld devices. The Deckit transcoding technology is built-in to allow one to test and design the WAP site offline. The transcoding is processed locally on the personal computer.

Single-User Television Channel Listing Program

Figure 23:
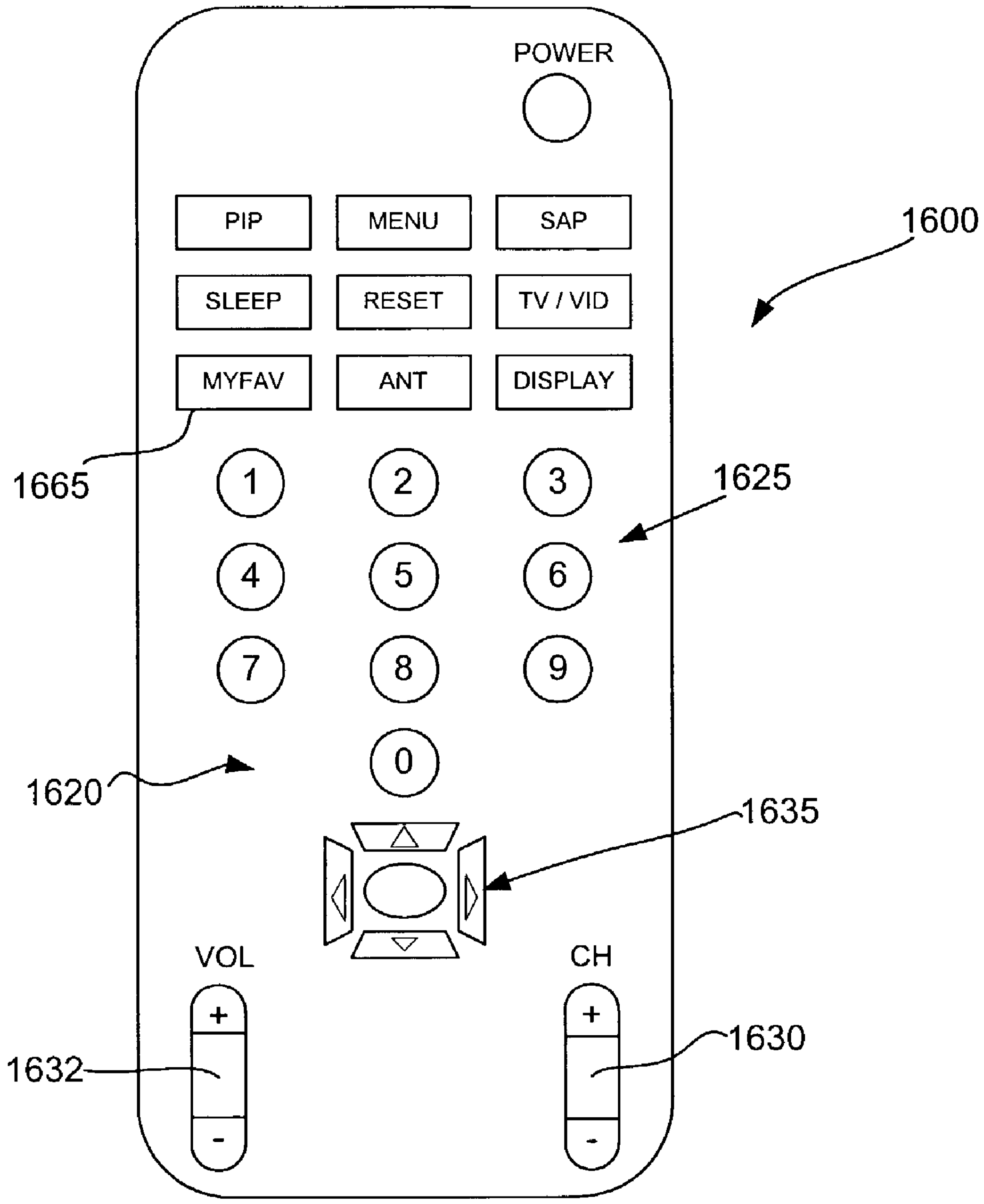
FIG. 23 is a plan view of a television remote control unit to which the generalized program of FIG. 1 can be applied.
Figure 24:
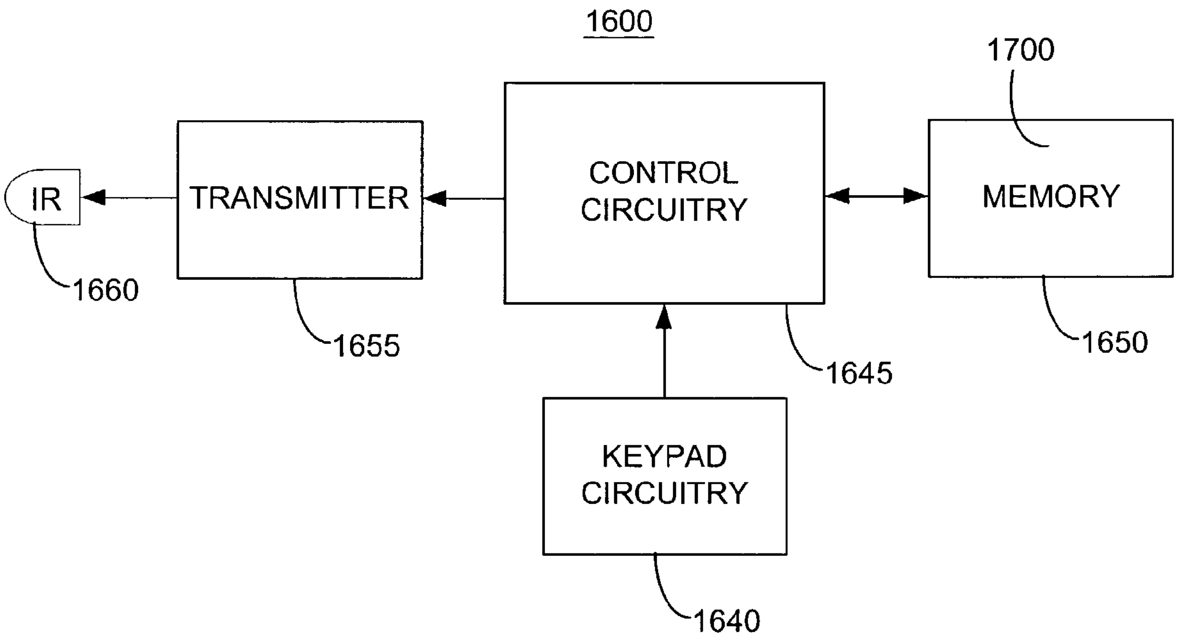
FIG. 24 is a block diagram illustrating the components of the remote control of FIG. 23.

The afore-described listing programs can be used for other applications besides prioritizing and anticipating watched television channels on a telephone. For example, referring to FIG. 23, a priority listing program 1700 (shown in FIG. 25) developed in accordance with the present inventions is described in the context of a television remote control 1600. The remote control 1600 comprises a keypad 1620 through which a remote control user 1615 (shown in FIG. 25) can remotely control a television (not shown), and which contains standard keys, such as number keys 1625, a channel up and down key 1630, a volume up and down key 1632, a scroll/selection keys 1635, and various other function keys. Referring further to FIG. 24, the remote control 1600 further includes keypad circuitry 1640, control circuitry 1645, memory 1650, a transmitter 1655, and an infrared (IR) emitter (or alternatively a light emitting diode (LED)) 1660. The keypad circuitry 1640 decodes the signals from the keypad 1620, as entered by the remote control user 1615, and supplies them to the control circuitry 1645. The control circuitry 1645 then provides the decoded signals to the transmitter 1655, which wirelessly transmits the signals to the television through the IR emitter 1660. The memory 1650 stores programs that are executed by the control circuitry 1645 for basic functioning of the remote control 1600. In many respects, these elements are standard in the industry, and therefore their general structure and operation will not be discussed in detail for purposes of brevity.

In addition to the standard features that typical remote controls have, however, the keypad 1620 contains a favorite channel key 1665 referred to as a "MYFAV" key. Much like the channel up or down keys 1630, operation of the favorite channel key 1665 immediately tunes (or switches) the television from the current television channel to the next television channel. Repetitive operation of the favorite channel key 1665 will switch the television from this new current television channel to the next one, and so on. Unlike the channel up or down keys 1630, however, the next television channel will not necessarily be the channel immediately above or below the current channel, but will tend to be one of the favorite television channels of the remote control user 1615.

It should be noted that rather than immediately and automatically switching television channels to a favorite television channel, operation of the favorite channel key 1665 can cause favorite television channel lists to be displayed on the television, similar to the previously described favorite phone number lists that were displayed on the mobile phone 1100. These lists will contain television channels that correspond to the remote control user 1615 favorite television channels, as determined by the remote control 1600. Once displayed on the television, the user can use the scroll/selection key 1635 on the keypad 1620 to select a desired channel from the favorite television channel list.

In any event, the priority listing program 1700, which is stored in the memory 1650 and executed by the control circuitry 1645, dynamically updates a comprehensive television channel list (described in further detail below) from which the next television channel will be selected. Preferably, the first channel on the comprehensive television channel list will be selected, then the second channel, then the third channel, and so on. The program 1700 updates the comprehensive television channel list based on the user's 1615 television watching pattern. For example, the program 1700 may maintain the comprehensive television channel list based on the number of times a television channel has been watched and the recent activity of the television channel, such that the comprehensive television channel list will likely contain a television channel that the remote control user 1615 is anticipated to watch at any given time. For example, if channels 2, 4, 6, and 7 have recently been watched numerous times, the program 1700 will tend to maintain these channels at the top of the comprehensive television channel list, so that they will be selected when the remote control user 1615 operates the favorite television channel key 1665.

To further improve the accuracy of anticipating the next channel that will be watched by the remote control user 1615, the program 1700 may optionally maintain several comprehensive television channel lists based on temporal information, such as, e.g., the day of the week (weekend or weekday) and/or time of day (day or evening). For example, a user 1615 may tend to watch a specific set of channels (e.g., 2, 4, and 8) between 8 pm and 10 pm on weekdays, and other set of channels (2, 5, and 11) between 3 pm and 6 pm on weekends. Or a user 1615 may tend to watch news programs between 10 pm and 12 pm on weekdays, and cartoons between 10 am and 12 pm on weekends. Thus, to further refine the process, the comprehensive television channel list can be divided into sublists that are selected and applied based on the current day of the week and/or time of the day.

To ensure that television channels that are quickly switched are not registered as being watched, the program 1700 only assumes that a program is watched if the remote control user 1615 has continuously watched the television channel for more than a specified period of time (e.g., five minutes). Thus, a television channel will only affect the comprehensive television channel list if this period of time is exceeded. This period of time can be fixed for all lengths of television programs, or optionally, can be based on the length of the television program (e.g., the longer the television program, the longer the time period). Optionally, programming information contained in a device, such as, e.g., a set top box or a video cassette recorder, can be used to determine if a television program is actually watched or not.

It should also be noted that although only a single user is illustrated, multiple users can obviously use the remote control 1600. In this case, usage of the remote control 1600 by multiple users will be transparent to the program 1700, which will maintain the comprehensive television channel list as if a single user was always using the remote control 1600. As will be described in further detail below, the program can be modified to maintain a television channel list for each of the users 1615, so that the television channel patterns of one user do not dilute or interfere with the television channel patterns of another user. In this manner, the comprehensive television channel list can be customized to the particular user that is currently operating the remote control 1600.

As will be described in further detail below, the listing program 1700 uses the existence or non-existence of a watched television channel on a comprehensive television channel list as a performance index $\phi$ in measuring its performance in relation to its objective of ensuring that the comprehensive channel list will include the future watched television channel, so that the remote control user 1615 is not required to "surf" through all of the television channels or manually punch in the television channel using the number keys. In this regard, it can be said that the performance index $\phi$ is instantaneous. Alternatively or optionally, the listing program 1700 can also use the location of the television channel on the comprehensive channel list as a performance index $\phi$.

Figure 25:
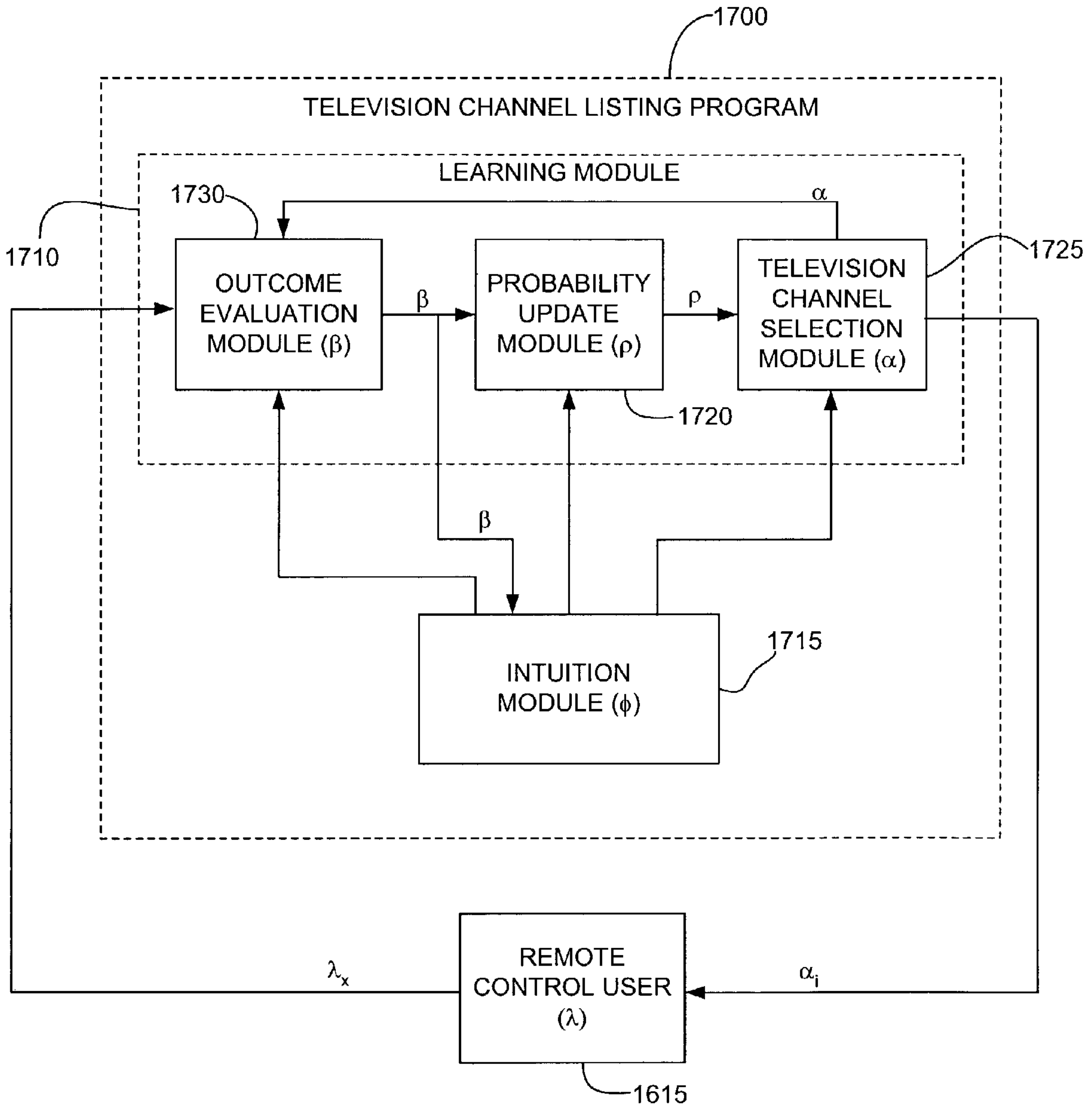
FIG. 25 is a block diagram of a priority listing program employed in the remote control of FIG. 23.

Referring now to FIG. 25, the listing program 1700 includes a probabilistic learning module 1710 and an intuition module 1715, which are specifically tailored for the remote control 1600. The probabilistic learning module 1710 comprises a probability update module 1720, a television channel selection module 1725, and an outcome evaluation module 1730. Specifically, the probability update module 1720 is mainly responsible for learning the remote control user's 1615 television watching habits and updating the previously described comprehensive television channel list $\alpha$ that places television channels in the order that they are likely to be watched in the future during any given time period. The outcome evaluation module 1730 is responsible for evaluating the comprehensive channel list $\alpha$ relative to current television channels $\lambda_x$, watched by the remote control user 1615. The channel selection module 1725 is mainly responsible for selecting a television channel from the comprehensive channel list $\alpha$ upon operation of the favorite television channel key 1665. Preferably, this is accomplished by selecting the channel at the top of the comprehensive channel list $\alpha$, then the second channel, third channel, and so on, as the favorite television channel key 1665 is repeatedly operated. The intuition module 1715 is responsible for directing the learning of the listing program 1700 towards the objective of selecting the television channel that is likely to be the remote control user's 1615 next watched television channel. In this case, the intuition module 1715 operates on the probability update module 1720, the details of which will be described in further detail below.

To this end, the channel selection module 1725 is configured to receive a television channel probability distribution p from the probability update module 1720, which is similar to equation [1] and can be represented by the following equation:

$$p(k)=[p_1(k),p_2(k),p_3(k)\ldots p_n(k)],$$

where $p_i$ is the probability value assigned to a specific television channel $\alpha_i$; n is the number of television channels $\alpha_i$ on the comprehensive channel list $\alpha$, and k is the incremental time at which the television channel probability distribution was updated.

Based on the television channel probability distribution p, the channel selection module 1725 generates the comprehensive channel list $\alpha$, which contains the listed television channels $\alpha_i$ ordered in accordance with their associated probability values $p_i$. For example, the first listed television channel $\alpha_i$ will be associated with the highest probability value $p_i$, while the last listed television channel $\alpha_i$ will be associated with the lowest probability value $p_i$. Thus, the comprehensive channel list $\alpha$ contains all television channels ever watched by the remote control user 1615 and is unlimited. Optionally, the comprehensive channel list $\alpha$ can contain a limited amount of television channels $\alpha_i$, e.g., 10, so that the memory 1650 is not overwhelmed by seldom watched television channels, which may eventually drop off of the comprehensive channel list $\alpha$.

It should be noted that a comprehensive television channel list $\alpha$ need not be separate from the television channel probability distribution p, but rather the television channel probability distribution p can be used as the comprehensive channel list $\alpha$ to the extent that it contains a comprehensive list of television channels $\alpha_i$ matching all of the watched television channels $\lambda_x$. However, it is conceptually easier to explain the aspects of the listing program 1700 in the context of a comprehensive television channel list that is ordered in accordance with the corresponding probability values $p_i$, rather than in accordance with the order in which they are listed in the television channel probability distribution p.

From the comprehensive channel list $\alpha$, the channel selection module 1725 selects the television channel $\alpha_i$ that the television will be switched to. In the preferred embodiment, the selected television channel $\alpha_i$ will be that which corresponds to the highest probability value $p_i$, i.e., the top television channel $\alpha_i$ on the comprehensive channel list $\alpha$. The channel selection module 1725 will then select the next television channel $\alpha_i$ that the television will be switched to, which preferably corresponds to the next highest probability value $p_i$, i.e., the second television channel $\alpha_i$ on the comprehensive channel list $\alpha$, and so on. As will be described in further detail below, this selection process can be facilitated by using a channel list pointer, which is incremented after each channel is selected, and reset to "1" (so that it points to the top channel) after a television channel has been deemed to be watched or after the last channel on the comprehensive channel list $\alpha$ has been reached.

As an example, consider Table 10, which sets forth in exemplary comprehensive television channel list $\alpha$ with associated probability values $p_i$.

TABLE 10

Exemplary Probability Values for Comprehensive Television Channel List

| Number | Listed Television Channels ($\alpha_1$) | Probability Values ($p_1$) |
|---|---|---|
| 1 | 2 | 0.286 |
| 2 | 11 | 0.254 |
| 3 | 4 | 0.142 |
| 4 | 26 | 0.114 |
| 5 | 35 | 0.097 |
| 6 | 9 | 0.054 |
| 7 | 48 | 0.033 |
| 8 | 76 | 0.012 |
| 9 | 5 | 0.008 |
| 10 | 15 | 0.003 |

In this exemplary case, channel 2, then channel 11, then channel 4, and so on, will be selected as the television channels to which the television will be sequentially switched. Optionally, these channels can selected as a favorite television channel list to be displayed on the television, since they are associated with the top three probability values $p_i$.

The outcome evaluation module 1730 is configured to receive a watched television channel $\lambda_x$ from the remote control user 1615 via the keypad 1620 of the remote control 1600. For example, the remote control user 1615 can switch the television to the television channel $\lambda_x$ using the number keys 1625 or channel-up or channel-down keys 1630 on the keypad 1620, operating the favorite channel key 1665 on the keypad 1620, or through any other means, including voice activation. In this embodiment, the television channel $\lambda_x$ can be selected from a complete set of television channels $\lambda$, i.e., all valid television channels that can be watched on the television. As previously discussed, the switched television channel will be considered to be a watched television channel only after a certain period of time has elapsed while the television is on that television channel. The outcome evaluation module 1730 is further configured to determine and output an outcome value $\beta$ that indicates if the currently watched television channel $\lambda_x$ matches a television channel $\alpha_i$ on the comprehensive channel list $\alpha$. In the illustrated embodiment, the outcome value $\beta$ equals one of two predetermined values: "1" if the currently watched television channel $\lambda_x$ matches a television channel $\alpha_i$ on the comprehensive channel list $\alpha$, and "0" if the currently watched television channel $\lambda_x$ does not match a television channel $\alpha_i$ on the comprehensive channel list $\alpha$.

It can be appreciated that unlike in the duck game 300 where the outcome value $\beta$ is partially based on the selected game move $\alpha_i$, the outcome value $\beta$ is technically not based on the listed television channel $\alpha_i$ selected by the channel selection module 1725, but rather whether a watched television channel $\lambda_x$ matches a television channel $\alpha_i$ on the comprehensive channel list $\alpha$ irrespective of whether it is the selected television channel. It should be noted, however, that the outcome value $\beta$ can optionally or alternatively be partially based on a selected television channel.

The intuition module 1715 is configured to receive the outcome value $\beta$ from the outcome evaluation module 1730 and modify the probability update module 1720, and specifically, the television channel probability distribution p, based thereon. Specifically, if the outcome value $\beta$ equals "0," indicating that the currently watched television channel $\lambda_x$ does not match a television channel $\alpha_i$ on the comprehensive channel list $\alpha$, the intuition module 1715 adds the watched television channel $\lambda_x$ to the comprehensive channel list $\alpha$ as a listed television channel $\alpha_i$.

The television channel $\alpha_i$ can be added to the comprehensive channel list $\alpha$ in a variety of ways, including in the manner used by the program 1700 to add a telephone number in the mobile phone 1100. Specifically, the location of the added television channel $\alpha_i$ on the comprehensive channel list $\alpha$ depends on the probability value $p_i$ assigned or some function of the probability value $p_i$ assigned.

For example, in the case where the number of television channels $\alpha_i$ is not limited, or the number of television channels $\alpha_i$ has not reached its limit, the television channel $\alpha_i$ may be added by assigning a probability value $p_i$ to it and renormalizing the television channel probability distribution p in accordance with the following equations:

$$p_i(k+1)=f(x); \quad [27]$$

$$p_j(k+1)=p_j(k)(1-f(x)); \; j\neq i \quad [28]$$

where i is the added index corresponding to the newly added television channel $\alpha_i$, $p_i$ is the probability value corresponding to television channel $\alpha_i$ added to the comprehensive channel list $\alpha$, f(x) is the probability value $p_i$ assigned to the newly added television channel $\alpha_i$, $p_j$ is each probability value corresponding to the remaining television channels $\alpha_j$ on the comprehensive channel list $\alpha$, and k is the incremental time at which the television channel probability distribution was updated.

In the illustrated embodiment, the probability value $p_i$ assigned to the added television channel $\alpha_i$ is simply the inverse of the number of television channels $\alpha_i$ on the comprehensive channel list $\alpha$, and thus f(x) equals 1/(n+1), where n is the number of television channels on the comprehensive channel list $\alpha$ prior to adding the television channel $\alpha_i$. Thus, equations [27] and [28] break down to:

$$p_i(k+1)=\frac{1}{n+1}; \quad [27\text{-}1]$$

$$p_j(k+1)=p_j(k)\frac{n}{n+1}; \; j\neq i \quad [28\text{-}1]$$

In the case where the number of television channels $\alpha_i$ is limited and has reached its limit, the television channel $\alpha$ with the lowest corresponding priority value $p_i$ is replaced with the newly watched television channel $\lambda_x$ by assigning a probability value $p_i$ to it and renormalizing the television channel probability distribution p in accordance with the following equations:

$$p_i(k+1)=f(x); \quad [29]$$

$$p_j(k+1)=\frac{p_j(k)}{\sum_{j\neq i}^{n} p_j(k)}(1-f(x));\ j\neq i \quad [30]$$

where i is the index used by the removed television channel $\alpha_l$, $p_l$ is the probability value corresponding to television channel $\alpha_l$ added to the comprehensive channel list $\alpha$,f (x) is the probability value $p_m$ assigned to the newly added television channel $\alpha$, f(x) is each probability value corresponding to the remaining television channels $\alpha_j$ on the comprehensive channel list $\alpha$, and k is the incremental time at which the television channel probability distribution was updated.

As previously stated, in the illustrated embodiment, the probability value $p_l$ assigned to the added television channel $\alpha_l$ is simply the inverse of the number of television channels $\alpha_l$ on the comprehensive channel list $\alpha$, and thus f(x) equals 1/n, where n is the number of television channels on the comprehensive channel list $\alpha$. Thus, equations [35] and [36] break down to:

$$p_i(k+1)=\frac{1}{n}; \quad [29\text{-}1]$$

$$p_j(k+1)=\frac{p_j(k)}{\sum_{j\neq i}^{n} p_j(k)}\left(\frac{n-1}{n}\right);\ j\neq i \quad [30\text{-}1]$$

It should be appreciated that the speed in which the automaton learns can be controlled by adding the television channel $\alpha_l$ to specific locations within the television channel probability distribution p. For example, the probability value $p_l$ assigned to the added television channel $\alpha_l$, can be calculated as the mean of the current probability values $p_l$, such that the television channel $\alpha_i$ will be added to the middle of the comprehensive channel list $\alpha$ to effect an average learning speed. The probability value $p_l$ assigned to the added television channel $\alpha_l$ can be calculated as an upper percentile (e.g. 25%) to effect a relatively quick learning speed. Or the probability value $p_i$ assigned to the added television channel $\alpha_l$ can be calculated as a lower percentile (e.g. 75%) to effect a relatively slow learning speed. It should be noted that if there is a limited number of television channels $\alpha_l$ on the comprehensive channel list $\alpha$, thereby placing the lowest television channels $\alpha_l$ in the likelihood position of being deleted from the comprehensive channel list $\alpha_l$ the assigned probability value $p_l$ should be not be so low as to cause the added television channel $\alpha_l$ to oscillate on and off of the comprehensive channel list $\alpha$ when it is alternately watched and not watched.

In any event, if the outcome value $\beta$ received from the outcome evaluation module 1730 equals "1," indicating that the currently watched television channel $\lambda_x$ matches a television channel $\alpha_l$ on the comprehensive channel list $\alpha$, the intuition module 1715 directs the probability update module 1720 to update the television channel probability distribution p using a learning methodology. In the illustrated embodiment, the probability update module 1720 utilizes a linear reward-inaction P-type update.

As an example, assume that a currently watched television channel $\lambda_x$ matches a television channel $\alpha_5$ on the comprehensive channel list $\alpha$, thus creating an outcome value $\beta$=1. Assume also that the comprehensive channel list $\alpha$ currently contains 10 television channels $\alpha_l$. In this case, general updating equations [6] and [7] can be expanded using equations [10] and [11], as follows:

$$p_5(k+1)=p_5(k)+\sum_{\substack{j=1\\ j\neq 5}}^{10} ap_j(k);$$

$$p_1(k+1)=p_1(k)-ap_1(k);$$

$$p_2(k+1)=p_2(k)-ap_2(k);$$

$$p_3(k+1)=p_3(k)-ap_3(k);$$

$$p_4(k+1)=p_4(k)-ap_4(k);$$

$$p_6(k+1)=p_6(k)-ap_6(k);$$

$$p_7(k+1)=p_7(k)-ap_7(k);$$

$$p_8(k+1)=p_8(k)-ap_8(k);$$

$$p_9(k+1)=p_9(k)-ap_9(k);$$

$$p_{10}(k+1)=p_{10}(k)-ap_{10}(k)$$

Thus, the corresponding probability value $p_5$ is increased, and the television channel probability values $p_l$ corresponding to the remaining television channels $\alpha_l$ are decreased. The value of a is selected based on the desired learning speed. The lower the value of $\alpha$, the slower the learning speed, and the higher the value of $\alpha$, the higher the learning speed. In the preferred embodiment, the value of a has been chosen to be 0.03. It should be noted that the penalty updating equations [8] and [9] will not be used, since in this case, a reward-penalty P-type update is not used.

Thus, it can be appreciated that, in general, the more a specific listed television channel $\alpha_l$ is watched relative to other listed television channels $\alpha_l$, the more the corresponding probability value $p_l$ is increased, and thus the higher that listed television channel $\alpha_l$ is moved up on the comprehensive channel list $\alpha$. As such, the chances that the listed television channel $\alpha_l$ will be selected will be increased. In contrast, the less a specific listed television channel $\alpha_l$ is watched relative to other listed television channels $\alpha_l$, the more the corresponding probability value $p_l$ is decreased (by virtue of the increased probability values $p_l$ corresponding to the more frequently watched listed television channels $\alpha_l$), and thus the lower that listed television channel $\alpha_l$ is moved down on the comprehensive channel list $\alpha$. As such, the chances that the listed television channel $\alpha_l$ will be selected by the channel selection module 1725 will be decreased.

It can also be appreciated that due to the nature of the learning automaton, the relative movement of a particular listed television channel $\alpha_l$ is not a matter of how many times the television channel $\alpha_l$ is watched, and thus, the fact that the total number of times that a particular listed television channel $\alpha_l$ has been watched is high does not ensure that it will be selected. In reality, the relative placement of a particular listed television channel $\alpha_l$ on the comprehensive channel list $\alpha_s$ is more of a function of the number of times that the listed television channel $\alpha_l$ has been recently watched. For example, if the total number of times a listed television channel $\alpha_i$ is watched is high, but has not been watched in the recent past, the listed television channel $\alpha_l$ may be relatively low on the comprehensive channel list $\alpha$ and thus it may not be selected. In contrast, if the total number of times a listed television channel $\alpha_l$ is watched is low, but it has been watched in the recent past, the listed television channel $\alpha_l$ may be relatively high on the comprehensive channel list $\alpha_l$ and thus it may be selected. As such, it can be appreciated that the learning automaton quickly adapts to the changing watching patterns of a particular remote control user 1615.

It should be noted, however, that a television channel probability distribution p can alternatively be purely based on the frequency of each of the television channels A. For example, given a total of n television channels watched, and a total number of times that each television channel is watched $f_1$, $f_2$, $f_3$ . . . , the probability values $p_l$ for the corresponding listed television channels $\alpha_l$ can be:

$$p_i(k+1) = \frac{fi}{n} \quad [31]$$

Noteworthy, each probability value $p_l$ is not a function of the previous probability value $p_l$ (as characterized by learning automaton methodology), but rather the frequency of the listed television channel $\alpha_l$ and total number of watched television channels n. With the purely frequency-based learning methodology, when a new television channel $\alpha_l$ is added to the comprehensive channel list $\alpha_l$ its corresponding probability value $p_l$ will simply be 1/n, or alternatively, some other function of the total number of watched television channels n. Optionally, the total number of watched television channels n is not absolute, but rather represents the total number of watched television channels n made in a specific time period, e.g., the last three months, last month, or last week. In other words, the television channel probability distribution p can be based on a moving average. This provides the frequency-based learning methodology with more dynamic characteristics.

In any event, as described above, a single comprehensive television channel list $\alpha$ that contains all television channels watched regardless of the time and day of the week is generated and updated. Optionally, several comprehensive television channel lists a can be generated and updated based on the time and day of the week. For example, Tables 11 and 12 below set forth exemplary comprehensive television channel lists $\alpha 1$ and $\alpha 2$ that respectively contain television channels $\alpha 1_l$ and $\alpha 2_l$ that are watched during the weekdays and weekend.

TABLE 11

Exemplary Probability Values for Comprehensive Weekday Television Channel List

| Number | Listed Weekday Television Channels ($\alpha 1_l$) | Probability Values ($p_l$) |
|---|---|---|
| 1 | 4 | 0.263 |
| 2 | 11 | 0.188 |
| 3 | 48 | 0.162 |
| 4 | 29 | 0.133 |
| 5 | 9 | 0.103 |
| 6 | 2 | 0.075 |
| 7 | 88 | 0.033 |
| 8 | 38 | 0.025 |
| 9 | 7 | 0.014 |
| 10 | 15 | 0.004 |

TABLE 12

Exemplary Probability Values for Comprehensive Weekend Television Channel List

| Number | Listed Weekend Television Channels ($\alpha 1_l$) | Probability Values ($p_l$) |
|---|---|---|
| 1 | 11 | 0.256 |
| 2 | 7 | 0.209 |
| 3 | 4 | 0.153 |
| 4 | 38 | 0.125 |
| 5 | 93 | 0.083 |
| 6 | 29 | 0.067 |
| 7 | 48 | 0.043 |
| 8 | 9 | 0.032 |
| 9 | 2 | 0.020 |
| 10 | 8 | 0.012 |

Notably, the top five locations of the exemplary comprehensive television channel lists $\alpha 1$ and $\alpha 2$ contain different television channels $\alpha 1_l$ and $\alpha 2_l$, presumably because certain television channels $\alpha 1_l$ (e.g., 48, 29, and 9) were mostly only watched during the weekdays, and certain television channels $\alpha 2_l$ (e.g., 7, 38, and 93) were mostly only watched during the weekends. The top five locations of the exemplary comprehensive television channel lists $\alpha 1$ and $\alpha 2$ also contain common television channels $\alpha_l$ and $\alpha 2_l$, presumably because certain television channels $\alpha 1_l$ and $\alpha 2_l$ (e.g., 4 and 11) were watched during the weekdays and weekends. Notably, these common television channels $\alpha 1_l$ and $\alpha 2_l$ are differently ordered in the exemplary comprehensive television channel lists $\alpha 1$ and $\alpha 2$, presumably because the remote control user's 1615 weekday and weekend watching patterns have differently influenced the ordering of these television channels. Although not shown, the single comprehensive list $\alpha$ can be subdivided, or the comprehensive channel lists $\alpha 1$ and $\alpha 2$ can be further subdivided, e.g., by day and evening.

When there are multiple comprehensive television channel lists a that are divided by day and/or time, the channel selection module 1725, outcome evaluation module 1730, probability update module 1720, and intuition module 1715 operate on the comprehensive channel lists a based on the current day and/or time (as obtained by a clock or calendar stored and maintained by the control circuitry 1645). Specifically, the intuition module 1715 selects the particular comprehensive list $\alpha$ that will be operated on. For example, during a weekday, the intuition module 1715 will select the comprehensive channel lists $\alpha 1$, and during the weekend, the intuition module 1715 will select the comprehensive channel lists $\alpha 2$.

The channel selection module 1725 will maintain the ordering of all of the comprehensive channel lists $\alpha$, but will select the television channel from the particular comprehensive television channel list $\alpha$ selected by the intuition module 1715. For example, during a weekday, the channel selection module 1725 will select the television channel from the comprehensive channel list $\alpha 1$, and during the weekend, the channel selection module 1725 will select the television channel from the comprehensive channel list $\alpha 2$. Thus, it can be appreciated that the particular television channel to which the television will be switched will be customized to the current day, thereby increasing the chances that the next television channel $\lambda_x$ watched by the remote control user 1615 will be the selected television channel.

The outcome evaluation module 1730 will determine if the currently watched television channel $\lambda_x$ matches a television channel $\alpha_l$ on the comprehensive channel list $\alpha$ selected by the intuition module 1715 and generate an outcome value $\beta$ based thereon, and the intuition module 1715 will accordingly modify the television channel probability distribution p corresponding to the selected comprehensive television channel list α. For example, during a weekday, the outcome evaluation module 1730 determines if the currently watched television channel $\lambda_x$ matches a television channel $\alpha_l$ on the comprehensive channel list α1, and the intuition module 1715 will then modify the television channel probability distribution p corresponding to the comprehensive channel list α1. During a weekend, the outcome evaluation module 1730 determines if the currently watched television channel $\lambda_x$ matches a television channel $\alpha_l$ on the comprehensive channel list α2, and the intuition module 1715 will then modify the television channel probability distribution p corresponding to the comprehensive channel list α2.

The intuition module 1715 may also prevent any one probability value $p_l$ from overwhelming the remaining probability values $p_l$ by limiting it to a particular value, e.g., 0.5. In this sense, the learning module 1710 will not converge to any particular probability value $p_l$, which is not the objective of the remote control 1600. That is, the objective is not to find a single favorite television channel, but rather a list of favorite television channels that dynamically changes with the remote control user's 1615 changing watching patterns. Convergence to a single probability value $p_l$ would defeat this objective.

So far, it has been explained that the listing program 1700 uses the instantaneous outcome value β as a performance index φ in measuring its performance in relation to its objective of select a television channel that will be watched by the remote control user 1615. It should be appreciated, however, that the performance of the listing program 1700 can also be based on a cumulative performance index φ. For example, the listing program 1700 can keep track of a percentage of the watched television channels $\lambda_x$ that match a television channel $\alpha_l$ on the comprehensive channel list α or portion thereof, or a consecutive number of watched television channels $\lambda_x$ that do not match a television channel $\alpha_l$ on the comprehensive channel list α or portion thereof, based on the outcome value β. Based on this cumulative performance index φ, the intuition module 1715 can modify the learning speed or nature of the learning module 1710.

Optionally, the outcome value β can be time-based in that the cumulative time that a television channel is watched can be measured to determine the quality of the watched television channel. If the case of a relatively lengthy time the television channel is watched, the intuition module 1715 can assign a probability value (if not found on the comprehensive channel list α) or increase the probability value (if found on the comprehensive channel list α) of the corresponding television channel higher than would otherwise be assigned or increased. In contrast, in the case of a relatively short time the television channel is watched, the intuition module 1715 can assign a probability value (if not found on the comprehensive channel list α) or increase the probability value (if found on the comprehensive channel list α) of the corresponding television channel lower than would otherwise be assigned or increased. When measuring the quality of the watched television channel, the processing can be performed after the television channel is switched.

It should be noted that, in the case where a comprehensive television channel list is displayed on the screen of the television for selection by the remote control user 1615, the channel selection module 1725 may optionally select a television channel subset from the comprehensive channel list α for eventual display to the remote control user 1615 as a comprehensive television channel list. Updating of a comprehensive television channel list that contains a television channel subset, and selection of the comprehensive television channel list for display, is similar to that accomplished in the previously described mobile phone 1100 when updating the comprehensive phone number list and selecting the favorite phone number therefrom.

Although the program 1700 is described as being stored within a remote control 1600, it can be distributed amongst several components within a remote control television system, or another component within the remote control television system, e.g., within the television, itself, or some other device associated with the television, e.g., a cable box, set top box, or video cassette recorder. In addition, although the program 1700 is described for use with a television, it should be noted that it can be applied to other consumer electronic equipment on which users can watch or listen to programs by switching channels, e.g., stereo equipment, satellite radio, MP3 player, Web devices, etc.

Figure 26:
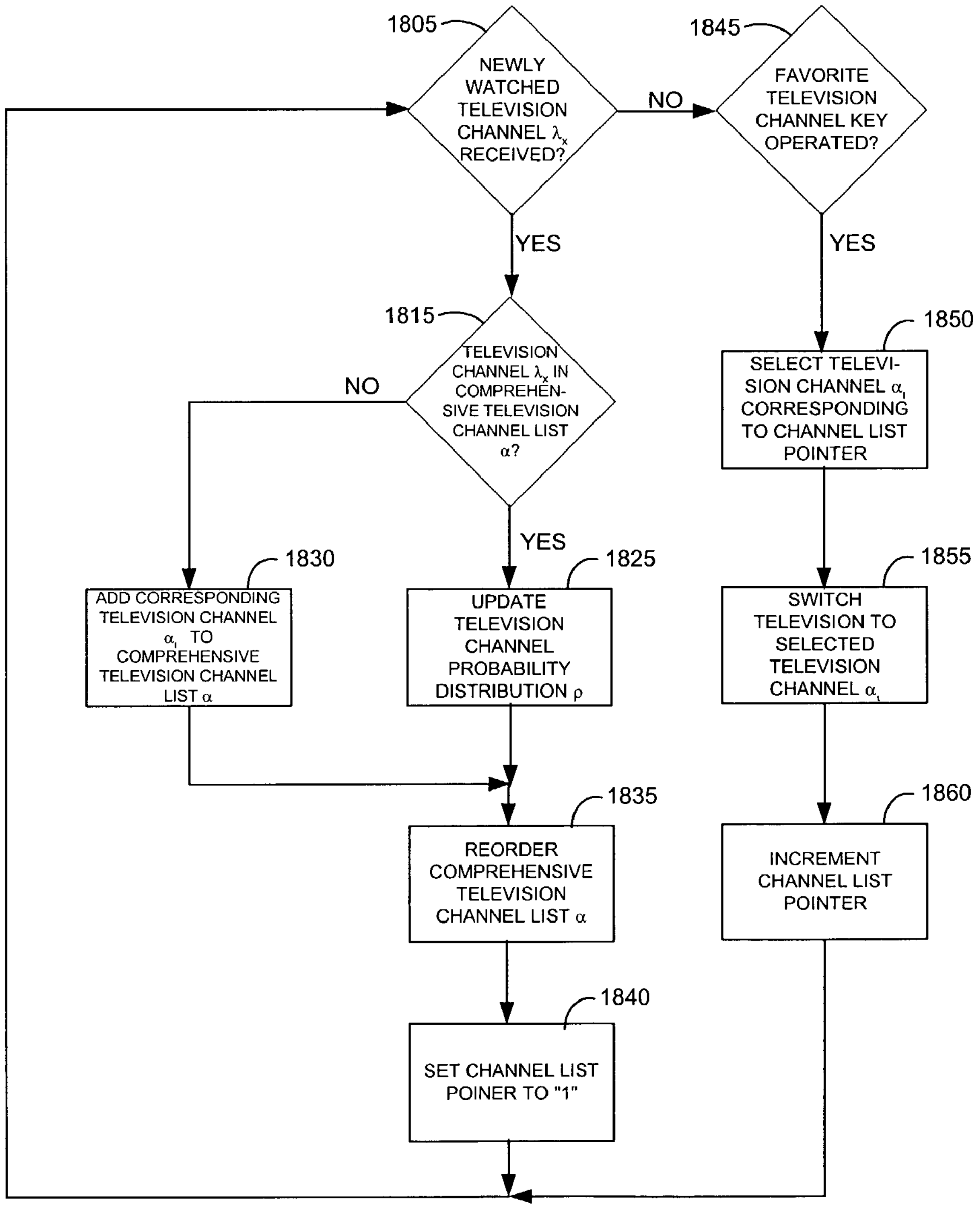
FIG. 26 is a flow diagram illustrating a preferred method performed by the priority listing program of FIG. 25.

Having now described the structure of the listing program 1700, the steps performed by the listing program 1700 will be described with reference to FIG. 26. First, the outcome evaluation module 1730 determines whether a television channel $\lambda_x$ has been newly watched (step 1805). As previously discussed, this occurs when a predetermined period of time has elapsed while the television is tuned to the television channel. If a television channel $\lambda_x$ has been newly watched, the outcome evaluation module 1730 determines whether it matches a television channel $\alpha_l$ on the comprehensive channel list α and generates an outcome value β in response thereto (step 1815). If so (β=1), the intuition module 1715 directs the probability update module 1720 to update the television channel probability distribution p using a learning methodology to increase the probability value $p_l$ corresponding to the listed television channel $\alpha_l$ (step 1825). If not (β=0), the intuition module 1715 generates a corresponding television channel $\alpha_l$ and assigns a probability value $p_l$ to it, in effect, adding it to the comprehensive channel list α (step 1830). The channel selection module 1725 then reorders the comprehensive channel list α (step 1835), sets the channel list pointer to "1" (step 1840), and returns to step 1805.

If a television channel $\lambda_x$ has not been newly watched at step 1805, e.g., if the predetermined period of time has not expired, the channel selection module 1725 determines whether the favorite channel key 1665 has been operated (step 1845). If so, the channel selection module 1725 selects a listed television channel $\alpha_l$, and in this case, the listed television channel $\alpha_i$ corresponding to the channel list pointer (step 1850). The television is then switched to the selected television channel $\alpha_l$ (step 1855), and the channel list pointer is incremented (step 1860). After step 1860, or if the favorite channel key 1665 has not been operated at step 1845, the listing program 1700 then returns to step 1805, where it is determined again if television channel $\lambda_x$ has been watched.

Figure 27:
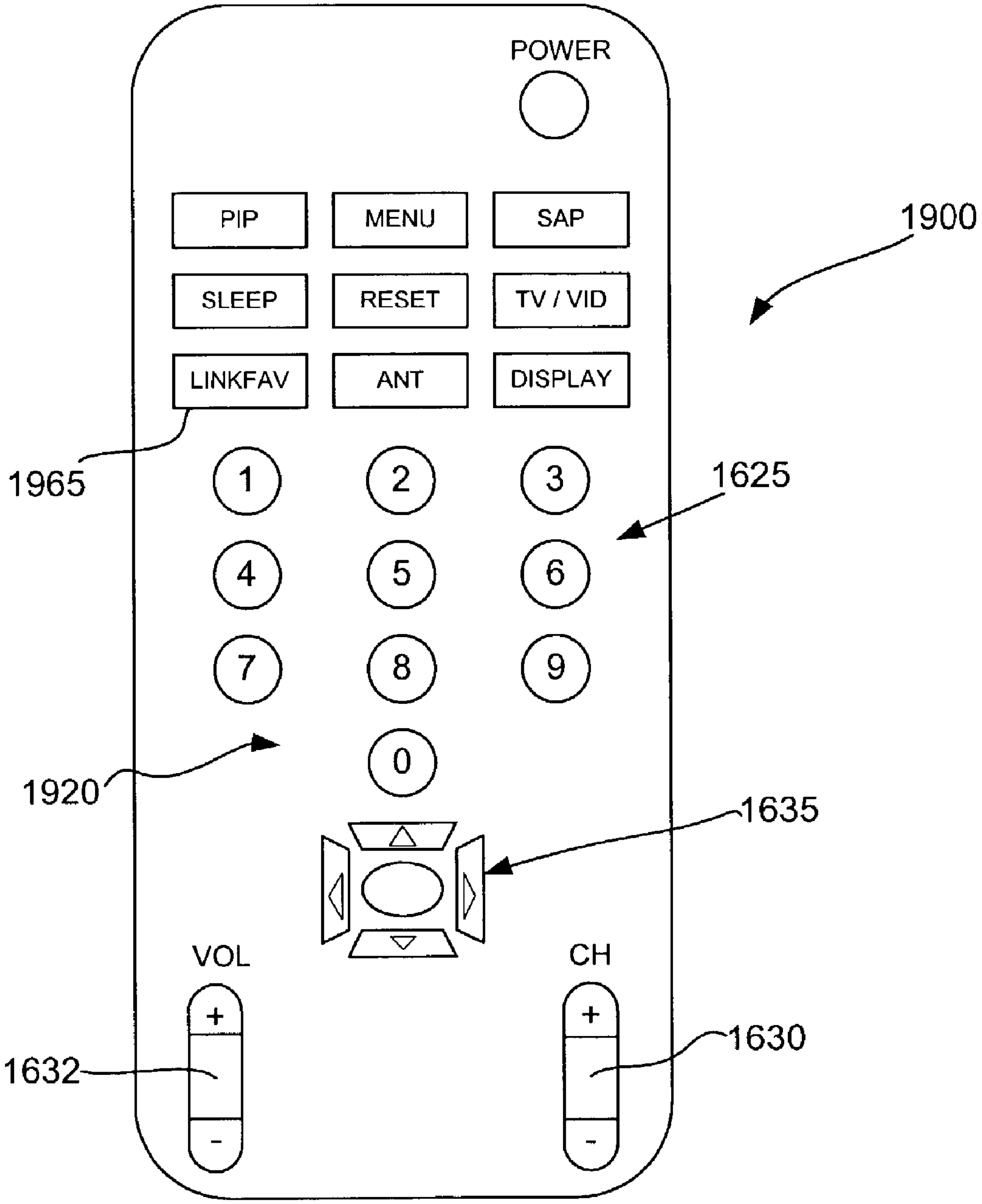
FIG. 27 is a plan view of another television remote control to which the generalized program of FIG. 1 can be applied.

Referring now to FIG. 27, another priority listing program 2000 (shown in FIG. 28) developed in accordance with the present inventions is described in the context of another television remote control 1900. The remote control 1900 is similar to the previously described remote control 1600 with the exception that it comprises a keypad 1920 that alternatively or optionally contains a specialized favorite channel key 1965 referred to as a "LINKFAV" key. The specialized favorite channel key 1965 is similar to the generalized favorite channel key 1965 in that its operation immediately and automatically switches the television from the current television channel to a next television channel that tends to correspond to one of the user's 1615 favorite television channels. Unlike with the generalized favorite channel key 1965, however, the next television channel will tend to be one of the user's 1615 favorite television channels based on the specific (as opposed to a general) channel watching pattern that the remote control user 1615 is currently in.

To this end, the program 2000 dynamically updates a plurality of linked comprehensive television channel lists from which the next television channel will be selected. Like with the generalized comprehensive television channel list, the program 2000 may maintain each of the linked comprehensive television channel lists based on the number of times a television channel has been watched, and the recent activity of the television channel. The linked comprehensive television channel lists are arranged and updated in such a manner that a selected one will be able to be matched and applied to the specific channel watching pattern that the remote control user 1615 is currently in.

Specifically, each linked comprehensive television channel list corresponds to a value of a specified television channel parameter, such that, when the remote control user 1615 operates the specialized favorite television key 1965, the linked comprehensive television channel list corresponding to the value exhibited by the currently watched television channel can be recalled, and thus, the next channel selected from that recalled list will be more likely to be the television channel that the remote control user 1615 desires to watch. A channel parameter can, e.g., include a switched channel number (in which case, the values may be 2, 3, 4, 5, etc.), channel type (in which case, the values may be entertainment, news, drama, sports, comedy, education, food, movies, science fiction, cartoon, action, music, shopping, home), channel age/gender (in which case, the values may be adult, teenage, kids, women, etc.), or channel rating (in which case, the values may be TV-Y, TV-Y7, TV-14, TV-MA, etc.). If the channel parameter is a channel type, channel age/gender or channel rating, a device (such as, e.g., a set top box, television or video cassette recorder) can be used to extract this information from the incoming program signal.

For example, if the channel parameter is a switched channel number, and if the television has been recently and often switched from channel 2 to channels 4, 8, and 11, or vice versa, the program 2000 will tend to maintain channels 4, 8, and 11 at the top of a list corresponding to channel 2, so that these favorite channels will be selected when the remote control user 1615 is currently watching channel 2 and operates the specialized favorite television channel key 1965. As another example, if the channel parameter is a channel type, and if movie channels 14 (TNT), 24 (MAX), and 26 (HBO3) have been recently watched numerous times, the program 2000 will tend to maintain these channels at the top of a list corresponding to movie channels, so that these favorite channels will be selected when the remote control user 1615 is currently watching a movie channel and operates the specialized favorite television channel key 1965.

As with the previously described program 1700, the program 2000 may optionally maintain the specialized television channel lists based on temporal information, such as, e.g., the day of the week (weekend or weekday) and/or time of day (day or evening). Thus, the specialized television channel lists can be further divided into sublists that are selected and applied based on the current day of the week and/or time of the day.

As with the program 1700, the program 2000 only assumes that a program is watched if the remote control user 1615 has continuously watched the television channel for more than a specified period of time (e.g., five minutes), so that a television channel will only affect the linked comprehensive television channel lists when this period of time is exceeded. Also, in the case where the television channel parameter is a switched channel number, selection of the next television channel from the specialized television channel lists, which would quickly vary with time, would be unstable without requiring a certain period of time to expire before a television channel can be considered watched. For example, without this feature, operation of the specialized favorite television channel key 1965 may switch the television from channel 2 to 4 if channel 4 is at the top of the linked comprehensive television channel list corresponding with channel 2, and then further operation of the specialized favorite television channel key 1965 may switch the television from channel 4 back to channel 2 if channel 2 is at the top of the linked comprehensive television channel list corresponding to channel 4. The channel would then switch back in and forth between channel 2 and 4 when the specialized favorite television channel key 1965 is further operated.

Thus, an assumption that a channel is a currently watched channel after a period of time has expired would prevent this adverse effect by forcing the program 2000 to select one linked comprehensive television channel list from which the unique channels can be sequentially selected. For example, when the currently watched television channel is channel 2, operation of the specialized favorite channel key 1965 may switch the television channel from channel 2 those channels that are on the linked comprehensive television channel list corresponding to channel 2. The predetermined period of time will, therefore, have to expire before the linked television channel, i.e., channel 2, is changed to the currently watched television channel.

As briefly discussed with respect to the program 1700, the program 2000 can be modified to maintain each of the specialized television channel lists for multiple users, so that the television channel patterns of one user do not dilute or interfere with the television channel patterns of another user. It should be noted, however, that in many cases, the specific channel watching patterns will be so unique to the users 1615 that the separate maintenance of the lists will not be necessary-at least with respect to the specialized favorite television channel key 1965. For example, a specific television channel pattern that is unique to kids (e.g., cartoons) will typically not conflict with a specific television channel pattern that is unique to adults (e.g., news).

As will be described in further detail below, the listing program 2000 uses the existence or non-existence of a watched television channel on the pertinent linked comprehensive television channel list as a performance index $\phi$ in measuring its performance in relation to its objective of ensuring that the pertinent linked channel list will include the future watched television channel, so that the remote control user 1615 is not required to "surf" through all of the television channels or manually punch in the television channel using the number keys. In this regard, it can be said that the performance index $\phi$ is instantaneous. Alternatively or optionally, the listing program 2000 can also use the location of the television channel in the pertinent linked comprehensive channel list as a performance index $\phi$.

Figure 28:
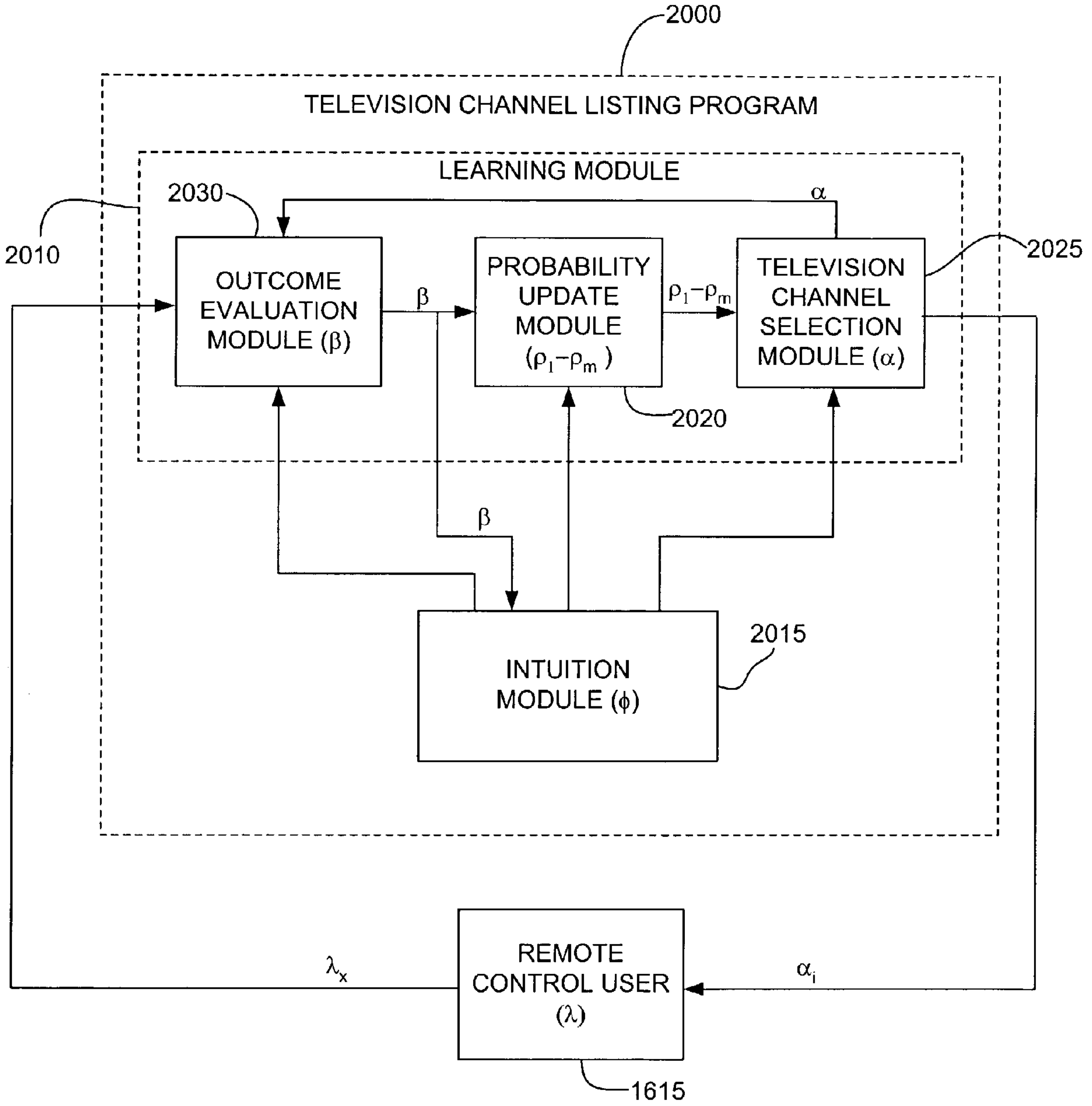
FIG. 28 is a block diagram of a priority listing program employed in the remote control of FIG. 27.

Referring now to FIG. 28, the listing program 2000 includes a probabilistic learning module 2010 and an intuition module 2015, which are specifically tailored for the remote control 1900. The probabilistic learning module 2010 comprises a probability update module 2020, a television channel selection module 2025, and an outcome evaluation module 2030.

Specifically, the probability update module 2020 is mainly responsible for learning the remote control user's 1615 television watching habits and updating linked comprehensive television channel lists $\alpha 1$-$\alpha m$ that places television channels $\alpha_l$ in the order that they are likely to be watched in the future during any given time period. m equals the number of values associated with the pertinent television channel parameter. For example, if the television channel parameter is a channel number, and there are 100 channels, m equals 100. If the television channel parameter is a channel type, and there are ten channel types, m equals 10.

The outcome evaluation module 2030 is responsible for evaluating the linked comprehensive channel lists $\alpha$1-am relative to current television channels $\lambda_x$ watched by the remote control user 1615. The channel selection module 2025 is mainly responsible for selecting a television channel $\alpha_l$ from the pertinent linked comprehensive channel list $\alpha_l$ upon operation of the favorite television channel key 1965. Preferably, this is accomplished by selecting the channel $\alpha_l$ at the top of the pertinent linked comprehensive channel list $\alpha_l$ then the second channel, third channel, and so on, as the specialized favorite channel key 1965 is repeatedly operated.

The intuition module 2015 is responsible for directing the learning of the listing program 2000 towards the objective of selecting the television channel $\alpha_l$ that is likely to be the remote control user's 1615 next watched television channel $\alpha_l$. In this case, the intuition module 2015 selects the pertinent linked comprehensive channel list $\alpha$, and operates on the probability update module 2020, the details of which will be described in further detail below.

To this end, the channel selection module 2025 is configured to receive multiple television channel probability distributions p1-pm from the probability update module 2020, which is similar to equation [1] and can be represented by the following equation:

$$p1(k)=[p1_1(k),p1_2(k),p1_3(k) \ldots p1_n(k)];$$

$$p2(k)=[p2_1(k),p2_2(k),p2_3(k) \ldots p2_n(k)];$$

$$p3(k)=[p3_1(k),p3_2(k),p3_3(k) \ldots p3_n(k)]$$

$$pm(k)[pm_1(k),pm_2(k),pm_3(k) \ldots pm_n(k)] \quad [1\text{-}4]$$

where m is the number of probability distributions, i.e., the number of values associated with the pertinent television channel parameter; $p_l$ is the probability value assigned to a specific television channel $\alpha_l$, n is the number of television channels $\alpha_l$ on the comprehensive channel list $\alpha$, and k is the incremental time at which the television channel probability distribution was updated.

Based on the television channel probability distribution p1-pm, the channel selection module 2025 generates the linked comprehensive channel lists $\alpha$1-am, each of which contains the listed television channels $\alpha_l$ ordered in accordance with their associated probability values $p_l$. Thus, each linked comprehensive channel list $\alpha$ contains all watched television channels $\alpha_l$ exhibiting a value corresponding to the list. For example, if the television channel parameter is a switched channel number, each linked comprehensive channel list $\alpha$ will be linked with a channel number and will contain all television channels $\alpha_l$ ever watched by the remote control user 1615 that were switched to and from that television channel. If the television channel parameter is a channel type, each linked comprehensive channel list $\alpha$ will be linked with a channel type and will contain all television channels $\alpha_l$ of that channel type ever watched by the remote control user 1615. As with the comprehensive channel list $\alpha$ described with respect to the program 1700, each of the linked comprehensive channel lists $\alpha$1-$\alpha$m can be unlimited, or optionally, contain a limited amount of television channels $\alpha_l$, e.g., 10, so that the memory 1650 is not overwhelmed by seldom watched television channels.

As with the previously described comprehensive television channel list $\alpha_l$ each of the linked comprehensive channel lists $\alpha$1-am need not be separate from their respective television channel probability distributions p1-pm, but rather a television channel probability distribution p can be used as a linked comprehensive channel list $\alpha$ to the extent that it contains a comprehensive list of the linked television channels $\alpha_l$.

From the linked comprehensive channel lists $\alpha$1-$\alpha$m, the channel selection module 2025 selects the list corresponding to the television channel parameter value exhibited by the current television channel watched, and then selects, from that list, a television channel $\alpha_l$ that the television will be switched to. In the preferred embodiment, the selected television channel $\alpha_l$ will be that which corresponds to the highest probability value $p_l$, i.e., the top television channel $\alpha_i$ in the selected linked comprehensive channel list $\alpha$. The channel selection module 2025 will then select the next television channel $\alpha_l$ that the television will be switched to, which preferably corresponds to the next highest probability value $p_l$, i.e., the second television channel $\alpha_l$ in the selected linked comprehensive channel list $\alpha$, and so on. As previously described above, this selection process can be facilitated by using a channel list pointer. In the preferred embodiment, once last television channel $\alpha_l$ is selected, the channel selection module 2025 will select the current channel that was watched prior to initiation of the selection process, and will then go through the selected linked comprehensive channel list $\alpha$ again. Optionally, the channel selection module 2025 will only cycle through a subset of the selected linked comprehensive channel list $\alpha$, e.g., the top three.

As an example, consider Table 13, which sets forth exemplary linked comprehensive television channel lists $\alpha$ with associated probability values $p_l$. In this case, the channel parameter is a switched channel number.

TABLE 13

Exemplary Probability Values for Linked Comprehensive Television Channel Lists

| Number | Listed Television Channels ($\alpha_1$) | Probability Values ($p_1$) |
|---|---|---|
| | Television Channel 2 | |
| 1 | 11 | 0.310 |
| 2 | 26 | 0.283 |
| 3 | 4 | 0.202 |
| 4 | 9 | 0.093 |
| 5 | 35 | 0.057 |
| 6 | 95 | 0.022 |
| 7 | 39 | 0.012 |
| 8 | 5 | 0.011 |
| 9 | 7 | 0.007 |
| 10 | 38 | 0.003 |
| | Television Channel 4 | |
| 1 | 2 | 0.280 |
| 2 | 8 | 0.238 |
| 3 | 9 | 0.168 |
| 4 | 38 | 0.119 |
| 5 | 30 | 0.084 |
| 6 | 83 | 0.032 |
| 7 | 5 | 0.028 |
| 8 | 7 | 0.018 |
| 9 | 33 | 0.009 |
| 10 | 93 | 0.004 |
| . | | |
| . | | |
| . | | |
| | +TC Television Channel 100 | |
| 1 | 93 | 0.294 |
| 2 | 48 | 0.228 |

TABLE 13-continued

Exemplary Probability Values for Linked Comprehensive Television Channel Lists

| Number | Listed Television Channels ($\alpha_1$) | Probability Values ($p_1$) |
|---|---|---|
| 3 | 84 | 0.172 |
| 4 | 11 | 0.013 |
| 5 | 9 | 0.082 |
| 6 | 88 | 0.061 |
| 7 | 94 | 0.027 |
| 8 | 7 | 0.013 |
| 9 | 38 | 0.008 |
| 10 | 98 | 0.002 |

In this exemplary case, if the currently watched channel is channel 2, channel 11, then channel 26, then channel 4, and so on, will be selected as the television channels to which the television will be sequentially switched. If the currently watched channel is channel 4, channels 2, 8, and 9, and so on, will be selected. If the currently watched channel is channel 100, channels 93, 48, and 84 will be selected. Notably, there is no corresponding linked comprehensive television channel list α for channel 3, presumably because channel 3 has never been watched.

As with the previously described outcome evaluation module 1730, the outcome evaluation module 2030 is configured to receive a watched television channel 4 from the remote control user 1615 via the keypad 1920 using any one of a variety of manners. The outcome evaluation module 2030 is further configured to determine and output an outcome value β that indicates if the currently watched television channel $\lambda_x$ matches a television channel $\alpha_l$ on the linked comprehensive channel list $\alpha_l$ as selected by the intuition module 2015 described below. In the illustrated embodiment, the outcome value β equals one of two predetermined values: "1" if the currently watched television channel $\lambda_x$ matches a television channel $\alpha_l$ on the selected linked comprehensive channel list $\alpha_l$ and "0" if the currently watched television channel $\lambda_x$ does not match a television channel $\alpha_l$ on the selected linked comprehensive channel list α.

The intuition module 2015 is configured to select the linked comprehensive channel list a corresponding to the television channel parameter value exhibited by the currently watched television channel $\lambda_x$. This selected linked comprehensive channel list α is the list that is operated on by the outcome evaluation module 2030 described above. The intuition module 2015 is further configured to receive the outcome value β from the outcome evaluation module 2030 and modify the probability update module 2020, and specifically, the television channel probability distribution p corresponding to the selected linked comprehensive channel list α. Specifically, if the outcome value β equals "0," indicating that next watched television channel $\lambda_x$ does not match a television channel $\alpha_l$ on the selected linked comprehensive channel list α, the intuition module 2015 adds the watched television channel $\lambda_x$ to the selected linked comprehensive channel list α as a listed television channel $\alpha_l$. The television channel $\alpha_l$ can be added to the selected linked comprehensive channel list α in a manner similarly described with respect to the intuition module 1715. If the outcome value β received from the outcome evaluation module 2030 equals "1," indicating that the next watched television channel $\lambda_x$ matches a television channel $\alpha_l$ on the selected linked comprehensive channel list $\alpha_l$ the intuition module 2015 directs the probability update module 2020 to update the corresponding television channel probability distribution p in the manner previously described with respect to intuition module 1715.

Optionally, the intuition module 2015 can be configured to select the linked comprehensive channel list α corresponding to the next watched television channel $\lambda_x$ and update that based on whether the current watched television channel $\lambda_x$ is found on that list-in effect, creating a bilateral link between the currently watched television channel $\lambda_x$ and the next watched television channel $\lambda_x$ rather than just a unilateral link from the currently watched television channel $\lambda_x$ to the next watched television channel $\lambda_x$ Thus, in this case, two linked comprehensive channel lists a will be updated for each television channel $\lambda_x$ that is watched (one for the currently watched television channel $\lambda_x$, and one for the next watched television channel $\lambda_x$).

In the case where the channel selection module 2025 selects a subset of the selected linked comprehensive television channel list α (e.g., for display to the remote control user 1615 as a favorite television channel list) or cycles through a subset of the linked comprehensive television channel list $\alpha_l$ the outcome evaluation module 2030 may generate more outcome values β. For example, in this case, the outcome evaluation module 2030 may generate an outcome value β equal to "1" if the currently watched television channel $\lambda_x$ matches a television channel $\alpha_l$ in the previously selected television channel subset, "0" if the currently watched television channel $\lambda_x$ does not match a television channel $\alpha_l$ on the selected linked comprehensive television channel list $\alpha_l$ and "2" if the currently watched television channel $\lambda_x$ matches a television channel $\alpha_l$ on the selected linked comprehensive phone number list α, but not in the previously selected television channel subset. If the outcome value is "0" or "1", the intuition module 2015 will direct the probability update module 2020 as previously described. If the outcome value is "2", however, the intuition module 2015 will not direct the probability update module 2020 to update the probability distribution p using a learning methodology, but instead will assign a probability value $p_l$ to the listed television channel $\alpha_l$. For example, the assigned probability value $p_l$ may be higher than that corresponding to the last television channel $\alpha_l$ in the selected television channel subset, in effect, replacing that last television channel $\alpha_l$ with the listed television channel $\alpha_l$ corresponding to the currently watched television channel $\lambda_x$.

The program 2000 can include other optional features, such as those previously described with respect to the program 1700. For example, for each television channel, several linked comprehensive television channel lists α can be generated and updated based on the time and day of the week. The intuition module 2015 may also prevent any one probability value $p_l$ from overwhelming the remaining probability values $p_l$ within each linked probability distribution p by limiting it to a particular value, e.g., 0.5. Also, the performance of the listing program 2000 can be based on a cumulative performance index ϕ rather than an instantaneous performance index ϕ. The outcome value β can be time-based in that the cumulative time that a television channel is watched can be measured to determine the quality of the watched television channel.

Figure 29:
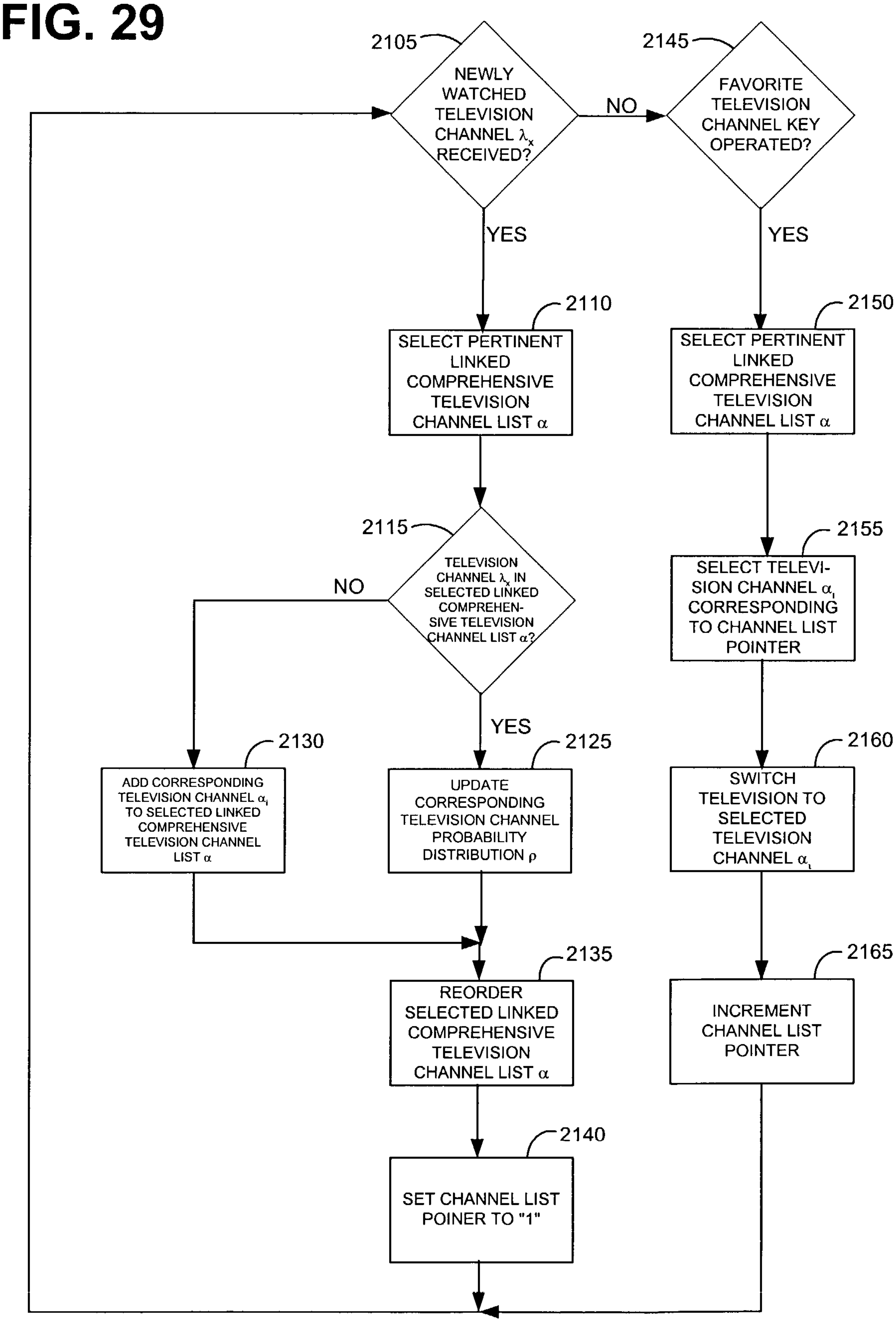
FIG. 29 is a flow diagram illustrating a preferred method performed by the priority listing program of FIG. 28.

Having now described the structure of the listing program 2000, the steps performed by the listing program 2000 will be described with reference to FIG. 29. First, the outcome evaluation module 2030 determines whether a television channel $\lambda_x$ has been newly watched (step 2105). As previously discussed, this occurs when a predetermined period of time has elapsed while the television is tuned to the television channel.

If a television channel $\lambda_x$ has been newly watched, the intuition module 2015 selects the linked comprehensive channel list $\alpha$ corresponding to a television channel parameter value exhibited by the currently watched channel $\lambda_x$ (step 2110). For example, if the television channel parameter is a switched channel number, and the currently watched channel $\lambda_x$ is channel 2, the outcome evaluation module 2030 will select the linked comprehensive channel list $\alpha$ corresponding to channel 2. If the television channel parameter is a channel type, and the currently watched channel $\lambda_x$ is a sports channel, the outcome evaluation module 2030 will select the linked comprehensive channel list $\alpha$ corresponding to sports.

The outcome evaluation module 2030 then determines whether the watched television channel $\lambda_x$ matches a television channel $\alpha_i$ on the selected linked comprehensive channel list $\alpha$ (step 2115). If so ($\beta$=1), the intuition module 2015 directs the probability update module 2020 to update the corresponding television channel probability distribution p using a learning methodology to increase the probability value $p_i$ corresponding to the listed television channel $\alpha_i$ (step 2125). If not ($\beta$=0), the intuition module 2015 generates a corresponding television channel $\alpha_i$ and assigns a probability value $p_i$ to it, in effect, adding it to the selected linked comprehensive channel list $\alpha$ (step 2130). The channel selection module 2025 then reorders the selected linked comprehensive channel list $\alpha$ (step 2135), sets the channel list pointer for the selected linked comprehensive channel list $\alpha$ to "1" (step 2140), and returns to step 2105.

If a television channel $\lambda_x$ has not been newly watched at step 2105, e.g., if the predetermined period of time has not expired, the channel selection module 2025 determines whether the favorite channel key 1965 has been operated (step 2145). If so, the channel selection module 2025 selects the linked comprehensive channel list $\alpha$ corresponding to the television channel parameter value exhibited by the currently watched channel $\lambda_x$ (step 2150), and then selects a listed television channel therefrom, and in this case, the listed television channel $\alpha_i$ corresponding to the channel list pointer for the selected linked comprehensive channel list $\alpha$ (step 2155). The television is then switched to the selected television channel $\alpha_i$ (step 2160), and the channel list pointer for the selected linked comprehensive channel list $\alpha$ is incremented (step 2165). After step 2165, or if the favorite channel key 1965 has not been operated at step 2145, the listing program 2000 then returns to step 2105, where it is determined again if a television channel $\lambda_x$ has been newly watched.

More specific details on the above-described operation of the television remote controls 1600 and 1900 can be found in the Computer Program Listing Appendix attached hereto and previously incorporated herein by reference. It is noted that the file "Intuition Intelligence-remote.doc" implements both functionalities for the generalized favorite channel key 1665 and the specialized favorite channel key 1965, with the channel parameter being a switched television channel. It should be noted that the files "Intuition Intelligence-remote.doc" was designed to emulate real-world remote control usage scenarios and to demonstrate the learning and intelligence capability. Only the functions relating to the generalized and specialized favorite channel keys 1665 and 1965 are set forth.

To this end, the remote control simulation is performed on a personal computer with the Windows 98 OS with Microsoft Access 2000 database support and Media Player. Media Player plays an AVI video file to simulate as if user is watching a program on TV. The Access 2000 database acts as a repository and stores all the lists with all relevant data including the probability values, count of the channel watched, channel number, name, etc., as well as channel number, channel name, channel type, age group, rating, etc. The code and algorithm is implemented in Visual Basic 5.0 with the help of Access 2000 database support.

As the program has access to more information than a simple remote (which has no Program details, like rating, cast, etc.) it uses a combination of the data available from the cable box or set top box or other mechanisms which can provide the additional information. The program can also implemented without that additional programming information as well. The access to this additional information, however, provides help in demonstrating more sophisticated demo.

Generalized Multi-User Learning Program (Single Processor Action-Multiple User Actions)

Figure 30:
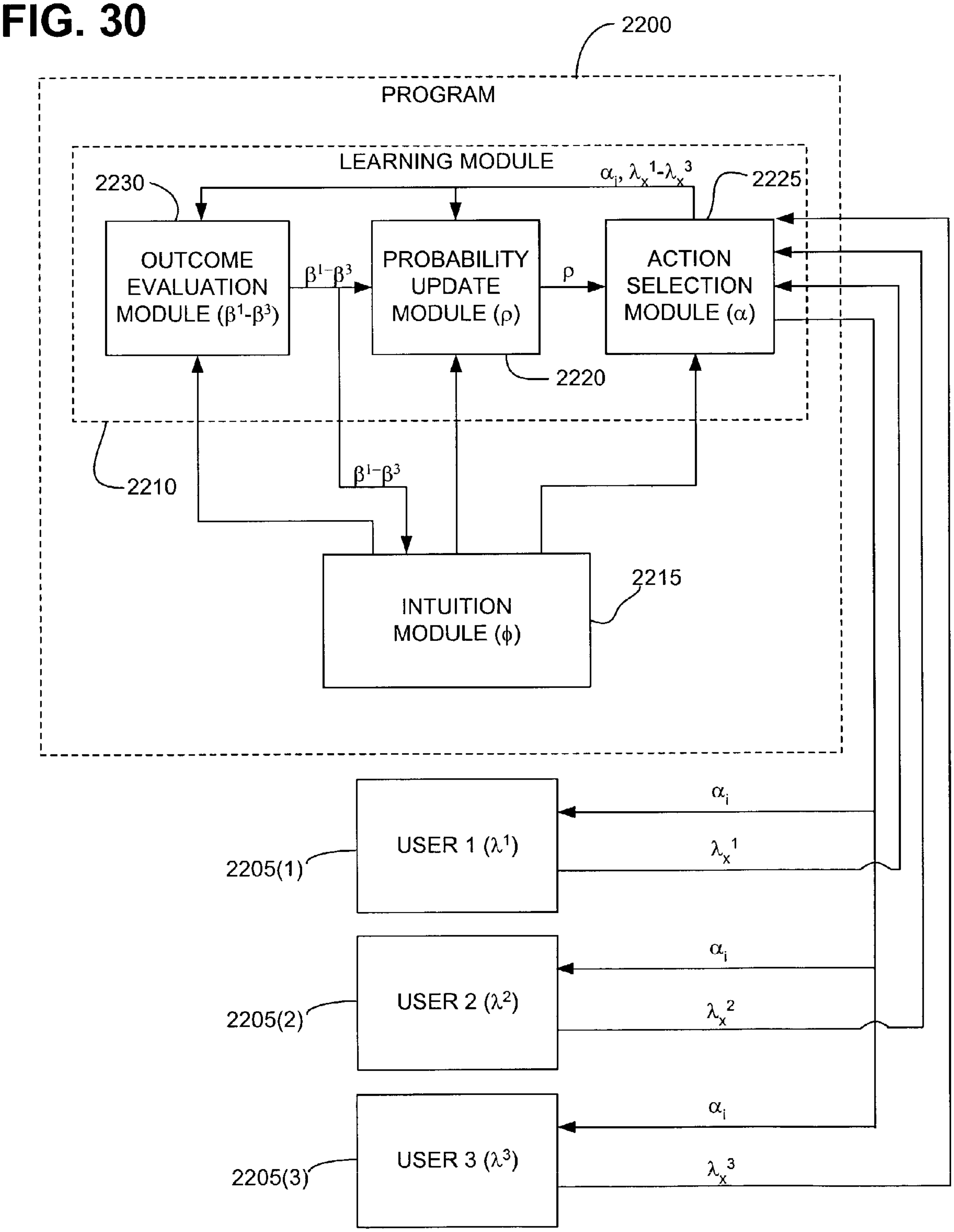
FIG. 30 is a block diagram of a generalized multiple-user learning software program constructed in accordance with the present inventions, wherein a single-input, multiple-output (SIMO) learning model is assumed.

Hereintobefore, intuitive learning methodologies directed to single-user (i.e., single-teacher) learning scenarios have been described. Referring to FIG. 30, a multi-user learning program 2200 developed in accordance with the present inventions can be generally implemented to provide intuitive learning capability to any variety of processing devices. In this embodiment, multiple users 2205(1)-(3) (here, three) interact with the program 2200 by receiving the same processor action $\alpha_i$ from a processor action set $\alpha$ within the program 2200, each independently selecting corresponding user actions $\lambda_x^1$-$\lambda_x^3$ from respective user action sets $\lambda^1$-$\lambda^3$ based on the received processor action $\alpha_i$ (i.e., user 2205(1) selects a user action $\lambda_x^1$ from the user action set $\lambda^1$, user 2205(2) selects a user action $\lambda_x^2$ from the user action set $\lambda^2$, and user 2205(3) selects a user action $\lambda_x^3$ from the user action set $\lambda^3$), and transmitting the selected user actions $\lambda_x^1$-$\lambda_x^3$ to the program 2200. Again, in alternative embodiments, the users 2205 need not receive the processor action $\alpha_i$ to select the respective user actions $\lambda_x^1$-$\lambda_x^3$, the selected user actions $\lambda_x^1$-$\lambda_x^3$ need not be based on the received processor action $\alpha_i$, and/or the processor action $\alpha_i$ may be selected in response to the selected user actions $\lambda_x^1$-$\lambda_x^3$. The significance is that processor actions $\alpha_i$ and user actions $\lambda_x^1$-$\lambda_x^3$ are selected. The program 2200 is capable of learning based on the measured performance (e.g., success or failure) of the selected processor action $\alpha_i$ relative to selected user actions $\lambda_x^1$-$\lambda_x^3$, which, for the purposes of this specification, can be measured as outcome values $\beta^1$-$\beta^3$. As will be described in further detail below, program 2200 directs its learning capability by dynamically modifying the model that it uses to learn based on a performance index $\phi$ to achieve one or more objectives.

To this end, the program 2200 generally includes a probabilistic learning module 2210 and an intuition module 2215. The probabilistic learning module 2210 includes a probability update module 2220, an action selection module 2225, and an outcome evaluation module 2230. Briefly, the probability update module 2220 uses learning automata theory as its learning mechanism, and is configured to generate and update a game move probability distribution p based on the outcome values $\beta^1$-$\beta^3$. In this scenario, the probability update module 2220 uses a single stochastic learning automaton with a single input to a multi-teacher environment (with the users 2205(1)-(3) as the teachers), and thus, a single-input, multiple-output (SIMO) model is assumed. Exemplary equations that can be used for the SIMO model will be described in further detail below.

In essence, the program 2200 collectively learns from the users 2205(1)-(3) notwithstanding that the users 2205(1)-(3) provide independent user actions $\lambda_x^1$-$\lambda_x^3$. The action selection module 2225 is configured to select the processor action $\alpha_i$ from the processor action set $\alpha$ based on the probability values contained within the game move probability distribution p internally generated and updated in the probability update module 2220. The outcome evaluation module 2230 is configured to determine and generate the outcome values $\beta^1$-$\beta^3$ based on the relationship between the selected processor action $\alpha_i$ and user actions $\lambda_x^1$-$\lambda_x^3$. The intuition module 2215 modifies the probabilistic learning module 2210 (e.g., selecting or modifying parameters of algorithms used in learning module 2210) based on one or more generated performance indexes $\phi$ to achieve one or more objectives. As previously discussed, the performance index $\phi$ can be generated directly from the outcome values $\beta^1$-$\beta^3$ or from something dependent on the outcome values $\beta^1$-$\beta^3$, e.g., the game move probability distribution p, in which case the performance index $\phi$ may be a function of the game move probability distribution p, or the game move probability distribution p may be used as the performance index $\phi$.

The modification of the probabilistic learning module 2210 is generally accomplished similarly to that described with respect to the afore-described probabilistic learning module 110. That is, the functionalities of (1) the probability update module 2220 (e.g., by selecting from a plurality of algorithms used by the probability update module 2220, modifying one or more parameters within an algorithm used by the probability update module 2220, transforming or otherwise modifying the game move probability distributions); (2) the action selection module 2225 (e.g., limiting or expanding selection of the action $\alpha_i$ corresponding to a subset of probability values contained within the game move probability distributions); and/or (3) the outcome evaluation module 2230 (e.g., modifying the nature of the outcome values $\beta^1$-$\beta^3$ or otherwise the algorithms used to determine the outcome values $\beta^1$-$\beta^3$), are modified.

Figure 31:
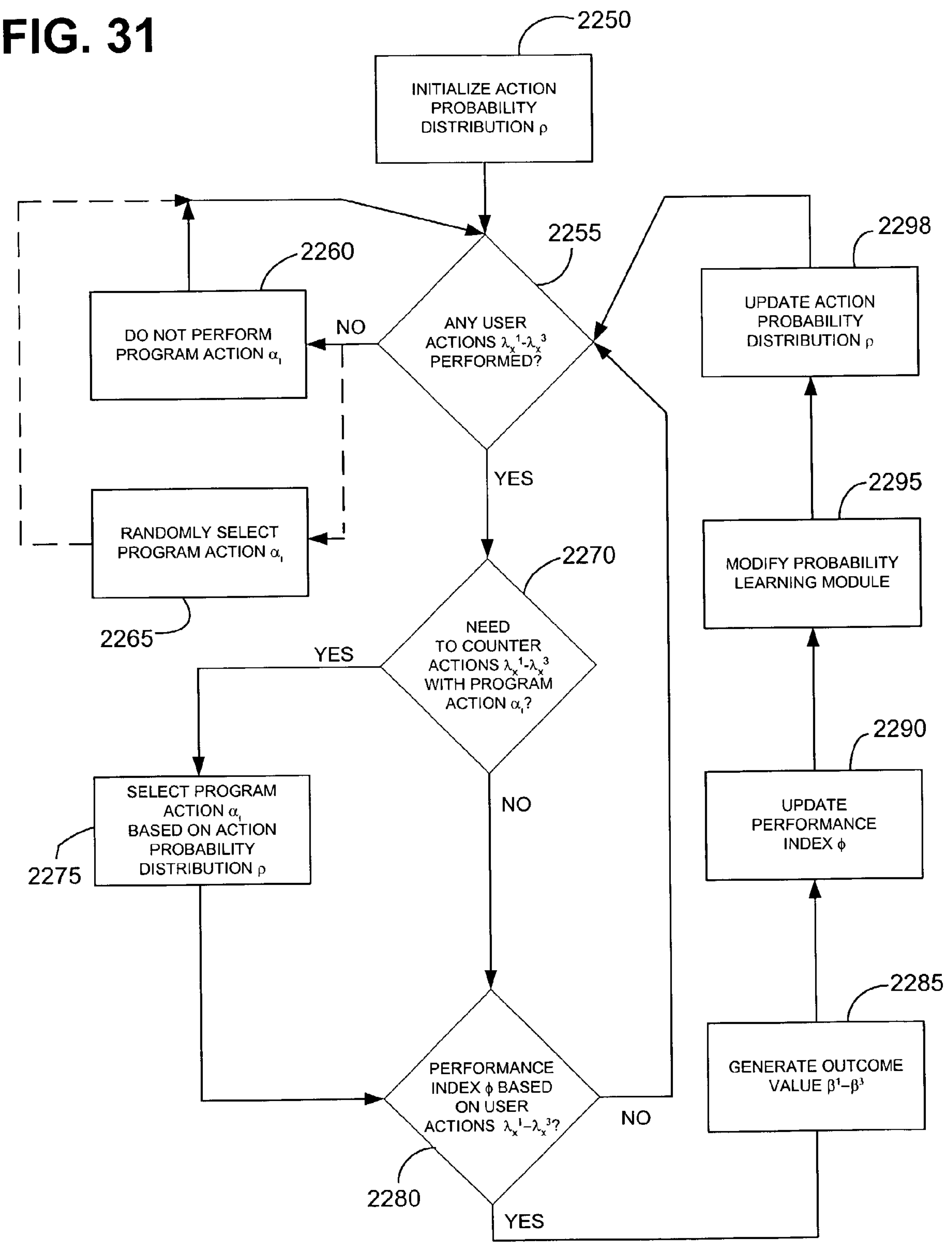
FIG. 31 is a flow diagram a preferred method performed by the program of FIG. 30.

The various different types of learning methodologies previously described herein can be applied to the probabilistic learning module 2210. The operation of the program 2200 is similar to that of the program 100 described with respect to FIG. 4, with the exception that the program 2200 takes into account all of the selected user actions $\lambda_x^1$-$\lambda_x^3$ when performing the steps. Specifically, referring to FIG. 31, the probability update module 2220 initializes the game move probability distributions (step 2250) similarly to that described with respect to step 150 of FIG. 4. The action selection module 2225 then determines if one or more of the user actions $\lambda_x^1\lambda_x^3$ have been selected from the respective user action sets $\lambda^1$-$\lambda^3$ (step 2255). If not, the program 2200 does not select a processor action $\alpha_i$ from the processor action set $\alpha$ (step 2260), or alternatively selects a processor action $\alpha_i$, e.g., randomly, notwithstanding that none of the user actions $\lambda_x^1$-$\lambda_x^3$ has been selected (step 2265), and then returns to step 2255 where it again determines if one or more of the user actions $\lambda_x^1$-$\lambda_x^3$ have been selected. If one or more of the user actions $\lambda_x^1$-$\lambda_x^3$ have been performed at step 2255, the action selection module 2225 determines the nature of the selected ones of the user actions $\lambda_x^1$-$\lambda_x^3$.

Specifically, the action selection module 2225 determines whether any of the selected ones of the user actions $\lambda_x^1$-$\lambda_x^3$ are of the type that should be countered with a processor action $\alpha_i$ (step 2270). If so, the action selection module 2225 selects a processor action $\alpha_i$ from the processor action set $\alpha$ based on the game move probability distribution p (step 2275). After the performance of step 2275 or if the action selection module 2225 determines that none of the selected user actions $\lambda_x^1$-$\lambda_x^3$ is of the type that should be countered with a processor action $\alpha_i$, the action selection module 2225 determines if any of the selected user actions $\lambda_x^1$-$\lambda_x^3$ are of the type that the performance index $\phi$ is based on (step 2280).

If not, the program returns to step 2255 to determine again whether any of the user actions $\lambda_x^1$-$\lambda_x^3$ have been selected. If so, the outcome evaluation module 2230 quantifies the performance of the previously selected processor action $\alpha_i$ relative to the currently selected user actions $\lambda_x^1$-$\lambda_x^3$ by generating outcome values $\beta^1$-$\beta^3$ (step 2285). The intuition module 2215 then updates the performance index $\phi$ based on the outcome values $\beta^1$-$\beta^3$, unless the performance index $\phi$ is an instantaneous performance index that is represented by the outcome values $\beta^1$-$\beta^3$ themselves (step 2290), and modifies the probabilistic learning module 2210 by modifying the functionalities of the probability update module 2220, action selection module 2225, or outcome evaluation module 2230 (step 2295). The probability update module 2220 then, using any of the updating techniques described herein, updates the game move probability distribution p based on the generated outcome values $\beta^1$-$\beta^3$ (step 2298).

The program 2200 then returns to step 2255 to determine again whether any of the user actions $\lambda_x^1$-$\lambda_x^3$ have been selected. It should be noted that the order of the steps described in FIG. 31 may vary depending on the specific application of the program 2200.

Multi-Player Game Program (Single Game Move-Multiple Player Moves)

Figure 32:
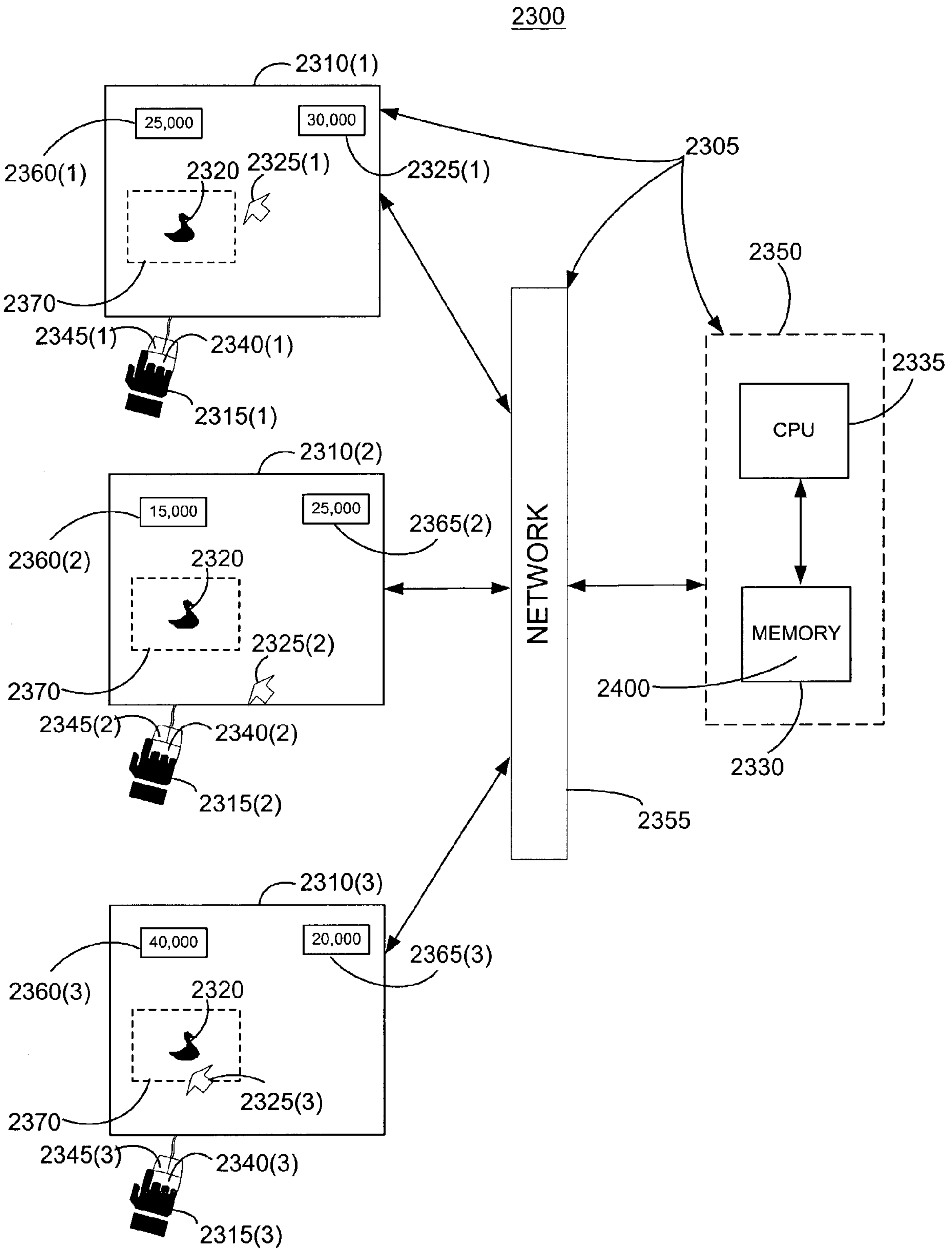
FIG. 32 is a block diagram of a multiple-player duck hunting game to which the generalized program of FIG. 30 can be applied, wherein the players simultaneously receive a single game move.

Having now generally described the components and functionality of the learning program 2200, we now describe one of its various applications. Referring to FIG. 32, a multiple-player game program 2400 (shown in FIG. 33) developed in accordance with the present inventions is described in the context of a duck hunting game 2300. The game 2300 comprises a computer system 2305, which can be used in an Internet-type scenario. The computer system 2305 includes multiple computers 2310(1)-(3), which merely act as dumb terminals or computer screens for displaying the visual elements of the game 2300 to multiple players 2315(1)-(3), and specifically, a computer animated duck 2320 and guns 2325(1)-(3), which are represented by mouse cursors. It is noted that in this embodiment, the positions and movements of the duck 2320 at any given time are identically displayed on all three of the computer screens 2315(1)-(3). Thus, in essence, each of the players 2315(1)-(3) visualize the same duck 2320 and are all playing against the same duck 2320. As previously noted with respect to the duck 220 and gun 225 of the game 200, the duck 2320 and guns 2325(1)-(3) can be broadly considered to be computer and user-manipulated objects, respectively. The computer system 2305 further comprises a server 2350, which includes memory 2330 for storing the game program 2400, and a CPU 2335 for executing the game program 2400. The server 2350 and computers 2310(1)-(3) remotely communicate with each other over a network 2355, such as the Internet. The computer system 2305 further includes computer mice 2340(1)-(3) with respective mouse buttons 2345(1)-(3), which can be respectively manipulated by the players 2315(1)-(3) to control the operation of the guns 2325(1)-(3).

It should be noted that although the game 2300 has been illustrated in a multi-computer screen environment, the game 2300 can be embodied in a single-computer screen environment similar to the computer system 205 of the game 200, with the exception that the hardware provides for multiple inputs from the multiple players 2315(1)-(3). The game 2300 can also be embodied in other multiple-input hardware environments, such as a video game console that receives video game cartridges and connects to a television screen, or a video game machine of the type typically found in video arcades.

Referring specifically to the computer screens 2310(1)-(3), the rules and objective of the duck hunting game 2300 are similar to those of the game 200. That is, the objective of the players 2315(1)-(3) is to shoot the duck 2320 by moving the guns 2325(1)-(3) towards the duck 2320, intersecting the duck 2320 with the guns 2325(1)-(3), and then firing the guns 2325(1)-(3). The objective of the duck 2320, on the other hand, is to avoid from being shot by the guns 2325(1)-(3). To this end, the duck 2320 is surrounded by a gun detection region 2370, the breach of which by any of the guns 2325(1)-(3) prompts the duck 2320 to select and make one of previously described seventeen moves. The game 2300 maintains respective scores 2360(1)-(3) for the players 2315(1)-(3) and scores 2365(1)-(3) for the duck 2320. To this end, if any one of the players 2315(1)-(3) shoots the duck 2320 by clicking the corresponding one of the mouse buttons 2345(1)-(3) while the corresponding one of the guns 2325(1)-(3) coincides with the duck 2320, the corresponding one of the player scores 2360(1)-(3) is increased. In contrast, if any one of the players 2315(1)-(3) fails to shoot the duck 2320 by clicking the corresponding one of the mouse buttons 2345(1)-(3) while the corresponding one of the guns 2325(1)-(3) does not coincide with the duck 2320, the corresponding one of the duck scores 2365(1)-(3) is increased. As previously discussed with respect to the game 200, the increase in the score can be fixed, one of a multitude of discrete values, or a value within a continuous range of values. It should be noted that although the players 2315(1)-(3) have been described as individually playing against the duck 2320, such that the players 2315(1)-(3) have their own individual scores 2360(1)-(3) with corresponding individual duck scores 2365(1)-(3), the game 2300 can be modified, so that the players 2315(1)-(3) can play against the duck 2320 as a team, such that there is only one player score and one duck score that is identically displayed on all three computers 760(1)-(3).

As will be described in further detail below, the game 2300 increases its skill level by learning the players' 2315(1)-(3) strategy and selecting the duck's 2320 moves based thereon, such that it becomes more difficult to shoot the duck 2320 as the players 2315(1)-(3) become more skillful. The game 2300 seeks to sustain the players' 2315(1)-(3) interest by collectively challenging the players 2315(1)-(3). To this end, the game 2300 continuously and dynamically matches its skill level with that of the players 2315(1)-(3) by selecting the duck's 2320 moves based on objective criteria, such as, e.g., the difference between a function of the player scores 2360(1)-(3) (e.g., the average) and a function (e.g., the average) of the duck scores 2365(1)-(3). In other words, the game 2300 uses this score difference as a performance index $\phi$ in measuring its performance in relation to its objective of matching its skill level with that of the game players. Alternatively, the performance index $\phi$ can be a function of the game move probability distribution p.

Figure 33:
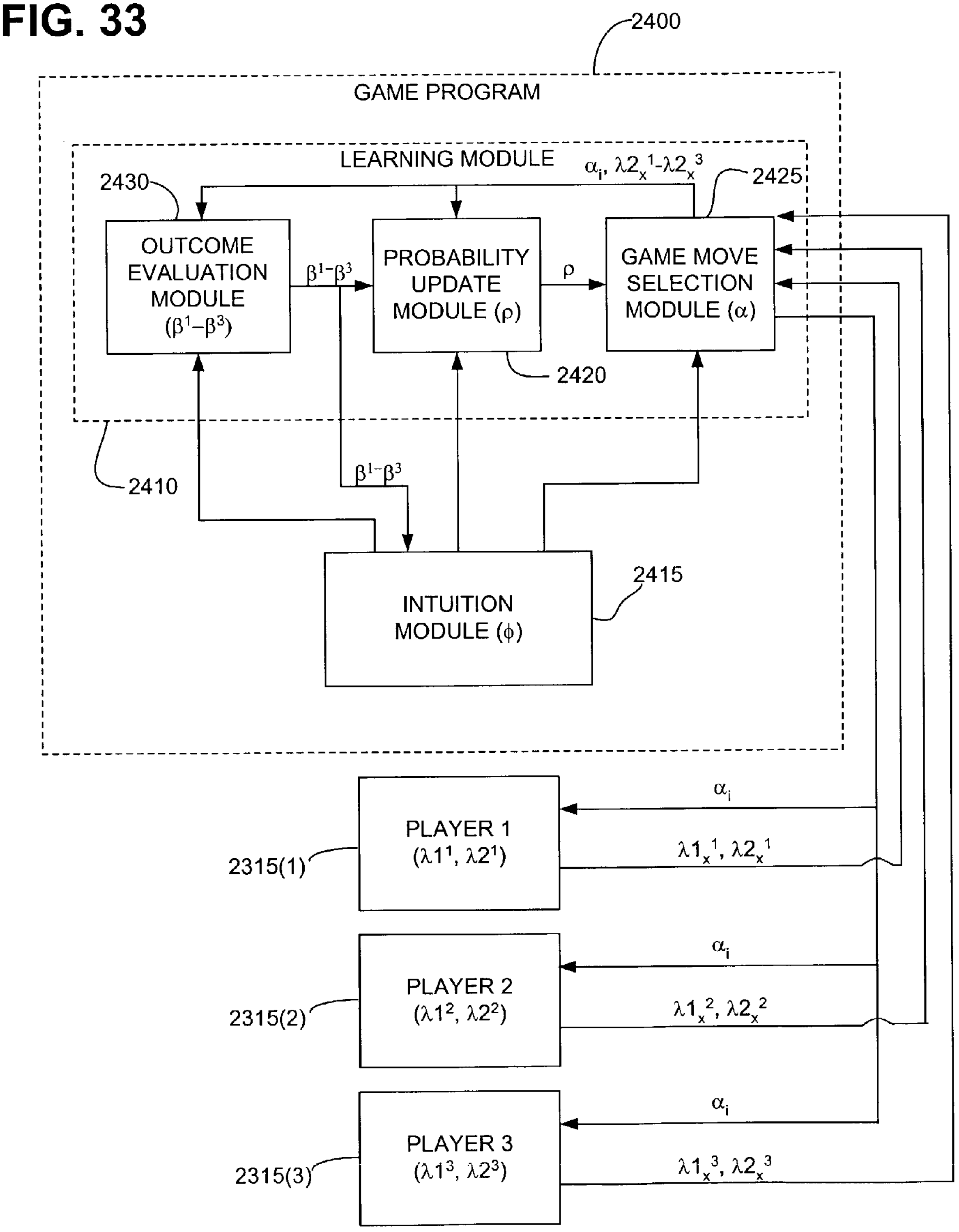
FIG. 33 is a block diagram of a multiple-player game program employed in the duck hunting game of FIG. 32.

Referring further to FIG. 33, the game program 2400 generally includes a probabilistic learning module 2410 and an intuition module 2415, which are specifically tailored for the game 2300. The probabilistic learning module 2410 comprises a probability update module 2420, a game move selection module 2425, and an outcome evaluation module 2430. Specifically, the probability update module 2420 is mainly responsible for learning the players' 2315(1)-(3) strategy and formulating a counterstrategy based thereon, with the outcome evaluation module 2430 being responsible for evaluating game moves performed by the game 2300 relative to game moves performed by the players 2315(1)-(3). The game move selection module 2425 is mainly responsible for using the updated counterstrategy to move the duck 2320 in response to moves by the guns 2325(1)-(3). The intuition module 2415 is responsible for directing the learning of the game program 2400 towards the objective, and specifically, dynamically and continuously matching the skill level of the game 2300 with that of the players 2315(1)-(3). In this case, the intuition module 2415 operates on the game move selection module 2425, and specifically selects the methodology that the game move selection module 2425 will use to select a game move $\alpha_i$ from the game move set $\alpha$ as will be discussed in further detail below. In the preferred embodiment, the intuition module 2415 can be considered deterministic in that it is purely rule-based. Alternatively, however, the intuition module 2415 can take on a probabilistic nature, and can thus be quasi-deterministic or entirely probabilistic.

To this end, the game move selection module 2425 is configured to receive player moves $\lambda 1_i^1$-$\lambda 1_i^3$ from the players 2315(1)-(3), which takes the form of mouse 2340(1)-(3) positions, i.e., the positions of the guns 2325(1)-(3) at any given time. Based on this, the game move selection module 2425 detects whether any one of the guns 2325(1)-(3) is within the detection region 2370, and if so, selects the game move $\alpha_i$ from the game move set $\alpha$ and specifically, one of the seventeen moves that the duck 2320 will make.

Like with the game program 300, the game move selection module 2425 selects the game move $\alpha_i$ based on the updated game strategy, and is thus, further configured to receive the game move probability distribution p from the probability update module 2420, and pseudo-randomly selecting the game move $\alpha_i$ based thereon. The intuition module 2415 is configured to modify the functionality of the game move selection module 2425 based on the performance index $\phi$, and in this case, the current skill levels of the players 2315(1)-(3) relative to the current skill level of the game 2300. In the preferred embodiment, the performance index $\phi$ is quantified in terms of the score difference value $\Delta$ between the average of the player scores 2360(1)-(3) and the duck scores 2365(1)-(3). Although in this case the player scores 2360(1)-(3) equally affect the performance index $\phi$ in an incremental manner, it should be noted that the effect that these scores have on the performance index $\phi$ may be weighted differently. In the manner described above with respect to game 200, the intuition module 2415 is configured to modify the functionality of the game move selection module 2425 by subdividing the game move set $\alpha$ into a plurality of game move subsets $\alpha_s$, selecting one of the game move subsets $\alpha_s$ based on the score difference value $\Delta$ (or alternatively, based on a series of previous determined outcome values $\beta^1$-$\beta^3$ or equivalent or some other parameter indicative of the performance index $\phi$). The game move selection module 2425 is configured to pseudo-randomly select a single game move a from the selected game move subset $\alpha_s$.

The game move selection module 2425 is further configured to receive player moves $\lambda 2_x^1$-$\lambda 2_x^3$ from the players 2315(1)-(3) in the form of mouse button 2345(1)-(3) click/mouse 2340(1)-(3) position combinations, which indicate the positions of the guns 2325(1)-(3) when they are fired. The outcome evaluation module 2430 is further configured to determine and output outcome values $\beta^1$-$\beta^3$ that indicate how favorable the selected game move $\alpha_i$ in comparison with the received player moves $\lambda 2_x^1$-$\lambda 2_x^3$ is, respectively.

As previously described with respect to the game 200, the outcome evaluation module 2430 employs a collision detection technique to determine whether the duck's 2320 last move was successful in avoiding the gunshots, with each of the outcome values $\beta^1$-$\beta^3$ equaling one of two predetermined values, e.g., "1" if a collision is not detected (i.e., the duck 2320 is not shot), and "0" if a collision is detected (i.e., the duck 2320 is shot), or alternatively, one of a range of finite integers or real numbers, or one of a range of continuous values.

The probability update module 2420 is configured to receive the outcome values $\beta^1$-$\beta^3$ from the outcome evaluation module 2430 and output an updated game strategy (represented by game move probability distribution p) that the duck 2320 will use to counteract the players' 2315(1)-(3) strategy in the future. As will be described in further detail below, the game move probability distributionp is updated periodically, e.g., every second, during which each of any number of the players 2315(1)-(3) may provide a corresponding number of player moves $\lambda 2_x^1$-$\lambda 2_x^3$ In this manner, the player moves $\lambda 2_x^1$-$\lambda 2_x^3$ asynchronously performed by the players 2315(1)-(3) may be synchronized to a time period. For the purposes of the specification, a player that the probability update module 2420 takes into account when updating the game move probability distribution p at any given time is considered a participating player. It should be noted that in other types of games, where the player moves $\lambda 2_x$ need not be synchronized to a time period, such as, e.g., strategy games, the game move probability distribution p may be updated after all players have performed a player move $\lambda 2_x$.

It is noted that in the preferred embodiment, the intuition module 2415, probability update module 2420, game move selection module 2425, and evaluation module 2430 are all stored in the memory 2330 of the server 2350, in which case, player moves $\lambda 1_l^1$-$\lambda 1_l^3$, player moves $\lambda 2_x^1$-$\lambda 2_x^3$, and the selected game moves $\alpha_i$ can be transmitted between the user computers 2310(1)-(3) and the server 2350 over the network 2355.

In this case, the game program 2400 may employ the following unweighted P-type SIMO equations:

$$p_j(k+1) = p_j(k) - \frac{s(k)}{m} g_j(p(k)) + \left(1 - \frac{s(k)}{m}\right) h_j(p(k)), \text{ if } \alpha(k) \neq \alpha_i \quad [32]$$

$$p_i(k+1) = p_i(k) + \frac{s(k)}{m} \sum_{\substack{j=1 \\ j\neq i}}^{n} g_j(p(k)) - \left(1 - \frac{s(k)}{m}\right) \sum_{\substack{j=1 \\ j\neq i}}^{n} h_j(p(k)), \quad \text{if } \alpha(k) = \alpha_i \quad [33]$$

where p,(k+1), p,(k), $g_j$(p k)), $h_j$(p(k)), i, j, k, and n have been previously defined, s(k) is the number of favorable responses (rewards) obtained from the participating players for game move $\alpha_i$, and m is the number of participating players. It is noted that s(k) can be readily determined from the outcome values $\beta^1$-$\beta^3$.

As an example, if there are a total of ten players, seven of which have been determined to be participating, and if two of the participating players shoot the duck 2320 and the other five participating players miss the duck 2320, m will equal 7, and s(k) will equal 5, and thus equations [32] and [33] can be broken down to:

$$p_j(k+1) = p_j(k) - \frac{5}{7} g_j(p(k)) + \frac{2}{7} h_j(p(k)), \text{ if } \alpha(k) \neq \alpha_i \quad [32\text{-}1]$$

$$p_i(k+1) = p_i(k) + \frac{5}{7} \sum_{\substack{j=1 \\ j\neq i}}^{n} g_j(p(k)) - \frac{2}{7} \sum_{\substack{j=1 \\ j\neq i}}^{n} h_j(p(k)), \text{ if } \alpha(k) = \alpha_i \quad [33\text{-}1]$$

It should be noted that a single player may perform more than one player move $\lambda 2_x$ in a single probability distribution updating time period, and thus be counted as multiple participating players. Thus, if there are three players, more than three participating players may be considered in equation. In any event, the player move sets $\lambda 2^1$-$\lambda 2^3$ are unweighted in equation [32], and thus each player affects the game move probability distribution p equally.

If it is desired that each player affects the game move probability distribution p unequally, the player move sets $\lambda 2^1$-$\lambda 2^3$ can be weighted. For example, player moves $\lambda 2_x$ performed by expert players can be weighted higher than player moves $\lambda 2_x$ performed by more novice players, so that the more skillful players affect the game move probability distribution p more than the less skillful players. As a result, the relative skill level of the game 2300 will tend to increase even though the skill level of the novice players do not increase. On the contrary, player moves $\lambda 2_x$ performed by novice players can be weighted higher than player moves $\lambda 2_x$ performed by more expert players, so that the less skillful players affect the game move probability distribution p more than the more skillful players. As a result, the relative skill level of the game 2300 will tend not to increase even though the skill level of the expert players increase.

In this case, the game program 2400 may employ the following weighted P-type SIMO equations:

$$p_j(k+1) = p_j(k) - \left(\sum_{q=1}^{m} w^q I_{Sq}\right) g_j(p(k)) + \left(\sum_{q=1}^{m} w^q I_{Fq}\right) h_j(p(k)), \quad \text{if } \alpha(k) \neq \alpha_i \quad [34]$$

$$p_i(k+1) = p_i(k) + \left(\sum_{q=1}^{m} w^q I_{Sq}\right) \sum_{\substack{j=1 \\ j\neq i}}^{n} g_j(p(k)) - \left(\sum_{q=1}^{m} w^q I_{Fq}\right) \sum_{\substack{j=1 \\ j\neq i}}^{n} h_j(p(k)), \quad \text{if } \alpha(k) = \alpha_i \quad [35]$$

where $p_i$(k+1), $p_i$(k), $g_j$(p(k)), $h_j$(p(k)), i, j, k, and n have been previously defined, q is the ordered one of the participating players, m is the number of participating players, $w^q$ is the normalized weight of the qth participating player, $I_S^q$ is a indicator variable that indicates the occurrence of a favorable response associated with the qth participating player, where $I_S^q$ is 1 to indicate that a favorable response occurred and 0 to indicate that a favorable response did not occur, and $I_F^q$ is a variable indicating the occurrence of an unfavorable response associated with the qth participating player, where $I_F^q$ is 1 to indicate that an unfavorable response occurred and 0 to indicate that an unfavorable response did not occur. It is noted that $I_S^q$ and $I_F^q$ can be readily determined from the outcome values $\beta^1$-$\beta^3$.

As an example, consider Table 14, which sets forth exemplary participation, weighting, and outcome results of ten players given a particular game move $\alpha_i$.

TABLE 14

Exemplary Outcome Results for Ten Players in Weighted SIMO Format

| Player # | Weighting Normalized to All Players | Participating (q) | Weighting Normalized to Participating Players (w) | Outcome (S or F) |
|---|---|---|---|---|
| 1 | 0.05 | 1 | 0.077 | S |
| 2 | 0.20 | 2 | 0.307 | S |
| 3 | 0.05 | — | — | — |
| 4 | 0.10 | 3 | 0.154 | F |
| 5 | 0.10 | — | — | — |
| 6 | 0.05 | 4 | 0.077 | F |
| 7 | 0.20 | — | — | — |
| 8 | 0.10 | 5 | 0.154 | S |
| 9 | 0.10 | 6 | 0.154 | S |
| 10 | 0.05 | 7 | 0.077 | S |

In this case, $$\sum_{q=1}^{m} w^q I_{Sq} = (.077)(1) + (.307)(1) + (.154)(0) + (0.77)(0) + (.154)(1) + (.154)(1) + (.077)(1) = .769; \text{ and}$$

$$\sum_{q=1}^{m} w^q I_{Fq} = (.077)(0) + (.307)(0) + (.154)(1) + (0.77)(1) + (.154)(0) + (.154)(0) + (.077)(0) = .231;$$

and thus, equations [34] and [35] can be broken down to:

$$p_j(k+1)=p_j(k)-0.769g_j(p(k))+0.231h_j(p(k)), \text{ if } \alpha(k)\neq\alpha_x \quad [34\text{-}1]$$

$$p_i(k+1) = p_i(k) + 0.769\sum_{\substack{j=1\\ j\neq i}}^{n} g_j(p(k)) - 0.231\sum_{\substack{j=1\\ j\neq i}}^{n} h_j(p(k)), \quad \text{if } \alpha(k) = \alpha_i \quad [35\text{-}1]$$

It should be also noted that although the probability update module 2420 may update the game move probability distribution p based on a combination of players participating during a given period of time by employing equations [34]-[35], the probability update module 2420 may alternatively update the game move probability distribution p as each player participates by employing SISO equations [4] and [5]. In general, however, updating the game move probability distribution p on a player-by-player participation basis requires more processing power than updating the game move probability distribution p on a grouped player participation basis. This processing capability becomes more significant as the number of players increases.

It should also be noted that a single outcome value β can be generated in response to several player moves λ2. In this case, if less than a predetermined number of collisions are detected, or alternatively, less than a predetermined percentage of collisions are detected based on the number of player moves $\lambda 2_x$ received, the outcome evaluation module 2430 will generate an favorable outcome value Δ, e.g., "1", will be generated. In contrast, if a predetermined number of collisions or more are detected, or alternatively, a predetermined percentage of collisions or more are detected based on the number of player moves $\lambda 2_x$ received, the outcome evaluation module 2430 will generate a favorable outcome value β, e.g., "0." As will be described in further detail below, a P-type Maximum Probability of Majority Approval (MPMA) SISO equation can be used in this case. Optionally, the extent of the collision or the players that perform the player moves $\lambda 2_x$ can be weighted. For example, shots to the head may be weighted higher than shots to the abdomen, or stronger players may be weighted higher than weaker players. Q-type or S-type equations can be used, in which case, the outcome value β may be a value between "0" and "1".

Figure 34:
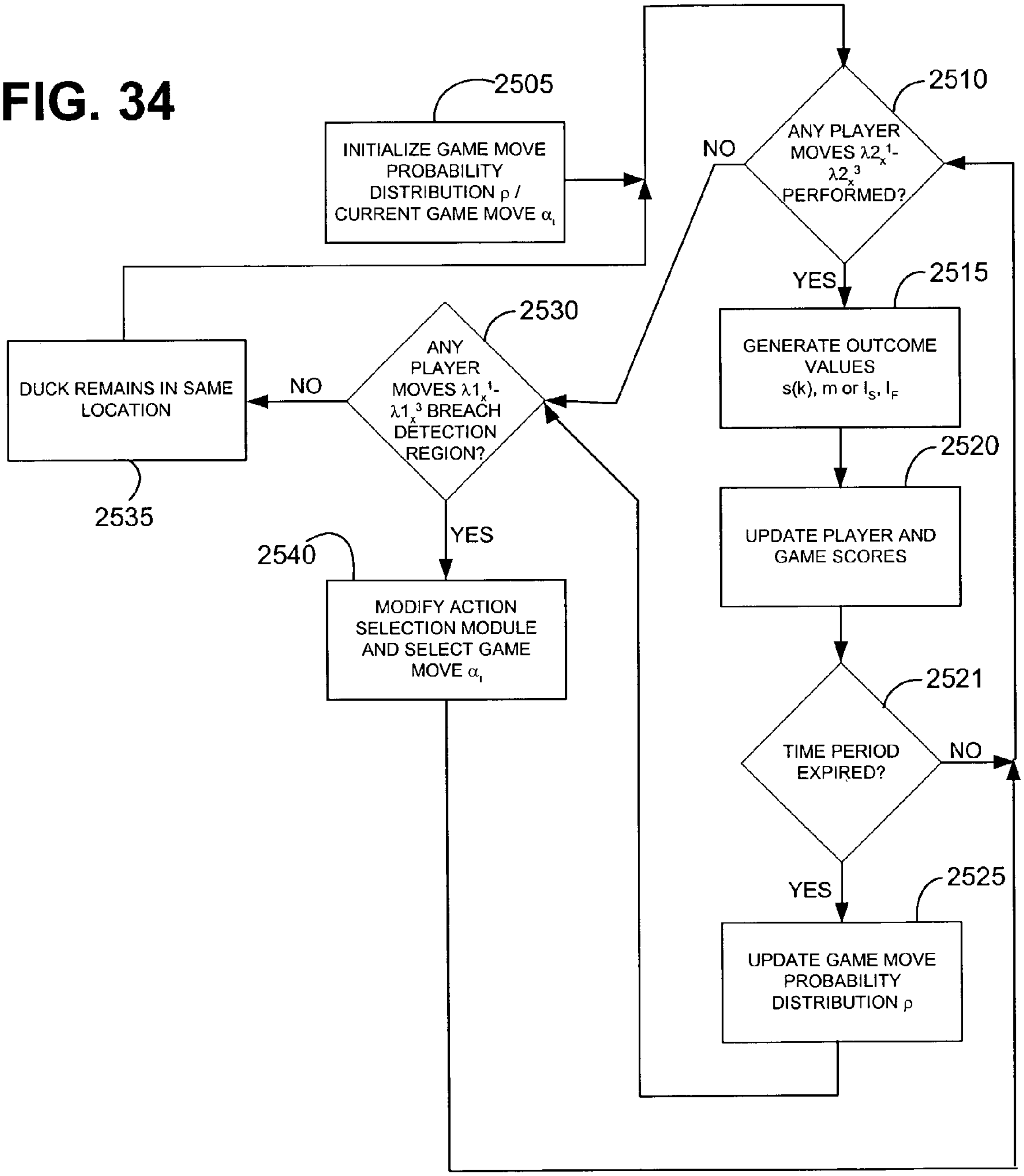
FIG. 34 is a flow diagram illustrating a preferred method performed by the game program of FIG. 33.

Having now described the structure of the game program 2400, the steps performed by the game program 2400 will be described with reference to FIG. 34. First, the probability update module 2420 initializes the game move probability distribution p and current game move $\alpha_l$ (step 2505) similarly to that described in step 405 of FIG. 9. Then, the game move selection module 2425 determines whether any of the player moves $\lambda 2_x^1$-$\lambda 2_x^3$ have been performed, and specifically whether the guns 2325(1)-(3) have been fired (step 2510). If any of the player moves $\lambda 2_x^1$-$\lambda 2_x^3$ have been performed, the outcome evaluation module 2430 generates the corresponding outcome values $\beta^1$-$\beta^3$, as represented by s(k) and m values (unweighted case) or $I_S^q$ and $I_F^q$ occurrences (weighted case), for the performed ones of the player moves $\lambda 2_x^1$-$\lambda 2_x^3$ (step 2515), and the intuition module 2415 then updates the corresponding player scores 2360(1)-(3) and duck scores 2365(1)-(3) based on the corresponding outcome values $\beta^1$-$\beta^3$ (step 2520), similarly to that described in steps 415 and 420 of FIG. 9. The intuition module 2415 then determines if the given time period to which the player moves $\lambda 2_x^1$-$\lambda 2_x^3$ are synchronized has expired (step 2521). If the time period has not expired, the game program 2400 will return to step 2510 where the game move selection module 2425 determines again if any of the player moves $\lambda 2_x^1$-$\lambda 2_x^3$ have been performed. If the time period has expired, the probability update module 2420 then, using the unweighted SIMO equations [32] and [33] or the weighted SIMO equations [34] and [35], updates the game move probability distributions based on the generated outcome values $\beta^1$-$\beta^3$ (step 2525). Alternatively, rather than synchronize the asynchronous performance of the player moves $\lambda 2_x^1$-$\lambda 2_x^3$ to the time period at step 921, the probability update module 2420 can update the game move probability distribution p after each of the asynchronous player moves $\lambda 2_x^1$-$\lambda 2_x^3$ is performed using any of the techniques described with respect to the game program 300. Also, it should be noted that if a single outcome value β is to be generated for a group of player moves $\lambda 2_x^1$-$\lambda 2_x^3$, outcome values $\beta^1$-$\beta^3$ are not generated at step 252 rather the single outcome value β is generated only after the time period has expired at step 2521, and then the game move probability distribution p is updated at step 2525.

After step 2525, or if none of the player moves $\lambda 2_x^1$-$\lambda 2_x^3$ has been performed at step 2510, the game move selection module 2425 determines if any of the player moves $\lambda 1_l^1$-$\lambda 1_l^3$ have been performed, i.e., guns 2325(1)-(3), have breached the gun detection region 270 (step 2530). If none of the guns 2325(1)-(3) has breached the gun detection region 270, the game move selection module 2425 does not select a game move $\alpha_l$ from the game move set $\alpha$ and the duck 2320 remains in the same location (step 2535). Alternatively, the game move $\alpha_l$ may be randomly selected, allowing the duck 2320 to dynamically wander. The game program 2400 then returns to step 2510 where it is again determined if any of the player moves $\lambda 1_l^1$-$\lambda 1_l^3$ has been performed. If any of the guns 2325(1)-(3) have breached the gun detection region 270 at step 2530, the intuition module 2415 modifies the functionality of the game move selection module 2425 based on the performance index $\phi$, and the game move selection module 2425 selects a game move $\alpha_l$ from the game move a in the manner previously described with respect to steps 440-470 of FIG. 9 (step 2540).

Figure 10:
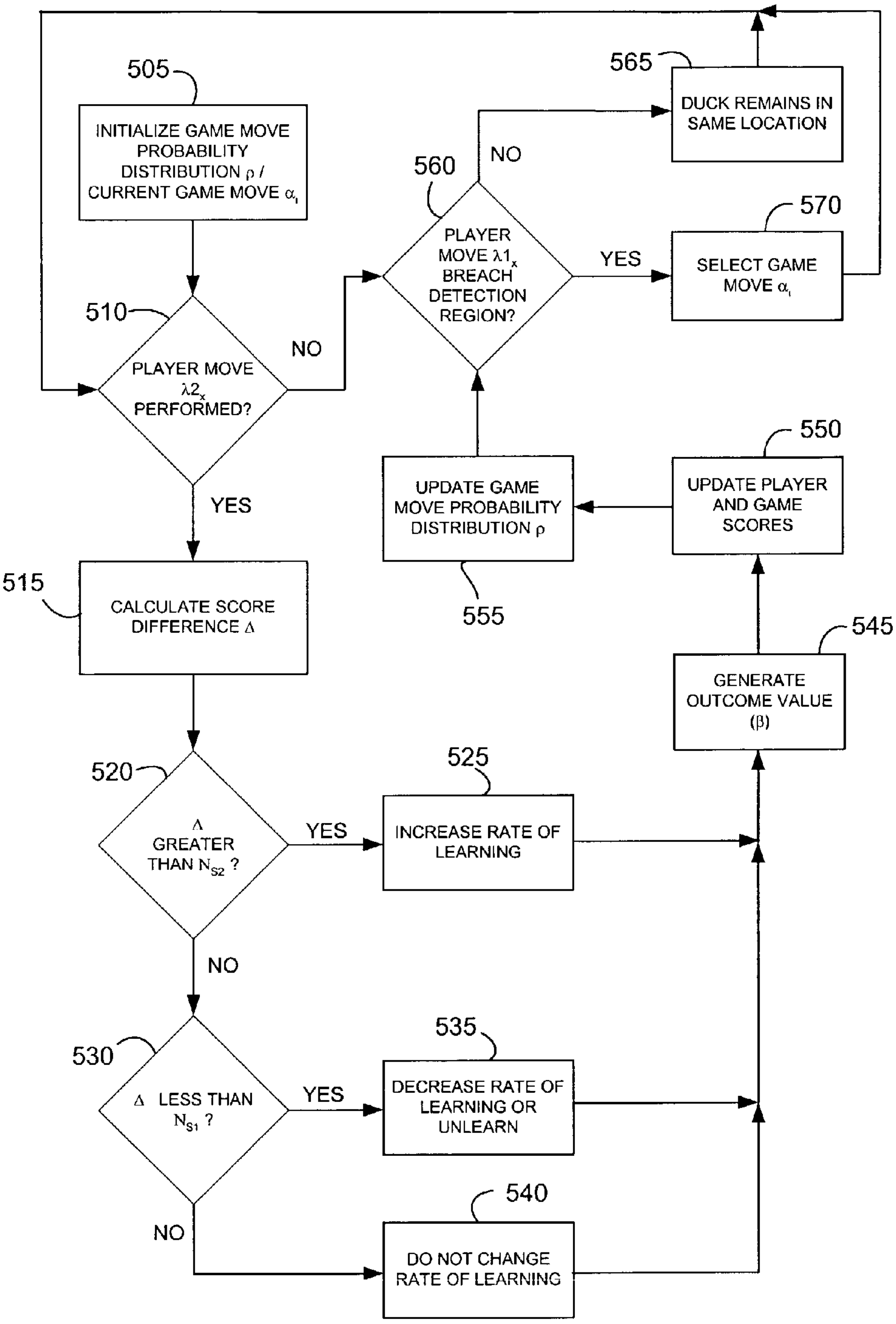
FIG. 10 is a flow diagram illustrating an alternative preferred method performed by the game program of FIG. 8.

It should be noted that, rather than use the game move subset selection technique, other afore-described techniques used to dynamically and continuously match the skill level of the players 2315(1)-(3) with the skill level of the game 2300, such as that illustrated in FIG. 10, can be alternatively or optionally be used as well in the game program 2400.

Generalized Multi-User Learning Program (Multiple Processor Actions-Multiple User Actions)

Figure 35:
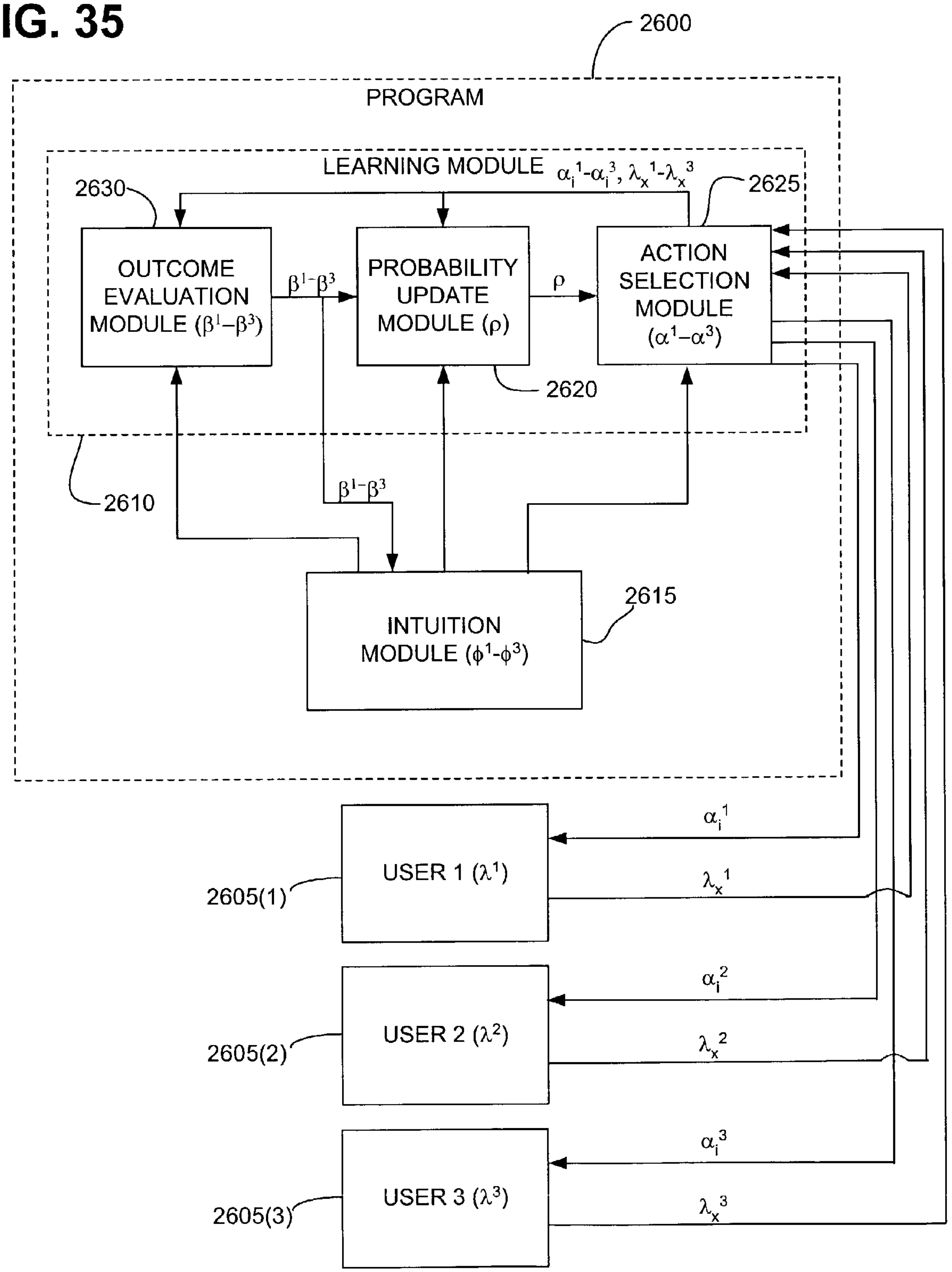
FIG. 35 is a block diagram of another generalized multiple-user learning software program constructed in accordance with the present inventions, wherein a multiple-input, multiple-output (MIMO) learning model is assumed.

Referring to FIG. 35, another multi-user learning program 2600 developed in accordance with the present inventions can be generally implemented to provide intuitive learning capability to any variety of processing devices. In this embodiment, multiple users 2605(1)-(3) (here, three) interact with the program 2600 by respectively receiving processor actions $\alpha_l^1$-$\alpha_l^3$ from respective processor action subsets $\alpha^1$-$\alpha^3$ within the program 2600, each independently selecting corresponding user actions $\lambda_x^1$-$\lambda_x^3$ from respective user action sets $\lambda^1$-$\lambda^3$ based on the received processor actions $\alpha_l^1$-$\alpha_l^3$ (i.e., user 2605(1) selects a user action $\lambda_x^1$ from the user action set $\lambda^1$ based on the received processor action $\alpha_l^2$, user 2605(2) selects a user action $\lambda_x^2$ from the user action set $\lambda^2$ based on the received processor action $\alpha_l^2$, and user 2605(3) selects a user action $\lambda_x^3$ from the user action set $\lambda^3$ based on the received processor action $\alpha_l^3$), and transmitting the selected user actions $\lambda_x^1$-$\lambda_x^3$ to the program 2600. Again, in alternative embodiments, the users 2605 need not receive the processor actions $\alpha_l^1$-$\alpha_l^3$, the selected user actions $\lambda_x^1$-$\lambda_x^3$ based on the received processor actions $\alpha_l^1$-$\alpha_{l3}$, and/or the processor actions $\alpha_l^1$-$\alpha_l^3$ may b selected in response to the selected user actions $\lambda_x^1$-$\lambda_x^3$. The significance is that processor actions $\alpha_l^1$-$\alpha_l^3$ and user actions $\lambda_x^1$-$\lambda_x^3$ are selected.

It should be noted that the multi-user learning program 2600 differs from the multi-user learning program 2200 in that the multiple users 2605(1)-(3) can receive multiple processor actions $\alpha_l^1$-$\alpha_l^3$ from the program 2600 at any given instance, all of which may be different, whereas the multiple users 2205(1)-(3) all receive a single processor action $\alpha_l$ from the program 2200. It should also be noted that the number and nature of the processor actions may vary or be the same within the processor action sets $\alpha^1$, $\alpha^2$, and $\alpha^3$ themselves. The program 2600 is capable of learning based on the measured performance (e.g., success or failure) of the selected processor actions $\alpha_l^1$-$\alpha_l^3$ relative to selected user actions $\lambda_x^1$-$\lambda_x^3$ which, for the purp specification, can be measured as outcome values $\beta^1$-$\beta^3$. As will be described in further detail below, program 2600 directs its learning capability by dynamically modifying the model that it uses to learn based on performance indexes $\phi^1$-$\phi^3$ to achieve one or more objectives.

To this end, the program 2600 generally includes a probabilistic learning module 2610 and an intuition module 2615. The probabilistic learning module 2610 includes a probability update module 2620, an action selection module 2625, and an outcome evaluation module 2630. Briefly, the probability update module 2620 uses learning automata theory as its learning mechanism, and is configured to generate and update an action probability distribution p based on the outcome values $\beta^1$-$\beta^3$. In this scenario, the probability update module 2620 uses a single stochastic learning automaton with multiple inputs to a multi-teacher environment (with the users 2605(1)-(3) as the teachers), and thus, a multiple-input, multiple-output (MIMO) model is assumed. Exemplary equations that can be used for the MIMO model will be described in further detail below.

In essence, as with the program 2200, the program 2600 collectively learns from the users 2605(1)-(3) notwithstanding that the users 2605(1)-(3) provide independent user actions user actions $\lambda_x^1$-$\lambda_x^3$. The action selection module 2625 is configured to select the processor actions $\alpha_l^1$-$\alpha_l^3$ based on the probability values contained within the action probability distribution p internally generated and updated in the probability update module 2620. Alternatively, multiple action selection modules 2625 or multiple portions of the action selection module 2625 may be used to respectively select the processor actions $\alpha_l^1$-$\alpha_l^3$. The outcome evaluation module 2630 is configured to determine and generate the outcome values $\beta^1$-$\beta^3$ based on the respective relationship between the selected processor actions $\alpha_l^1$-$\alpha_l^3$ and user actions $\lambda_x^1$-$\lambda_x^3$. The intuition module 2615 modifies the probabilistic learning module 2610 (e.g., selecting or modifying parameters of algorithms used in learning module 2610) based on the generated performance indexes $\phi^1$-$\phi^3$ to achieve one or more objectives. Alternatively, a single performance index $\phi$ can be used. As previously described, the performance indexes $\phi^1$-$\phi^3$ can be generated directly from the outcome values $\beta^1$-$\beta^3$ or from something dependent on the outcome values $\beta^1$-$\beta^3$, e.g., the action probability distributions, in which case the performance indexes $\phi^1$-$\phi^3$ may be a function of the action probability distribution p, or the action probability distribution p may be used as the performance indexes $\phi^1$-$\phi^3$.

The modification of the probabilistic learning module 2610 is generally accomplished similarly to that described with respect to the afore-described probabilistic learning module 110. That is, the functionalities of (1) the probability update module 2620 (e.g., by selecting from a plurality of algorithms used by the probability update module 2620, modifying one or more parameters within an algorithm used by the probability update module 2620, transforming or otherwise modifying the action probability distribution p); (2) the action selection module 2625 (e.g., limiting or expanding selection of the processor action $\alpha_l$ corresponding to a subset of probability values contained within the action probability distribution p); and/or (3) the outcome evaluation module 2630 (e.g., modifying the nature of the outcome values $\beta^1$-$\beta^3$ or otherwise the algorithms used to determine the outcome values $\beta^1$-$\beta^3$), are modified.

Figure 36:
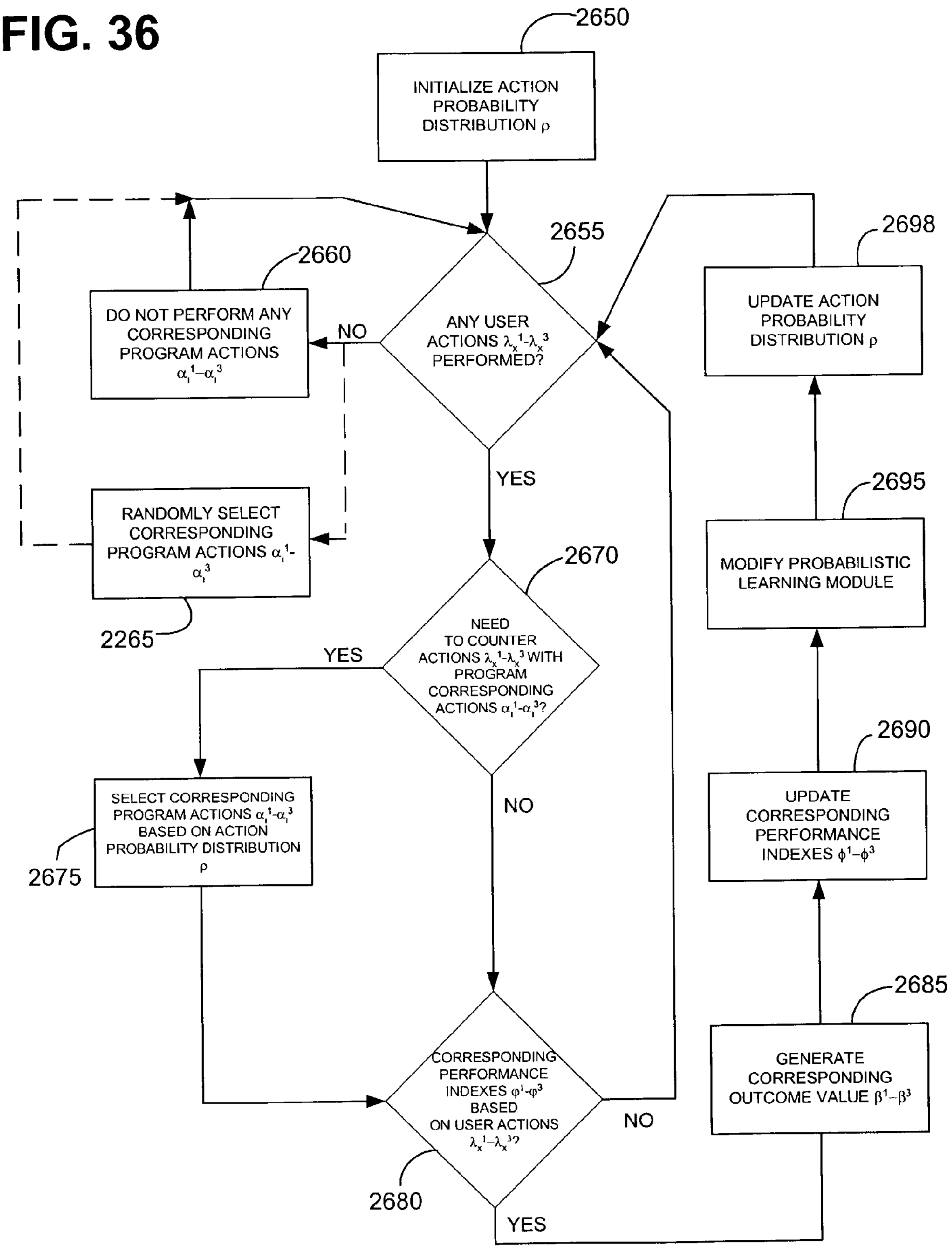
FIG. 36 is a flow diagram illustrating a preferred method performed by the program of FIG. 35.

The various different types of learning methodologies previously described herein can be applied to the probabilistic learning module 2610. The operation of the program 2600 is similar to that of the program 2200 described with respect to FIG. 31, with the exception that the program 2600 individually responds to the user actions $\lambda_x^1$-$\lambda_x^3$ with processor actions $\alpha_i^1$-$\alpha_i^3$ when performing the steps. Specifically, referring to FIG. 36, the probability update module 2620 initializes the action probability distribution p (step 2650) similarly to that described with respect to step 150 of FIG. 4. The action selection module 2625 then determines if one or more of the user actions $\lambda_x^1$-$\lambda_x^3$ have been selected from the user action sets $\lambda^1$-$\lambda^3$ (step 2655). If the program 2600 does not select processor actions $\alpha_i^1$-$\alpha_i^3$ from the respective processor action sets $\alpha^1$-$\alpha^3$ (step 2660), or alternatively selects processor actions $\alpha_i^1$-$\alpha_i^3$, e.g., randomly, notwithstanding that none of the user actions $\lambda_x^1$-$\lambda_x^3$ has been selected (step 2665), and then returns to step 2655 where it again determines if one or more of the user actions $\lambda_x^1$-$\lambda_x^3$ have been selected. If one or more of the user actions $\lambda_x^1$-$\lambda_x^3$ have been selected at step 2655, the action selection module 2625 determines the nature of the selected ones of the user actions $\lambda_x^1$-$\lambda_x^3$.

Specifically, the action selection module 2625 determines whether any of the selected ones of the user actions $\lambda_x^1$-$\lambda_x^3$ are of the type that should be countered with the corresponding ones of the processor actions $\alpha_i^1$-$\alpha_i^3$ (step 2670). If so, the action selection module 2625 selects the processor action $\alpha_i$ from the corresponding processor action sets $\alpha^1$-$\alpha^3$ based on the action probability distribution p (step 2675). Thus, if user action $\lambda^1$ was selected and is of the type that should be countered with a processor action $\alpha_i$, a processor action $\alpha_i^1$ will be selected from the processor action set $\alpha^1$. If user action $\lambda^2$ was selected and is of the type that should be countered with a processor action $\alpha_i$, a processor action $\alpha_i^2$ will be selected from the processor action set $\alpha^2$. If user action $\lambda^3$ was selected and is of the type that should be countered with a processor action $\alpha_i$, a processor action $\alpha_i^3$ will be selected from the processor action set $\alpha^3$. After the performance of step 2675 or if the action selection module 2625 determines that none of the selected user actions $\lambda_x^1$-$\lambda_x^3$ are of the type that should be countered with a processor action $\alpha_i$, the action selection module 2625 determines if any of the selected user actions $\lambda_x^1$-$\lambda_x^3$ are of the type that the performance indexes $\phi^1$-$\phi^3$ are based on (step 2680).

If not, the program 2600 returns to step 2655 to determine again whether any of the user actions $\lambda_x^1$-$\lambda_x^3$ have been selected. If so, the outcome evaluation module 2630 quantifies the performance of the previously corresponding selected processor actions $\alpha_i^1\alpha_i^3$ relative to the currently selected user actions $\lambda_x^1$-$\lambda_x^3$, respectively, by generating outcome values $\beta^1$-$\beta^3$ (step 2685). The intuition module 2615 then updates the performance indexes $\phi^1$-$\phi^3$ based on the outcome values $\beta^1$-$\beta^3$, unless the performance indexes $\phi^1$-$\phi^3$ are instantaneous performance indexes that are represented by the outcome values $\beta^1$-$\beta_3$ themselves (step 2690), and modifies the probabilistic learning module 2610 by modifying the functionalities of the probability update module 2620, action selection module 2625, or outcome evaluation module 2630 (step 2695). The probability update module 2620 then, using any of the updating techniques described herein, updates the action probability distribution p based on the generated outcome values $\beta^1$-$\beta^3$ (step 2698).

The program 2600 then returns to step 2655 to determine again whether any of the user actions $\lambda_x^1$-$\lambda_x^3$ have been selected. It should be noted that the order of the steps described in FIG. 36 may vary depending on the specific application of the program 2600.

Multi-Player Game Program (Multiple Game Moves-Multiple Player Moves)

Figure 37:
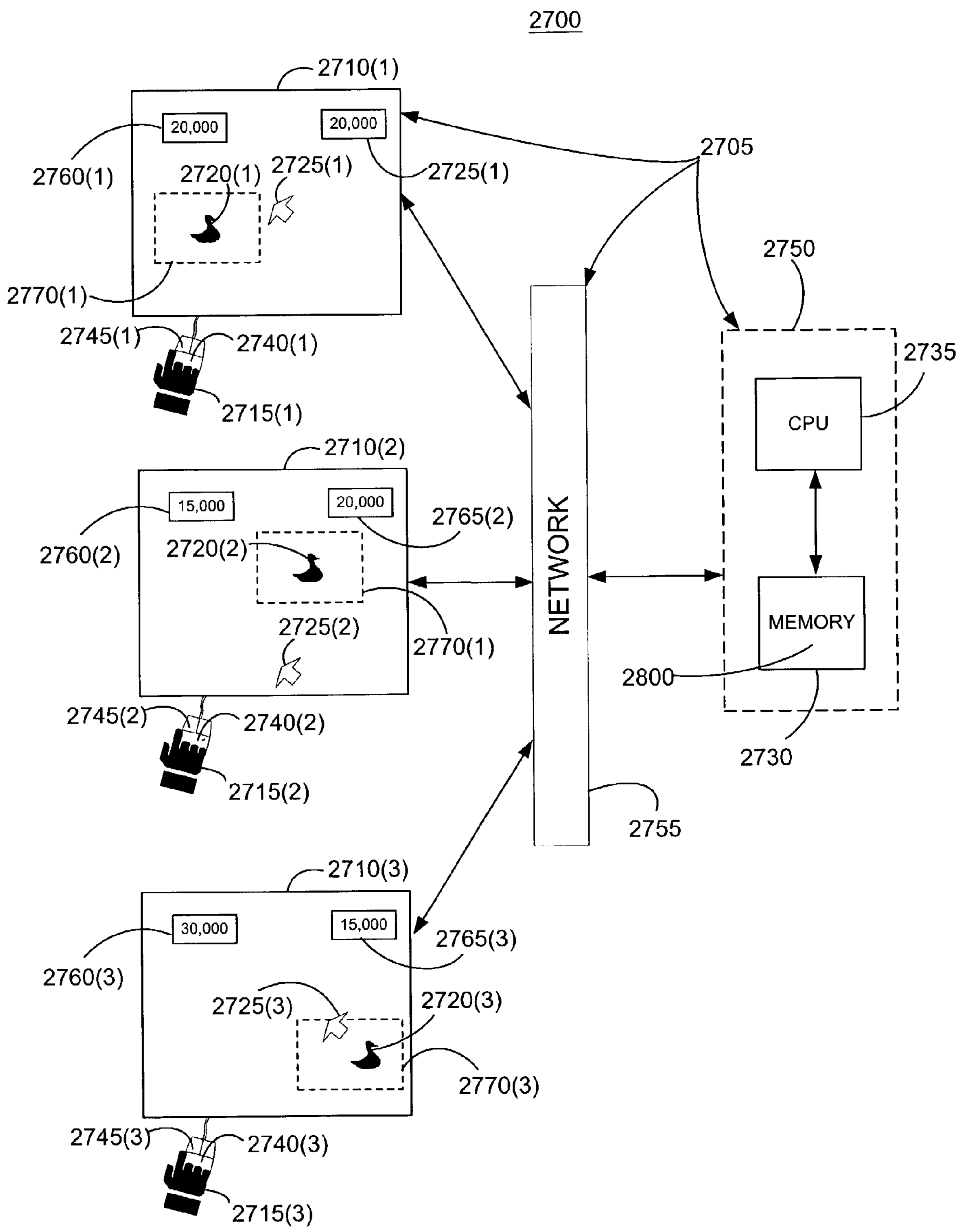
FIG. 37 is a block diagram of a multiple-player duck hunting game to which the generalized program of FIG. 35 can be applied, wherein the players simultaneously receive multiple game moves.

Having now generally described the components and functionality of the learning program 2600, we now describe one of its various applications. Referring to FIG. 37, a multiple-player game program 2800 developed in accordance with the present inventions is described in the context of a duck hunting game 2700. The game 2700 comprises a computer system 2705, which like the computer system 2305, can be used in an Internet-type scenario, and includes multiple computers 2710(1)-(3), which display the visual elements of the game 2700 to multiple players 2715(1)-(3), and specifically, different computer animated ducks 2720(1)-(3) and guns 2725(1)-(3), which are represented by mouse cursors. It is noted that in this embodiment, the positions and movements of the corresponding ducks 2720(1)-(3) and guns 2725(1)-(3) at any given time are individually displayed on the corresponding computer screens 2715(1)-(3). Thus, in essence, as compared to the game 2300 where each of the players 2315(1)-(3) visualizes the same duck 2320, the players 2715(1)-(3) in this embodiment visualize different ducks 2720(1)-(3) and the corresponding one of the guns 2725(1)-(3). That is, the player 2715(1) visualizes the duck 2720(1) and gun 2725(1), the player 2715(2) visualizes the duck 2720(2) and gun 2725(2), and the player 2715(3) visualizes the duck 2720(3) and gun 2725(3).

As previously noted with respect to the duck 220 and gun 225 of the game 200, the ducks 2720(1)-(3) and guns 2725(1)-(3) can be broadly considered to be computer and user-manipulated objects, respectively. The computer system 2715 further comprises a server 2750, which includes memory 2730 for storing the game program 2800, and a CPU 2735 for executing the game program 2800. The server 2750 and computers 2710(1)-(3) remotely communicate with each other over a network 2755, such as the Internet. The computer system 2715 further includes computer mice 2740(1)-(3) with respective mouse buttons 2745(1)-(3), which can be respectively manipulated by the players 2715(1)-(3) to control the operation of the guns 2725(1)-(3). As will be described in further detail below, the computers 2710(1)-(3) can be implemented as dumb terminals, or alternatively smart terminals to off-load some of the processing power from the server 2750.

Referring specifically to the computers 2710(1)-(3), the rules and objective of the duck hunting game 2700 are similar to those of the game 2300. That is, the objective of the players 2715(1)-(3) is to respectively shoot the ducks 2720(1)-(3) by moving the corresponding guns 2725(1)-(3) towards the ducks 2720(1)-(3), intersecting the ducks 2720(1)-(3) with the guns 2725(1)-(3), and then firing the guns 2725(1)-(3). The objective of the ducks 2720(1)-(3), on the other hand, is to avoid from being shot by the guns 2725(1)-(3). To this end, the ducks 2720(1)-(3) are surrounded by respective gun detection regions 2770(1)-(3), the respective breach of which by the guns 2725(1)-(3) prompts the ducks 2720(1)-(3) to select and make one of the previously described seventeen moves. The game 2700 maintains respective scores 2760(1)-(3) for the players 2715(1)-(3) and respective scores 2765(1)-(3) for the ducks 2720(1)-(3). To this end, if the players 2715(1)-(3) respectively shoot the ducks 2720(1)-(3) by clicking the mouse buttons 2745(1)-(3) while the corresponding guns 2725(1)-(3) coincide with the ducks 2720(1)-(3), the player scores 2760(1)-(3) are respectively increased. In contrast, if the players 2715(1)-(3) respectively fail to shoot the ducks 2720(1)-(3) by clicking the mouse buttons 2745(1)-(3) while the guns 2725(1)-(3) do not coincide with the ducks 2720(1)-(3), the duck scores 2765(1)-(3) are respectively increased. As previously discussed with respect to the game 2300, the increase in the scores can be fixed, one of a multitude of discrete values, or a value within a continuous range of values.

As will be described in further detail below, the game 2700 increases its skill level by learning the players' 2715(1)-(3) strategy and selecting the respective ducks' 2720(1)-(3) moves based thereon, such that it becomes more difficult to shoot the ducks 2720(1)-(3) as the player 2715(1)-(3) becomes more skillful. The game 2700 seeks to sustain the players' 2715(1)-(3) interest by challenging the players 2715 (1)-(3). To this end, the game 2700 continuously and dynamically matches its skill level with that of the players 2715(1)-(3) by selecting the ducks' 2720(1)-(3) moves based on objective criteria, such as, e.g., the respective differences between the player scores 2760(1)-(3) and the duck scores 2765(1)-(3). In other words, the game 2700 uses these respective score differences as performance indexes $\phi^1$-$\phi^3$ in measuring its performance in relation to its objective of matching its skill level with that of the game players.

Figure 38:
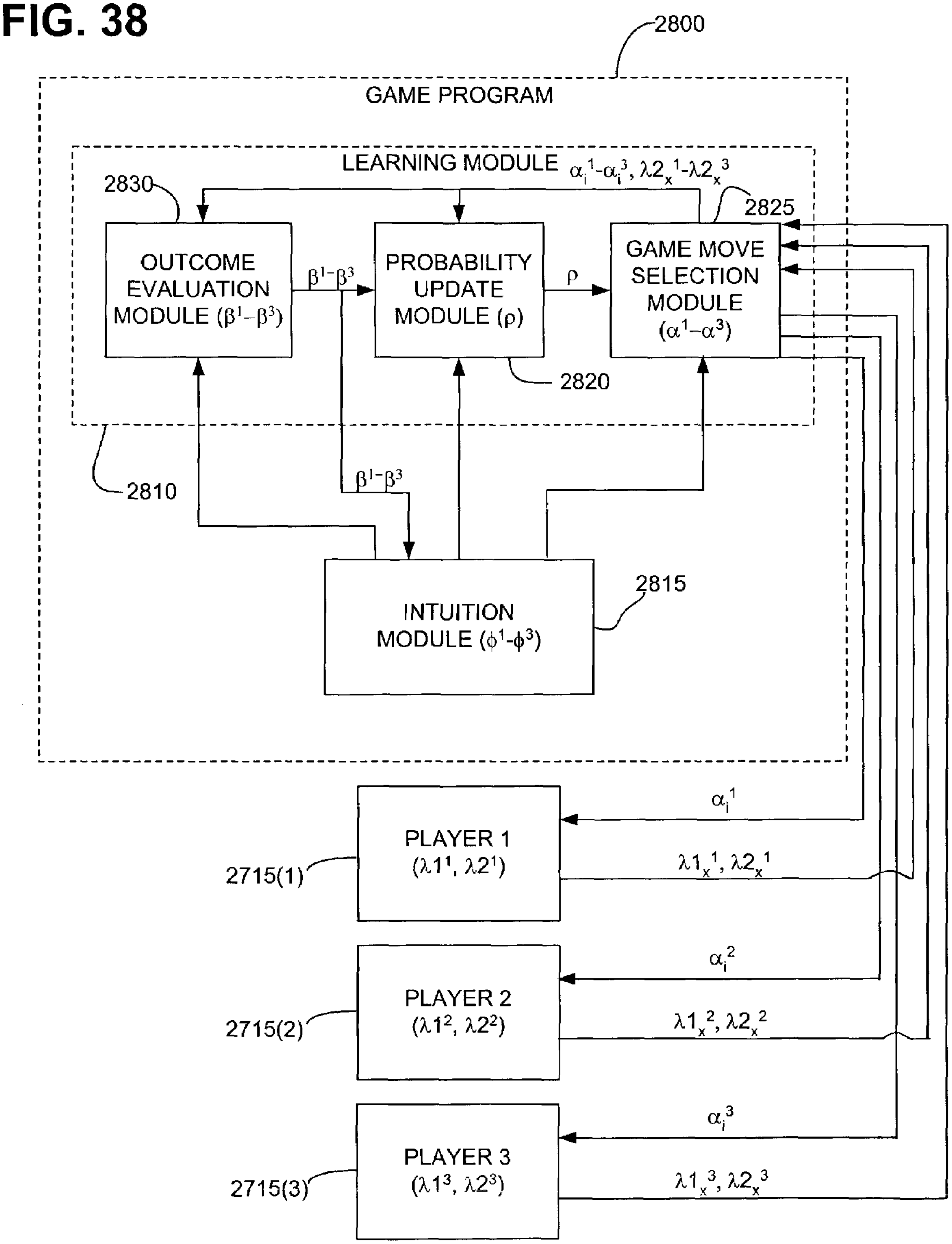
FIG. 38 is a block diagram of a multiple-player game program employed in the duck hunting game of FIG. 37.

Referring further to FIG. 38, the game program 2800 generally includes a probabilistic learning module 2810 and an intuition module 2815, which are specifically tailored for the game 2700. The probabilistic learning module 2810 comprises a probability update module 2820, a game move selection module 2825, and an outcome evaluation module 2830. Specifically, the probability update module 2820 is mainly responsible for learning the players' 2715(1)-(3) strategy and formulating a counterstrategy based thereon, with the outcome evaluation module 2830 being responsible for evaluating game moves performed by the game 2700 relative to game moves performed by the players 2715(1)-(3). The game move selection module 2825 is mainly responsible for using the updated counterstrategy to respectively move the ducks 2720 (1)-(3) in response to moves by the guns 2725(1)-(3). The intuition module 2815 is responsible for directing the learning of the game program 2800 towards the objective, and specifically, dynamically and continuously matching the skill level of the game 2700 with that of the players 2715(1)-(3). In this case, the intuition module 2815 operates on the game move selection module 2825, and specifically selects the methodology that the game move selection module 2825 will use to select game moves $\alpha_l$-$\alpha_l^3$ from the respective game move sets $\alpha^1$-$\alpha^3$, as will be discussed in further detail below. In the preferred embodiment, the intuition module 2815 can be considered deterministic in that it is purely rule-based. Alternatively, however, the intuition module 2815 can take on a probabilistic nature, and can thus be quasi-deterministic or entirely probabilistic.

To this end, the game move selection module 2825 is configured to receive player moves $\lambda1_l^1$-$\lambda1_l^3$ from the players 2715(1)-(3), which take the form of mouse 2740(1)-(3) positions, i.e., the positions of the guns 2725(1)-(3) at any given time. Based on this, the game move selection module 2825 detects whether any one of the guns 2725(1)-(3) is within the detection regions 2770(1)-(3), and if so, selects game moves $\alpha_l^1$-$\alpha_l^3$ from the respective game move sets $\alpha^1$-$\alpha^3$ and specifically, one of the seventeen moves that the ducks 2720(1)-(3) will make.

The game move selection module 2825 respectively selects the game moves $\alpha_l^1$-$\alpha_l^3$ based on the updated game strategy, and is thus, further configured to receive the game move probability distributions from the probability update module 2820, and pseudo-randomly selecting the game moves $\alpha_l^1$-$\alpha_l^3$ based thereon. The intuition module 2815 modifies the functionality of the game move selection module 2825 based on the performance indexes $\phi^1$-$\phi^3$ and in this case, the current skill levels of the players 2715(1)-(3) relative to the current skill level of the game 2700. In the preferred embodiment, the performance indexes $\phi^1$-$\phi^3$ are quantified in terms of the respective score difference values $\Delta^1$-$\Delta^3$ between the player scores 2760(1)-(3) and the duck scores 2765(1)-(3). Although in this case the player scores 2760(1)-(3) equally affect the performance indexes $\phi^1$-$\phi^3$ in an incremental manner, it should be noted that the effect that these scores have on the performance indexes $\phi^1$-$\phi^3$ may be weighted differently. In the manner described above with respect to game 200, the intuition module 2815 is configured to modify the functionality of the game move selection module 2825 by subdividing the game move set $\alpha^1$ into a plurality of game move subsets $\alpha_s^1$ and selecting one of the game move subsets $\alpha_s^1$ based on the score difference value $\Delta^1$; subdividing the game move set $\alpha^2$ into a plurality of game move subsets $\alpha_{s2}$ and selecting one of the game move subsets $\alpha_{s2}$ based on the score difference value $\Delta^2$; and subdividing the game move set $\alpha^3$ into a plurality of game move subsets $\alpha_s^3$ and selecting one of the game move subsets $\alpha_s^3$ based on the score difference value $\Delta^3$ (or alternatively, based on a series of previous determined outcome values $\beta^1$-$\beta^3$ or some other parameter indicative of the performance indexes $\phi^1$-$\phi^3$). The game move selection module 2825 is configured to pseudo-randomly select game moves $\alpha_1 l$-$a_1^3$ from the selected ones of the game move subsets $\alpha_s^1$-$\alpha_s^3$.

The game move selection module 2825 is further configured to receive player moves $\lambda2_x^1$-$\lambda2_x^3$ from the players 271 5(1)-(3) in the form of mouse button 2745(1)-(3) click/mouse 1040(1)-(3) position combinations, which indicate the positions of the guns 2725(1)-(3) when they are fired. The outcome evaluation module 2830 is further configured to determine and output outcome values $\beta^1$-$\beta^3$ that indicate how favorable the selected game move $\alpha_l^1$, $\alpha_l^2$, and $\alpha_l^3$ in comparison with the received player moves $\lambda2_x^1$-$\lambda2_x^3$ are, respectively.

As previously described with respect to the game 200, the outcome evaluation module 2830 employs a collision detection technique to determine whether the ducks' 2720(1)-(3) last moves were successful in avoiding the gunshots, with the outcome values $\beta^1$-$\beta^3$ equaling one of two predetermined values, e.g., "1" if a collision is not detected (i.e., the ducks 2720(1)-(3) are not shot), and "0" if a collision is detected (i.e., the ducks 1020(1)-(3) are shot), or alternatively, one of a range of finite integers or real numbers, or one of a range of continuous values.

The probability update module 2820 is configured to receive the outcome values $\beta^1$-$\beta^3$ from the outcome evaluation module 2830 and output an updated game strategy (represented by game move probability distribution p) that the ducks 2720(1)-(3) will use to counteract the players' 2715 (1)-(3) strategy in the future. As will be described in further detail below, the game move probability distribution p is updated periodically, e.g., every second, during which each of any number of the players 2715(1)-(3) may provide one or more player moves $\lambda2_x^1$-$\lambda2_x^3$. In this manner, the player moves $\lambda2_x^1$-$\lambda2_x^3$ asynchronously performed by the players 2715(1)-(3) may be synchronized to a time period. For the purposes of the specification, a player that the probability update module 2820 takes into account when updating the game move probability distribution p at any given time is considered a participating player.

The game program 2800 may employ the following unweighted P-type MIMO learning methodology:

$$p_i(k+1) = p_i(k) + \frac{s_i(k)}{m}\sum_{\substack{j=1\\j\neq i}}^{n} g_j(p(k)) - \frac{(r_i(k)-s_i(k))}{m}\sum_{\substack{j=1\\j\neq i}}^{n} h_j(p(k)) - \frac{\sum_{\substack{j=1\\j\neq i}}^{n} s_j(k)}{m} g_i(p(k)) + \frac{\sum_{\substack{j=1\\j\neq i}}^{n} (r_j(k)-s_j(k))}{m} h_i(p(k)) \quad [36]$$

where p,(k+1), p,(k), $g_j(p(k))$, $h_j(p(k))$, i,j, k, and n have been previously defined, $r_l(k)$ is the total number of favorable (rewards) and unfavorable responses (penalties) obtained from the participating players for game move $\alpha_l$, $s_l(k)$ is the number of favorable responses (rewards) obtained from the participating players for game move $\alpha_l$, $r_j(k)$ is the total number of favorable (rewards) and unfavorable responses (penalties) obtained from the participating players for game move $\alpha_j$, $s_j(k)$ is the number of favorable responses (rewards) obtained from the participating players for game move $\alpha_j$. It is noted that $s_l(k)$ can be readily determined from the outcome values $\beta^1$-$\beta^3$ corresponding to game moves $\alpha_l$ and $s_j(k)$ can be readily determined from the outcome values $\beta^1$-$\beta^3$ corresponding to game moves $\alpha_j$.

As an example, consider Table 15, which sets forth exemplary participation, outcome results of ten players, and game moves $\alpha_l$ to which the participating players have responded.

TABLE 15

Exemplary Outcome Results for Ten Players in Unweighted MIMO Format

| Player # | Game Move ($\alpha_1$) Responded To | Outcome (S or F) |
|---|---|---|
| 1 | $\alpha_1$ | S |
| 2 | — | — |
| 3 | $\alpha_1$ | F |
| 4 | $\alpha_{15}$ | S |
| 5 | $\alpha_2$ | S |
| 6 | — | — |
| 7 | $\alpha_2$ | S |
| 8 | $\alpha_{13}$ | F |
| 9 | $\alpha_{15}$ | F |
| 10 | $\alpha_2$ | F |

In this case, m=8, $r_1(k)=2$, $s_1(k)=1$, $r_2(k)=3$, $s_2(k)=2$, $r_{13}(k)=1$, $s_{13}(k)=0$, $r_{15}(k)=2$, $s_5(k)=1$, $r_{3\text{-}12,\ 14,\ 16\text{-}17}(k)=0$, and $r_{3\text{-}12,\ 14,\ 16\text{-}17}(k)=0$, and thus, equation [36] can be broken down to:

for game moves $\alpha_1$, $\alpha_2$, $\alpha_{13}$, $\alpha_{15}$:

$$p_1(k+1) = p_1(k) + \frac{1}{8}\sum_{\substack{j=1\\j\neq i}}^{n} g_j(p(k)) - \frac{1}{8}\sum_{\substack{j=1\\j\neq i}}^{n} h_j(p(k)) - \frac{3}{8}g_1(p(k)) + \frac{3}{8}h_1(p(k))$$

-continued $$p_2(k+1) = p_2(k) + \frac{2}{8}\sum_{\substack{j=1\\j\neq i}}^{n} g_j(p(k)) - \frac{1}{8}\sum_{\substack{j=1\\j\neq i}}^{n} h_j(p(k)) - \frac{2}{8}g_2(p(k)) + \frac{3}{8}h_2(p(k))$$

$$p_{13}(k+1) = p_{13}(k) - \frac{1}{8}\sum_{\substack{j=1\\j\neq i}}^{n} h_j(p(k)) - \frac{4}{8}g_{13}(p(k)) + \frac{3}{8}h_{13}(p(k))$$

$$p_{15}(k+1) = p_{15}(k) + \frac{1}{8}\sum_{\substack{j=1\\j\neq i}}^{n} g_j(p(k)) - \frac{1}{8}\sum_{\substack{j=1\\j\neq i}}^{n} h_j(p(k)) - \frac{3}{8}g_{15}(p(k)) + \frac{3}{8}h_{15}(p(k))$$

for game moves $\alpha_3$-$\alpha_{12}$, $\alpha_{14}$, and $\alpha_{16}$-$\alpha_{17}$:

$$p_i(k+1) = p_i(k) - \frac{4}{8}g_i(p(k)) + \frac{4}{8}h_i(p(k))$$

It should be noted that a single player may perform more than one player move $\lambda 2_x$ in a single probability distribution updating time period, and thus be counted as multiple participating players. Thus, if there are three players, more than three participating players may be considered in equation. Also, if the game move probability distribution p is only updated periodically over several instances of a player move $\lambda 2_x$, as previously discussed, multiple instances of a player moves $\lambda 2_x$ will be counted as multiple participating players. Thus, if three player moves $\lambda 2_x$ from a single player are accumulated over a period of time, these player moves $\lambda 2_x$ will be treated as if three players had each performed a single player move $\lambda 22_l$.

In any event, the player move sets $\lambda 2^1$-$\lambda 2^3$ are unweighted in equation [36], and thus each player affects the game move probability distribution p equally. As with the game program 2400, if it is desired that each player affects the game move probability distribution p unequally, the player move sets $\lambda 2^1$-$\lambda 2^3$ can be weighted. In this case, the game program 2800 may employ the following weighted P-type MIMO learning methodology:

$$p_i(k+1) = p_i(k) + \left(\sum_{q=1}^{m} w_q I_{Si}^q\right)\left(\sum_{\substack{j=1\\j\neq i}}^{n} g_j(p(k))\right) - \left(\sum_{q=1}^{m} w_q I_{Fi}^q\right)\left(\sum_{\substack{j=1\\j\neq i}}^{n} h_j(p(k))\right) - \left(\sum_{q=1}^{m}\sum_{\substack{j=1\\j\neq i}}^{n} w_q I_{Sj}^q g_i(p(k))\right) + \left(\sum_{q=1}^{m}\sum_{\substack{j=1\\j\neq i}}^{n} w_q I_{Fj}^q h_i(p(k))\right) \quad [37]$$

where p,(k+1), $p_l(k)$, $g_j(p(k))$, $h_j(p(k))$, i, j, k, and n have been previously defined, q is the ordered one of the participating players, m is the number of participating players, $w^q$ is the normalized weight of the qth participating player, $I_{six}^q$ is a variable indicating the occurrence of a favorable response associated with the qth participating player and game move $\alpha_l$, and $I_{Sj}^q$ is a variable indicating the occurrence of a favorable response associated with the qth participating player and game move $\alpha_j$, $I_{Fix}^q$ is a variable indicating the occurrence of an unfavorable response associated with the qth participating player and game move $\alpha_l$, and $I_{Fjx}^q$ is a variable indicating the occurrence of an unfavorable response associated with the qth participating player and game move $\alpha_j$. It is noted that $I_S^q$ and $I_F^q$ can be readily determined from the outcome values $\beta^1$-$\beta^3$.

As an example, consider Table 16, which sets forth exemplary participation, outcome results of ten players, weighting of players, and game moves $\alpha_l$ to which the participating players have responded.

TABLE 16

Exemplary Outcome Results for Ten Players in Weighted MIMO Format

| Player # | Weighting Normalized to All Players | Participating (q) | Game Move($\alpha_1$) Responded To | Weighting Normalized to Participating Players (w) | Outcome (S or F) |
|---|---|---|---|---|---|
| 1 | 0.05 | 1 | $\alpha_1$ | 0.067 | S |
| 2 | 0.20 | — | — | — | — |
| 3 | 0.05 | 2 | $\alpha_1$ | 0.067 | F |
| 4 | 0.10 | 3 | $\alpha_{15}$ | 0.133 | S |
| 5 | 0.10 | 4 | $\alpha_2$ | 0.133 | S |
| 6 | 0.05 | — | — | — | — |
| 7 | 0.20 | 5 | $\alpha_2$ | 0.267 | S |
| 8 | 0.10 | 6 | $\alpha_{13}$ | 0.133 | F |
| 9 | 0.10 | 7 | $\alpha_{15}$ | 0.133 | F |
| 10 | 0.05 | 8 | $\alpha_2$ | 0.067 | F |

In this case, $$\sum_{q=1}^{m} w^q I_{S_1^q} = w^1 I_{S1}^1 = (.067)(1) = 0.067;$$

$$\sum_{q=1}^{m} w^q I_{S_2^q} = w^5 I_{S2}^5 + w^7 I_{S2}^7 = (.133)(1) + (0.267)(1) = 0.400;$$

$$\sum_{q=1}^{m} w^q I_{S_{13}^q} = 0;$$

$$\sum_{q=1}^{m} w^q I_{S_{15}^q} = w^4 I_{S15}^4 = (.133)(1) = 0.133;$$

$$\sum_{q=1}^{m} w^q I_{F_1^q} = w^3 I_{F1}^3 = (.067)(1) = 0.067;$$

$$\sum_{q=1}^{m} w^q I_{F_2^q} = w^{10} I_{F2}^{10} = (.067)(1) = 0.067;$$

$$\sum_{q=1}^{m} w^q I_{F_{13}^q} = w^8 I_{F13}^8 = (.133)(1) = 0.133$$

$$\sum_{q=1}^{m} w^q I_{F_{15}^q} = w^9 I_{F15}^9 = (.133)(1) = 0.133;$$

and thus, equation [37] can be broken down to:

for game moves $\alpha_1$, $\alpha_2$, $\alpha_{13}$, $\alpha_{15}$:

$$p_1(k+1) = p_1(k) + 0.067\sum_{\substack{j=1 \\ j\neq i}}^{n} g_j(p(k)) - 0.067\sum_{\substack{j=1 \\ j\neq i}}^{n} h_j(p(k)) - 0.533 g_1(p(k)) + 0.333 h_1(p(k))$$

-continued $$p_2(k+1) = p_2(k) + 0.400\sum_{\substack{j=1 \\ j\neq i}}^{n} g_j(p(k)) - 0.067\sum_{\substack{j=1 \\ j\neq i}}^{n} h_j(p(k)) - 0.200 g_2(p(k)) + 0.333 h_2(p(k))$$

$$p_{13}(k+1) = p_{13}(k) - 0.133\sum_{\substack{j=1 \\ j\neq i}}^{n} h_j(p(k)) - 0.600 g_{13}(p(k)) + 0.267 h_{13}(p(k))$$

$$p_{15}(k+1) = p_{15}(k) + 0.133\sum_{\substack{j=1 \\ j\neq i}}^{n} g_j(p(k)) - 0.133\sum_{\substack{j=1 \\ j\neq i}}^{n} h_j(p(k)) - 0.467 g_{15}(p(k)) + 0.267 h_{15}(p(k))$$

for game moves $\alpha_3$-$\alpha_{12}$, $\alpha_{14}$, and $\alpha_{16}$-$\alpha_{17}$:

$$p_l(k+1) = p_l(k) - 0.600 g_l(p(k)) + 0.400 h_l(p(k))$$

It should be noted that the number of players and game moves $\alpha_l$ may be dynamically altered in the game program 2800. For example, the game program 2800 may eliminate weak players by learning the weakest moves of a player and reducing the game score for that player. Once a particular metric is satisfied, such as, e.g., the game score for the player reaches zero or the player loses five times in row, that player is eliminated. As another example, the game program 2800 may learn each players' weakest and strongest moves, and then add a game move $\alpha_l$ for the corresponding duck if the player executes a weak move, and eliminate a game move $\alpha_l$ for the corresponding duck if the player executes a strong move. In effect, the number of variables within the learning automaton can be increased or decreased. For this we can employ the pruning/growing (expanding) learning algorithms.

Having now described the structure of the game program 2800, the steps performed by the game program 2800 will be described with reference to FIG. 39. First, the probability update module 2820 initializes the game move probability distribution p and current player moves $\lambda 2_x^1$-$\lambda 2_x^3$, (step 2905) similarly to that described in step 405 of FIG. 9. Then, the game move selection module 2825 determines whether any of the player moves $\lambda 2_x^1$-$\lambda 2_x^3$ have been performed, and specifically whether the guns 2725(1)-(3) have been fired (step 2910). If any of the $\lambda 2_x^1$, $\lambda 2_i^2$, and $\lambda 2_x^3$ have been performed, the outcome evaluation module 2830 generates the corresponding outcome values $\beta^1$-$\beta^3$, as represented by s(k), r(k) and m values (unweighted case) or $I_S^q$ and $I_F^q$ occurrences (weighted case), for the performed ones of the player moves $\lambda 2_x^1$-$\lambda 2_x^3$ and corresponding game moves $\alpha_i^1$-$\alpha_i^3$ (step 2915), and the intuition module 2815 then updates the corresponding player scores 2760(1)-(3) and duck scores 2765(1)-(3) based on the outcome values $\beta^1$-$\beta^3$ (step 2920), similarly to that described in steps 415 and 420 of FIG. 9. The intuition module 2815 then determines if the given time period to which the player moves $\lambda 2_x^1$-$\lambda 2_x^3$ are synchronized has expired (step 2921). If the time period has not expired, the game program 2800 will return to step 2910 where the game move selection module 2825 determines again if any of the player moves $\lambda 2_x^1$-$\lambda 2_x^3$ have been performed. If the time period has expired, the probability update module 2820 then, using the unweighted MIMO equation [36] or the weighted MIMO equation [37], updates the game move probability distribution p based on the outcome values $\beta^1$-$\beta^3$ (step 2925). Alternatively, rather than synchronize the asynchronous performance of the player moves $\lambda 2_x^1$-$\lambda 2_x^3$ to the time period at step 2921, the probability update module 2820 can update the game move probability distribution p after each of the asynchronous player moves $\lambda 2_x^1$-$\lambda 2_x^3$ is performed using any of the techniques described with respect to the game program 300.

After step 2925, or if none of the player moves $\lambda 2_x^1$-$\lambda 2_x^3$ has been performed at step 2910, the game move selection module 2825 determines if any of the player moves $\lambda 1_i^1$-$\lambda 1_i^3$ have been performed, i.e., guns 2725(1)-(3), have breached the gun detection regions 2770(1)-(3) (step 2930). If none of the guns 2725(1)-(3) have breached the gun detection regions 2770(1)-(3), the game move selection module 2825 does not select any of the game moves $\alpha_i^1$-$\alpha_i^3$ from the respective game move sets $\alpha^1$-$\alpha^3$, and the ducks 2720(1)-(3) remain in the same location (step 2935). Alternatively, the game moves $\alpha_i^1$-$\alpha_i^3$ may be randomly selected, respectively allowing the ducks 2720(1)-(3) to dynamically wander. The game program 2800 then returns to step 2910 where it is again determined if any of the player moves $\lambda 1_i^1$-$\lambda 1_i^3$ have been performed. If any of the guns 2725(1)-(3) have breached the gun detection regions 2770(1)-(3) at step 2930, the intuition module 2815 modifies the functionality of the game move selection module 2825, and the game move selection module 2825 selects the game moves $\alpha_i^1$-$\alpha_i^3$ from the game move sets $\alpha^1$-$\alpha^3$ that correspond to the breaching guns 2725(1)-(3) based on the corresponding performance indexes $\phi^1$-$\phi^3$ in the manner previously described with respect to steps 440-470 of FIG. 9 (step 2940).

It should be noted that, rather than use the game move subset selection technique, other afore-described techniques used to dynamically and continuously match the skill level of the players 2715(1)-(3) with the skill level of the game 2700, such as that illustrated in FIG. 10, can be alternatively or optionally be used as well in the game.

Referring back to FIG. 37, it is noted that the network 2755 is used to transmit information between the user computers 2710(1)-(3) and the server 2750. The nature of this information will depend on how the various modules are distributed amongst the user computers 2710(1)-(3) and the server 2750. In the preferred embodiment, the intuition module 2815 and probability update module 2820 are located within the memory 2730 of the server 2750. Depending on the processing capability of the CPU 2735 of the server 2750 and the anticipated number of players, the game move selection module 2825 and/or game evaluation module 2830 can be located within the memory 2730 of the server 2750 or within the computers 2710(1)-(3).

Figure 40:
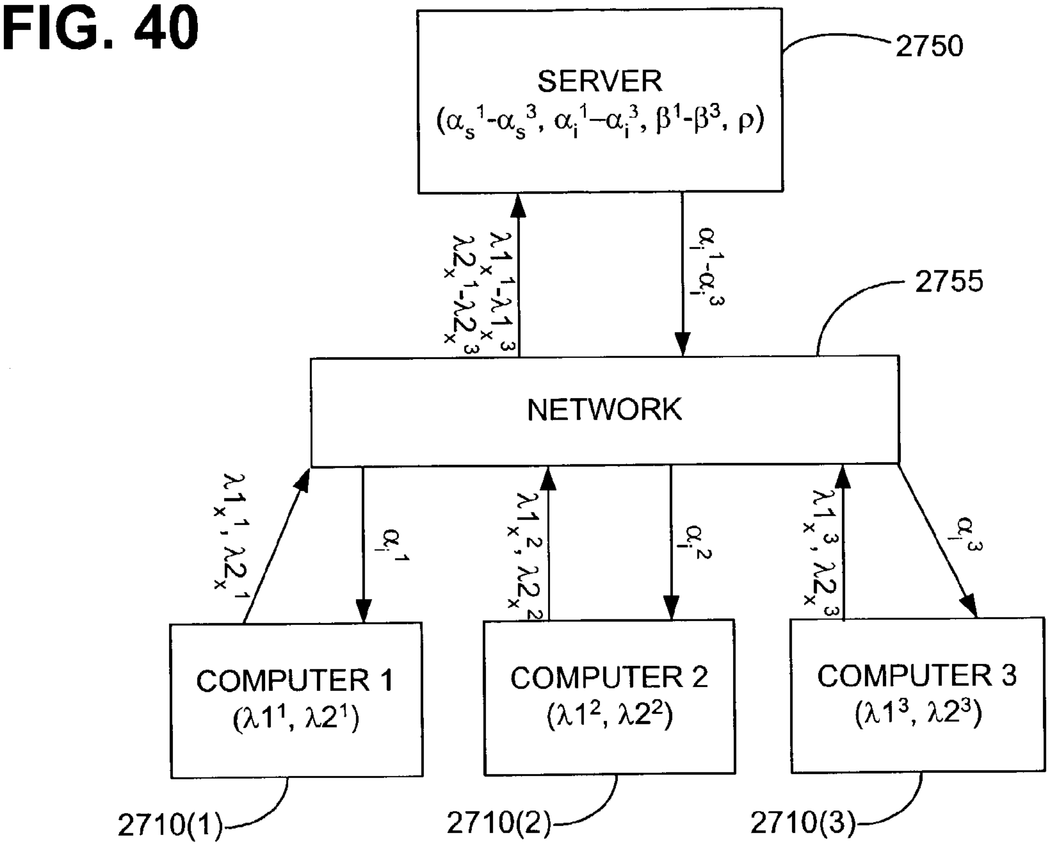
FIG. 40 is a block diagram of a first preferred computer system for distributing the processing power of the duck hunting game of FIG. 37.

For example, if the CPU 2735 has a relatively quick processing capability and the anticipated number of players is low, all modules can be located within the server 2750. In this case, and with reference to FIG. 40, all processing, such as, e.g., selecting game moves $\alpha_i^1$-$\alpha_i^3$, generating outcome values $\beta^1$-$\beta^3$, and updating the game move probability distribution p, will be performed in the server 2750. Over the network 2755, selected game moves $\alpha_i^1$-$\alpha_i^3$ will be transmitted from the server 2750 to the respective user computers 2710(1)-(3), and performed player moves $\lambda 1_i^1$-$\lambda 1_i^3$ and game moves $\lambda 2_x^1$-$\lambda 2_x^3$ will be transmitted from the respective user computers 2710(1)-(3) to the server 2750.

Figure 41:
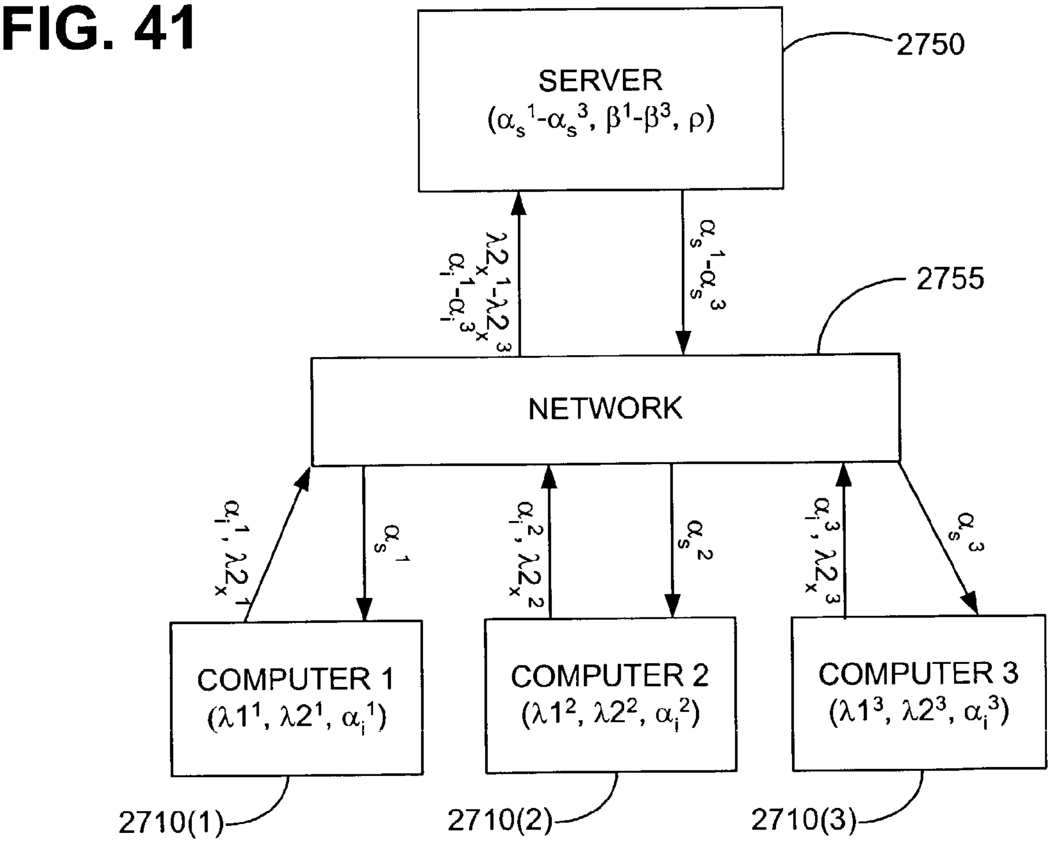
FIG. 41 is a block diagram of a second preferred computer system for distributing the processing power of the duck hunting game of FIG. 37.

Referring now to FIG. 41, if it is desired to off-load some of the processing functions from the server 2750 to the computers 2710(1)-(3), the game move selection modules 2825 can be stored in the computers 2710(1)-(3), in which case, game move subsets $\alpha_i^1$-$\alpha_i^3$ can be selected by the server 2750 and then transmitted to the respective user computers 2710(1)-(3) over the network 2755. The game moves $\alpha_i^1$-$\alpha_i^3$ can then be selected from the game move subsets $\alpha_s^1$-$\alpha_s^3$ by the respective computers 2710(1)-(3) and transmitted to the server 2750 over the network 2755. In this case, performed player moves $\lambda 1_i^1$-$\lambda 1_i^3$ need not be transmitted from the user computers 2710(1)-(3) to the server 2750 over the network 2755, since the game moves $\alpha_i^1$-$\alpha_i^3$ are selected within the user computers 2710(1)-(3).

Figure 42:
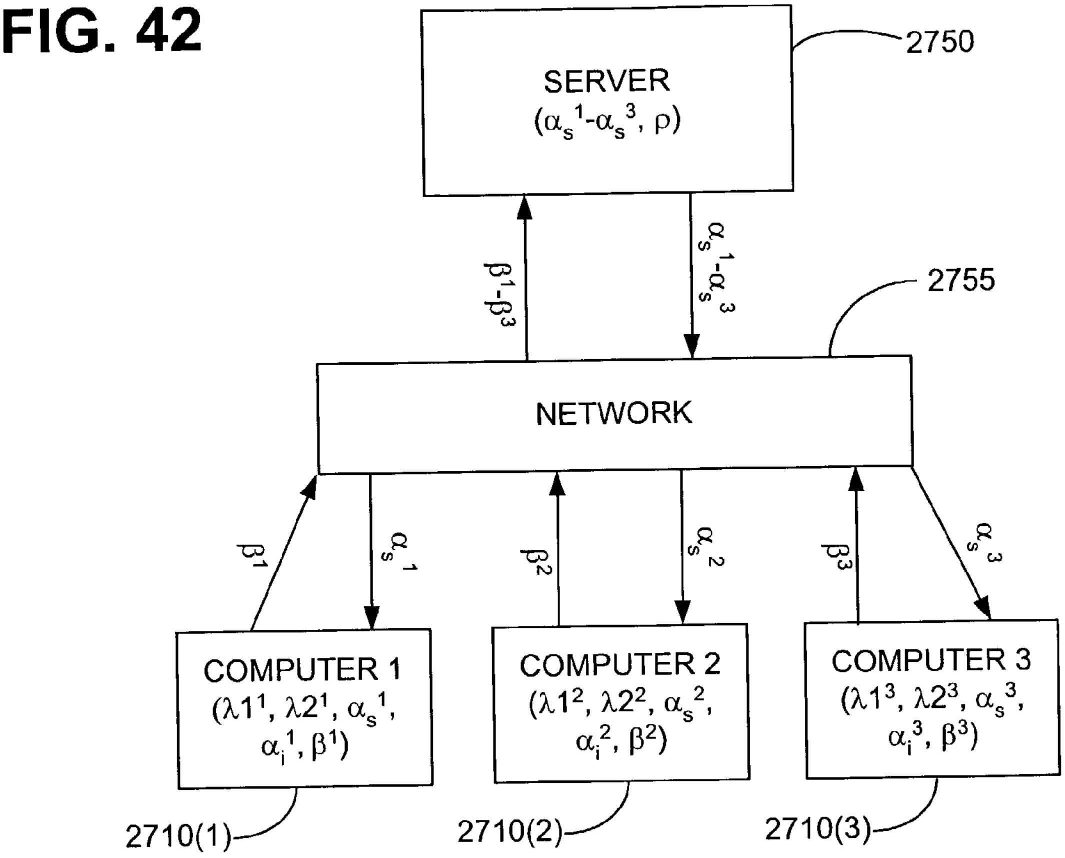
FIG. 42 is a block diagram of a third preferred computer system for distributing the processing power of the duck hunting game of FIG. 37.

Referring to FIG. 42, alternatively or in addition to game move selection modules 2825, outcome evaluation modules 2830 can be stored in the user computers 2710(1)-(3), in which case, outcome values $\beta^1$-$\beta^3$ can be generated in the respective user computers 2710(1)-(3) and then be transmitted to the server 2750 over the network 2755. It is noted that in this case, performed player moves $\lambda 2_x^1$-$\lambda 2_x^3$ need not be transmitted from the user computers 2710(1)-(3) to the server 2750 over the network 2755.

Figure 43:
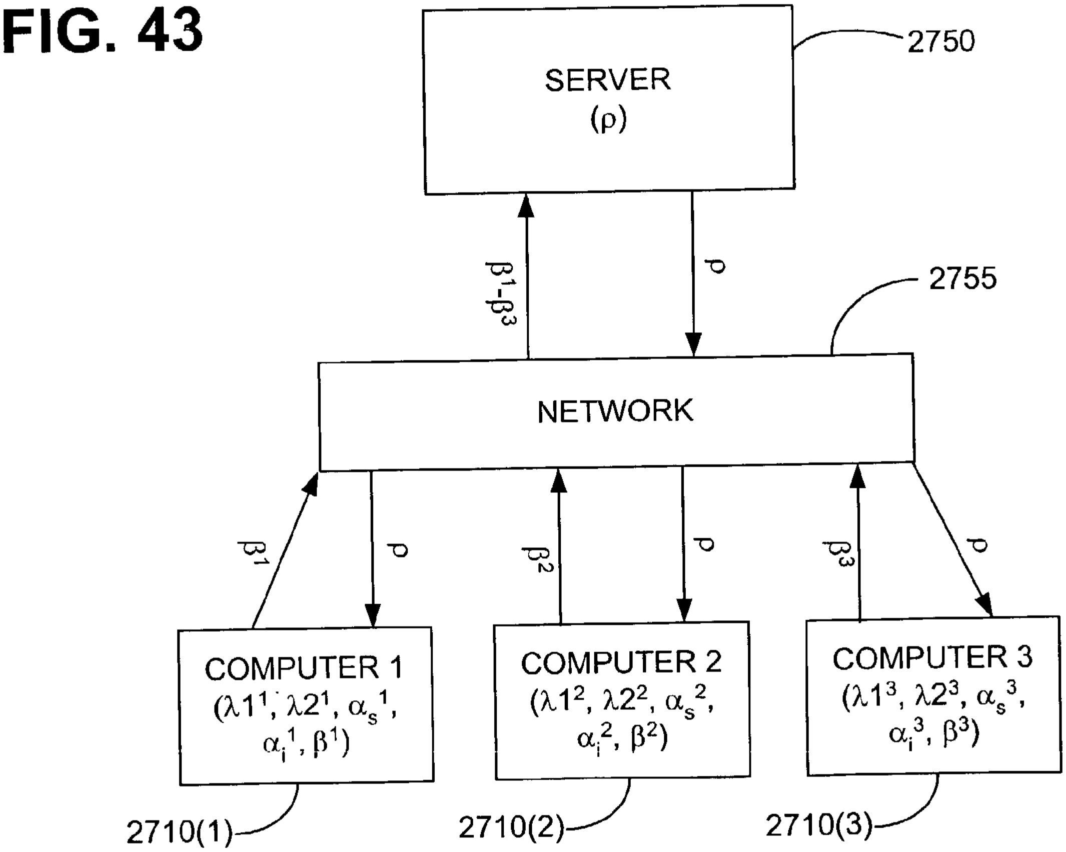
FIG. 43 is a block diagram of a fourth preferred computer system for distributing the processing power of the duck hunting game of FIG. 37.

Referring now to FIG. 43, if it is desired to off-load even more processing functions from the server 2750 to the computers 2710(1)-(3), portions of the intuition module 2815 may be stored in the respective computers 2710(1)-(3). In this case, the probability distribution p can be transmitted from the server 2750 to the respective computers 2710(1)-(3) over the network 2755. The respective computers 2710(1)-(3) can then select game move subsets $\alpha_s^1$-$\alpha_s^3$, and select game moves $\alpha_i^1$-$\alpha_i^3$ from the selected game move subsets $\alpha_s^1$-$\alpha_s^3$. If the outcome evaluation module 2830 is stored in the server 2750, the respective computers 2710(1)-(3) will then transmit the selected game moves $\alpha_i^1$-$\alpha_i^3$ to the server 2750 over the network 2755. If outcome evaluation modules 2830 are stored in the respective user computers 2710(1)-(3), however, the computers 2710(1)-(3) will instead transmit outcome values $\beta^1$-$\beta^3$ to the server 2750 over the network 2755.

To even further reduce the processing needs for the server 2750, information is not exchanged over the network 2755 in response to each performance of player moves $\lambda 2_x^1$-$\lambda 2_x^3$, but rather only after a number of player moves $\lambda 2_x^1$-$\lambda 2_x^3$ has been performed. For example, if all processing is performed in the server 2750, the performed player moves $\lambda 2_x^1$-$\lambda 2_x^3$ can be accumulated in the respective user computers 2710(1)-(3) and then transmitted to the server 2750 over the network 2755 only after several player moves $\lambda 2_x^1$-$\lambda 2_x^3$ have been performed. If the game move selection modules 2825 are located in the respective user computers 2710(1)-(3), both performed player moves $\lambda 2_x^1$-$\lambda 2_x^3$ and selected game moves $\alpha_i^1$-$\alpha_i^3$ can be accumulated in the user computers 2710(1)-(3) and then transmitted to the server 2750 over the network 2755. If the outcome evaluation modules 2830 are located in respective user computers 2710(1)-(3), outcome values $\beta^1$-$\beta^3$ can be accumulated in the user computers 2710(1)-(3) and then transmitted to the server 2750 over the network 2755. In all of these cases, the server 2750 need only update the game move probability distribution p periodically, thereby reducing the processing of the server 2750.

Like the previously described probability update module 2420, the probability update module 2820 may alternatively update the game move probability distributions as each player participates by employing SISO equations [4] and [5]. In the scenario, the SISO equations [4] and [5] will typically be implemented in a single device that serves the players 2715(1)-(3), such as the server 2750. Alternatively, to reduce the processing requirements in the server 2750, the SISO equations [4] and [5] can be implemented in devices that are controlled by the players 2715(1)-(3), such as the user computers 2710(1)-(3).

Figure 44:
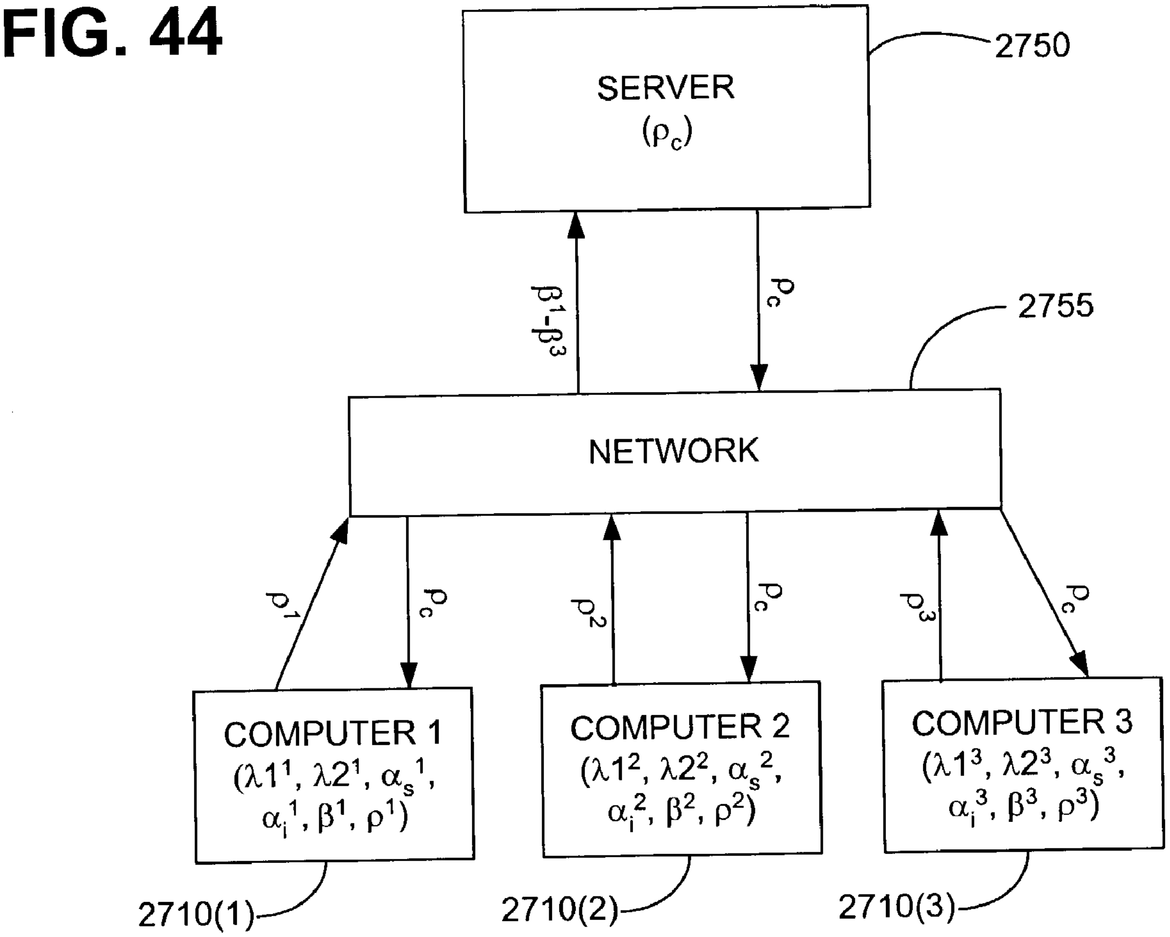
FIG. 44 is a block diagram of a fifth preferred computer system for distributing the processing power of the duck hunting game of FIG. 37.

In this case, and with reference to FIG. 44, separate probability distributions $p^1$-$p^3$ are generated and updated in the respective user computers 2710(1)-(3) using SISO equations. Thus, all of the basic functionality, such as performing player moves $\lambda 1_l^1$-$\lambda 1_l^3$ and $\lambda 2_x^1$-$\lambda 2_x^3$, subdividing and selecting game move subsets $\alpha_s^1$-$\alpha_s^3$ and $\alpha_i^1$-$\alpha_i^3$, and updating the game move probability distributions $p^1$-$p^3$, are performed in the user computers 2710(1)-(3). For each of the user computers 2710(1)-(3), this process can be the same as those described above with respect to FIGS. 9 and 10. The server 2750 is used to maintain some commonality amongst different game move probability distributions $p^1$-$p^3$ being updated in the respective user computers 2710(1)-(3). This may be useful, e.g., if the players 2715(1)-(3) are competing against each other and do not wish to be entirely handicapped by exhibiting a relatively high level of skill. Thus, after several iterative updates, the respective user computers 2710(1)-(3) can periodically transmit their updated probability distributions $p^1$-$p^3$ to the server 2750 over the network 2755. The server 2750 can then update a centralized probability distribution p based on the recently received probability distributions $p^1$-$p^3$, and preferably a weighted average of the probability distributions $p^1$-$p^3$. The weights of the game move probability distributions $p^1$-$p^3$ may depend on, e.g., the number of times the respective game move probability distributions $p^1$-$p^3$ have been updated at the user computers 2710(1)-(3).

Thus, as the number of player moves $\lambda 2_x$ performed at a particular user computer 2710 increases relative to other user computers 2710, the effect that the iteratively updated game move probability distribution p transmitted from this user computer 2710 to the server 2750 has on central game move probability distribution $p_c$ will correspondingly increase. Upon generating the centralized probability distribution $p_c$, the server 2750 can then transmit it to the respective user computers 2710(1)-(3). The user computers 2710(1)-(3) can then use the centralized probability distribution p as their initial game move probability distributions $p^1$-$p^3$, which are then iteratively updated. This process will then repeated.

Generalized Multi-User Learning Program With Multiple Probability Distributions

Figure 45:
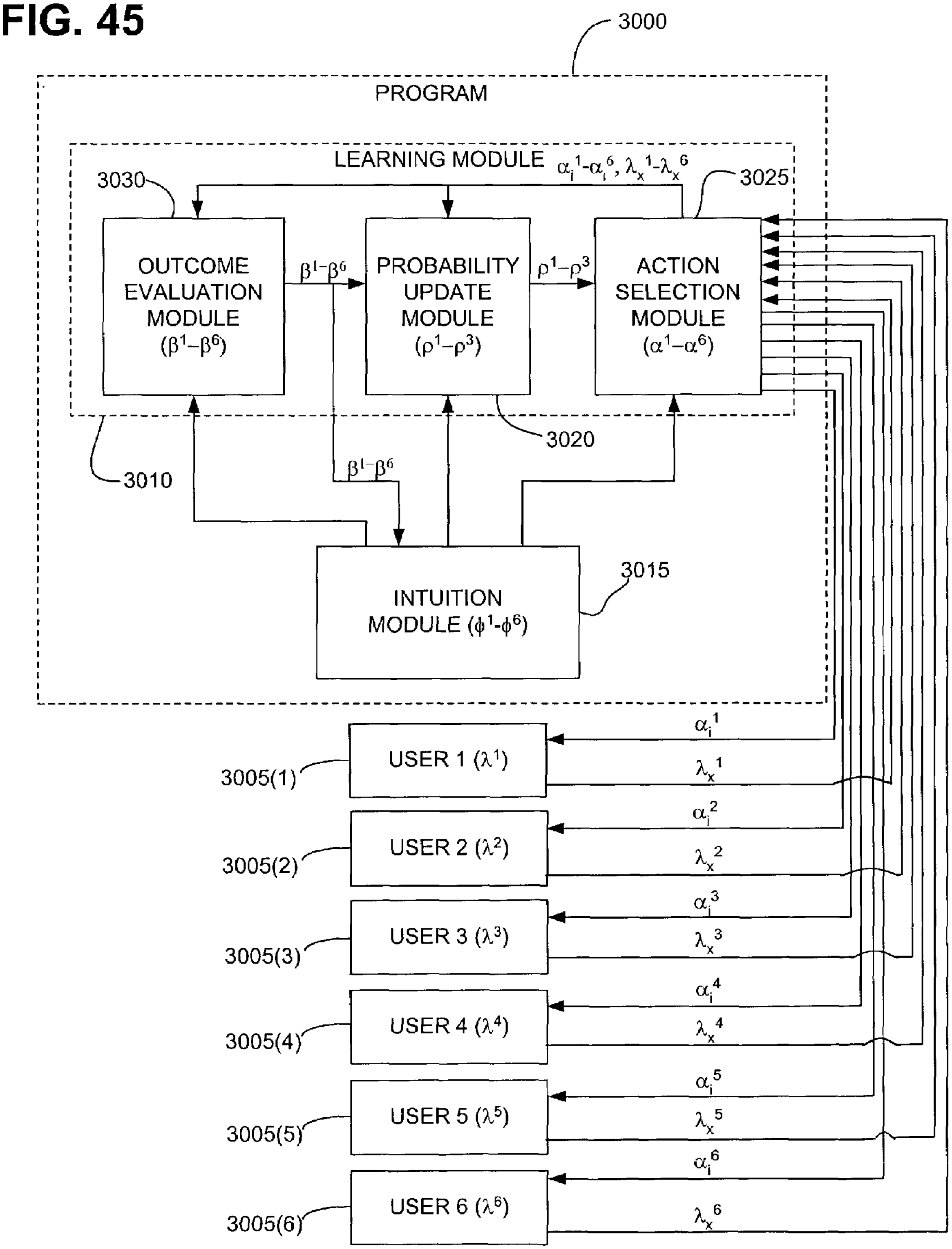
FIG. 45 is a block diagram of still another generalized multiple-user learning software program constructed in accordance with the present inventions, wherein multiple SISO learning models are assumed.

Referring to FIG. 45, another multi-user learning program 3000 developed in accordance with the present inventions can be generally implemented to provide intuitive learning capability to any variety of processing devices. Multiple sets of users 3005(1)-(2), 1405(3)-(4), and 1405(5)-(6) (here three sets of two users each) interact with the program 3000 by respectively receiving processor actions $\alpha_i^1$-$\alpha_i^6$ from respective processor action sets $\alpha^1$-$\alpha^6$ within the program 3000, selecting user actions $\lambda_x^1$-$\lambda_x^6$ from the respective user action sets $\lambda^1$-$\lambda^6$ based on the received processor actions $\alpha_i^1$-$\alpha_i^6$, and transmitting the selected user actions $\lambda_x^1$-$\lambda_x^6$ to the program 3000. Again, in alternative embodiments, the users 3005 need not receive the processor actions $\alpha_i^1$-$\alpha_i^6$, the selected user actions $\lambda_x^1$-$\lambda_x^6$ need not be based on the received processors actions $\alpha_i^1$-$\alpha_i^6$, and/or the processor actions $\alpha_i^1$-$\alpha_i^6$ may be selected in response to the selected user actions $\lambda_x^1$-$\lambda_x^6$. The significance is that processor actions $\alpha_i^1$-$\alpha_i^6$ and user actions $\lambda_x^1$-$\lambda_x^6$ are selected.

The program 3000 is capable of learning based on the measured performance (e.g., success or failure) of the selected processor actions $\alpha_i^1$-$\alpha_i^6$ relative to selected user actions $\lambda_x^1$-$\lambda_x^6$, which, for the purposes of this specification, can be measured as outcome values $\beta^1$-$\beta^6$. As will be described in further detail below, program 3000 directs its learning capability by dynamically modifying the model that it uses to learn based on performance indexes $\phi^1$-$\phi^6$ to achieve one or more objectives.

To this end, the program 3000 generally includes a probabilistic learning module 3010 and an intuition module 3015. The probabilistic learning module 3010 includes a probability update module 3020, an action selection module 3025, and an outcome evaluation module 3030. The program 3000 differs from the program 2600 in that the probability update module 3020 is configured to generate and update multiple action probability distributions $p^1$-$p^3$ (as opposed to a single probability distribution p) based on respective outcome values $\beta^1$-$\beta^2$, $\beta^3$-$\beta^4$, and $\beta^5$-$\beta^6$. In this scenario, the probability update module 3020 uses multiple stochastic learning automatons, each with multiple inputs to a multi-teacher environment (with the users 3005(1)-(6) as the teachers), and thus, a MIMO model is assumed for each learning automaton. Thus, users 3005(1)-(2), users 3005(3)-(4), and users 3005(5)-(6) are respectively associated with action probability distributions $p^1$-$p^3$, and therefore, the program 3000 can independently learn for each of the sets of users 3005(1)-(2), users 3005(3)-(4), and users 3005(5)-(6). It is noted that although the program 3000 is illustrated and described as having a multiple users and multiple inputs for each learning automaton, multiple users with single inputs to the users can be associated with each learning automaton, in which case a SIMO model is assumed for each learning automaton, or a single user with a single input to the user can be associated with each learning automaton, in which case a SISO model can be associated for each learning automaton.

The action selection module 3025 is configured to select the processor actions $\alpha_i^1$-$\alpha_i^2$, $\alpha_i^3$-$\alpha_i^4$, and $\alpha_i^5$-$\alpha_i^6$ from respective action sets $\alpha^1$-$\alpha^2$, $\alpha^3$-$\alpha^4$, and $\alpha^5$-$\alpha^6$ based on the probability values contained within the respective action probability distributions $p^1$-$p^3$ internally generated and updated in the probability update module 3020. The outcome evaluation module 3030 is configured to determine and generate the outcome values $\beta^1$-$\beta^6$ based on the respective relationship between the selected processor actions $\alpha_l^1$-$\alpha_l^6$ and user actions $\lambda_x^1$-$\lambda_x^6$. The intuition module 3015 modifies the probabilistic learning module 3010 (e.g., selecting or modifying parameters of algorithms used in learning module 3010) based on the generated performance indexes $\phi^1$-$\phi^6$ to achieve one or more objectives. As previously described, the performance indexes $\phi^1$-$\phi^6$ can be generated directly from the outcome values $\beta^1$-$\beta^6$ or from something dependent on the outcome values $\beta^1$-$\beta^6$ e.g., the action probability distributions $p^1$-$p^3$, in which case the performance indexes $\phi^1$-$\phi^2$, $\phi^3$-$\phi^4$, and $\phi^5$-$\phi^6$ maybe a function of the action probability distributions $p^1$-$p^3$, or the action probability distributions $p^1$-$p^3$ may be used as the performance indexes $\phi^1$-$\phi^2$, $\phi^3$-$\phi^4$, and $\phi^5$-$\phi^6$. The modification of the probabilistic learning module 3010 is generally accomplished similarly to that described with respect to the afore-described probabilistic learning module 110. That is, the functionalities of (1) the probability update module 3020 (e.g., by selecting from a plurality of algorithms used by the probability update module 3020, modifying one or more parameters within an algorithm used by the probability update module 3020, transforming or otherwise modifying the action probability distributions $p^1$-$p^3$); (2) the action selection module 3025 (e.g., limiting or expanding selection of the processor actions $\alpha_l{}^1$-$\alpha_l^2$, $\alpha_l^3$-$\alpha_l^4$, and $\alpha_l^5$-$\alpha_l^6$ corresponding to subsets of probability values contained within the action probability distributions $p^1$-$p^3$); and/or (3) the outcome evaluation module 3030 (e.g., modifying the nature of the outcome values $\beta^1$-$\beta^6$ or otherwise the algorithms used to determine the outcome values $\beta^1$-$\beta^6$), are modified.

The various different types of learning methodologies previously described herein can be applied to the probabilistic learning module 3010. The steps performed by the program 3000 are similar to that described with respect to FIG. 36, with the exception that the game program 3000 will independently perform the steps of the flow diagram for each of the sets of users 3005(1)-(2), 1405(3)-(4), and 1405(5)-(6). For example, the program 3000 will execute one pass through the flow for users 3005(1)-(2) (and thus the first probability distribution $p^1$), then one pass through the flow for users 3005 (3)-(4) (and thus the first probability distribution $p^2$) and then one pass through the flow for users 3005(5)-(6) (and thus the first probability distribution $p^3$).

Figure 46:
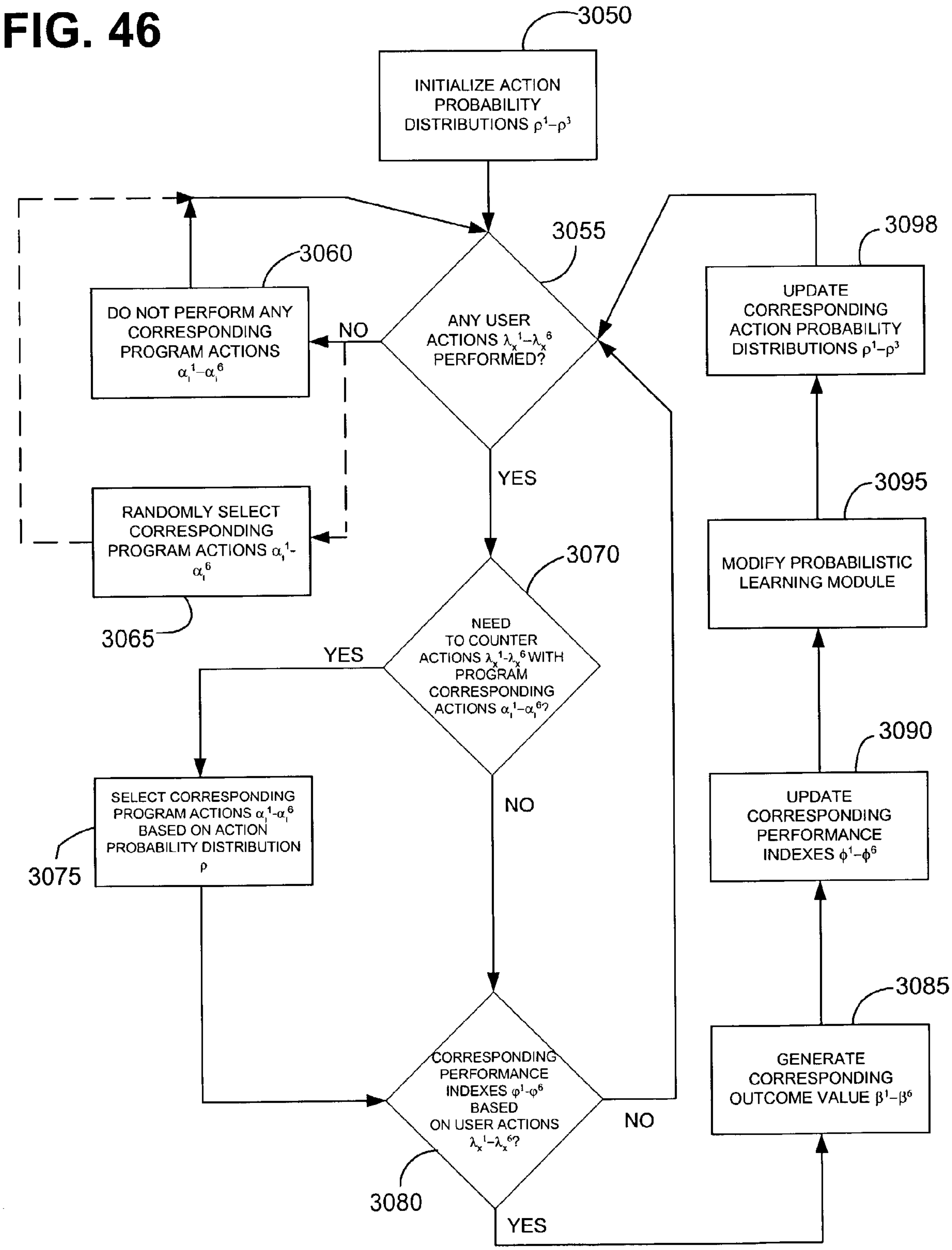
FIG. 46 is a flow diagram illustrating a preferred method performed by the program of FIG. 45.

Alternatively, the program 3000 can combine the steps of the flow diagram for the users 3005(1)-(6). For example, referring to FIG. 46, the probability update module 3020 initializes the action probability distributions $p^1$-$p^3$ (step 3050) similarly to that described with respect to step 150 of FIG. 4. The action selection module 3025 then determines if one or more of the user actions $\lambda_x^1$-$\lambda_x^6$ have been selected from the respective user action sets $\lambda^1$-$\lambda^6$ (step 3055). If not, the program 3000 does not select the processor actions $\alpha_l^1$-$\alpha_l^6$ from the processor action sets $\alpha^1$-$\alpha^6$ (step 3060), or alternatively selects processor actions $\alpha_l{}^1$-$\alpha_l^6$, e.g., randomly, notwithstanding that none of the user actions $\lambda_x^1$-$\lambda_x^6$ have been selected (step 3065), and then returns to step 3055 where it again determines if one or more of the user actions $\lambda_x^1$-$\lambda_x^6$ have been selected. If one or more of the user actions $\lambda_x^1$-$\lambda_x^6$ have been selected at step 3055, the action selection module 3025 determines the nature of the selected ones of the user actions $\lambda_x^1$-$\lambda_x^6$.

Specifically, the action selection module 3025 determines whether any of the selected ones of the user actions $\lambda_x^1$-$\lambda_x^6$ are of the type that should be countered with the corresponding ones of the processor actions $\alpha_l^1$-$\alpha_l^6$ (step 3070). If so, the action selection module 3025 selects processor actions $\alpha_l$ from the corresponding processor action sets $\alpha^1$-$\alpha^2$, $\alpha^3$-$\alpha^4$, and $\alpha^5$-$\alpha^6$ based on the corresponding one of the action probability distributions $p^1$-$p^3$ (step 3075). Thus, if either of the user actions $\lambda_x^1$ and $\lambda_x^2$ is selected and is of the type that should be countered with a processor action $\alpha_l$, processor actions $\alpha_l^1$ and $\alpha_l^2$ will be selected from the corresponding processor action sets $\alpha^1$ and $\alpha^2$ based on the probability distribution $p^1$. If either of the user actions $\lambda_x^3$ and $\lambda_x^4$ is selected and is of the type that should be countered with a processor action $\alpha_l$, processor actions $\alpha_l^3$ and $\alpha_l^4$ will be selected from the corresponding processor action sets $\alpha^3$ and $\alpha^4$ based on the probability distribution $p^2$. If either of the user actions $\lambda_x^5$ and $\lambda_x^6$ is selected and is of the type that should be countered with a processor action $\alpha_l$, processor actions $\alpha_l^5$ and $\alpha_l^6$ will be selected from the corresponding processor action sets $\alpha^5$ and $\alpha^6$ based on the probability distribution $p^3$. After the performance of step 3075 or if the action selection module 3025 determines that none of the selected ones of the user actions $\lambda_x^1$-$\lambda_x^6$ is of the type that should be countered with a processor action $\alpha_l$, the action selection module 3025 determines if any of the selected ones of the user actions $\lambda_x^1$-$\lambda_x^6$ are of the type that the performance indexes $\phi^1$-$\phi^6$ are based on (step 3080).

If not, the program 3000 returns to step 3055 to determine again whether any of the user actions $\lambda_x^1$-$\lambda_x^6$ have been selected. If so, the outcome evaluation module 3030 quantifies the performance of the previously corresponding selected processor actions $\alpha_l^1$-$\alpha_l^6$ relative to the selected ones of the current user actions $\lambda_x^1$-$\lambda_x^6$, respectively, by generating outcome values $\beta^1$-$\beta^6$ (step 3085). The intuition module 3015 then updates the performance indexes $\phi^1$-$\phi^6$ based on the outcome values $\beta^1$-$\beta^6$, unless the performance indexes $\phi^1$-$\phi^6$ are instantaneous performance indexes that are represented by the outcome values $\beta^1$-$\beta^6$ themselves (step 3090), and modifies the probabilistic learning module 3010 by modifying the functionalities of the probability update module 3020, action selection module 3025, or outcome evaluation module 3030 (step 3095). The probability update module 3020 then, using any of the updating techniques described herein, updates the respective action probability distributions $p^1$-$p^3$ based on the generated outcome values $\beta^1$-$\beta^2$, $\beta^3$-$\beta^4$, and $\beta^5$-$\beta^6$ (step 3098).

The program 3000 then returns to step 3055 to determine again whether any of the user actions $\lambda_x^1$-$\lambda_x^6$ have been selected. It should also be noted that the order of the steps described in FIG. 46 may vary depending on the specific application of the program 3000.

Multi-Player Game Program with Multiple Probability Distributions

Figure 47:
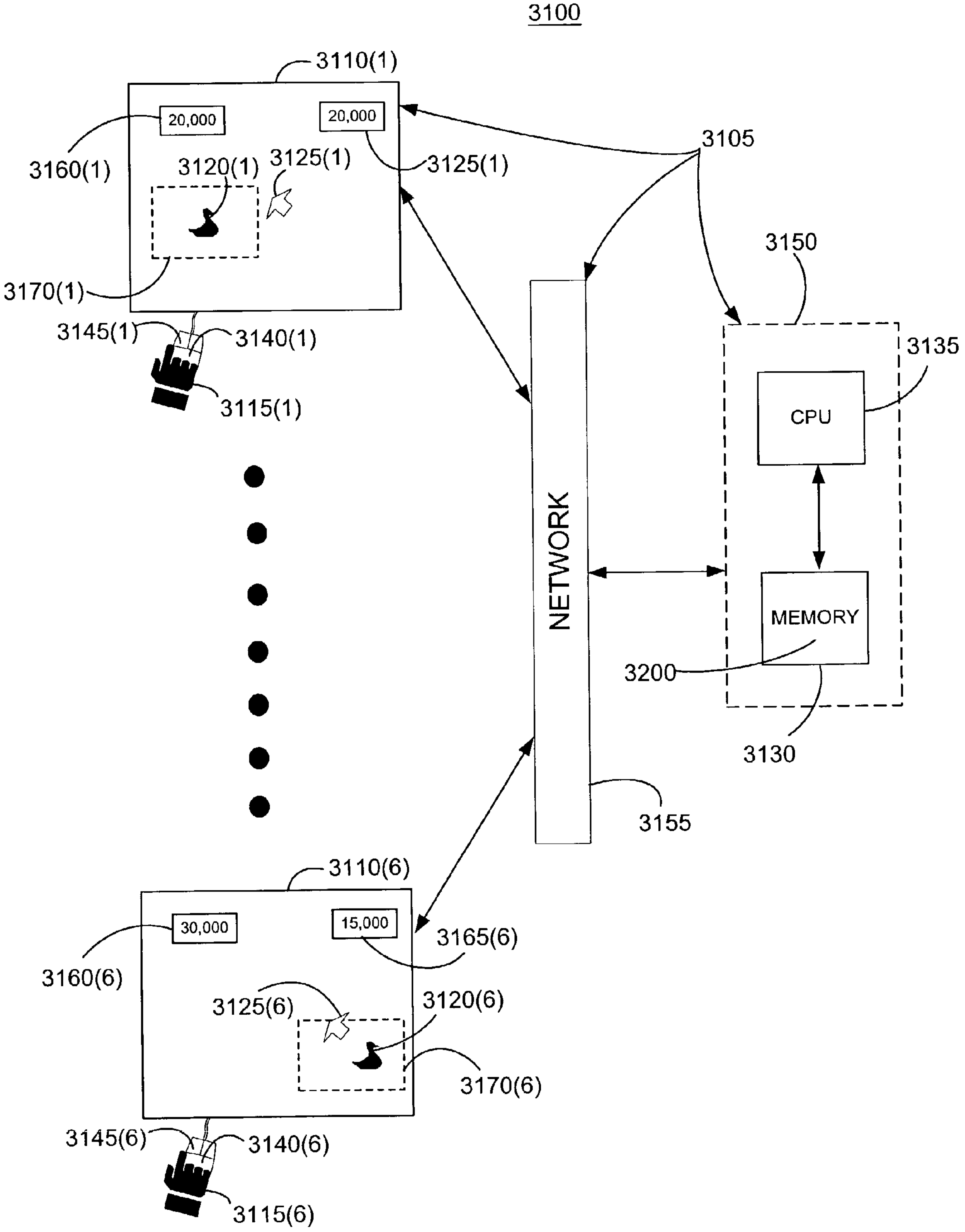
FIG. 47 is a block diagram of a multiple-player duck hunting game to which the generalized program of FIG. 45 can be applied.

Having now generally described the components and functionality of the learning program 3000, we now describe one of its various applications. Referring to FIG. 47, a multiple-player game program 3200 developed in accordance with the present inventions is described in the context of a duck hunting game 3100. The game 3100 is similar to the previously described game 2700 with the exception that three sets of players (players 3115(1)-(2), 3115(3)-(4), and 3115(5)-(6)) are shown interacting with a computer system 3105, which like the computer systems 2305 and 2705, can be used in an Internet-type scenario. Thus, the computer system 3105 includes multiple computers 3110(1)-(6), which display computer animated ducks 3120(1)-(6) and guns 3125(1)-(6). The computer system 3105 further comprises a server 3150, which includes memory 3130 for storing the game program 3200, and a CPU 1535 for executing the game program 3200. The server 3150 and computers 3110(1)-(6) remotely communicate with each other over a network 3155, such as the Internet. The computer system 3105 further includes computer mice 3140(1)-(6) with respective mouse buttons 3145 (1)-(6), which can be respectively manipulated by the players 3115(1)-(6) to control the operation of the guns 3125(1)-(6). The ducks 3120(1)-(6) are surrounded by respective gun detection regions 3170(1)-(6). The game 3100 maintains respective scores 3160(1)-(6) for the players 3115(1)-(6) and respective scores 3165(1)-(6) for the ducks 3120(1)-(6).

As will be described in further detail below, the players 3115(1)-(6) are divided into three sets based on their skill levels (e.g., novice, average, and expert). The game 3100 treats the different sets of players 3115(1)-(6) differently in that it is capable of playing at different skill levels to match the respective skill levels of the players 3115(1)-(6). For example, if players 3115(1)-(2) exhibit novice skill levels, the game 3100 will naturally play at a novice skill level for players 3115(1)-(2). If players 3115(3)-(4) exhibit average skill levels, the game 3100 will naturally play at an average skill level for players 311 5(3)-(4). If players 3115(5)-(6) exhibit expert skill levels, the game 3100 will naturally play at an expert skill level for players 3115(5)-(6). The skill level of each of the players 3115(1)-(6) can be communicated to the game 3100 by, e.g., having each player manually input his or her skill level prior to initiating play with the game 3100, and placing the player into the appropriate player set based on the manual input, or sensing each player's skill level during game play and dynamically placing that player into the appropriate player set based on the sensed skill level. In this manner, the game 3100 is better able to customize itself to each player, thereby sustaining the interest of the players 3115(1)-(6) notwithstanding the disparity of skill levels amongst them.

Figure 48:
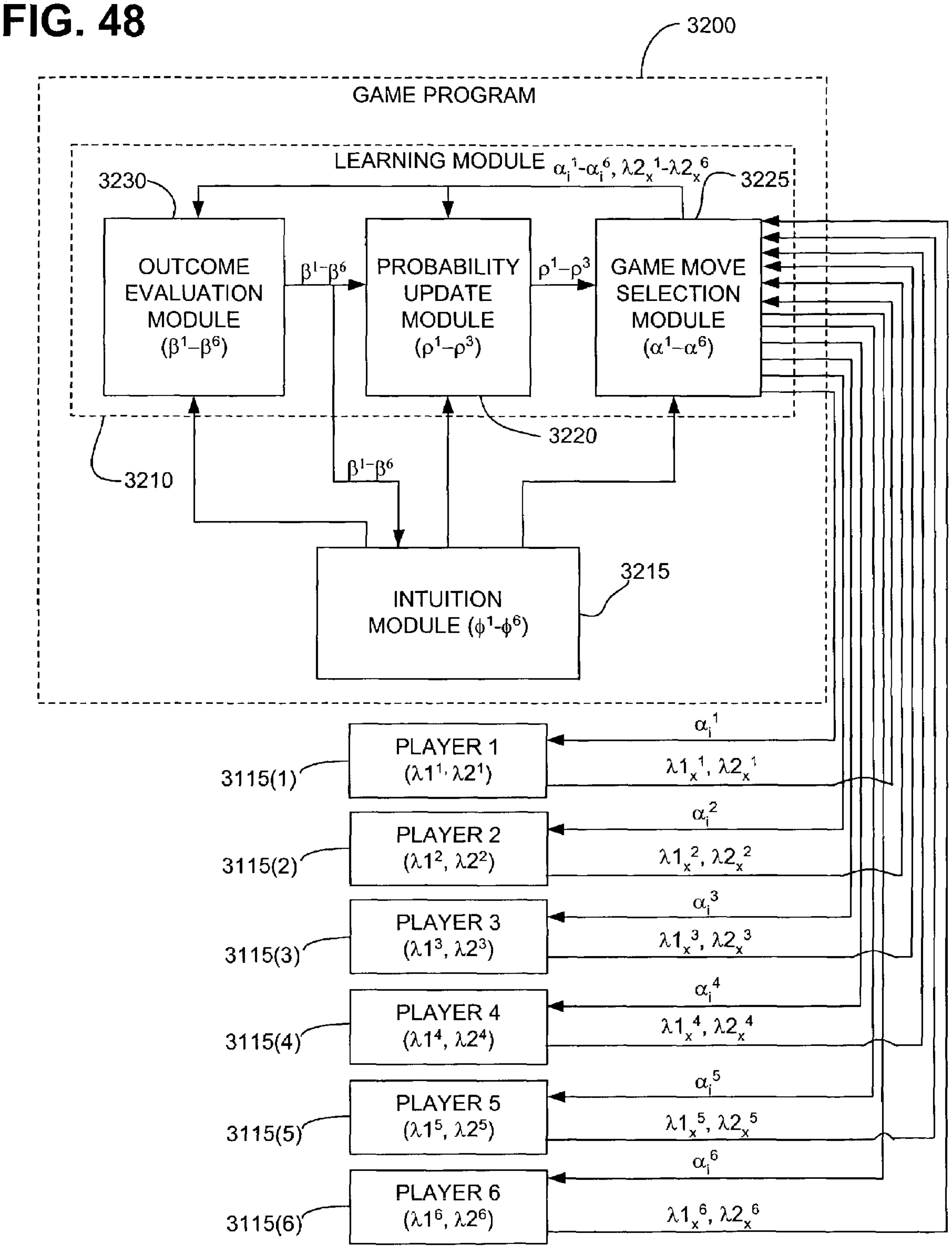
FIG. 48 is a block diagram of a multiple-player game program employed in the duck hunting game of FIG. 47.

Referring further to FIG. 48, the game program 3200 generally includes a probabilistic learning module 3210 and an intuition module 3215, which are specifically tailored for the game 3100. The probabilistic learning module 3210 comprises a probability update module 3220, a game move selection module 3225, and an outcome evaluation module 3230. The probabilistic learning module 3210 and intuition module 3215 are configured in a manner similar to the learning module 2810 and intuition module 2815 of the game program 2800. To this end, the game move selection module 3225 is configured to receive player moves $\lambda 1_l^1$-$\lambda 1_l^6$ from the players 3115(1)-(6), which take the form of mouse 3140(1)-(6) positions, i.e., the positions of the guns 3125(1)-(6) at any given time. Based on this, the game move selection module 3225 detects whether any one of the guns 3125(1)-(6) is within the detection regions 3170(1)-(6), and if so, selects game moves $\alpha_l^1$-$\alpha_l^6$ from the respective game move sets $\alpha^1$-$\alpha^6$ and specifically, one of the seventeen moves that the ducks 3120(1)-(6) will make. The game move selection module 3225 respectively selects the game moves $\alpha_l^1$-$\alpha_l^2$, $\alpha_l^3$-$\alpha_l^4$, and $\alpha_l^5$-$\alpha_l^6$ based on game move probability distributions $p^1$-$p^3$ received from the probability update module 3220.

Like the intuition module 2815, the intuition module 3215 modifies the functionality of the game move selection module 3225 by subdividing the game move set $\alpha^1$-$\alpha^6$ into pluralities of game move subsets $\alpha_s^1$-$\alpha_s^6$ and selecting one of each of the pluralities of game move subsets $\alpha_s^1$-$\alpha_s^6$ based on the respective score difference values $\Delta^1$-$\Delta^6$. The game move selection module 3225 is configured to pseudo-randomly select game moves $\alpha_l^1$-$\alpha_l^6$ from the selected ones of the game move subsets $\alpha_s^1$-$\alpha_s^6$.

The game move selection module 3225 is further configured to receive player moves $\lambda 2_x^1$-$\lambda 2_x^6$ from the players 3115 (1)-(6) in the form of mouse button 1545(1)-(6) click/mouse 3140(1)-(6) position combinations, which indicate the positions of the guns 3125(1)-(6) when they are fired. The outcome evaluation module 3230 is further configured to determine and output outcome values $\beta^1$-$\beta^6$ that indicate how favorable the selected game moves $\alpha_l^1$-$\alpha_l^6$ in comparison with the received player moves $\lambda 2_x^1$-$\lambda 2_x^6$, respectively.

The probability update module 3220 is configured to receive the outcome values $\beta^1$-$\beta^6$ from the outcome evaluation module 3230 and output an updated game strategy (represented by game move probability distributions $p^1$-$p^3$) that the ducks 3120(1)-(6) will use to counteract the players' 1515(1)-(6) strategy in the future. Like the game move probability distributionp updated by the probability update module 2820, updating of the game move probability distributions $p^1$-$p^3$is synchronized to a time period. As previously described with respect to the game 2700, the functions of the learning module 1510 can be entirely centralized within the server 3150 or portions thereof can be distributed amongst the user computers 3110(1)-(6). When updating each of the game move probability distributions $p^1$-$p^3$, the game program 3200 may employ, e.g., the unweighted P-type MIMO learning methodology defined by equation [36] or the weighted P-type MIMO learning methodology defined by equation [37].

Figure 39:
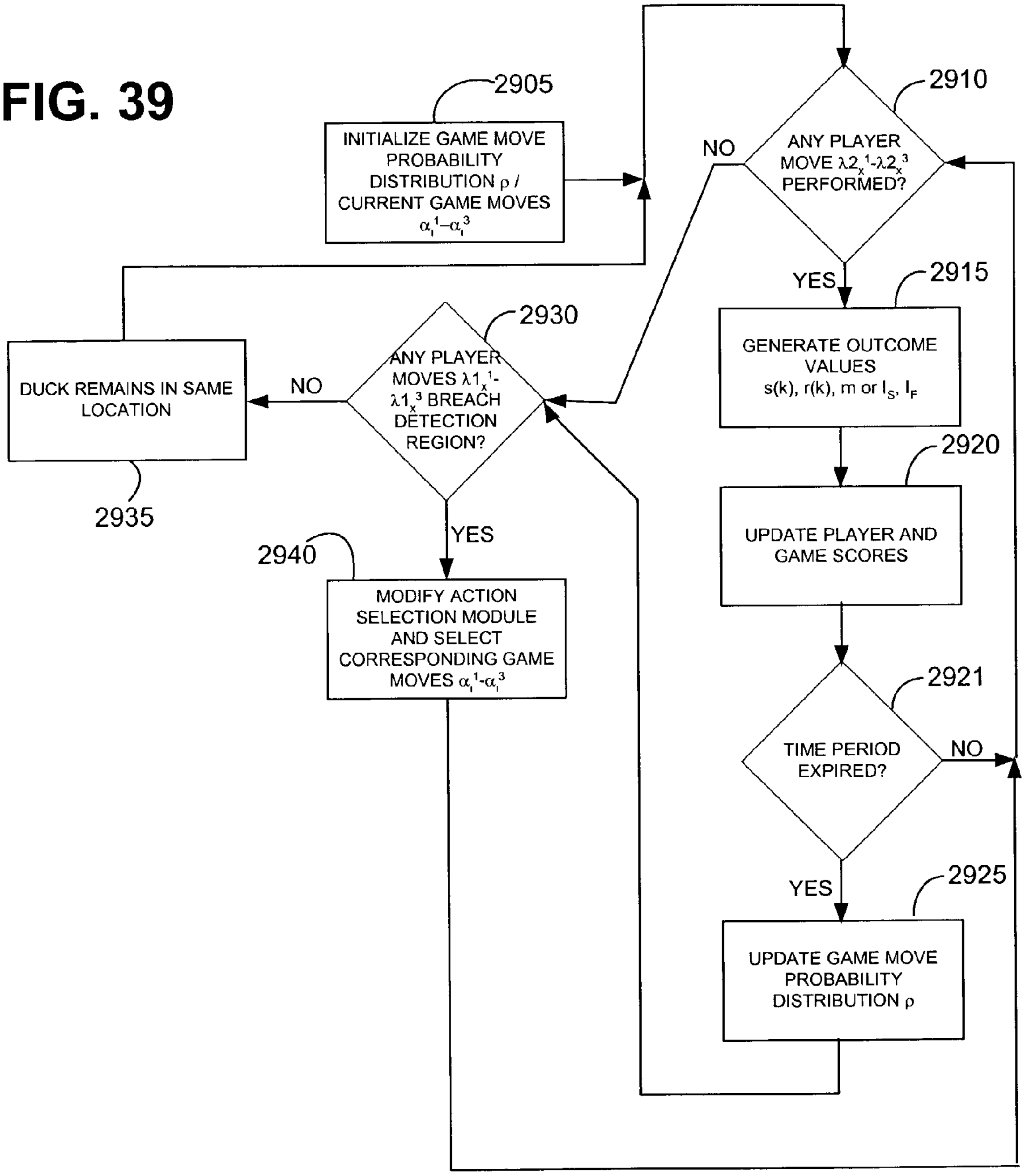
FIG. 39 is a flow diagram illustrating a preferred method performed by the game program of FIG. 38.

The steps performed by the game program 3200 are similar to that described with respect to FIG. 39, with the exception that the game program 3200 will independently perform the steps of the flow diagram for each of the sets of game players 3115(1)-(2), 3115(3)-(4), and 3115(5)-(6). For example, the game program 3200 will execute one pass through the flow for game players 3115(1)-(2) (and thus the first probability distribution $p^1$), then one pass through the flow for game players 3115(3)-(4) (and thus the second probability distribution $p^2$), and then one pass through the flow for game players 3115(5)-(6) (and thus the third probability distribution $p^3$).

Figure 49:
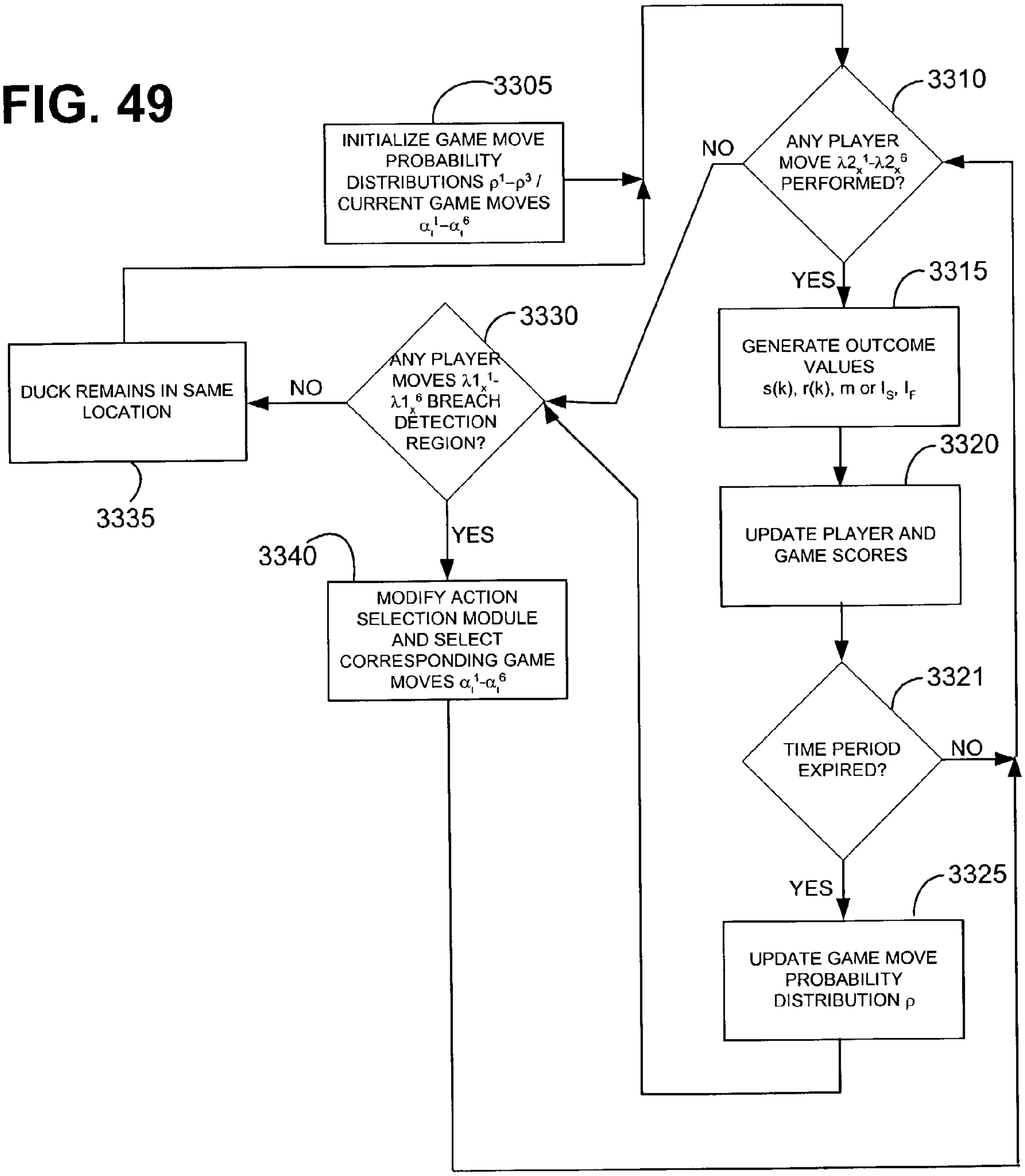
FIG. 49 is a flow diagram illustrating a preferred method performed by the game program of FIG. 48.

Alternatively, the game program 3200 can combine the steps of the flow diagram for the game players 3115(1)-(6). For example, referring to FIG. 49, the probability update module 3220 will first initialize the game move probability distributions $p^1$-$p^3$ and current player moves $\lambda 2_x^1$-$\lambda 2_x^6$, (step 3305) similarly to that described in step 405 of FIG. 9. Then, the game move selection module 3225 determines whether any of the player moves $\lambda 2_x^1$-$\lambda 2_x^6$ have been performed, and specifically whether the guns 3125(1)-(6) have been fired (step 3310). If any of player moves $\lambda 2_x^1$-$\lambda 2_x^6$ have been performed, the outcome evaluation module 3230 generates the corresponding outcome values $\beta^1$-$\beta^6$ for the performed ones of the player moves $\lambda_x^1$-$\lambda_x^6$ and corresponding game moves $\alpha_l^1$-$\alpha_l^6$ (step 3315). For each set of player moves $\lambda 2_x^1$-$\lambda 2_l^2$, $\lambda 2_x^3$-$\lambda 2_x^4$, and $\lambda 2_x^5$-$\lambda 2_x^6$, the corresponding outcome values $\beta^1$-$\beta^2$, $\beta^3$-$\beta^4$, and $\beta^5$-$\beta^6$ can be requested by different sets of s(k), r(k) and m values (unweighted case) or $I_S^q$ and $I_F^q$ occurrences (weighted case). The intuition module 3215 then updates the corresponding player scores 3160(1)-(6) and duck scores 3165(1)-(6) based on the outcome values $\beta^1$-$\beta^6$ (step 3320), similarly to that described in steps 415 and 420 of FIG. 9. The intuition module 3215 then determines if the given time period to which the player moves $\lambda 2_x^1$-$\lambda 2_x^6$ are synchronized has expired (step 3321). If the time period has not expired, the game program 3200 will return to step 3310 where the game move selection module 3225 determines again if any of the player moves $\lambda 2_x^1$-$\lambda 2_x^6$ have been performed. If the time period has expired, the probability update module 3220 then, using the unweighted MIMO equation [36] or the weighted MIMO equation [37], updates the game move probability distributions $p^1$-$p^3$ based on the respective outcome values $\beta^1$-$\beta^2$, $\beta^3$-$\beta^4$, and $\beta^5$-$\beta^6$ (step 3325). Alternatively, rather than synchronize the asynchronous performance of the player moves $\lambda 2_x^1$-$\lambda 2_x^6$ to the time period at step 3321, the probability update module 3220 can update the pertinent one of the game move probability distribution $p^1$-$p^3$ after each of the asynchronous player moves $\lambda 2_x^1$-$\lambda 2_x^6$ is performed using any of the techniques described with respect to the game program 300.

After step 3325, or if none of the player moves $\lambda 2_x^1$-$\lambda 2_x^6$ has been performed at step 3310, the game move selection module 3225 determines if any of the player moves have been performed, i.e., guns 3125(1)-(6), have breached the gun detection regions 3170(1)-(6) (step 3330). If none of the guns 3125(1)-(6) have breached the gun detection regions 3170(1)-(6), the game move selection module 3225 does not select any of the game moves $\alpha_l^1$-$\alpha_l^6$ from the respective game move sets $\alpha^1$-$\alpha^6$, and the ducks 3120(1)-(6) remain in the same location (step 3335). Alternatively, the game moves $\alpha_l^1$-$\alpha_l^6$ may be randomly selected, respectively allowing the ducks 3120(1)-(6) to dynamically wander. The game program 3200 then returns to step 3310 where it is again determined if any of the player moves $\lambda 1_l^1$-$\lambda 1_l^6$ have been performed. If any of the guns 3125(1)-(6) have breached the gun detection regions 3170(1)-(6) at step 3330, the intuition module 3215 modifies the functionality of the game move selection module 3225, and the game move selection module 3225 selects the game moves $\alpha_l^1$-$\alpha_l^2$, $\alpha_l^3$-$\alpha_l^4$, and $\alpha_l^5$-$\alpha_l^6$ from the game move sets $\alpha^1$-$\alpha^2$, $\alpha^3$-$\alpha^4$, and $\alpha^5$-$\alpha^6$ that correspond to the breaching guns 3125(1)-(2), 3125(3)-(4), and 3125(5)-(6) based on the corresponding performance indexes $\phi^1$-$\phi^6$ in the manner previously described with respect to steps 440-470 of FIG. 9 (step 3340).

It should be noted that, rather than use the game move subset selection technique, other afore-described techniques used to dynamically and continuously match the skill level of the players 3115(1)-(6) with the skill level of the game 3100, such as that illustrated in FIG. 10, can be alternatively or optionally be used as well in the game. It should also be noted that, as described with respect to FIGS. 40-44, the various modules can be distributed amongst the user computers 3110 (1)-(3) and the server 3150 in a manner that optimally distributes the processing power.

Multiple-User Phone Listing Program with Multiple Probability Distributions

Figure 50:
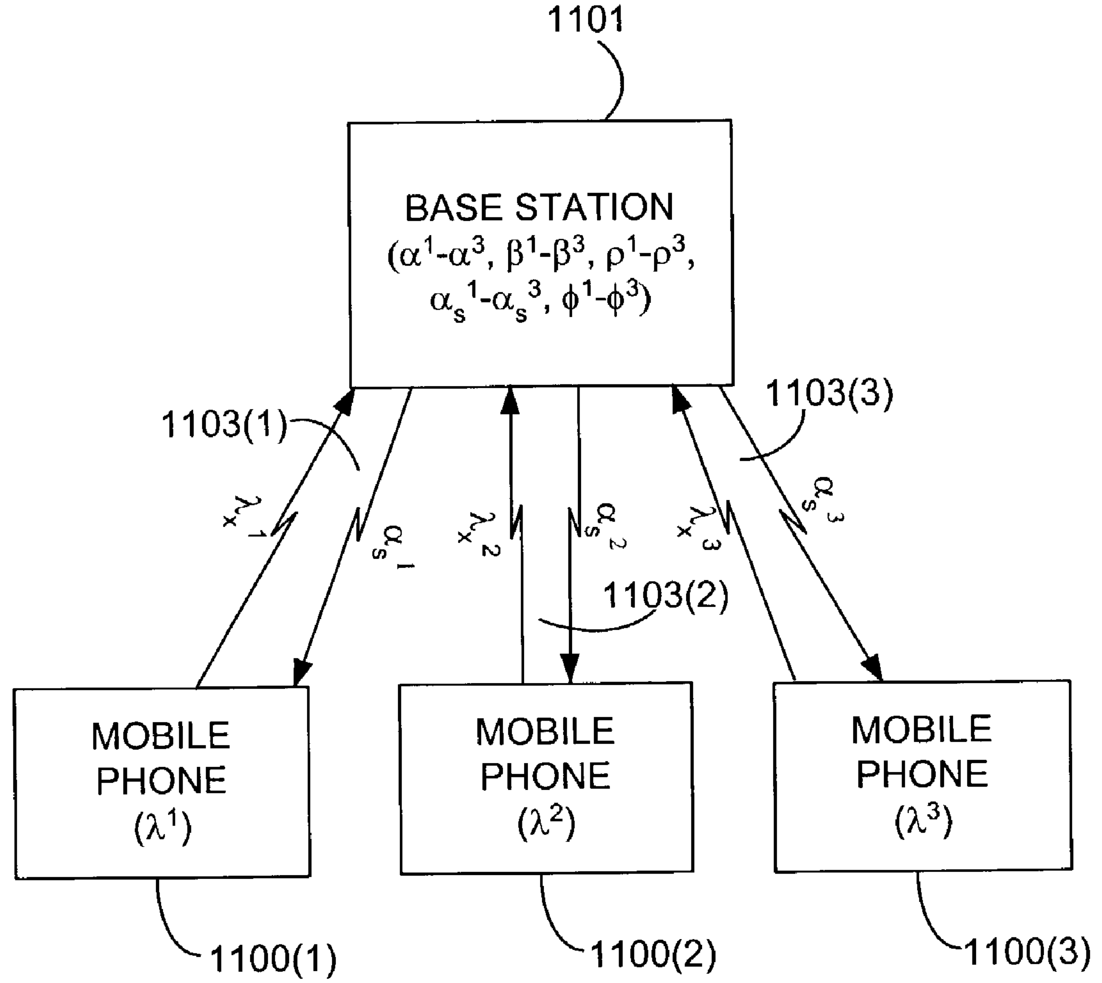
FIG. 50 is a block diagram illustrating the components of a mobile phone system to which the generalized program of FIG. 45 can be applied.

The learning program 3000 has other applications besides game programs. For example, the listing program 1200, which was previously described as being self-contained in the mobile phone 1100, can be distributed amongst several components or can be contained in a component separate from the mobile phone 1100 to service several phone users. Referring to FIG. 50, a priority listing program 3400 (shown in FIG. 51) is stored in a base station 1101, which services several mobile phones 1100(1)-(3) (three shown here) via respective wireless links 1103(1)-(3). The listing program 3400 is similar to the previously described listing program 1200, with the exception that it can generate a favorite phone number list for several mobile phones 1100(1)-(3).

Figure 51:
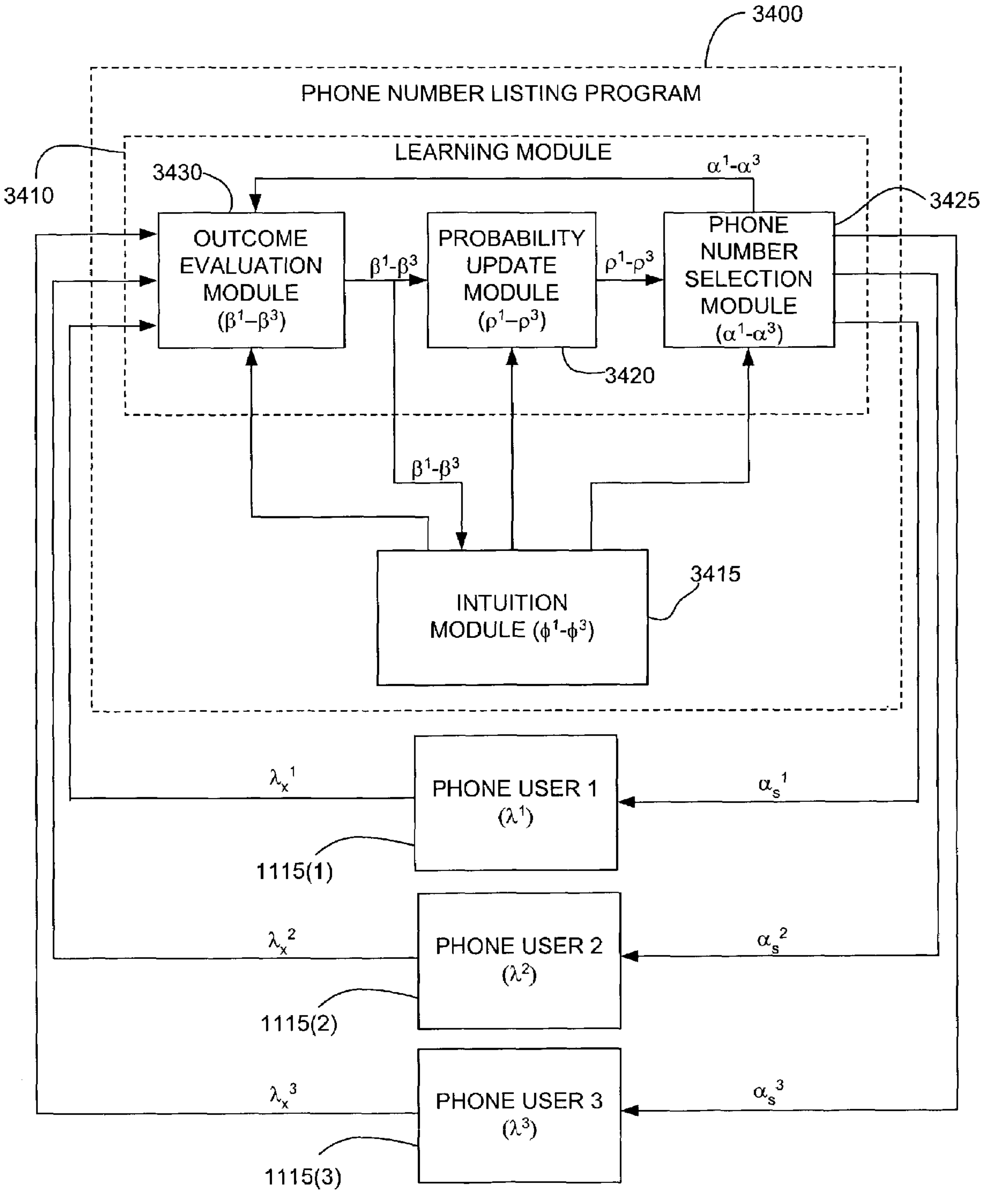
FIG. 51 is a block diagram of a priority listing program employed in the mobile phone system of FIG. 50.

Referring further to FIG. 51, the listing program 3400 generally includes a probabilistic learning module 3410 and an intuition module 3415. The probabilistic learning module 3410 comprises a probability update module 3420, a phone number selection module 3425, and an outcome evaluation module 3430. Specifically, the probability update module 3420 is mainly responsible for learning each of the phone users' 1115(1)-(3) calling habits and updating comprehensive phone number lists $\alpha^1$-$\alpha^3$ using probability distributions $p^1$-$p^3$ that, for each of the users' 1115(1)-(3), place phone numbers in the order that they are likely to be called in the future during any given time period. The outcome evaluation module 3430 is responsible for evaluating each of the comprehensive phone number lists $\alpha^1$-$\alpha^3$ relative to current phone numbers $\lambda x^1$-$\lambda x^3$ called by the phone users 1115(1)-(3).

The base station 1101 obtains the called phone numbers $\lambda x^1$-$\lambda x^3$ when the mobile phones 1100(1)-(3) place phone calls to the base station 1101 via the wireless links 1103(1)-(3). The phone number selection module 3425 is mainly responsible for selecting phone number subsets $\alpha_s^1$-$\alpha_s^3$ from the respective comprehensive phone number lists $\alpha^1$-$\alpha^3$ for eventual display to the phone users 1115(1)-(3) as favorite phone number lists. These phone number subsets $\alpha_s^1$-$\alpha_s^1$ are wirelessly transmitted to the respective mobile phones 1100 (1)-(3) via the wireless links 1103(1)-(3) when the phone calls are established. The intuition module 3415 is responsible for directing the learning of the listing program 3400 towards the objective, and specifically, displaying the favorite phone number lists that are likely to include the phone users' 1115(1)-(3) next called phone numbers. The intuition module 3415 accomplishes this based on respective performance indexes $\phi^1$-$\phi^3$ (and in this case, instantaneous performance indexes $\phi^1$-$\phi^3$ represented as respective outcome values $\beta^1$-$\beta^3$).

It should be noted that the listing program 3400 can process the called phone numbers $\lambda x^1$-$\lambda x^3$ on an individual basis, resulting in the generation and transmission of respective phone number subsets $\alpha_s^1$-$\alpha_s^3$ to the mobile phones 1100(1)-(3) in response thereto, or optionally to minimize processing time, the listing program 3400 can process the called phone numbers $\lambda_x^1$-$\lambda_x^3$ in a batch mode, which may result in the periodic (e.g., once a day) generation and transmission of respective phone number subsets $\alpha_s^1$-$\alpha_s^3$ to the mobile phones 1100(1)-(3). In the batch mode, the phone number subsets $\alpha_s^1$-$\alpha_s^3$ can be transmitted to the respective mobile phones 1100(1)-(3) during the next phone calls from the mobile phones 1100(1)-(3). The detailed operation of the listing program 3400 modules have previously been described, and will therefore not be reiterated here for purposes of brevity. It should also be noted that all of the processing need not be located in the base station 1101, and certain modules of the program 1200 can be located within the mobile phones 1100(1)-(3).

As will be appreciated, the phone need not be a mobile phone, but can be any phone or device that can display phone numbers to a phone user. The present invention particularly lends itself to use with mobile phones, however, because they are generally more complicated and include many more features than standard phones. In addition, mobile phone users are generally more busy and pressed for time and may not have the external resources, e.g., a phone book, that are otherwise available to phone users of home phone users. Thus, mobile phone users generally must rely on information contained in the mobile phone itself. As such, a phone that learns the phone user's habits, e.g., the phone user's calling pattern, becomes more significant in the mobile context.

Figure 52:
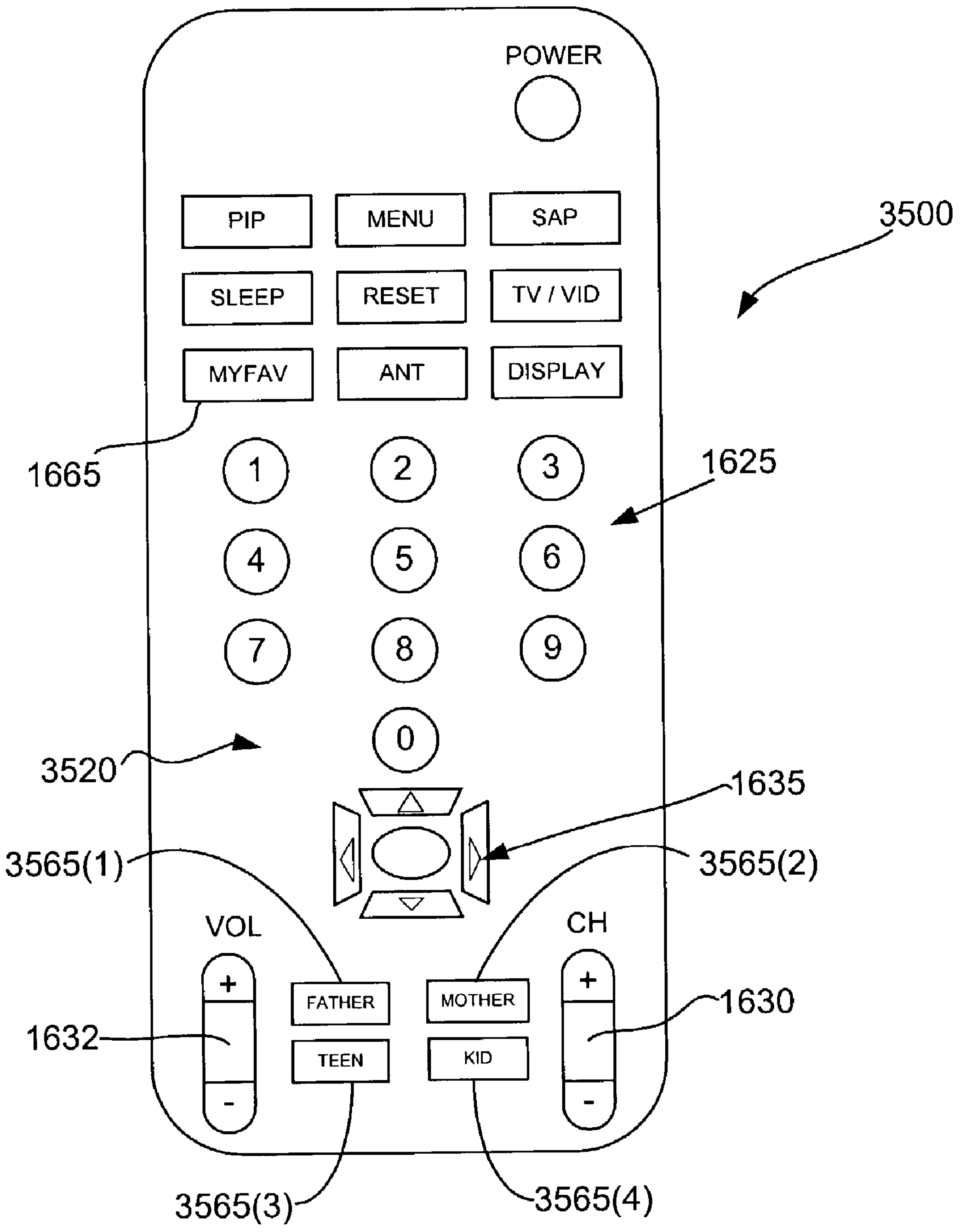
FIG. 52 is a plan view of a television remote control to which the generalized program of FIG. 45 can be applied.

Multiple-User Television Channel Listing Program with Multiple Probability Distributions The learning program 3000 can be applied to remote controls as well. Referring now to FIG. 52, another priority listing program 3600 (shown in FIG. 53) developed in accordance with the present inventions is described in the context of another television remote control 3500. The remote control 3500 is similar to the previously described remote control 1600 with the exception that it comprises a keypad 3520 that alternatively or optionally contains multi-user keys 3565(1)-(4) respectively referred to as "FATHER", "MOTHER", "TEENAGE", and "KID" keys. Alternatively, the family member keys 3565(1)-(4) can be respectively labeled "USER1," "USER2," "USER3," and "USER4" keys. Operation of the multi-user keys 3565(1)-(4) allows the remote control 3500 to identify the specific person that is currently watching the television, thereby allowing it to more efficiently and accurately anticipate the television channels that the person would likely watch. Thus, each time the user operates the remote control 3500, he or she will preferably depress the corresponding multi-user key 3565 to indicate to the remote control 3500 that the user is the father, mother, teenager, or child, or some other classified user. In this manner, the remote control 3500 will be able to learn that specific user's channel watching patterns and anticipate that user's favorite television channels.

To this end, the program 3600 dynamically updates a plurality of comprehensive television channel lists for the multiple users. The comprehensive television channel lists are identical to the single comprehensive television channel list described with respect to the program 1700, with the exception that the comprehensive television channel lists are arranged and updated in such a manner that a selected one will be able to be matched with the current user 1615 and applied to the channel watching pattern of that user 1615. Alternatively, a single comprehensive television channel list is updated, and the information contained therein is extracted and stored in multiple television channel lists for the users. In this case, programming information, such as channel type, will be used to determine which television channel list the extracted information will be stored in. For example, if the channel type is "cartoons" the extracted information may be stored in the television channel list corresponding to a kid.

The listing program 3600 uses the existence or non-existence of watched television channels on the comprehensive television channel lists as performance indexes $\phi^1$-$\phi^4$ in measuring its performance in relation to its objective of ensuring that the comprehensive channel lists will include the future watched television channels. In this regard, it can be said that the performance indexes $\phi^1$-$\phi^4$ are instantaneous. Alternatively or optionally, the listing program 3600 can also use the location of the television channel on the comprehensive channel list as performance indexes $\phi^1$-$\phi^4$.

Figure 53:
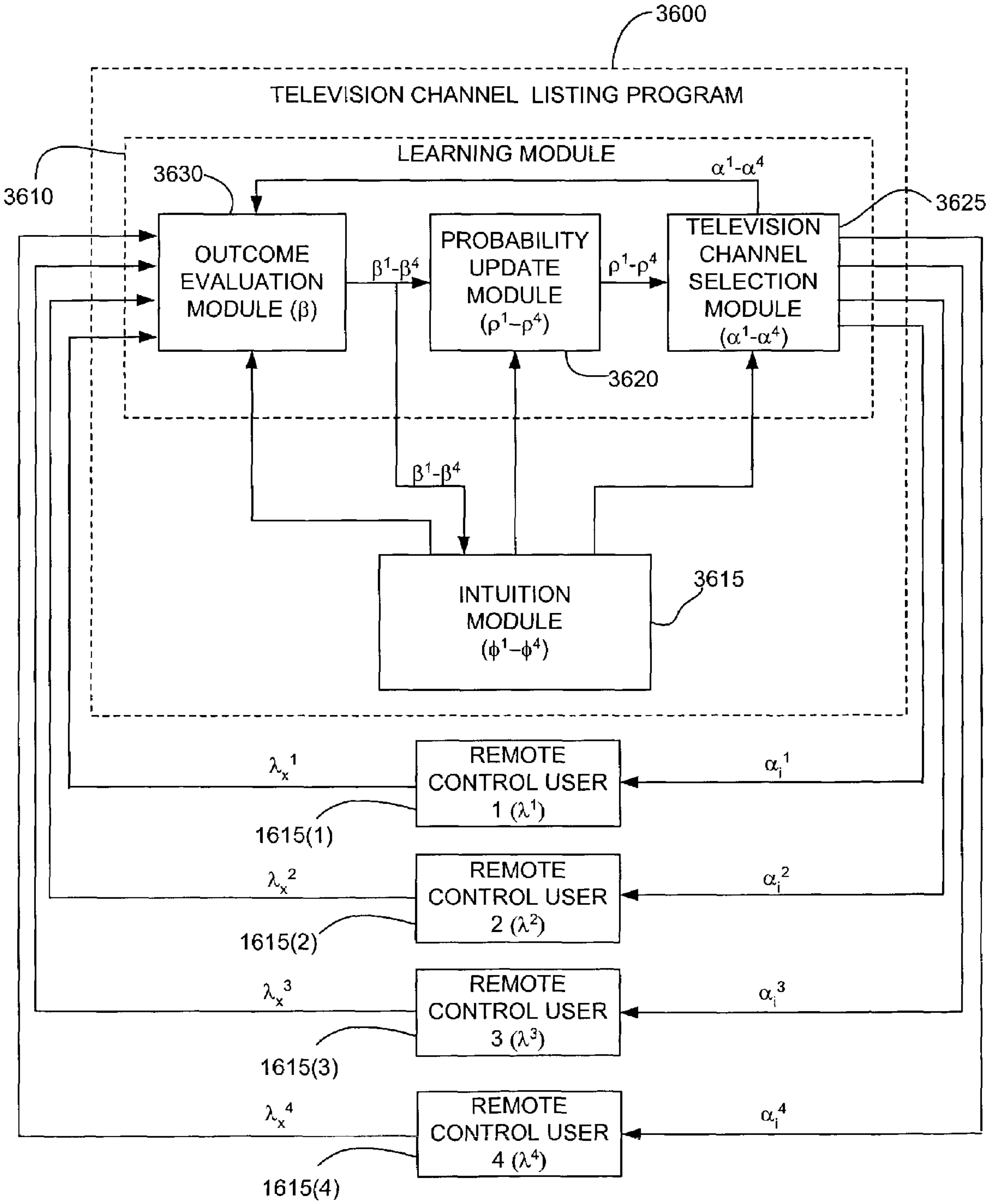
FIG. 53 is a block diagram of a priority listing program employed in the remote control of FIG. 52.

Referring now to FIG. 53, the listing program 3600 includes a probabilistic learning module 3610 and an intuition module 3615, which are specifically tailored for the remote control 3500. The probabilistic learning module 3610 comprises a probability update module 3620, a television channel selection module 3625, and an outcome evaluation module 3630.

Specifically, the probability update module 3620 is mainly responsible for learning the remote control users' 1615(1)-(4) television watching habits and respectively updating comprehensive television channel lists $\alpha^1$-$\alpha^4$ that place television channels $\alpha_l$ in the order that they are likely to be watched by the users 1615(1)-(4) in the future during any given time period. The outcome evaluation module 3630 is responsible for evaluating the comprehensive channel lists $\alpha^1$-$\alpha^4$ relative to current television channels $\lambda_x^1$-$\lambda_x^4$ watched by the respective remote control users 1615(1)-(4). The channel selection module 3625 is mainly responsible for selecting a television channel $\alpha_l$ from the comprehensive channel list $\alpha$ corresponding to the current user 1615 upon operation of the favorite television channel key 1965.

The intuition module 3615 is responsible for directing the learning of the listing program 3600 towards the objective of selecting the television channel $\alpha_l$ that is likely to be the current remote control user's 1615 next watched television channel $\alpha_l$. In this case, the intuition module 3615 selects the pertinent comprehensive channel list $\alpha$, and operates on the probability update module 3620, the details of which will be described in further detail below.

To this end, the channel selection module 3625 is configured to receive multiple television channel probability distributions $p^1$-$p^4$ from the probability update module 3620. Based on the television channel probability distributions $p^1$-$p^4$, the channel selection module 3625 generates the comprehensive channel lists $\alpha^1$-$\alpha^4$, each of which contains the listed television channels $\alpha_l$ ordered in accordance with their associated probability values $p_l$ Thus, each comprehensive channel list $\alpha$ contains all television channels $\alpha_l$ watched by the corresponding user 1615. From the comprehensive channel lists $\alpha^1$-$\alpha^4$, the channel selection module 3625 selects the list corresponding to the current user 1615, and then selects, from that list, a television channel $\alpha_l$ that the television will be switched to in the same manner that the previously described channel selection module 1725 selects a television channel from a single comprehensive television list.

Alternatively or in addition to the favorite channel key 1665, which switches the television to the next channel based on a user's generalized channel watching pattern, the keypad 3520 can include the specialized favorite channel key 1965, which switches the television to the next channel based on a user's specialized channel watching patterns. In this case, the program 3600 will operate on a plurality of linked comprehensive television channel lists $\alpha 1$-$\alpha m$ for each of the users 2715(1)-(4).

The outcome evaluation module 3630 is configured to receive watched television channels $\lambda_x^1$-$\lambda_x^4$ from the remote control users 1615(1)-(4) via the keypad 3520 using any one of the previously described methods. The outcome evaluation module 3630 is further configured to determine and output outcome values $\beta^1$-$\beta^4$ that indicate if the currently watched television channels $\lambda_x^1$-$\lambda_x^4$ respectively match television channels $\alpha_l^1$-$\alpha_l^4$ on the comprehensive channel lists $\alpha^1$-$\alpha^4$.

The intuition module 3615 is configured to receive the outcome value $\beta^1$-$\beta^4$ from the outcome evaluation module 3630 and modify the probability update module 3620, and specifically, the television channel probability distributions $p^1$-$p^4$. This is accomplished in the same manner as that described with respect to the intuition module 1715 when modifying the single television channel probability distribution p.

Figure 54:
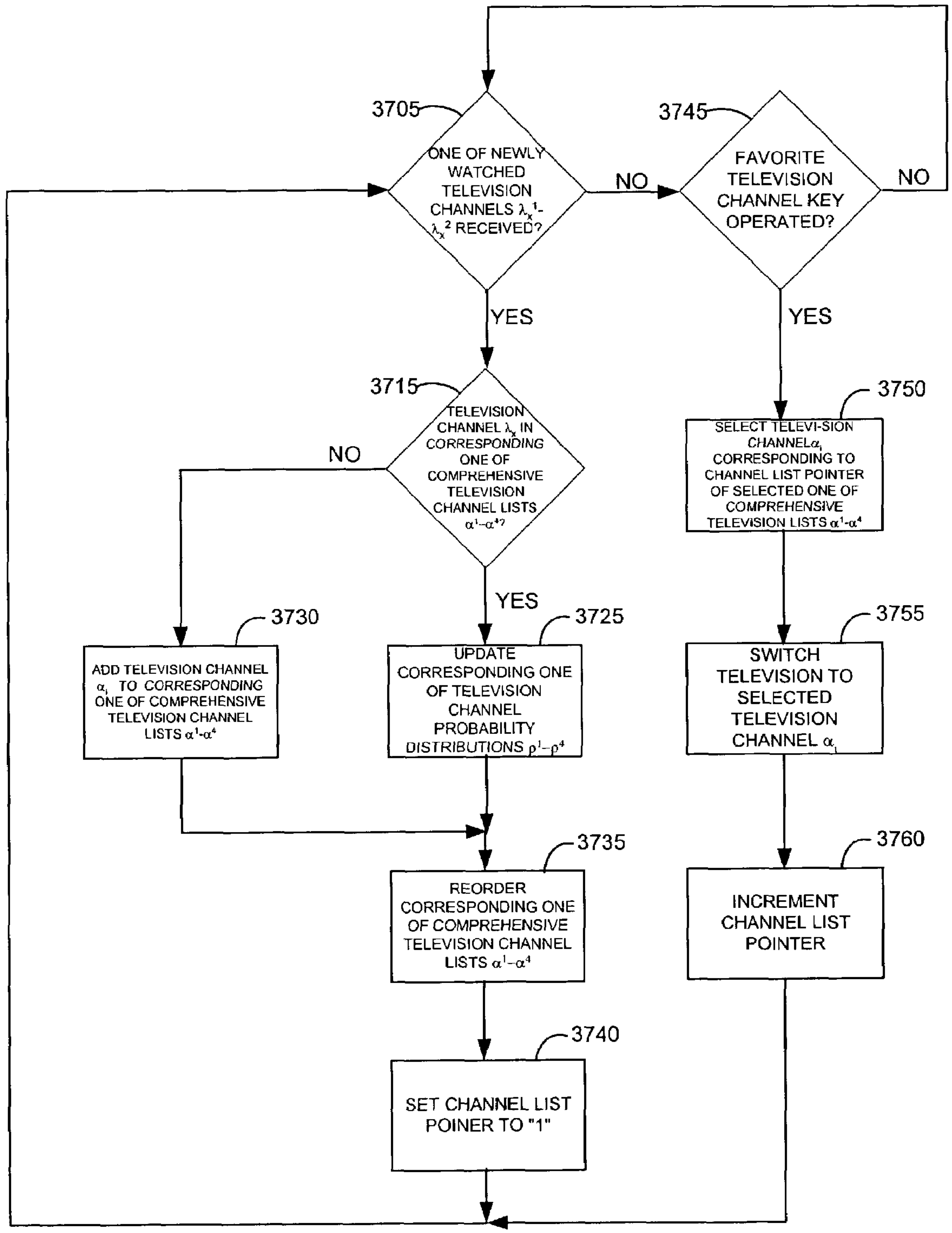
FIG. 54 is a flow diagram illustrating a preferred method performed by the priority listing program of FIG. 53.

Having now described the structure of the listing program 3600, the steps performed by the listing program 3600 will be described with reference to FIG. 54. First, the outcome evaluation module 3630 determines whether one of the television channels $\lambda_x^1$-$\lambda_x^4$ has been newly watched (step 3705). The specific television channel watched will be specified by which multi-user key 3565 is operated. For example, (1) if multi-user key 3565(1) is operated, a currently watched television channel will be television channel $\lambda_x^2$; (2) if multi-user key 3565(2) is operated, a currently watched television channel will be television channel $\lambda_x^2$; (3) if multi-user key 3565(3) is operated, a currently watched television channel will be television channel $\lambda_x^3$; and (4) if multi-user key 3565(4) is operated, a currently watched television channel will be television channel $\lambda_x^4$.

If one of the television channels $\lambda_x^1$-$\lambda_x^4$ have been newly watched, the outcome evaluation module 3630 determines whether it matches a television channel $\alpha_l$ on the corresponding one of the comprehensive channel lists $\alpha^1$-$\alpha^4$ and generates the respective one of the outcome values $\beta^1$-$\beta^4$ in response thereto (step 3715). If so ($\beta$=1), the intuition module 3615 directs the probability update module 3620 to update the respective one of the television channel probability distributions $p^1$-$p^4$ using a learning methodology to increase the probability value $p_l$ corresponding to the listed television channel $\alpha_l$ (step 3725). If not $\beta$=0), the intuition module 3615 generates a corresponding television channel $\alpha_l$ and assigns a probability value $p_l$ to it, in effect, adding it to the respective one of the comprehensive channel lists $\alpha^1$-$\alpha^4$ (step 3730). The channel selection module 3625 then reorders the respective one of the comprehensive channel list $\alpha^1$-$\alpha^4$ (step 3735), sets the channel list pointer to "1" (step 3740), and returns to step 3705.

If none of the television channels $\lambda_x^1$-$\lambda_x^4$ has been newly watched at step 3705, e.g., if the predetermined period of time has not expired, the channel selection module 3625 determines whether the favorite channel key 1665 has been operated (step 3745). If so, the channel selection module 3625 selects a listed television channel $\alpha_l$ from one of the comprehensive channel lists 60 $^1$-$\alpha^4$, and in this case, the listed television channel $\alpha_l$ corresponding to the channel list pointer (step 3750). The comprehensive channel list from which the listed television channel $\alpha_l$ is selected will be specified by which multi-user key 3565 is operated. The television is then switched to the selected television channel $\alpha_l$ (step 3755), and the channel list pointer is incremented (step 3760). After step 3760, or if the favorite channel key 1665 has not been operated at step 3745, the listing program 3600 then returns to step 3705, where it is determined again if one of the television channels $\lambda_x^1$-$\lambda_x^4$ has been watched.

Generalized Multi-User Learning Program (Single Processor Action-Maximum Probability of Majority Approval)

Figure 55:
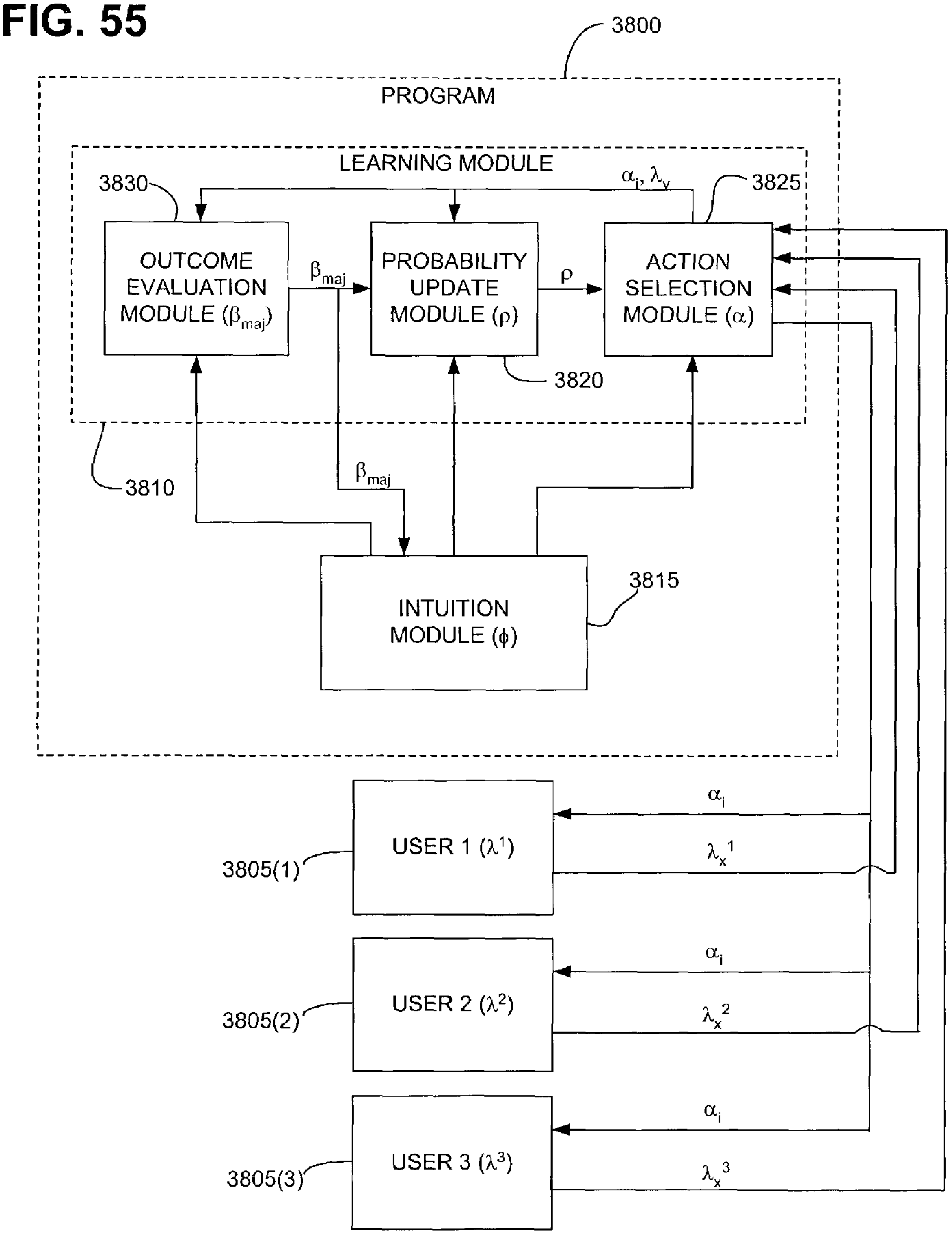
FIG. 55 is a block diagram of yet another multiple-user learning software program constructed in accordance with the present inventions, wherein a maximum probability of majority approval (MPMA) learning model is assumed.

Referring to FIG. 55, still another multi-user learning program 3800 developed in accordance with the present inventions can be generally implemented to provide intuitive learning capability to any variety of processing devices. In the previous multiple user action embodiments, each user action incrementally affected the relevant action probability distribution. The learning program 3800 is similar to the SIMO-based program 2200 in that multiple users 3805(1)-(3) (here, three) interact with the program 3800 by receiving the same processor action $\alpha_i$ from a processor action set $\alpha$ within the program 3800, and each independently select corresponding user actions $\lambda_x^1$-$\lambda_x^3$ from respective user action sets $\lambda^1$-$\lambda^3$ based on the received processor action $\alpha_l$. Again, in alternative embodiments, the users 3805 need not receive the processor action $\alpha_l$, the selected user actions $\lambda_x^1$-$\lambda_x^3$ need not be based on the received processor action $\alpha_l$, and/or the processor actions $\alpha_l$ may be selected in response to the selected user actions $\lambda_x^1$-$\lambda_x^3$. The significance is that a processor action $\alpha_l$ and user actions $\lambda_x^1$-$\lambda_x^3$ are selected.

The program 3800 is capable of learning based on the measured success ratio (e.g., minority, majority, super majority, unanimity) of the selected processor action $\alpha_l$ relative to the selected user actions $\lambda_x^1$-$\lambda_x^3$ as compared to a reference success ratio, which for the purposes of this specification, can be measured as a single outcome value 62 $_{maj}$. In essence, the selected user actions $\lambda_x^1$-$\lambda_x^3$ are treated as a selected action vector $\lambda_v$. For example, if the reference success ratio for the selected processor action $\alpha_l$ is a majority, $\beta_{maj}$ may equal "1" (indicating a success) if the selected processor action $\alpha_l$ is successful relative to two or more of the three selected user actions $\lambda_x^1$-$\lambda_x^3$, and may equal "0" (indicating a failure) if the selected processor action $\alpha_l$ is successful relative to one or none of the three selected user actions $\lambda_x^1$-$\lambda_x^3$. It should be noted that the methodology contemplated by the program 3800 can be applied to a single user that selects multiple user actions to the extent that the multiple actions can be represented as an action vector $\lambda_v$, in which case, the determination of the outcome value $\beta_{maj}$ can be performed in the same manner. As will be described in further detail below, the program 3800 directs its learning capability by dynamically modifying the model that it uses to learn based on a performance index $\phi$ to achieve one or more objectives.

To this end, the program 3800 generally includes a probabilistic learning module 3810 and an intuition module 3815. The probabilistic learning module 3810 includes a probability update module 3820, an action selection module 3825, and an outcome evaluation module 3830. Briefly, the probability update module 3820 uses learning automata theory as its learning mechanism, and is configured to generate and update an action probability distribution p based on the outcome value $\beta_{maj}$. In this scenario, the probability update module 3820 uses a single stochastic learning automaton with a single input to a single-teacher environment (with the users 3805 (1)-(3), in combination, as a single teacher), or alternatively, a single stochastic learning automaton with a single input to a single-teacher environment with multiple outputs that are treated as a single output), and thus, a SISO model is assumed. The significance is that multiple outputs, which are generated by multiple users or a single user, are quantified by a single outcome value $\beta_{maj}$. Alternatively, if the users 3805 (1)-(3) receive multiple processor actions $\alpha_l$, some of which are different, multiple SISO models can be assumed. For example if three users receive processor action $\alpha_1$, and two users receive processor action a2, the action probability distribution p can be sequentially updated based on the processor action $\alpha_1$, and then updated based on the processor action $\alpha_2$, or updated in parallel, or in combination thereof. Exemplary equations that can be used for the SISO model will be described in further detail below.

The action selection module 3825 is configured to select the processor action $\alpha_l$ from the processor action set $\alpha$ based on the probability values $p_l$ contained within the action probability distribution p internally generated and updated in the probability update module 3820. The outcome evaluation module 3830 is configured to determine and generate the outcome value $\beta_{maj}$ based on the relationship between the selected processor action $\alpha_l$ and the user action vector $\lambda_v$. The intuition module 3815 modifies the probabilistic learning module 3810 (e.g., selecting or modifying parameters of algorithms used in learning module 3810) based on one or more generated performance indexes $\phi$ to achieve one or more objectives. As previously discussed with respect to the outcome value $\beta$, the performance index $\phi$ can be generated directly from the outcome value $\beta_{maj}$ or from something dependent on the outcome value $\beta_{maj}$, e.g., the action probability distribution p, in which case the performance index $\phi$ may be a function of the action probability distribution p, or the action probability distribution p may be used as the performance index $\phi$. Alternatively, the intuition module 3815 may be non-existent, or may desire not to modify the probabilistic learning module 3810 depending on the objective of the program 3800.

The modification of the probabilistic learning module 3810 is generally accomplished similarly to that described with respect to the afore-described probabilistic learning module 110. That is, the functionalities of (1) the probability update module 3820 (e.g., by selecting from a plurality of algorithms used by the probability update module 3820, modifying one or more parameters within an algorithm used by the probability update module 3820, transforming or otherwise modifying the action probability distribution p); (2) the action selection module 3825 (e.g., limiting or expanding selection of the action $\alpha_l$ corresponding to a subset of probability values contained within the action probability distribution p); and/or (3) the outcome evaluation module 3830 (e.g., modifying the nature of the outcome value $\beta_{maj}$ or otherwise the algorithms used to determine the outcome values $\beta_{maj}$), are modified. Specific to the learning program 3800, the intuition module 3815 may modify the outcome evaluation module 3830 by modifying the reference success ratio of the selected processor action $\alpha_l$. For example, for an outcome value $\beta_{maj}$ to indicate a success, the intuition module 3815 may modify the reference success ratio of the selected processor action $\alpha_l$ from, e.g., a super-majority to a simple majority, or vice versa.

Figure 56:
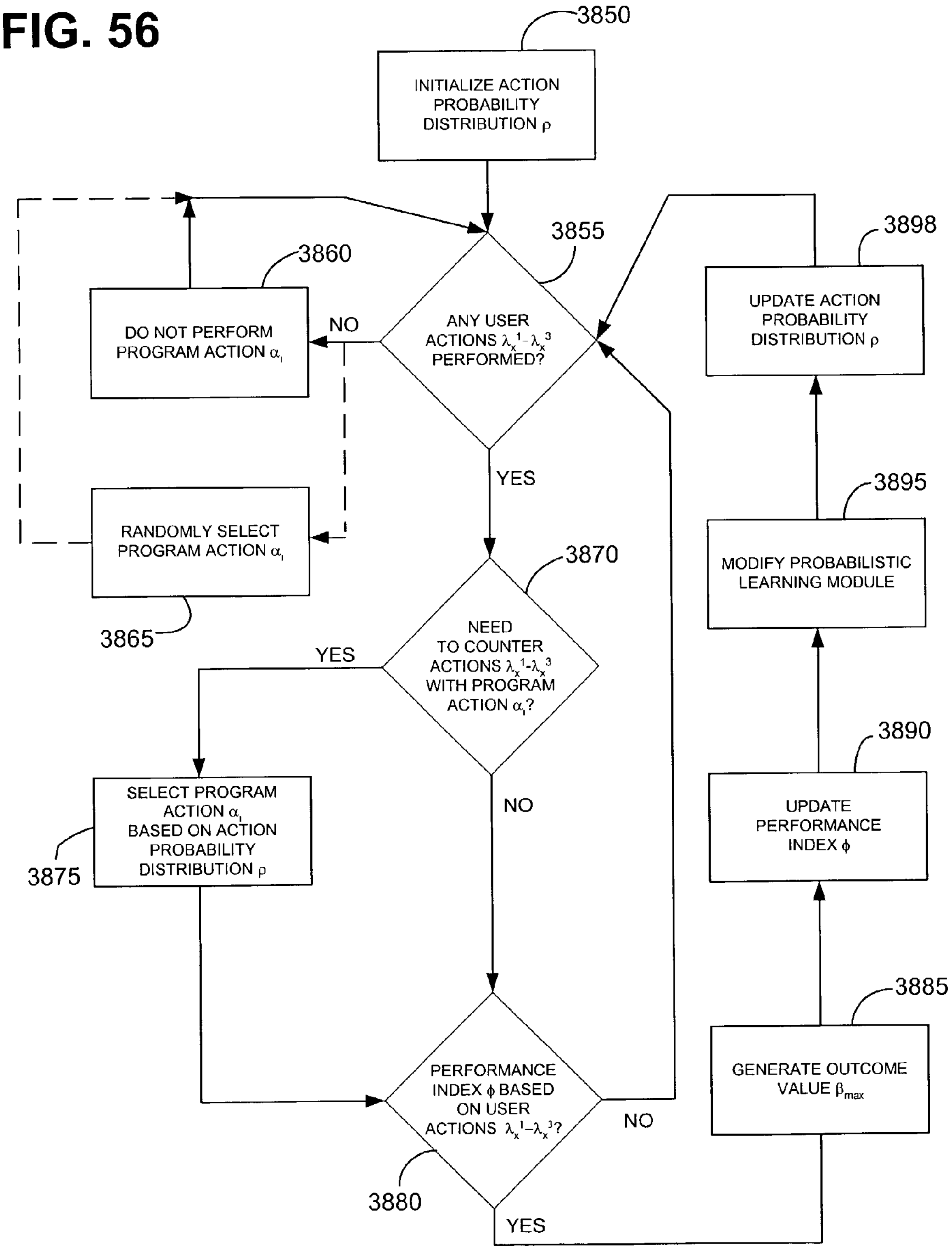
FIG. 56 is a flow diagram illustrating a preferred method performed by the program of FIG. 55.

The various different types of learning methodologies previously described herein can be applied to the probabilistic learning module 3810. The operation of the program 3800 is similar to that of the program 2200 described with respect to FIG. 31, with the exception that, rather than updating the action probability distribution p based on several outcome values $\beta^1$-$\beta^3$ for the users 3805, the program 3800 updates the action probability distribution p based on a single outcome value $\beta_{maj}$ derived from the measured success of the selected processor action $\alpha_l$ relative to the selected user actions $\lambda_x^1$-$\lambda_x^3$, as compared to a reference success ratio. Specifically, referring to FIG. 56, the probability update module 3820 initializes the action probability distribution p (step 3850) similarly to that described with respect to step 150 of FIG. 4. The action selection module 3825 then determines if one or more of the user actions $\lambda_x^1$-$\lambda_x^3$ have been selected from the respective user action sets $\lambda^1$-$\lambda^3$ (step 3855). If not, the program 3800 does not select a processor action $\alpha_l$ from the processor action set $\alpha$ (step 3860), or alternatively selects a processor action $\alpha_i$, e.g., randomly, notwithstanding that none of the user actions $\lambda_x^1$-$\lambda_x^3$ has been selected (step 3865), and then returns to step 3855 where it again determines if one or more of the user actions $\lambda_x^1$-$\lambda_x^3$ have been selected. If one or more of the user actions $\lambda_x^1$-$\lambda_x^3$ have been performed at step 3855, the action selection module 3825 determines the nature of the selected ones of the user actions $\lambda_x^1$-$\lambda_x^3$.

Specifically, the action selection module 3825 determines whether any of the selected ones of the user actions $\lambda_x^1$-$\lambda_x^3$ should be countered with a processor action $\alpha_l$ (step 3870). If so, the action selection module 3825 selects a processor action $\alpha_l$ from the processor action set a based on the action probability distribution p (step 3875). After the performance of step 3875 or if the action selection module 3825 determines that none of the selected user actions $\lambda_x^1$-$\lambda_x^3$ is of the type that should be countered with a processor action $\alpha_l$, the action selection module 3825 determines if any of the selected user actions $\lambda_x^1$-$\lambda_x^3$ are of the type that the performance index $\phi$ is based on (step 3880).

If not, the program 3800 returns to step 3855 to determine again whether any of the user actions $\lambda_x^1$-$\lambda_x^3$ have been selected. If so, the outcome evaluation module 3830 quantifies the performance of the previously selected processor action $\alpha_l$ relative to the reference success ratio (minority, majority, supermajority, etc.) by generating a single outcome value $\beta_{maj}$ (step 3885). The intuition module 3815 then updates the performance index $\phi$ based on the outcome value $\beta_{maj}$, unless the performance index $\phi$ is an instantaneous performance index that is represented by the outcome value $\beta_{maj}$ itself (step 3890). The intuition module 3815 then modifies the probabilistic learning module 3810 by modifying the functionalities of the probability update module 3820, action selection module 3825, or outcome evaluation module 3830 (step 3895). The probability update module 3820 then, using any of the updating techniques described herein, updates the action probability distribution p based on the generated outcome value $\beta_{maj}$ (step 3898).

The program 3800 then returns to step 3855 to determine again whether any of the user actions $\lambda_x^1$-$\lambda_x^3$ have been selected. It should be noted that the order of the steps described in FIG. 56 may vary depending on the specific application of the program 3800.

Multi-Player Game Program (Single Game Move—Maximum Probability of Majority Approval)

Figure 57:
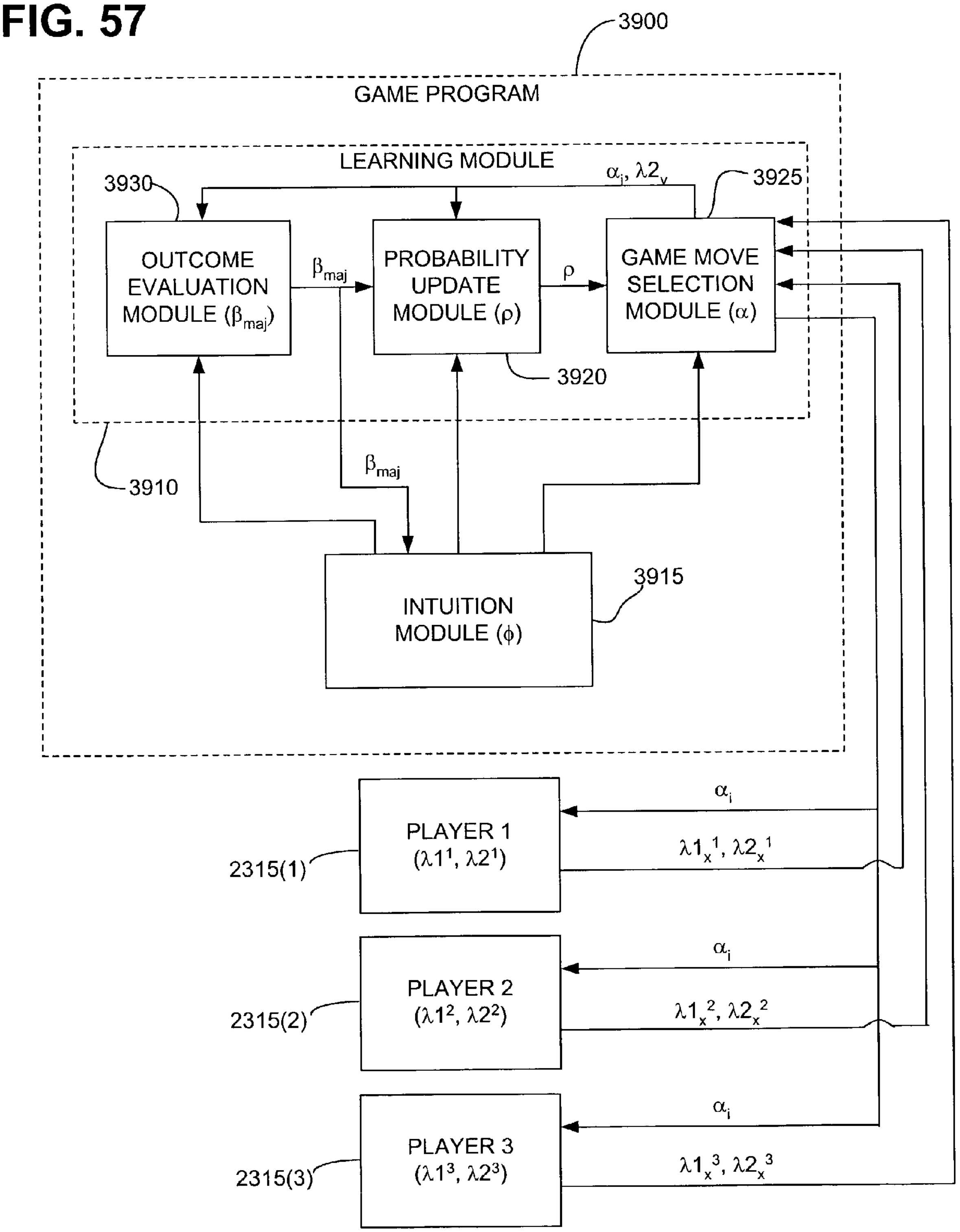
FIG. 57 is a block diagram of a multiple-player game program that can be employed in the duck hunting game of FIG. 32 to which the generalized program of FIG. 55 can be applied.

Having now generally described the components and functionality of the learning program 3800, we now describe one of its various applications. Referring to FIG. 57, a multiple-player game program 3900 developed in accordance with the present inventions is described in the context of the previously described duck hunting game 2300 (see FIG. 32). Because the game program 3900 will determine the success or failure of a selected game move based on the player moves as a group, in this version of the duck hunting game 2300, the players 2315(1)-(3) play against the duck 2320 as a team, such that there is only one player score 2360 and duck score 2365 that is identically displayed on all three computers 760(1)-(3).

The game program 3900 generally includes a probabilistic learning module 3910 and an intuition module 3915, which are specifically tailored for the game 2300. The probabilistic learning module 3910 comprises a probability update module 3920, a game move selection module 3925, and an outcome evaluation module 3930, which are similar to the previously described probability update module 2420, game move selection module 2425, and outcome evaluation module 2430, with the exception that they operate on the player moves $\lambda 2_x^1$-$\lambda 2_x^3$ as a player move vector $\lambda 2_v$ and determine and output a single outcome value $\beta_{maj}$ that indicates how favorable the selected game move $\alpha_l$ in comparison with the received player move vector $\lambda 2_v$.

As previously discussed, the game move probability distribution p is updated periodically, e.g., every second, during which each of any number of the players 2315(1)-(3) may provide a corresponding number of player moves $\lambda 2_x^1$-$\lambda 2_x^3$ so that the player moves $\lambda 2_x^1$-$\lambda 2_x^3$ asynchronously performed by the players 2315(1)-(3) may be synchronized to a time period as a single player move vector $\lambda 2_v$. It should be noted that in other types of games, where the player moves $\lambda 2_x$ need not be synchronized to a time period, such as, e.g., strategy games, the game move probability distribution p may be updated after all players have performed a player move $\lambda 2_x$.

The game program 3900 may employ the following P-type Maximum Probability Majority Approval (MPMA) SISO equations:

$$p_i(k+1) = p_i(k) + \sum_{\substack{j=1 \\ j \neq i}}^{n} g_j(p(k)); \text{ and} \quad [38]$$

$$p_j(k+1) = p_j(k) - g_j(p(k)), \text{ when } \beta_{maj}(k)=1 \text{ and } \alpha_l \text{ is selected} \quad [39]$$

$$p_i(k+1) = p_i(k) - \sum_{\substack{j=1 \\ j \neq i}}^{n} h_j(p(k)); \text{ and} \quad [40]$$

$$p_j(k+1) = p_j(k) + h_j(p(k)), \text{ when, } \beta_{maj}(k)=0 \text{ and } \alpha_l \text{ is selected} \quad [41]$$

where $p_l(k+1)$, $p_l(k)$, $g_j(k))$, $h_j(p(k))$, i, j, k, and n have been previously defined, and $\beta_{maj}(k)$ is the outcome value based on a majority success ratio of the participating players.

As an example, if there are a total of ten players, seven of which have been determined to be participating, and if two of the participating players shoot the duck 2320 and the other five participating players miss the duck 2320, $\beta_{maj}(k)=1$, since a majority of the participating players missed the duck 2320. If, on the hand, four of the participating players shoot the duck 2320 and the other three participating players miss the duck 2320, $\beta_{maj}(k)=0$, since a majority of the participating players hit the duck 2320. Of course, the outcome value $\beta_{maj}$ need not be based on a simple majority, but can be based on a minority, supermajority, unanimity, or equality of the participating players. In addition, the players can be weighted, such that, for any given player move $\lambda 2_x$, a single player may be treated as two, three, or more players when determining if the success ratio has been achieved. It should be noted that a single player may perform more than one player move $\lambda 2_x$ in a single probability distribution updating time period, and thus be counted as multiple participating players. Thus, if there are three players, more than three participating players may be considered in equation.

Figure 58:
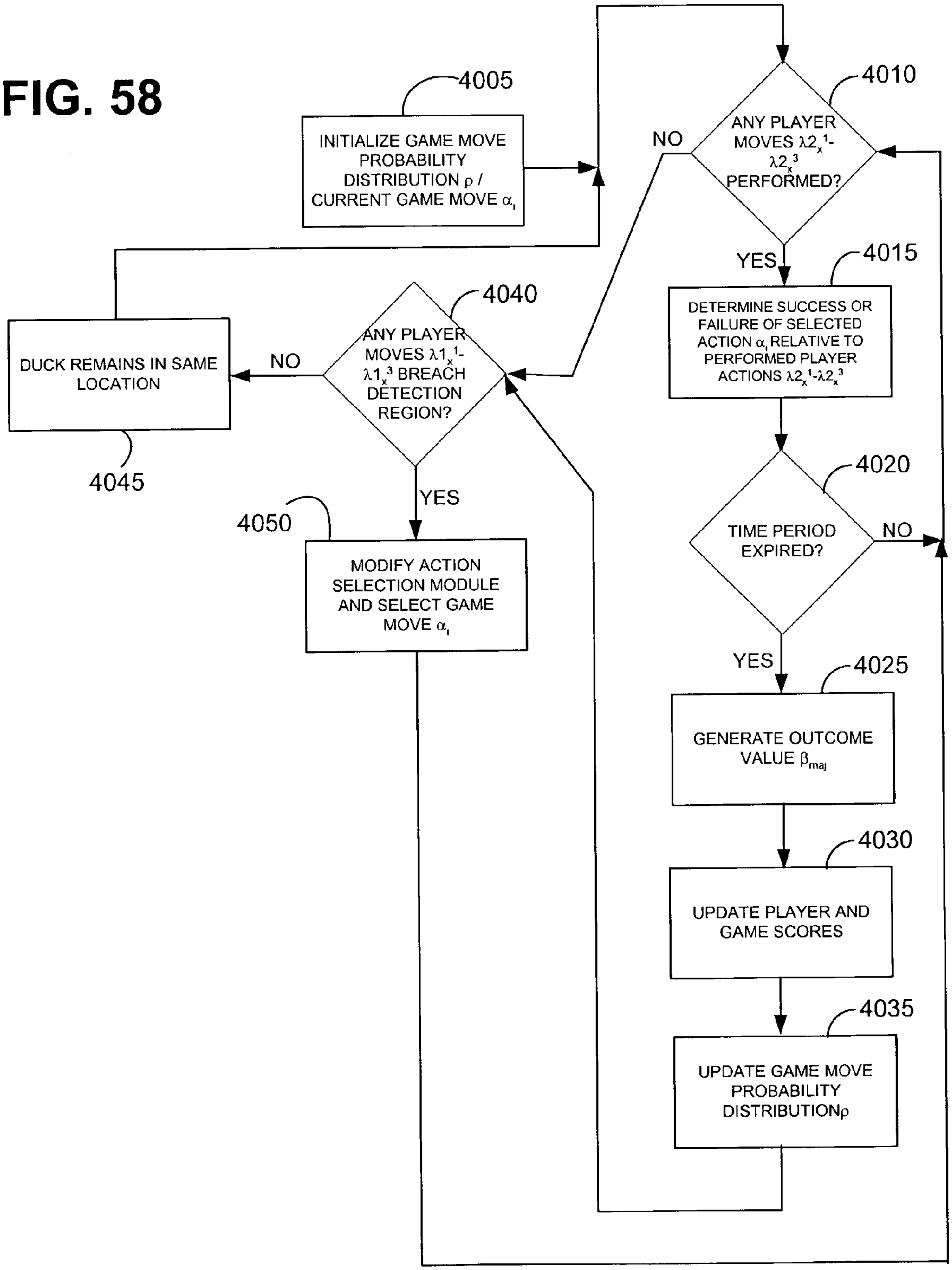
FIG. 58 is a flow diagram illustrating a preferred method performed by the game program of FIG. 57.

Having now described the structure of the game program 3900, the steps performed by the game program 3900 will be described with reference to FIG. 58. First, the probability update module 3920 initializes the game move probability distribution p and current game move $\alpha_l$ (step 4005) similarly to that described in step 405 of FIG. 9. Then, the game move selection module 3925 determines whether any of the player moves $\lambda 2_x^1$-$\lambda 2_x^3$ have been performed, and specifically whether the guns 2325(1)-(3) have been fired (step 4010). If any of the player moves $\lambda 2_x^1$-$\lambda 2_x^3$ have been performed, the outcome evaluation module 3930 determines the success or failure of the currently selected game move $\alpha_l$ relative to the performed ones of the player moves $\lambda 2_x^1$-$\lambda 2_x^3$ (step 4015). The intuition module 3915 then determines if the given time period to which the player moves $\lambda 2_x^1$-$\lambda 2_x^3$ are synchronized has expired (step 4020). If the time period has not expired, the game program 3900 will return to step 4010 where the game move selection module 3925 determines again if any of the player moves $\lambda 2_x^1$-$\lambda 2_x^3$ have been performed. If the time period has expired, the outcome evaluation module 3930 determines the outcome value $\beta_{maj}$ for the player moves $\lambda 2_x^1$-$\lambda 2_x^3$, i.e., the player move vector $\lambda 2_v$ (step 4025). The intuition module 3915 then updates the combined player score 2360 and duck scores 2365 based on the outcome value $\beta_{maj}$ (step 4030). The probability update module 3920 then, using the MPMA SISO equations [38]-[41], updates the game move probability distribution p based on the generated outcome value $\beta_{maj}$ (step 4035).

After step 4035, or if none of the player moves $\lambda 2_x^1$-$\lambda 2_x^3$ has been performed at step 4010, the game move selection module 3925 determines if any of the player moves $\lambda 1_l^1$-$\lambda 1_l^3$ have been performed, i.e., guns 2325(1)-(3), have breached the gun detection region 270 (step 4040). If none of the guns 2325(1)-(3) has breached the gun detection region 270, the game move selection module 3925 does not select a game move $\alpha_l$ from the game move set α and the duck 2320 remains in the same location (step 4045). Alternatively, the game move $\alpha_l$ may be randomly selected, allowing the duck 2320 to dynamically wander. The game program 3900 then returns to step 4010 where it is again determined if any of the player moves $\lambda 1_l^1$-$\lambda 1_l^3$ has been performed.

Figure 9:
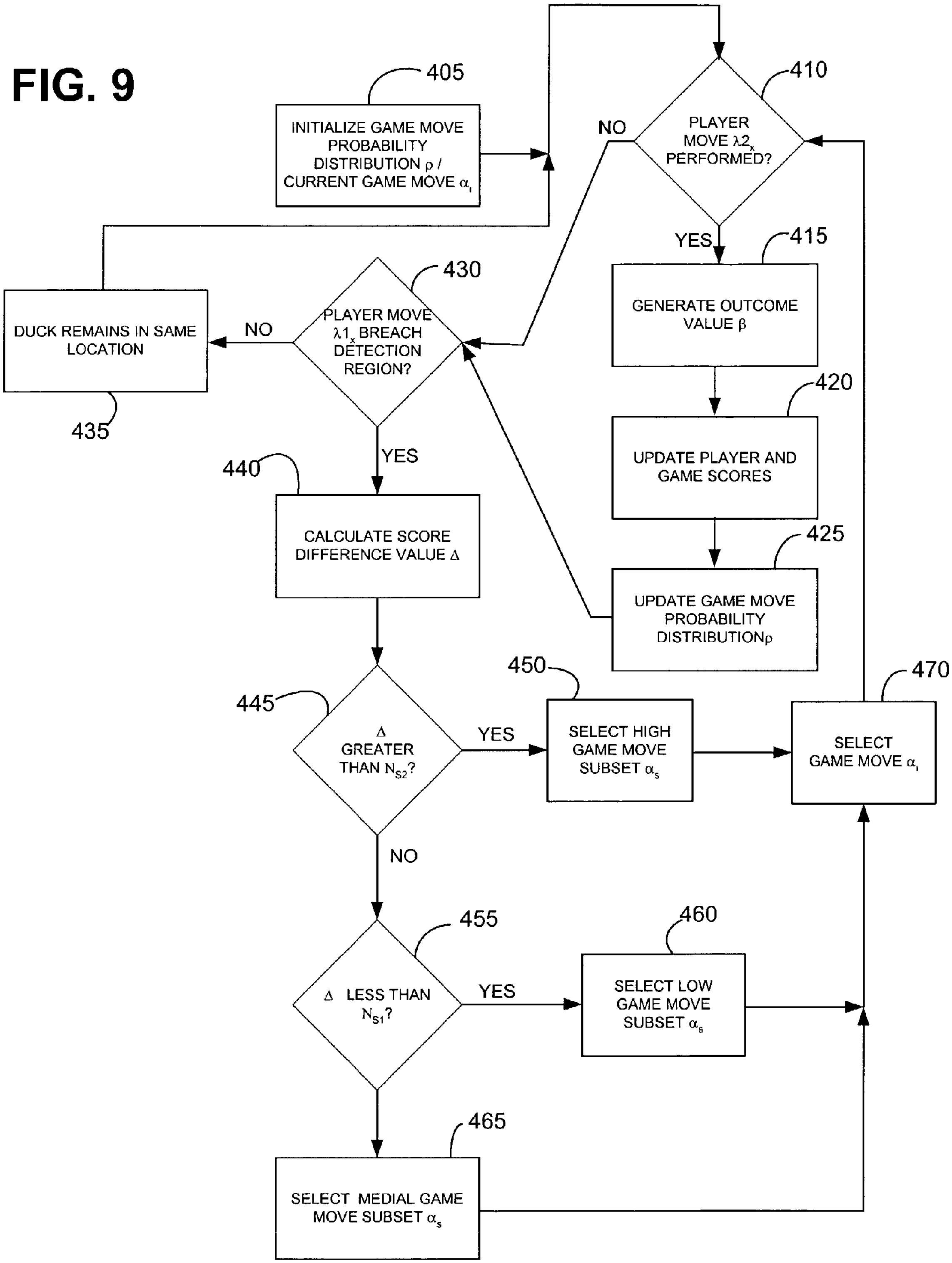
FIG. 9 is a flow diagram illustrating a preferred method performed by the game program of FIG. 8.

If any of the guns 2325(1)-(3) have breached the gun detection region 270 at step 4040, the intuition module 3915 modifies the functionality of the game move selection module 3925 based on the performance index φ, and the game move selection module 3925 selects a game move $\alpha_l$ from the game move set α in the manner previously described with respect to steps 440-470 of FIG. 9 (step 4050). It should be noted that, rather than use the game move subset selection technique, other afore-described techniques used to dynamically and continuously match the skill level of the players 2315(1)-(3) with the skill level of the game 2300, such as that illustrated in FIG. 10, can be alternatively or optionally be used as well in the game program 3900. Also, the intuition module 3915 may modify the functionality of the outcome evaluation module 3930 by modifying the reference success ratio of the selected game move $\alpha_l$ on which the single outcome value $\beta_{maj}$ is based.

Figure 59:
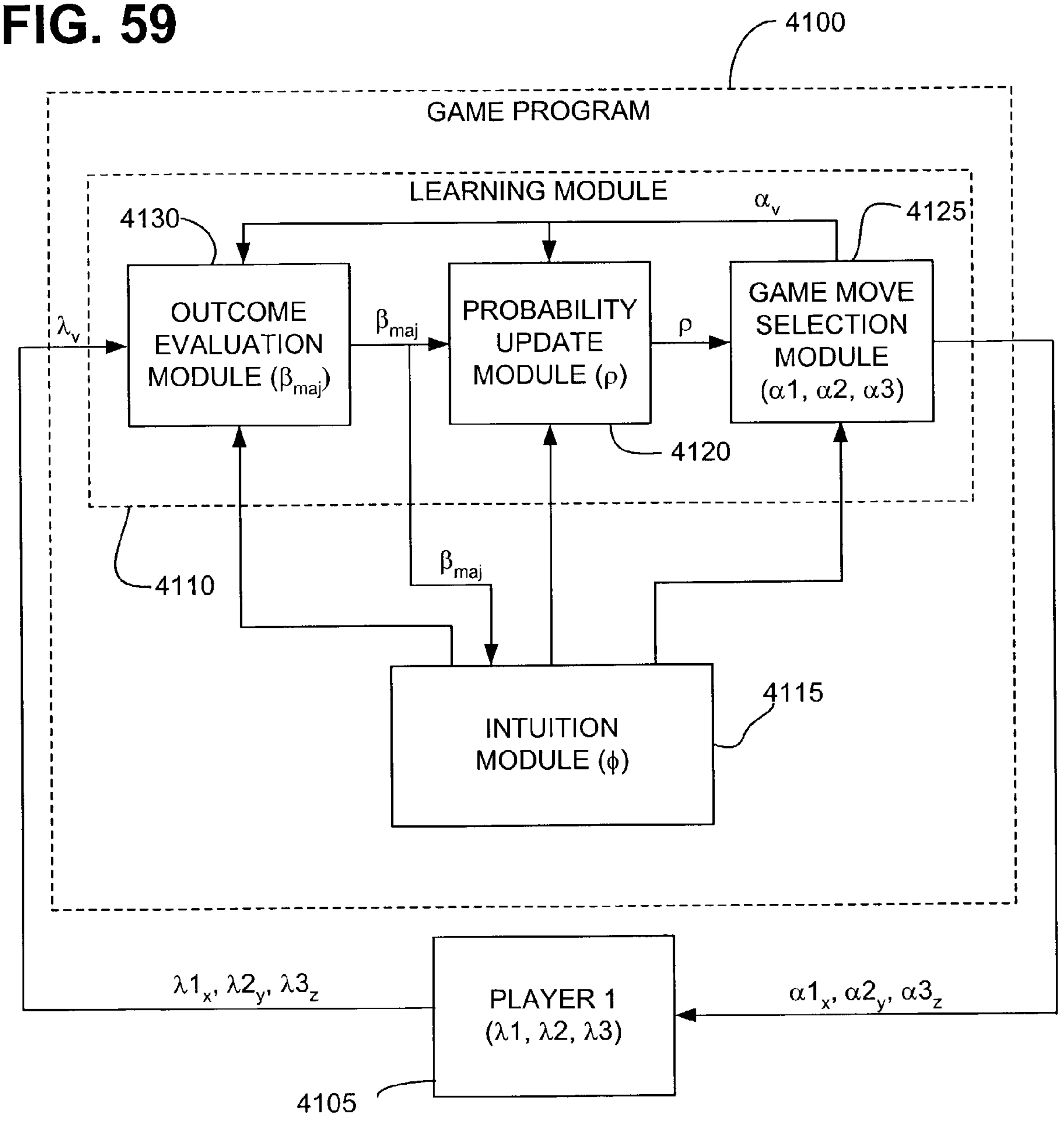
FIG. 59 is a block diagram of a single-player game program that can be employed in a war game to which the generalized program of FIG. 55 can be applied.

The learning program 3800 can also be applied to single-player scenarios, such as, e.g., strategy games, where the player performs several game moves at a time. For example, referring to FIG. 59, a game program 4100 developed in accordance with the present inventions is described in the context of a war game, which can be embodied in any one of the previously described computer systems. In the war game, a player 4105 can select any one of a variety of combinations of weaponry to attack the game's defenses. For example, in the illustrated embodiment, the player 4105 may be able to select three weapons at a time, and specifically, one of two types of bombs (denoted by $\lambda 1_1$ and $\lambda 1_2$) from a bomb set λ1, one of three types of guns (denoted by $\lambda 2_1$, $\lambda 2_2$, and $\lambda 2_3$) from a gun set λ2, and one of two types of arrows (denoted by $\lambda 3_1$ and $\lambda 3_2$) from an arrow set λ3. Thus, the selection of three weapons can be represented by weapon vector $\lambda_v$ ($\lambda 1_l$, $\lambda 2_y$, and $\lambda 3_z$) that will be treated as a single game move. Given that three weapons will be selected in combination, there will be a total of twelve weapon vectors $\lambda_v$ available to the player 4105, as illustrated in the following Table 17.

TABLE 17

Exemplary Weapon Combinations for War Game

| $\lambda_v$ | $\lambda 1_x$ | $\lambda 2_y$ | $\lambda 3_z$ |
|---|---|---|---|
| Bomb 1, Gun 1, Arrow 1 ($\lambda_1$) | Bomb 1 ($\lambda 1_1$) | Gun 1 ($\lambda 2_1$) | Arrow 1 ($\lambda 3_1$) |
| Bomb 1, Gun 1, Arrow 2 ($\lambda_2$) | Bomb 1 ($\lambda 1_1$) | Gun 1 ($\lambda 2_1$) | Arrow 2 ($\lambda 3_2$) |
| Bomb 1, Gun 2, Arrow 1 ($\lambda_2$) | Bomb 1 ($\lambda 1_1$) | Gun 2 ($\lambda 2_2$) | Arrow 1 ($\lambda 3_1$) |
| Bomb 1, Gun 2, Arrow 2 ($\lambda_4$) | Bomb 1 ($\lambda 1_1$) | Gun 2 ($\lambda 2_2$) | Arrow 2 ($\lambda 3_2$) |
| Bomb 1, Gun 3, Arrow 1 ($\lambda_5$) | Bomb 1 ($\lambda 1_1$) | Gun 3 ($\lambda 2_3$) | Arrow 1 ($\lambda 3_1$) |
| Bomb 1, Gun 3, Arrow 2 ($\lambda_6$) | Bomb 1 ($\lambda 1_1$) | Gun 3 ($\lambda 2_3$) | Arrow 2 ($\lambda 3_2$) |
| Bomb 2, Gun 1, Arrow 1 ($\lambda_7$) | Bomb 2 ($\lambda 1_2$) | Gun 1 ($\lambda 2_1$) | Arrow 1 ($\lambda 3_1$) |
| Bomb 2, Gun 1, Arrow 2 ($\lambda_8$) | Bomb 2 ($\lambda 1_2$) | Gun 1 ($\lambda 2_1$) | Arrow 2 ($\lambda 3_2$) |
| Bomb 2, Gun 2, Arrow 1 ($\lambda_9$) | Bomb 2 ($\lambda 1_2$) | Gun 2 ($\lambda 2_2$) | Arrow 1 ($\lambda 3_1$) |
| Bomb 2, Gun 2, Arrow 2 ($\lambda_{10}$) | Bomb 2 ($\lambda 1_2$) | Gun 2 ($\lambda 2_2$) | Arrow 2 ($\lambda 3_2$) |
| Bomb 2, Gun 3, Arrow 1 ($\lambda_{11}$) | Bomb 2 ($\lambda 1_2$) | Gun 3 ($\lambda 2_3$) | Arrow 1 ($\lambda 3_1$) |
| Bomb 2, Gun 3, Arrow 2 ($\lambda_{12}$) | Bomb 2 ($\lambda 1_2$) | Gun 3 ($\lambda 2_3$) | Arrow 2 ($\lambda 3_2$) |

An object of the game (such as a monster or warrior) may be able to select three defenses at a time, and specifically, one of two types of bomb defusers (denoted by $\alpha 1_1$ and $\alpha 1_2$) from a bomb defuser set α1 against the player's bombs, one of three types of body armor (denoted by $\alpha 2_1$, $\alpha 2_2$, and $\alpha 2_3$) from a body armor set $\alpha 2$ against the players' guns, and one of two types of shields (denoted by $\alpha 1_1$ and $\alpha 1_2$) from a shield set $\alpha 3$ against the players' arrows. Thus, the selection of three defenses can be represented by game move vector $\alpha_v$ ($\alpha 1_l$, $\alpha 2_y$, and $\alpha 3_z$) that will be treated as a single game move. Given that three defenses will be selected in combination, there will be a total of twelve game move vectors $\alpha_v$ available to the game, as illustrated in the following Table 18.

TABLE 18

Exemplary Defense Combinations for War Game

| $\alpha_v$ | $\alpha 1_x$ | $\alpha 2_y$ | $\alpha 3_z$ |
|---|---|---|---|
| Defuser 1, Armor 1, Shield 1 ($\lambda_1$) | Defuser 1 ($\lambda 1_1$) | Armor 1 ($\lambda 2_1$) | Shield 1 ($\lambda 3_1$) |
| Defuser 1, Armor 1, Shield 2 ($\lambda_2$) | Defuser 1 ($\lambda 1_1$) | Armor 1 ($\lambda 2_1$) | Shield 2 ($\lambda 3_2$) |
| Defuser 1, Armor 2, Shield 1 ($\lambda_3$) | Defuser 1 ($\lambda 1_1$) | Armor 2 ($\lambda 2_2$) | Shield 1 ($\lambda 3_1$) |
| Defuser 1, Armor 2, Shield 2 ($\lambda_4$) | Defuser 1 ($\lambda 1_1$) | Armor 2 ($\lambda 2_2$) | Shield 2 ($\lambda 3_2$) |
| Defuser 1, Armor 3, Shield 1 ($\lambda_5$) | Defuser 1 ($\lambda 1_1$) | Armor 3 ($\lambda 2_3$) | Shield 1 ($\lambda 3_1$) |
| Defuser 1, Armor 3, Shield 2 ($\lambda_6$) | Defuser 1 ($\lambda 1_1$) | Armor 3 ($\lambda 2_3$) | Shield 2 ($\lambda 3_2$) |
| Defuser 2, Armor 1, Shield 1 ($\lambda_7$) | Defuser 2 ($\lambda 1_2$) | Armor 1 ($\lambda 2_1$) | Shield 1 ($\lambda 3_1$) |
| Defuser 2, Armor 1, Shield 2 ($\lambda_8$) | Defuser 2 ($\lambda 1_2$) | Armor 1 ($\lambda 2_1$) | Shield 2 ($\lambda 3_2$) |
| Defuser 2, Armor 2, Shield 1 ($\lambda_9$) | Defuser 2 ($\lambda 1_2$) | Armor 2 ($\lambda 2_2$) | Shield 1 ($\lambda 3_1$) |
| Defuser 2, Armor 2, Shield 2 ($\lambda_{10}$) | Defuser 2 ($\lambda 1_2$) | Armor 2 ($\lambda 2_2$) | Shield 2 ($\lambda 3_2$) |
| Defuser 2, Armor 3, Shield 1 ($\lambda_{11}$) | Defuser 2 ($\lambda 1_2$) | Armor 3 ($\lambda 2_3$) | Shield 1 ($\lambda 3_1$) |
| Defuser 2, Armor 3, Shield 2 ($\lambda_{12}$) | Defuser 2 ($\lambda 1_2$) | Armor 3 ($\lambda 2_3$) | Shield 2 ($\lambda 3_2$) |

The game maintains a score for the player and a score for the game. To this end, if the selected defenses $\alpha$ of the game object fail to prevent one of the weapons $\lambda$ selected by the player from hitting or otherwise damaging the game object, the player score will be increased. In contrast, if the selected defenses $\alpha$ of the game object prevent one of the weapons $\lambda$ selected by the player from hitting or otherwise damaging the game object, the game score will be increased. In this game, the selected defenses a of the game, as represented by the selected game move vector $\alpha_v$ will be successful if the game object is damaged by one or none of the selected weapons $\lambda$ (thus resulting in an increased game score), and will fail, if the game object is damaged by two or all of the selected weapons $\lambda$ (thus resulting in an increased player score). As previously discussed with respect to the game 200, the increase in the score can be fixed, one of a multitude of discrete values, or a value within a continuous range of values.

As will be described in further detail below, the game increases its skill level by learning the player's strategy and selecting the weapons based thereon, such that it becomes more difficult to damage the game object as the player becomes more skillful. The game optionally seeks to sustain the player's interest by challenging the player. To this end, the game continuously and dynamically matches its skill level with that of the player by selecting the weapons based on objective criteria, such as, e.g., the difference between the player and game scores. In other words, the game uses this score difference as a performance index $\phi$ in measuring its performance in relation to its objective of matching its skill level with that of the game player. Alternatively, the performance index $\phi$ can be a function of the game move probability distribution p.

The game program 4100 generally includes a probabilistic learning module 4110 and an intuition module 4115, which are specifically tailored for the war game. The probabilistic learning module 4110 comprises a probability update module 4120, a game move selection module 4125, and an outcome evaluation module 4130. Specifically, the probability update module 4120 is mainly responsible for learning the player's strategy and formulating a counterstrategy based thereon, with the outcome evaluation module 4130 being responsible for evaluating the selected defense vector $\alpha_v$ relative to the weapon vector $\lambda_x$, selected by the player 4105. The game move selection module 4125 is mainly responsible for using the updated counterstrategy to select the defenses in response to weapons selected by the game object. The intuition module 4115 is responsible for directing the learning of the game program 4100 towards the objective, and specifically, dynamically and continuously matching the skill level of the game with that of the player. In this case, the intuition module 4115 operates on the game move selection module 4125, and specifically selects the methodology that the game move selection module 4125 will use to select the defenses $\alpha 1_l$, $\alpha 2_y$, and $\alpha 3z$ from defense sets $\alpha 1$, $\alpha 2$, and $\alpha 3$, i.e., one of the twelve defense vectors $\alpha_v$. Optionally, the intuition module 4115 may operate on the outcome evaluation module 4130, e.g., by modifying the reference success ratio of the selected defense vector $\alpha_v$, i.e., the ratio of hits to the number of weapons used. Of course if the immediate objective is to merely determine the best defense vector $\alpha_v$, the intuition module 4115 may simply decide to not modify the functionality of any of the modules.

To this end, the outcome evaluation module 4130 is configured to receive weapons $\lambda 1_x$, $\lambda 2_y$, and $\lambda 3_z$ from the player, i.e., one of the twelve weapon vectors A. The outcome evaluation module 4130 then determines whether the previously selected defenses $\alpha 1_l$, $\alpha 2_y$, and $\alpha 3_z$, i.e., one of the twelve defense vectors $\alpha_v$, were able to prevent damage incurred from the received weapons $\lambda 1_l$, $\lambda 2y$, and $\lambda 3_z$, with the outcome value , $\beta_{maj}$ equaling one of two predetermined values, e.g., "1" if two or more of the defenses $\alpha 1_l$, $\alpha 2_y$, and $\alpha 3_z$ were successful, or "0" if two or more of the defenses $\alpha 1_l$, $\alpha 2_y$, and $\alpha 3_z$ were unsuccessful.

The probability update module 4120 is configured to receive the outcome values $\beta_{maj}$ from the outcome evaluation module 4130 and output an updated game strategy (represented by game move probability distribution p) that the game object will use to counteract the player's strategy in the future. The probability update module 4120 updates the game move probability distribution p using the P-type MPMA SISO equations [38]-[41], with the game move probability distribution p containing twelve probability values $p_v$ corresponding to the twelve defense vectors $\alpha_v$. The game move selection module 4125 pseudo-randomly selects the defense vector $\alpha_v$ based on the updated game strategy, and is thus, further configured to receive the game move probability distribution p from the probability update module 4120, and selecting the defense vector $\alpha_v$ based thereon.

The intuition module 4115 is configured to modify the functionality of the game move selection module 4125 based on the performance index $\phi$, and in this case, the current skill level of the players relative to the current skill level of the game. In the preferred embodiment, the performance index $\phi$ is quantified in terms of the score difference value $\Delta$ between the player score and the game object score. In the manner described above with respect to game 200, the intuition module 4115 is configured to modify the functionality of the game move selection module 4125 by subdividing the set of twelve defense vectors $\Delta$ into a plurality of defense vector subsets, and selecting one of the defense vectors subsets based on the score difference value Δ. The game move selection module 4125 is configured to pseudo-randomly select a single defense vector $\alpha_v$ from the selected defense vector subset. Alternatively, the intuition module 4115 modifies the maximum number of defenses α in the defense vector $\alpha_v$ that must be successful from two to one, e.g., if the relative skill level of the game object is too high, or from two to three, e.g., if the relative skill level of the game object is too low. Even more alternatively, the intuition module 4115 does not exist or determines not to modify the functionality of any of the modules, and the game move selection module 4125 automatically selects the defense vector $\alpha_v$ corresponding to the highest probability value $p_v$ to always find the best defense for the game object.

Figure 60:
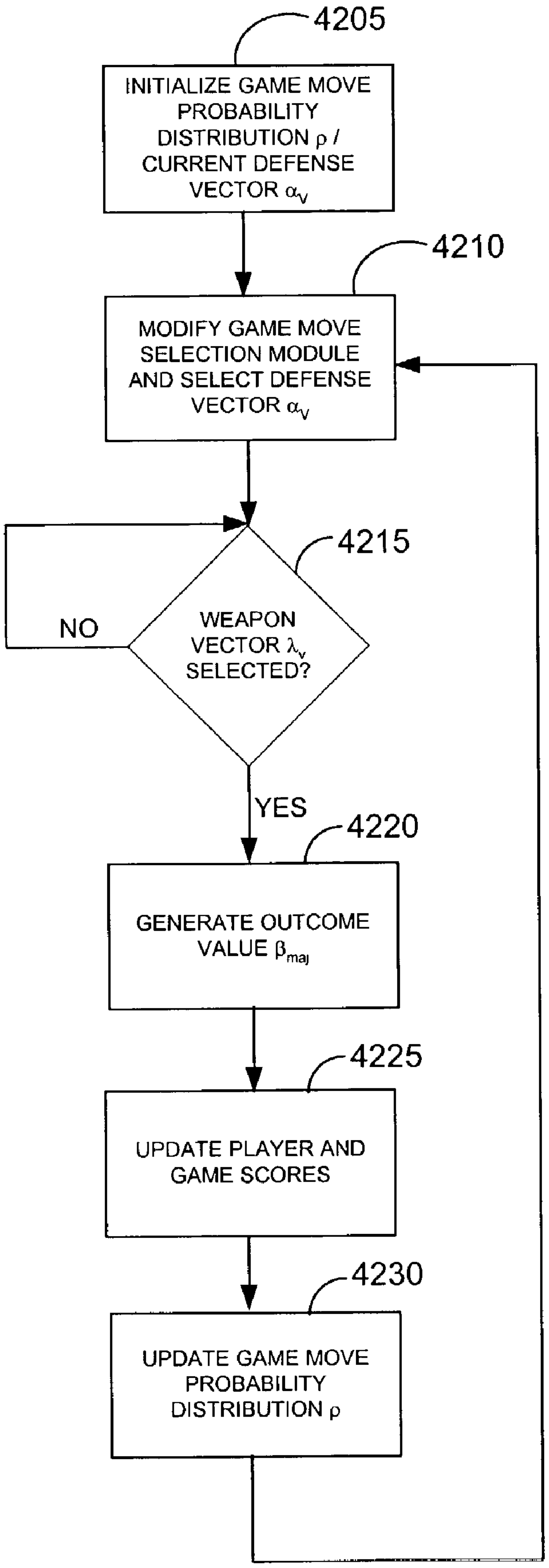
FIG. 60 is a flow diagram illustrating a preferred method performed by the game program of FIG. 59.

Having now described the structure of the game program 4100, the steps performed by the game program 4100 will be described with reference to FIG. 60. First, the probability update module 4120 initializes the game move probability distributions and current defense vector $\alpha_v$ (step 4205) similarly to that described in step 405 of FIG. 9. Then, the intuition module 4115 modifies the functionality of the game move selection module 4125 based on the performance index ϕ, and the game move selection module 4125 selects a defense vector $\alpha_v$ from the defense vector set α in the manner previously described with respect to steps 440-470 of FIG. 9 (step 4210). It should be noted that, rather than use the game move subset selection technique, other afore-described techniques used to dynamically and continuously match the skill level of the player 4105 with the skill level of the game, such as that illustrated in FIG. 10, can be alternatively or optionally be used as well in the game program 4100. Also, the intuition module 4115 may modify the functionality of the outcome evaluation module 4130 by modifying the success ratio of the selected defense vector $\alpha_v$ on which the single outcome value $\beta_{maj}$ is based. Even more alternatively, the intuition module 4115 may not modify the functionalities of any of the modules, e.g., if the objective is to find the best defense vector $\alpha_v$.

Then, the outcome evaluation module 4130 determines whether the weapon vector $\alpha_v$ has been selected (step 4215). If no weapon vector $\alpha_v$ has been selected at step 4215, the game program 4100 then returns to step 4215 where it is again determined if a weapon vector $\lambda_v$ has been selected. If the a weapon vector $\lambda_v$ has been selected, the outcome evaluation module 4130 then determines how many of the defenses in the previously selected defense vector $\alpha_v$ were successful against the respective weapons of the selected weapon vector $\lambda_v$, and generates the outcome value $\beta_{maj}$ in response thereto (step 4220). The intuition module 4115 then updates the player scores and game object score based on the outcome values $\beta_{maj}$ (step 4225). The probability update module 4120 then, using the MPMA SISO equations [38]-[41], updates the game move probability distribution $p_v$ based on the generated outcome value β (step 4230). The game program 4100 then returns to step 4210 where another defense vector $\alpha_v$ is selected.

Figure 61:
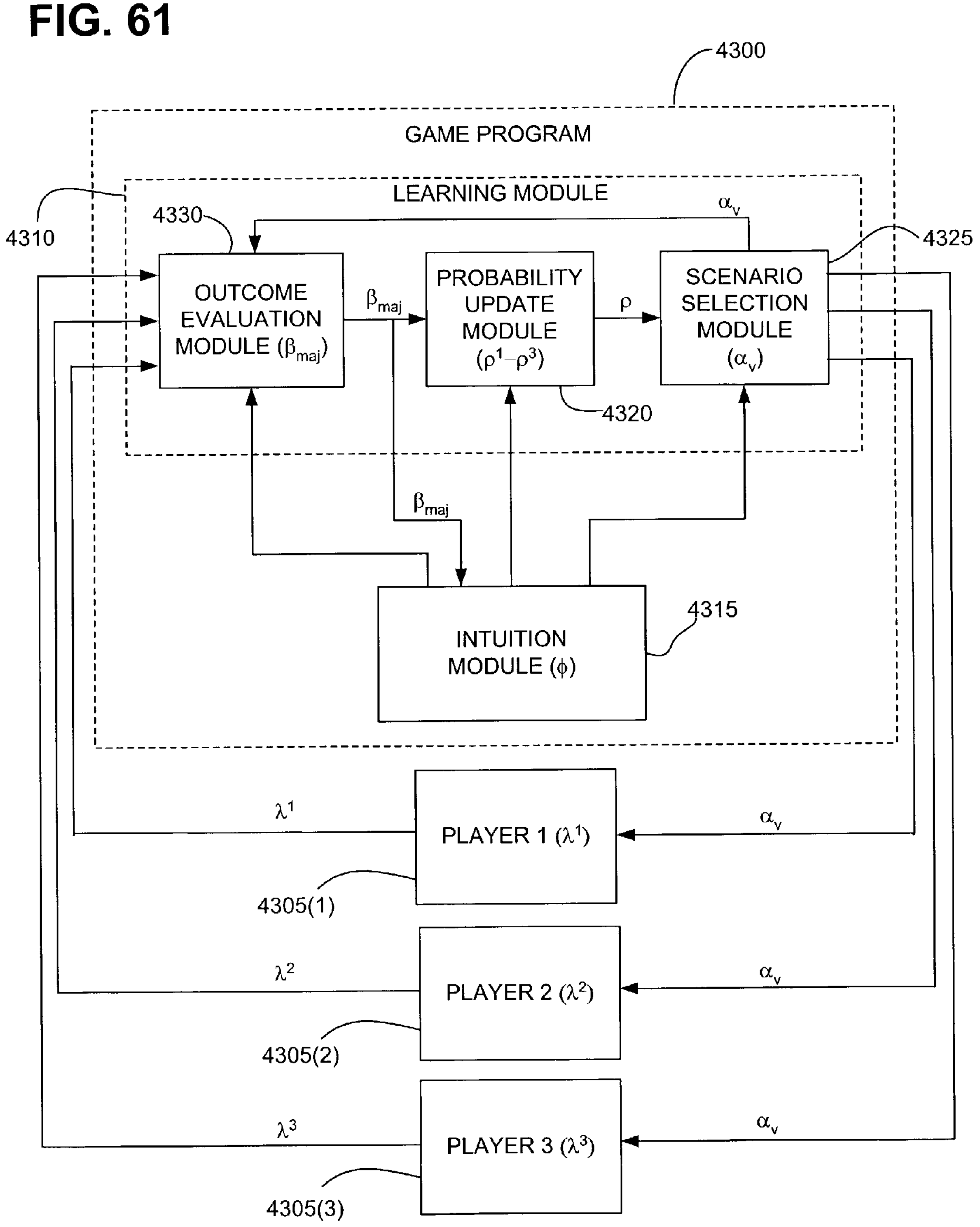
FIG. 61 is a block diagram of a multiple-player game program that can be employed to generate revenue to which the generalized program of FIG. 55 can be applied.

The learning program 3800 can also be applied to the extrinsic aspects of games, e.g., revenue generation from the games. For example, referring to FIG. 61, a learning software revenue program 4300 developed in accordance with the present inventions is described in the context of an internet computer game that provides five different scenarios (e.g., forest, mountainous, arctic, ocean, and desert) with which three players 4305(1)-(3) can interact. The objective the program 4300 is to generate the maximum amount of revenue as measured by the amount of time that each player 4305 plays the computer game. The program 4300 accomplishes this by providing the players 4305 with the best or more enjoyable scenarios. Specifically, the program 4300 selects three scenarios designated from the five scenario set α at time for each player 4305 to interact with. Thus, the selection of three scenarios can be represented by a scenario vector $\alpha_v$ that will be treated as a single game move. Given that three scenarios will be selected in combination from five scenarios, there will be a total of ten scenario vectors $\alpha_v$ available to the players 4305, as illustrated in the following Table 19.

TABLE 19

Exemplary Scenario Combinations for the Revenue Generating Computer Game

| $\alpha_v$ |
|---|
| Forest, Mountainous, Arctic ($\alpha_1$) |
| Forest, Mountainous, Ocean ($\alpha_2$) |
| Forest, Mountainous, Desert ($\alpha_3$) |
| Forest, Arctic, Ocean ($\alpha_4$) |
| Forest, Arctic, Desert ($\alpha_5$) |
| Forest, Ocean, Desert ($\alpha_6$) |
| Mountainous, Arctic, Ocean ($\alpha_7$) |
| Mountainous, Arctic, Desert ($\alpha_8$) |
| Mountainous, Ocean, Desert ($\alpha_9$) |
| Arctic, Ocean, Desert ($\alpha_{10}$) |

In this game, the selected scenarios a of the game, as represented by the selected game move vector $\alpha_v$, will be successful if two or more of the players 4305 play the game for at least a predetermined time period (e.g., 30 minutes), and will fail, if one or less of the players 4305 play the game for at least the predetermined time period. In this case, the player move A can be considered a continuous period of play. Thus, three players 4305(1)-(3) will produce three respective player moves $\lambda^1$-$\lambda^3$. The revenue program 4300 maintains a revenue score, which is a measure of the target incremental revenue with the current generated incremental revenue. The revenue program 4300 uses this revenue as a performance index ϕ in measuring its performance in relation to its objective of generating the maximum revenue.

The revenue program 4300 generally includes a probabilistic learning module 4310 and an intuition module 4315, which are specifically tailored to obtain the maximum revenue. The probabilistic learning module 4310 comprises a probability update module 4320, a scenario selection module 4325, and an outcome evaluation module 4330. Specifically, the probability update module 4320 is mainly responsible for learning the players' 4305 favorite scenarios, with the outcome evaluation module 4330 being responsible for evaluating the selected scenario vector $\alpha_v$ relative to the favorite scenarios as measured by the amount of time that game is played. The scenario selection module 4325 is mainly responsible for using the learned scenario favorites to select the scenarios. The intuition module 4315 is responsible for directing the learning of the revenue program 4300 towards the objective, and specifically, obtaining maximum revenue. In this case, the intuition module 4315 operates on the outcome evaluation module 4330, e.g., by modifying the success ratio of the selected scenario vector $\alpha_l$, or the time period of play that dictates the success or failure of the selected defense vector $\alpha_v$. Alternatively, the intuition module 4315 may simply decide to not modify the functionality of any of the modules.

To this end, the outcome evaluation module 4330 is configured to player moves $\lambda^1$-$\lambda^3$ from the respective players 4305(1)-(3). The outcome evaluation module 4330 then determines whether the previously selected scenario vector $\alpha_v$ was played by the players 4305(1)-(3) for the predetermined time period, with the outcome value $\lambda_{maj}$ equaling one of two predetermined values, e.g., "1" if the number of times the selected scenario vector $\alpha_v$ exceeded the predetermined time period was two or more times, or "0" if the number of times the selected scenario vector $\alpha_v$ exceeded the predetermined time period was one or zero times.

The probability update module 4320 is configured to receive the outcome values $\beta_{maj}$ from the outcome evaluation module 4330 and output an updated game strategy (represented by scenario probability distribution p) that will be used to select future scenario vectors $\alpha_v$. The probability update module 4320 updates the scenario probability distribution p using the P-type MPMA SISO equations [38]-[41], with the scenario probability distributions containing ten probability values $p_v$ corresponding to the ten scenario vectors $\alpha_v$. The scenario selection module 4325 pseudo-randomly selects the scenario vector $\alpha_v$ based on the updated revenue strategy, and is thus, further configured to receive the scenario probability distributions from the probability update module 4320, and selecting the scenario vector $\alpha_v$ based thereon.

The intuition module 4315 is configured to modify the functionality of the outcome evaluation module 4330 based on the performance index $\phi$, and in this case, the revenue score. The scenario selection module 4325 is configured to pseudo-randomly select a single scenario vector $\alpha_v$ from the ten scenario vectors $\alpha_v$. For example, the intuition module 4315 can modify the maximum number of times the play time for the scenario vector $\alpha_l$ exceeds the predetermined period of time from two to one or from two to three. Even more alternatively, the intuition module 4315 does not exist or determines not to modify the functionality of any of the modules.

Figure 62:
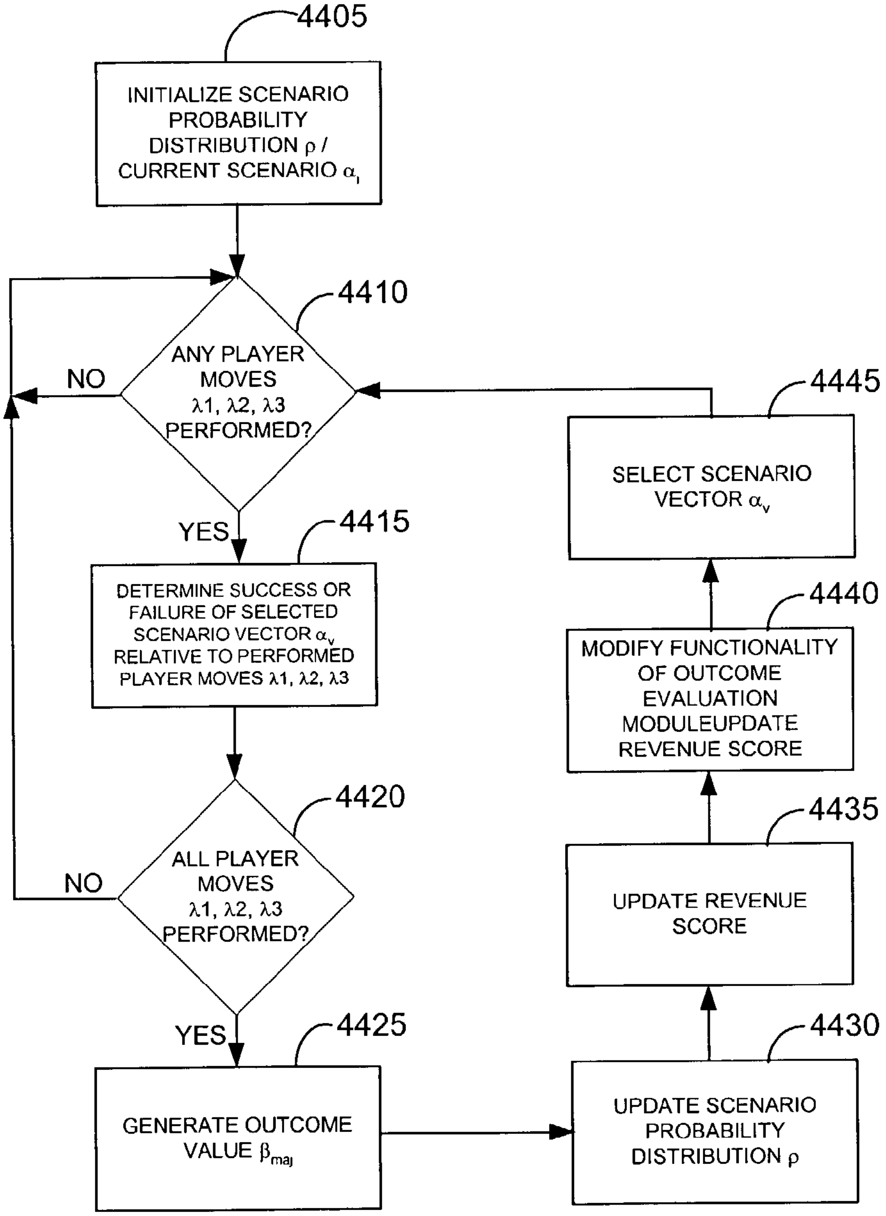
FIG. 62 is a flow diagram illustrating a preferred method performed by the game program of FIG. 61.

Having now described the structure of the game program 4300, the steps performed by the game program 4300 will be described with reference to FIG. 62. First, the probability update module 4320 initializes the scenario probability distribution p and current scenario vector $\alpha_v$ (step 4405). Then, the scenario selection module 4325 determines whether any of the player moves $\lambda^1$-$\lambda^3$ have been performed, and specifically whether play has been terminated by the players 4305(1)-(3) (step 4410). If none of the player moves $\lambda^1$-$\lambda^3$ has been performed, the program 4300 returns to step 4410 where it again determines if any of the player $\lambda^1$-$\lambda^3$ have been performed. If any of the player moves $\lambda^1$-$\lambda^3$ have been performed, the outcome evaluation module 4330 determines the success or failure of the currently selected scenario vector $\alpha_v$ relative to continuous play period corresponding to the performed ones of the player moves $\lambda^1$-$\lambda^3$, i.e., whether any of the players 4305(1)-(3) terminated play (step 4415). The intuition module 2015 then determines if all three of the player moves $\lambda^1$-$\lambda^3$ have been performed (step 4420). If not, the game program 4300 will return to step 4410 where the scenario selection module 4325 determines again if any of the player moves $\lambda^1$-$\lambda^3$ have been performed. If all three of the player moves $\lambda^1$-$\lambda^3$ have been performed, the outcome evaluation module 4330 then determines how many times the play time for the selected scenario vector $\alpha_v$ exceeded the predetermined time period, and generates the outcome value $\beta_{maj}$ in response thereto (step 4425). The probability update module 4320 then, using the MPMA SISO equations [38]-[41], updates the scenario probability distribution p based on the generated outcome value $\beta_{maj}$ (step 4430). The intuition module 3915 then updates the revenue score based on the outcome value $\beta_{maj}$ (step 4435), and then modifies the functionality of the outcome evaluation module 4330 (step 4440). The game move selection module 3925 then pseudo-randomly selects a scenario vector $\alpha_v$ (step 4445).

Generalized Multi-User Learning Program (Single Processor Action-Maximum Number of Teachers Approving)

Figure 63:
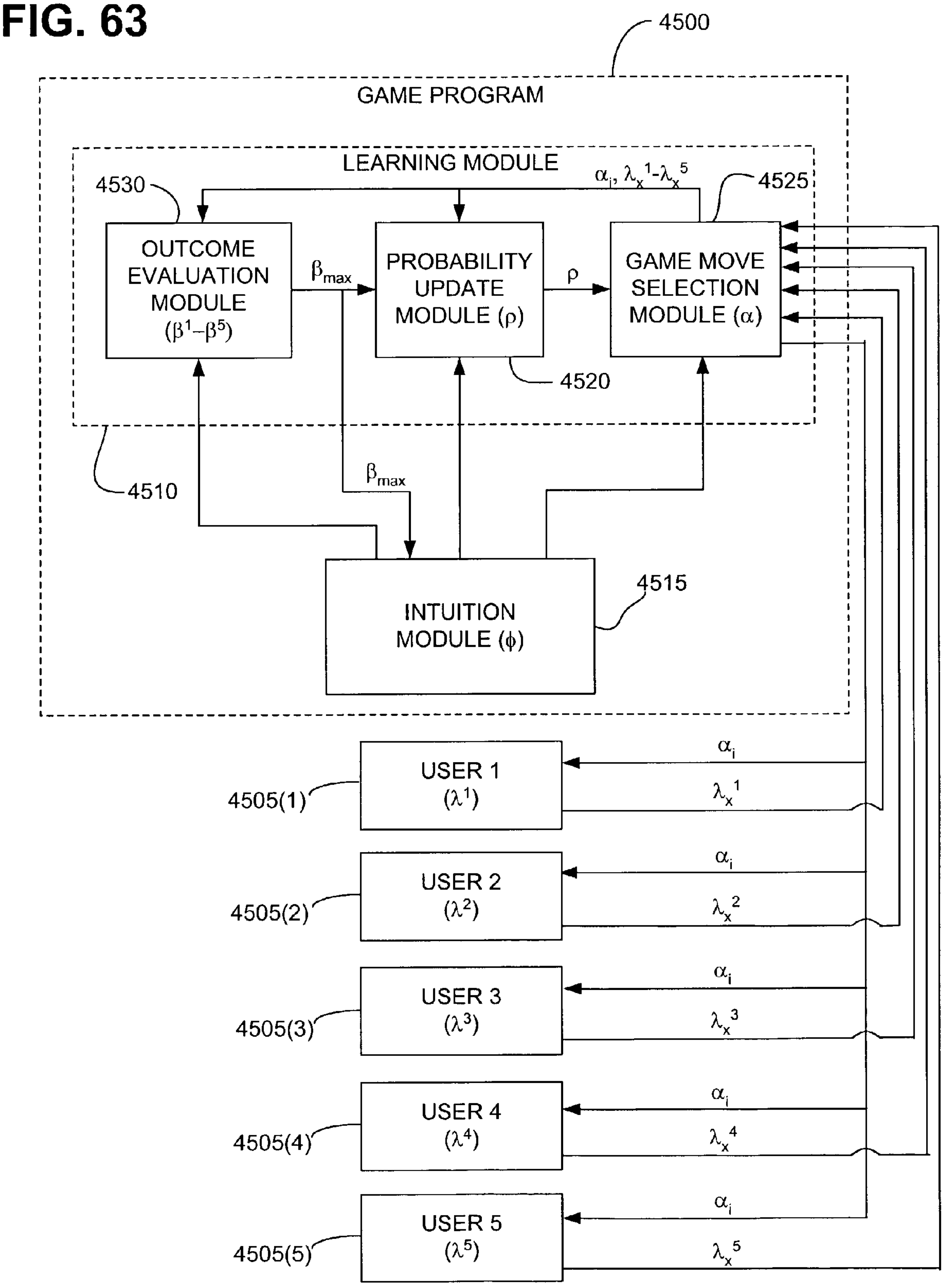
FIG. 63 is a block diagram of yet another multiple-user learning software program constructed in accordance with the present inventions, wherein a maximum number of teachers approving (MNTA) learning model is assumed.

Referring to FIG. 63, yet another multi-user learning program 4500 developed in accordance with the present inventions can be generally implemented to provide intuitive learning capability to any variety of processing devices. The learning program 4500 is similar to the program 3800 in that multiple users 4505(1)-(5) (here, five) interact with the program 4500 by receiving the same processor action $\alpha_l$ from a processor action set $\alpha$ within the program 4500, and each independently selecting corresponding user actions $\lambda_x^1$-$\lambda_x^5$ from respective user action sets $\lambda^1$-$\lambda^5$ based on the received processor action $\alpha_l$. The learning program 4500 differs from the program 3800 in that, rather than learning based on the measured success ratio of a selected processor action $\alpha_l$ relative to a reference success ratio, it learns based on whether the selected processor action $\alpha_l$ has a relative success level (in the illustrated embodiment, the greatest success) out of processor action set $\alpha$ for the maximum number of users 4505. For example, $\beta_{max}$ may equal "1" (indicating a success) if the selected processor action $\alpha_l$ is the most successful for the maximum number of users 4505, and may equal "0" (indicating a failure) if the selected processor action $\alpha_l$ is not the most successful for the maximum number of users 4505. To determine which processor action $\alpha_l$ is the most successful, individual outcome values $\beta^1$-$\beta^5$ are generated and accumulated for the user actions $\lambda_x^1$-$\lambda_x^5$ relative to each selected action $\alpha_i$. As will be described in further detail below, the program 4500 directs its learning capability by dynamically modifying the model that it uses to learn based on a performance index $\phi$ to achieve one or more objectives.

To this end, the program 4500 generally includes a probabilistic learning module 4510 and an intuition module 4515. The probabilistic learning module 4510 includes a probability update module 4520, an action selection module 4525, and an outcome evaluation module 4530. Briefly, the probability update module 4520 uses learning automata theory as its learning mechanism, and is configured to generate and update a single action probability distribution p based on the outcome value $\beta_{max}$. In this scenario, the probability update module 4520 uses a single stochastic learning automaton with a single input to a single-teacher environment (with the users 4505(1)-(5), in combination, as a single teacher), and thus, a SISO model is assumed. Alternatively, if the users 4505(1)-(5) receive multiple processor actions $\alpha_l$, some of which are different, multiple SISO models can be assumed, as previously described with respect to the program 3800. Exemplary equations that can be used for the SISO model will be described in further detail below.

The action selection module 4525 is configured to select the processor action $\alpha_l$ from the processor action set $\alpha$ based on the probability values $p_l$ contained within the action probability distributions internally generated and updated in the probability update module 4520. The outcome evaluation module 4530 is configured to determine and generate the outcome values $\beta^1$-$\beta^5$ based on the relationship between the selected processor action $\alpha_l$ and the user actions $\lambda_x^1$-$\lambda_x^5$. The outcome evaluation module 4530 is also configured to determine the most successful processor action $\alpha_l$ for the maximum number of users 4505(1)-(5), and generate the outcome value $\beta_{max}$ based thereon.

The outcome evaluation module 4530 can determine the most successful processor action $\alpha_l$ for the maximum number of users 4505(1)-(5) by reference to action probability distributions $p^1$-$p^5$ maintained for the respective users 4505(1)-(5). Notably, these action probability distributions $p^1$-$p^5$ would be updated and maintained using the SISO model, while the single action probability distribution p described above will be separately updated and maintained using a Maximum Number of Teachers Approving (MNTA) model, which uses the outcome value $\beta_{max}$. For example, Table 20 illustrates exemplary probability distributions $p^1$-$p^5$ for the users 4505(1)-(5), with each of the probability distributions $p^1$-$p^5$ having seven probability values $p_l$ corresponding to seven processor actions $\alpha_l$. As shown, the highest probability values, and thus, the most successful processor actions $\alpha_l$ for the respective users 4505(1)-(5), are $\alpha_4$ ($p_4$=0.92) for user 4505(1), $\alpha_5$ ($p_1$=0.93) for user 4505(2), $\alpha_4$ ($p_4$=0.94) for user 4505(3), $\alpha_4$ ($p_4$=0.69) for user 4505(4), and $\alpha_4$ ($p_7$=0.84) for user 4505 (5). Thus, for the exemplary action probability distributions p shown in Table 20, the most successful processor action $\alpha_l$ for the maximum number of users 4505(1)-(5) (in this case, users 4505(1), 4505(3), and 4505(4)) will be processor action $\alpha_4$, and thus, if the action selected is $\alpha_4$, $\beta_{max}$ will equal "1", resulting an increase in the action probability value $p_4$, and if the action selected is other than $\alpha_4$, $\beta_{max}$ will equal "0", resulting in a decrease in the action probability value $p_4$.

TABLE 20

Exemplary Probability Values for Action Probability Distributions Separately Maintained for Five Users

| p | $p_1$ | $p_2$ | $p_3$ | $p_4$ | $p_5$ | $p_6$ | $p_7$ |
|---|---|---|---|---|---|---|---|
| 1 | 0.34 | 0.78 | 0.48 | 0.92 | 0.38 | 0.49 | 0.38 |
| 2 | 0.93 | 0.39 | 0.28 | 0.32 | 0.76 | 0.68 | 0.69 |
| 3 | 0.39 | 0.24 | 0.13 | 0.94 | 0.83 | 0.38 | 0.38 |
| 4 | 0.39 | 0.38 | 0.39 | 0.69 | 0.38 | 0.32 | 0.48 |
| 5 | 0.33 | 0.23 | 0.23 | 0.39 | 0.30 | 0.23 | 0.84 |

The outcome evaluation module 4530 can also determine the most successful processor action $\alpha_l$ for the maximum number of users 4505(1)-(5) by generating and maintaining an estimator table of the successes and failures of each of the processor action $\alpha_l$ relative to the user actions user actions $\lambda_x^1$-$\lambda_x^5$. This is actually the preferred method, since it will more quickly converge to the most successful processor action $\alpha_l$ for any given user 4505, and requires less processing power. For example, Table 21 illustrates exemplary success to total number ratios $r_l$ for each of the seven processor actions $\alpha_l$ and for each of the users 4505(1)-(5). As shown, the highest probability values, and thus, the most successful processor actions $\alpha_l$ for the respective users 4505(1)-(5), are $\alpha_4$ ($r_4$=4/5) for user 4505(1), $\alpha_6$ ($r_6$=9/10) for user 4505(2), $\alpha_4$ ($r_6$=8/10) for user 4505(3), $\alpha_7$ ($r_7$=6/7) for user 4505(4), and $\alpha_2$ ($r_2$=5/6) for user 4505(5). Thus, for the exemplary success to total number ratios r shown in Table 21, the most successful processor action $\alpha_l$ for the maximum number of users 4505(1)-(5) (in this case, users 4505(2) and 3205(3)) will be processor action $\alpha_6$, and thus, if the action selected is $\alpha_6$, $\beta_{max}$ will equal "1", resulting an increase in the action probability value $p_6$ for the single action probability distribution p, and if the action selected is other than $\alpha_6$, $\beta_{max}$ will equal "0", resulting in a decrease in the action probability value $p_6$ for the single action probability distribution p.

TABLE 21

Exemplary Estimator Table For Five Users

| r | $r_1$ | $r_2$ | $r_3$ | $r_4$ | $r_5$ | $r_6$ | $r_7$ |
|---|---|---|---|---|---|---|---|
| 1 | 3/10 | 2/6 | 9/12 | 4/5 | 2/9 | 4/10 | 4/7 |
| 2 | 6/10 | 4/6 | 4/12 | 3/5 | 4/9 | 9/10 | 5/7 |
| 3 | 7/10 | 3/6 | 8/12 | 2/5 | 6/9 | 8/10 | 3/7 |
| 4 | 5/10 | 4/6 | 2/12 | 4/5 | 5/9 | 6/10 | 6/7 |
| 5 | 3/10 | 5/6 | 6/12 | 3/5 | 2/9 | 5/10 | 4/7 |

The intuition module 4515 modifies the probabilistic learning module 4510 (e.g., selecting or modifying parameters of algorithms used in learning module 4510) based on one or more generated performance indexes $\phi$ to achieve one or more objectives. As previously discussed, the performance index $\phi$ can be generated directly from the outcome values $\beta^1$-$\beta^5$ or from something dependent on the outcome values $\beta^1$-$\beta^5$, e.g., the action probability distributions $p^1$-$p^5$, in which case the performance index $\phi$ may be a function of the action probability distributions $p^1$-$p^5$, or the action probability distributions $p^1$-$p^5$ may be used as the performance index $\phi$. Alternatively, the intuition module 4515 may be non-existent, or may desire not to modify the probabilistic learning module 4510 depending on the objective of the program 4500.

The modification of the probabilistic learning module 4510 is generally accomplished similarly to that described with respect to the afore-described probabilistic learning module 110. That is, the functionalities of (1) the probability update module 4520 (e.g., by selecting from a plurality of algorithms used by the probability update module 4520, modifying one or more parameters within an algorithm used by the probability update module 4520, transforming or otherwise modifying the action probability distribution p); (2) the action selection module 4525 (e.g., limiting or expanding selection of the action $\alpha_l$ corresponding to a subset of probability values contained within the action probability distribution p); and/or (3) the outcome evaluation module 4530 (e.g., modifying the nature of the outcome values $\beta^1$-$\beta^5$ or otherwise the algorithms used to determine the outcome values $\beta^1$-$\beta^5$), are modified. Specific to the learning program 4500, the intuition module 4515 may modify the outcome evaluation module 4530 to indicate which processor action $\alpha_l$ is the least successful or average successful processor action $\alpha_i$ for the maximum number of users 4505.

The various different types of learning methodologies previously described herein can be applied to the probabilistic learning module 4510. The operation of the program 4500 is similar to that of the program 2200 described with respect to FIG. 31, with the exception that, rather than updating the action probability distribution p based on several outcome values $\beta^1$-$\beta^5$ for the users 4505, the program 4500 updates the action probability distributionp based on the outcome value $\beta_{max}$.

Figure 64:
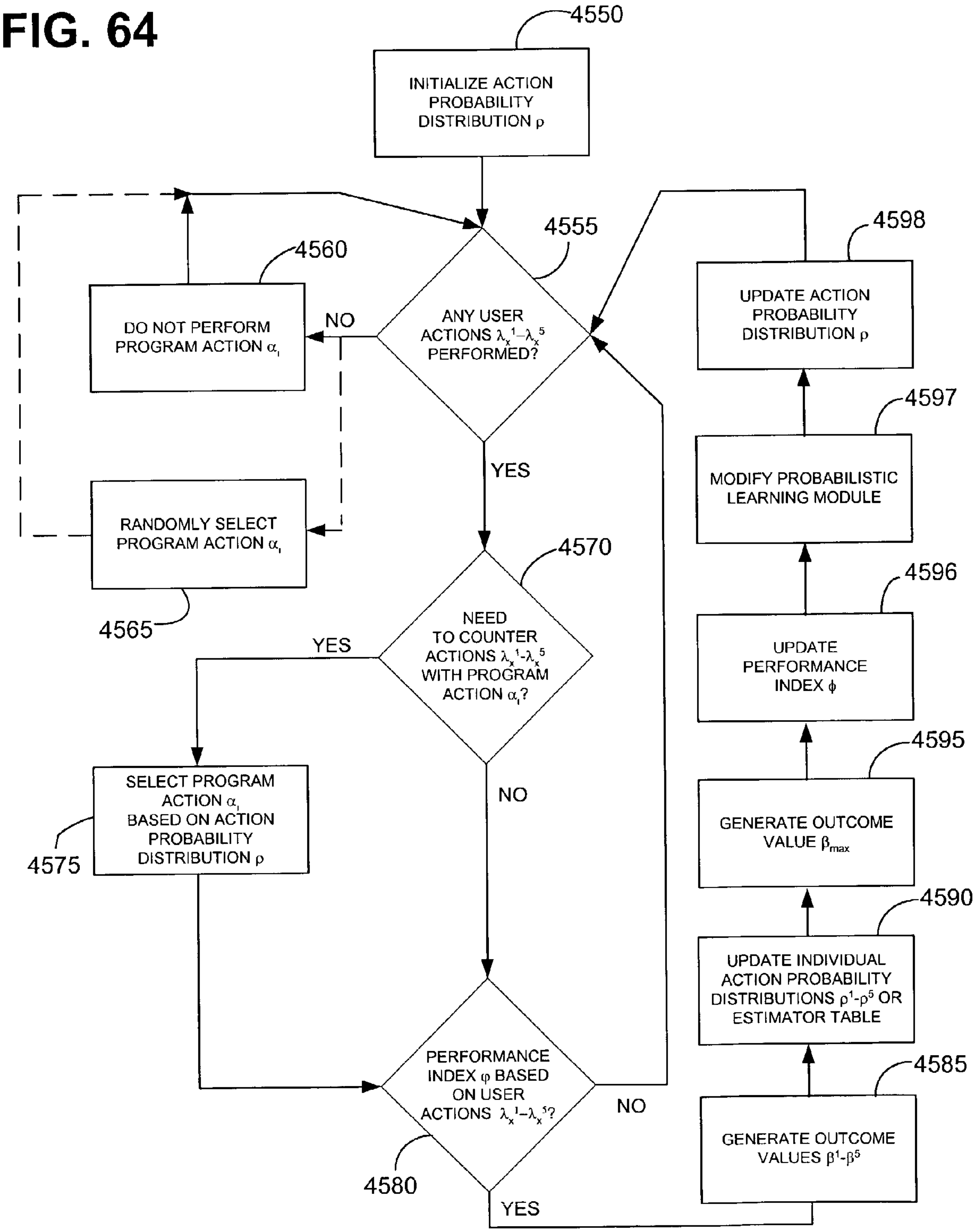
FIG. 64 is a flow diagram illustrating a preferred method performed by the program of FIG. 63.

Specifically, referring to FIG. 64, the probability update module 4520 initializes the action probability distribution p (step 4550) similarly to that described with respect to step 150 of FIG. 4. The action selection module 4525 then determines if one or more of the users 4505(1)-(5) have selected a respective one or more of the user actions $\lambda^{x1}$-$\lambda_x^5$ (step 4555). If not, the program 4500 does not select a processor action $\alpha_l$ from the processor action set $\alpha$ (step 4560), or alternatively selects a processor action $\alpha_l$, e.g., randomly, notwithstanding that none of the users 4505 has selected a user actions $\lambda_x$ (step 4565), and then returns to step 3755 where it again determines if one or more of the users 4505 have selected the respective one or more of the user actions $\lambda x^1$-$\lambda_x^5$.

If so, the action selection module 4525 determines whether any of the selected user actions $\lambda_x^1$-$\lambda_x^5$ should be countered with a processor action $\alpha_l$ (step 4570). If they should, the action selection module 4525 selects a processor action $\alpha_l$ from the processor action set $\alpha$ based on the action probability distributionp (step 4575). After the selection of step 4575 or if the action selection module 4525 determines that none of the selected user actions $\lambda_x^1$-$\lambda_x^5$ should be countered with a processor action $\alpha_l$, the outcome evaluation module 4530, the action selection module 4525 determines if any of the selected user actions $\lambda_x^1$-$\lambda_x^5$ are of the type that the performance index $\phi$ is based on (step 4580).

If not, the program 4500 returns to step 4555. If so, the outcome evaluation module 4530 quantifies the selection of the previously selected processor action $\alpha_l$ relative to the selected ones of the user actions $\lambda_x^1$-$\lambda_x^5$ by generating the respective ones of the outcome values $\beta^1$-$\beta^5$ (step 4585). The probability update module 4520 then updates the individual action probability distributions $p^1$-$p^5$ or estimator table for the respective users 4505 (step 4590), and the outcome evaluation module 4530 then determines the most successful processor action $\alpha_l$ for the maximum number of users 4505, and generates outcome value $\beta_{max}$ (step 4595).

The intuition module 4515 then updates the performance index $\phi$ based on the relevant outcome values $\beta^1$-$\beta^5$ unless the performance index $\phi$ is an instantaneous performance index that is represented by the outcome values $\beta^1$-$\beta^5$ themselves (step 4596). The intuition module 4515 then modifies the probabilistic learning module 4510 by modifying the functionalities of the probability update module 4520, action selection module 4525, or outcome evaluation module 4530 (step 4597). The probability update module 4520 then, using any of the updating techniques described herein, updates the action probability distribution p based on the generated $\beta_{max}$ (step 4598).

The program 4500 then returns to step 4555 to determine again whether one or more of the users 4505(1)-(5) have selected a respective one or more of the user actions $\lambda_x^1$-$\lambda_x^5$. It should be noted that the order of the steps described in FIG. 64 may vary depending on the specific application of the program 4500.

Multi-Player Game Program (Single Game Move-Maximum Number of Teachers Approving)

Figure 65:
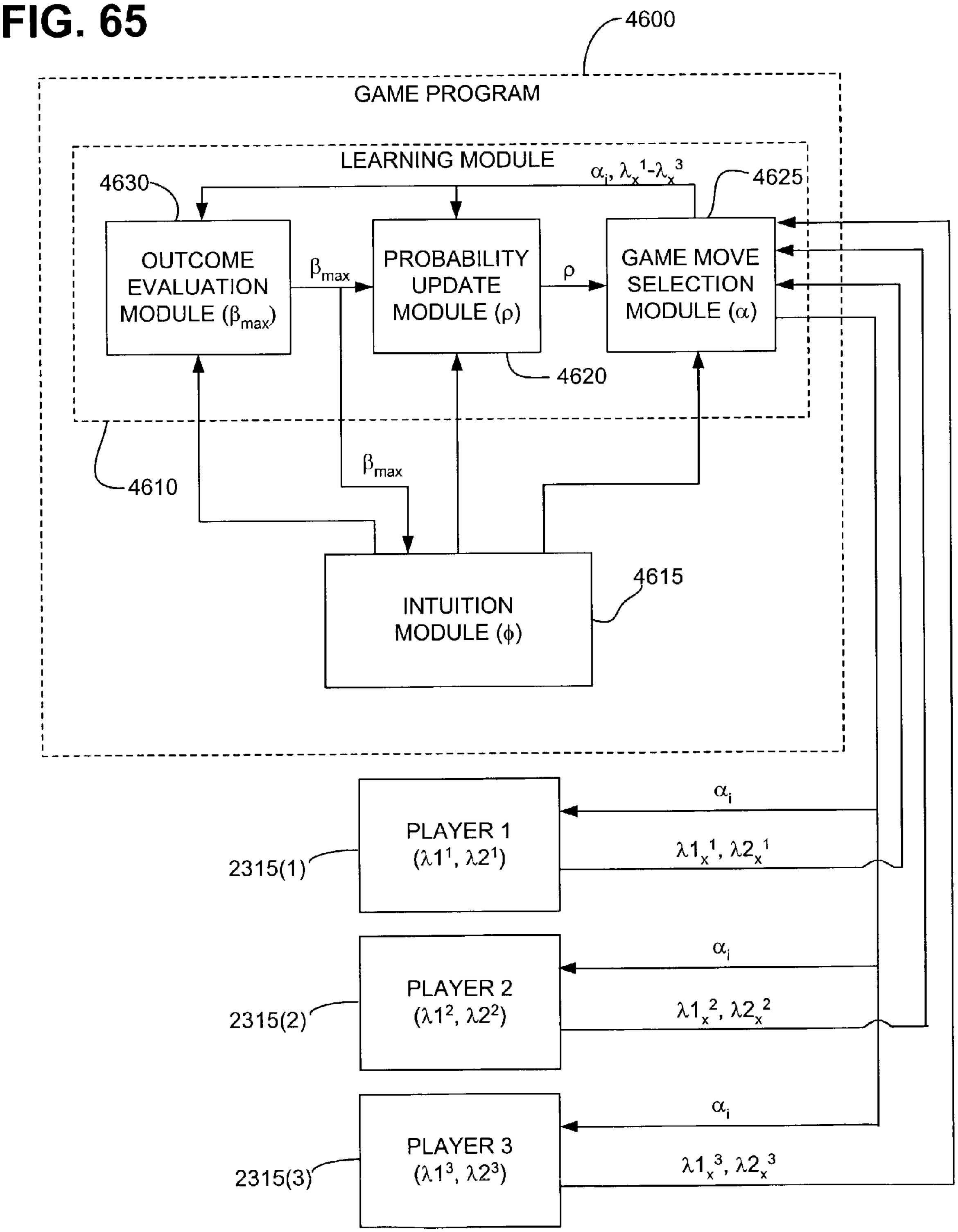
FIG. 65 is a block diagram of a multiple-player game program that can be employed in the duck hunting game of FIG. 32 to which the generalized program of FIG. 63 can be applied.

Having now generally described the components and functionality of the learning program 4500, we now describe one of its various applications. Referring to FIG. 65, a multiple-player game program 4600 developed in accordance with the present inventions is described in the context of the previously described duck hunting game 2300 (see FIG. 32). Because the game program 4600 will determine the success or failure of a selected game move based on the player moves as a group, in this version of the duck hunting game 2300, the players 2315(1)-(3) play against the duck 2320 as a team, such that there is only one player score 2360 and duck score 2365 that is identically displayed on all three computers 2310 (1)-(3).

The game program 4600 generally includes a probabilistic learning module 4610 and an intuition module 4615, which are specifically tailored for the game 2300. The probabilistic learning module 4610 comprises a probability update module 4620, a game move selection module 4625, and an outcome evaluation module 4630, which are similar to the previously described probability update module 3920, game move selection module 3925, and outcome evaluation module 3930, with the exception that it does not operate on the player moves $\lambda 2_x^1 \lambda 2_l^3$ as a vector, but rather generates multiple outcome values $\beta^1$-$\beta^3$ for the player moves $\lambda 2_l^1$-$\lambda 2_x^3$, determines the game move $\alpha_l$ that is the most successful out of game move set $\alpha$ for the maximum number of players 2315(1)-(3), and then generates an outcome value $\beta_{max}$.

As previously discussed, the game move probability distribution p is updated periodically, e.g., every second, during which each of any number of the players 2315(1)-(3) may provide a corresponding number of player moves $\lambda 2_x^1$-$\lambda 2_x^3$ so that the player moves $\lambda 2_x^1$-$\lambda 2_x^3$ asynchronously performed by the players 2315(1)-(3) may be synchronized to a time period. It should be noted that in other types of games, where the player moves $\lambda 2_x$ need not be synchronized to a time period, such as, e.g., strategy games, the game move probability distribution p may be updated after all players have performed a player move $\lambda 2_x$.

The game program 4600 may employ the following P-type Maximum Number of Teachers Approving (MNTA) SISO equations:

$$p_i(k+1) = p_i(k) + \sum_{\substack{j=1 \\ j \neq i}}^{n} g_j(p(k)); \text{ and} \quad [42]$$

$$p_j(k+1)=p_j(k)-g_j(p(k)), \text{ when } \beta_{max}(k)=1 \text{ and } \alpha_l \text{ is selected} \quad [43]$$

$$p_i(k+1) = p_i(k) - \sum_{\substack{j=1 \\ j \neq i}}^{n} h_j(p(k)); \text{ and} \quad [44]$$

$$p_j(k+1)=p_j(k)+h_j(p(k)), \text{ when } \beta_{max}(k)=0 \text{ and } \alpha_l \text{ is selected} \quad [45]$$

where $p_i(k+1)$, $p_i(k)$, $g_j(p(k))$, $h_j(p(k))$, i, j, k, and n have been previously defined, and $\beta_{max}(k)$ is the outcome value based on a maximum number of the players for which the selected game move $\alpha_l$ is successful.

The game move $\alpha_l$ that is the most successful for the maximum number of players can be determined based on a cumulative success/failure analysis of the duck hits and misses relative to all of the game move $\alpha_l$ as derived from game move probability distributions p maintained for each of the players, or from the previously described estimator table. As an example, assuming the game move $\alpha_4$ was selected and there are a total of ten players, if game move $\alpha_4$ is the most successful for four of the players, game move $\alpha_1$ is the most successful for three of the players, game move $\alpha_7$ is the most successful for two of the players, and game move $\alpha_4$ is the most successful for one of the players, $\beta_{max}(k)=1$ since the game move $\alpha_4$ is the most successful for the maximum number (four) of players. If, however, game move $\alpha_4$ is the most successful for two of the players, game move $\alpha_1$ is the most successful for three of the players, game move $\alpha_7$ is the most successful for four of the players, and game move $\alpha_4$ is the most successful for one of the players, $\beta_{max}(k)=0$, since the game move $\alpha_4$ is not the most successful for the maximum number of players.

Figure 66:
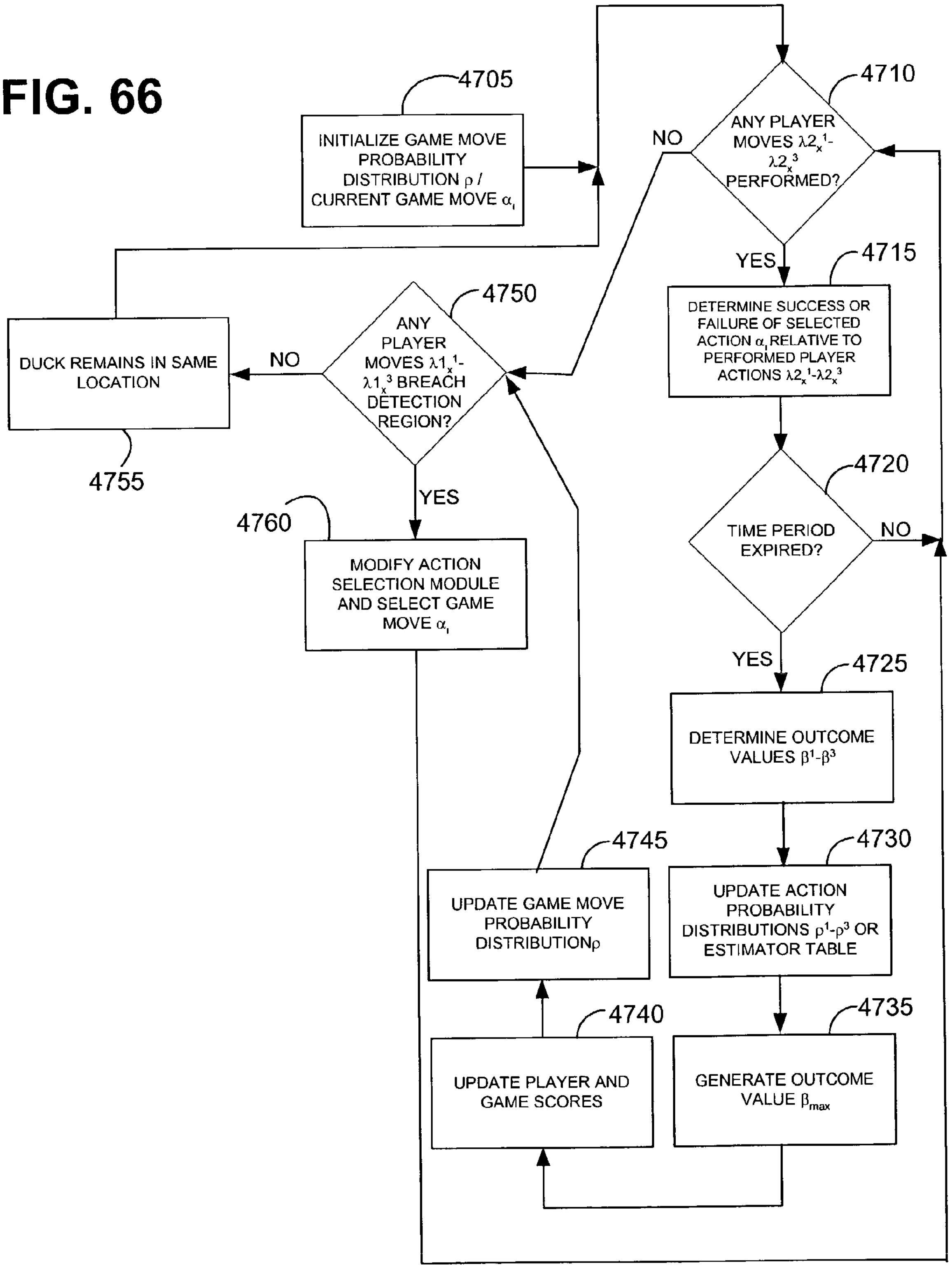
FIG. 66 is a flow diagram illustrating a preferred method performed by the game program of FIG. 65.

Having now described the structure of the game program 4600, the steps performed by the game program 4600 will be described with reference to FIG. 66. First, the probability update module 4620 initializes the game move probability distribution p and current game move αhd ix (step 4705) similarly to that described in step 405 of FIG. 9. Then, the game move selection module 4625 determines whether any of the player moves $\lambda 2_x^1$-$\lambda 2_x^3$ have been performed, and spe- cifically whether the guns 2325(1)-(3) have been fired (step 4710). If any of the player moves $\lambda 2_x^1$-$\lambda 2_x^3$ have been performed, the outcome evaluation module 4630 determines the success or failure of the currently selected game move $\alpha_l$ relative to the performed ones of the player moves $\lambda 2_x^1$-$\lambda 2_x^3$ (step 4715). The intuition module 4615 then determines if the given time period to which the player moves $\lambda 2_x^1$-$\lambda 2_x^3$ are synchronized has expired (step 4720). If the time period has not expired, the game program 4600 will return to step 4710 where the game move selection module 4625 determines again if any of the player moves $\lambda 2_x^1$-$\lambda 2_x^3$ have been performed. If the time period has expired, the outcome evaluation module 4630 determines the outcome values $\beta^1$-$\beta^3$ for the performed one of the player moves $\lambda 2_x^1$-$\lambda 2_x^3$ (step 4725). The probability update module 4620 then updates the game move probability distributions $p^1$-$p_3$ for the players 2315(1)-(3) or updates the estimator table (step 4730). The outcome evaluation module 4630 then determines the most successful game move $\alpha_l$ for each of the players 2315 (based on the separate probability distributions $p^1$-$p_3$ or estimator table), and then generates the outcome value $\beta_{max}$ (step 4735). The intuition module 4615 then updates the combined player 2360 and duck scores 2365 based on the separate outcome values $\beta^1$-$\beta^3$ (step 4740). The probability update module 4620 then, using the MNTA SISO equations [42]-[45], updates the game move probability distribution p based on the generated outcome value $\beta_{max}$ (step 4745).

After step 4745, or if none of the player moves $\lambda 2_x^1$-$\lambda 2_x^3$ has been performed at step 4710, the game move selection module 4625 determines if any of the player moves $\lambda 2_x^1$-$\lambda 2_x^3$ have been performed, i.e., guns 2325(1)-(3), have breached the gun detection region 270 (step 4750). If none of the guns 2325(1)-(3) has breached the gun detection region 270, the game move selection module 4625 does not select a game move $\alpha_l$ from the game move set $\alpha$ and the duck 2320 remains in the same location (step 4755). Alternatively, the game move $\alpha_l$ may be randomly selected, allowing the duck 2320 to dynamically wander. The game program 4600 then returns to step 4710 where it is again determined if any of the player moves $\lambda 1_l^1$-$\lambda 1_l^3$ have been performed. If any of the guns 2325(1)-(3) have breached the gun detection region 270 at step 4750, the intuition module 4615 may modify the functionality of the game move selection module 4625 based on the performance index $\phi$, and the game move selection module 4625 selects a game move $\alpha_l$ from the game move set $\alpha$ in the manner previously described with respect to steps 440-470 of FIG. 9 (step 4760). It should be noted that, rather than use the game move subset selection technique, other afore-described techniques used to dynamically and continuously match the skill level of the players 2315(1)-(3) with the skill level of the game 2300, such as that illustrated in FIG. 10, can be alternatively or optionally be used as well in the game program 4600. Also, the intuition module 4615 may modify the functionality of the outcome evaluation module 4630 by changing the most successful game move to the least or average successful $\alpha_l$ for each of the players 2315(1)-(3).

Generalized Multi-User Learning Program (Single Processor Action-Teacher Action Pair)

Figure 67:
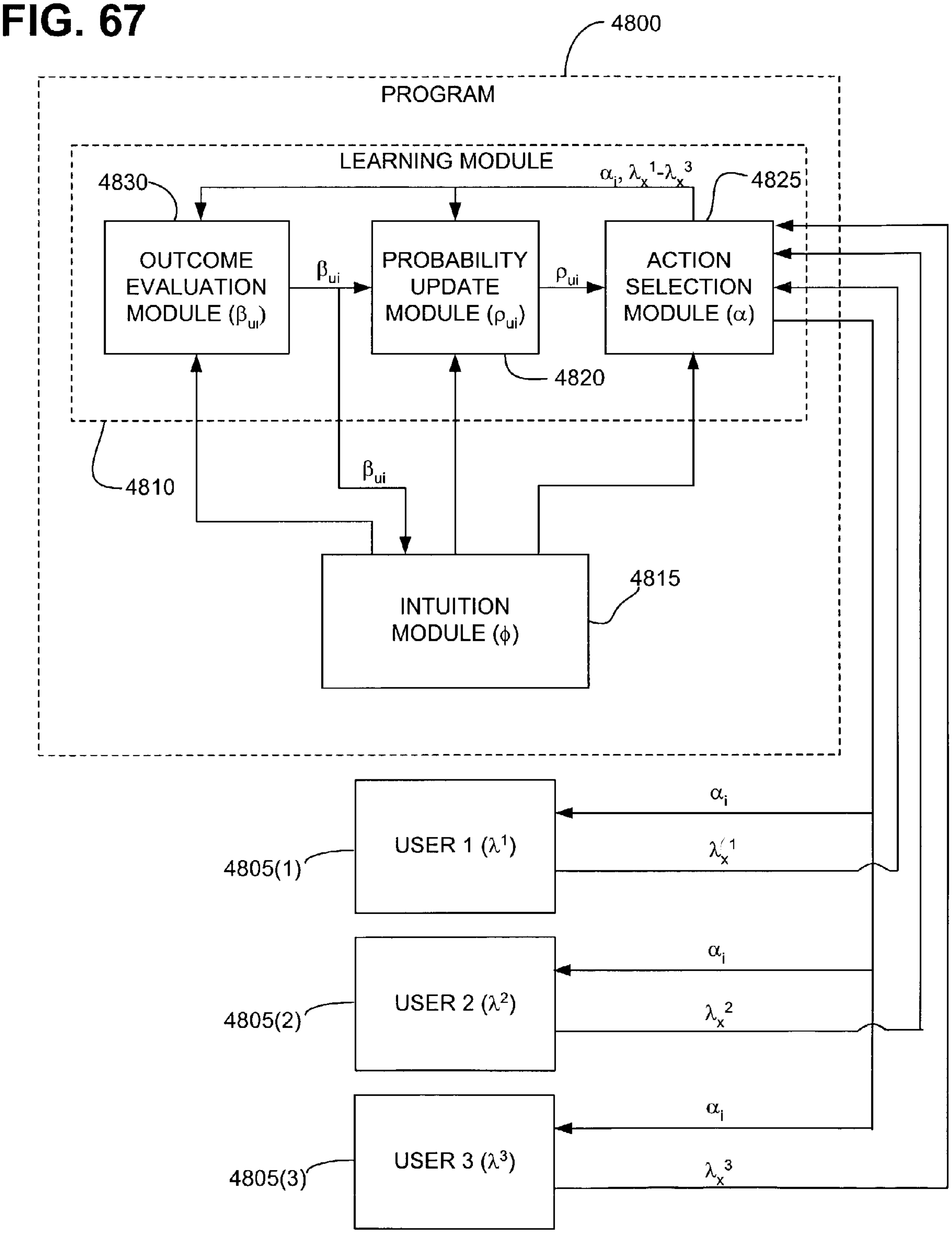
FIG. 67 is a block diagram of yet another multiple-user learning software program constructed in accordance with the present inventions, wherein a teacher-action pair (TAP) learning model is assumed.

Referring to FIG. 67, still another multi-user learning program 4800 developed in accordance with the present inventions can be generally implemented to provide intuitive learning capability to any variety of processing devices. Unlike the previous embodiments, the learning program 4800 may link processor actions with user parameters (such as, e.g., users or user actions) to generate action pairs, or trios or higher numbered groupings.

The learning program 4800 is similar to the SIMO-based program 2200 in that multiple users 4805(1)-(3) (here, three) interact with the program 4800 by receiving the same processor action $\alpha_l$ from a processor action set $\alpha$ within the program 4800, each independently selecting corresponding user actions $\lambda_x^1$-$\lambda_x^3$ from respective user action sets $\lambda_x^1$-$\lambda_x^3$ based on the received processor action $a_l$. Again, in alternative embodiments, the users 4805 need not receive the processor action $\alpha_l$, the selected user actions $\lambda_x^1$-$\lambda_x^3$ need not be based on the received processor action $\alpha_l$, and/or the processor actions $\alpha_l$ may be selected in response to the selected user actions $\lambda_x^1$-$\lambda_x^3$. The significance is that a processor action $\alpha_l$ and user actions $\lambda_x^1$-$\lambda_x^3$ are selected.

The program 4800 is capable of learning based on the measured success or failure of combination of user/processor action pairs $\alpha_{uix}$, which for the purposes of this specification, can be measured as outcome values $\beta_{ui}$, where u is the index for a specific user 4805, and i is the index for the specific processor action $\alpha_l$. For example, if the processor action set $\alpha$ includes seventeen processor actions $\alpha_l$, than the number of user/processor action pairs $\alpha_{uix}$ will equal fifty-one (three users 4805 multiplied by seventeen processor actions $\alpha_l$). As an example, if selected processor action $\alpha_8$ is successful relative to a user action $\lambda_x$ selected by the second user 4805(2), then $\beta_{2,8}$ may equal "1" (indicating a success), and if processor action $\alpha_8$ is not successful relative to a user action $\lambda_x$ selected by the second user 4805(2), then $\beta_{2,8}$ may equal "0" (indicating a failure).

It should be noted that other action pairs are contemplated. For example, instead of linking the users 4805 with the processor actions $\alpha_l$, the user actions $\lambda_x$ can be linked to the processor actions $\alpha_l$, to generate user action/processor action pairs $\alpha_{lix}$, which again can be measured as outcome values $\beta_{xi}$, where i is the index for the selected action $\alpha_l$, and x is the index for the selected action $\lambda_x$. For example, if the processor action set $\alpha$ includes seventeen processor actions $\alpha_l$, and the user action set $\alpha$ includes ten user actions $\lambda_x$, than the number of user action/processor action pairs $\alpha_{lix}$ will equal one hundred seventy (ten user actions $\lambda_x$ multiplied by seventeen processor actions $\alpha_l$). As an example, if selected processor action $\alpha_{12}$ is successful relative to user action $\lambda_6$ selected by a user 4805 (either a single user or one of a multiple of users), then $\beta_{6,12}$ may equal "1" (indicating a success), and if selected processor action $\alpha_{12}$ is not successful relative to user action 26 selected by a user 4805, then $\beta_{6,12}$ may equal "0" (indicating a failure).

As another example, the users 4805, user actions $\lambda_x$, and processor actions $\alpha_l$, can be linked together to generate user/user action/processor action trios $\alpha_{uxix}$, which can be measured as outcome values $\beta_{uxl}$, where u is the index for the user 4805, i is the index for the selected action $\alpha_i$, and x is the index for the selected user action $\lambda_x$. For example, if the processor action set a includes seventeen processor actions $\alpha_l$, and the user action set $\alpha$ includes ten user actions $\lambda_x$, than the number of user/user action/processor action trios $\alpha_{uxl}$ will equal five hundred ten (three users 4805 multiplied by ten user actions $\lambda_x$ multiplied by seventeen processor actions $\alpha_l$). As an example, if selected processor action $\alpha_{12}$ is successful relative to user action 26 selected by the third user 4805(3) (either a single user or one of a multiple of users), then $\beta_{3,6,12}$ may equal "1" (indicating a success), and if selected processor action $\alpha_{12}$ is not successful relative to user action 26 selected by the third user 4805(3), then $\beta_{3,6,12}$ may equal "0" (indicating a failure).

It should be noted that the program 4800 can advantageously make use of estimator tables should the number of processor action pairs or trio become too numerous. The estimator table will keep track of the number of successes and failures for each of the action pairs or trios. In this manner, the processing required for the many processor actions pairs or trios can be minimized. The action probability distribution p can then be periodically updated based on the estimator table.

To this end, the program 4800 generally includes a probabilistic learning module 4810 and an intuition module 4815. The probabilistic learning module 4810 includes a probability update module 4820, an action selection module 4825, and an outcome evaluation module 4830. Briefly, the probability update module 4820 uses learning automata theory as its learning mechanism, and is configured to generate and update an action probability distribution p containing probability values (either $p_{ul}$ or $p_{xl}$ or $p_{uxl}$) based on the outcome values $\beta_{ut}$ or $\beta_{xl}$ in the case of action pairs, or based on outcome values $\beta_{uxl}$, in the case of action trios. In this scenario, the probability update module 4820 uses a single stochastic learning automaton with a single input to a single-teacher environment (with the users 4805(1)-(3), in combination, as a single teacher), or alternatively, a single stochastic learning automaton with a single input to a single-teacher environment with multiple outputs that are treated as a single output), and thus, a SISO model is assumed. The significance is that the user actions, processor actions, and/or the users are linked to generate action pairs or trios, each of which can be quantified by a single outcome value β. Exemplary equations that can be used for the SISO model will be described in further detail below.

The action selection module 4825 is configured to select the processor action $\alpha_l$ from the processor action set α based on the probability values (either $p_{ut}$ or $p_{xl}$ or $p_{uxl}$) contained within the action probability distribution p internally generated and updated in the probability update module 4820. The outcome evaluation module 4830 is configured to determine and generate the outcome value β (either $\beta_{ut}$ or $\beta_{xl}$ or $\beta_{uxl}$) based on the relationship between the selected processor action $\alpha_l$ and the selected user action $\lambda_x$. The intuition module 4815 modifies the probabilistic learning module 4810 (e.g., selecting or modifying parameters of algorithms used in learning module 4810) based on one or more generated performance indexes φ to achieve one or more objectives. As previously discussed, the performance index φ can be generated directly from the outcome value for from something dependent on the outcome value β, e.g., the action probability distribution p, in which case the performance index φ may be a function of the action probability distribution p, or the action probability distribution p may be used as the performance index 0. Alternatively, the intuition module 4815 may be non-existent, or may desire not to modify the probabilistic learning module 4810 depending on the objective of the program 4800.

The modification of the probabilistic learning module 4810 is generally accomplished similarly to that described with respect to the afore-described probabilistic learning module 110. That is, the functionalities of (1) the probability update module 4820 (e.g., by selecting from a plurality of algorithms used by the probability update module 4820, modifying one or more parameters within an algorithm used by the probability update module 4820, transforming or otherwise modifying the action probability distribution p); (2) the action selection module 4825 (e.g., limiting or expanding selection of the action $\alpha_l$ corresponding to a subset of probability values contained within the action probability distribution p); and/or (3) the outcome evaluation module 4830 (e.g., modifying the nature of the outcome value β or otherwise the algorithms used to determine the outcome values β, are modified.

Figure 68:
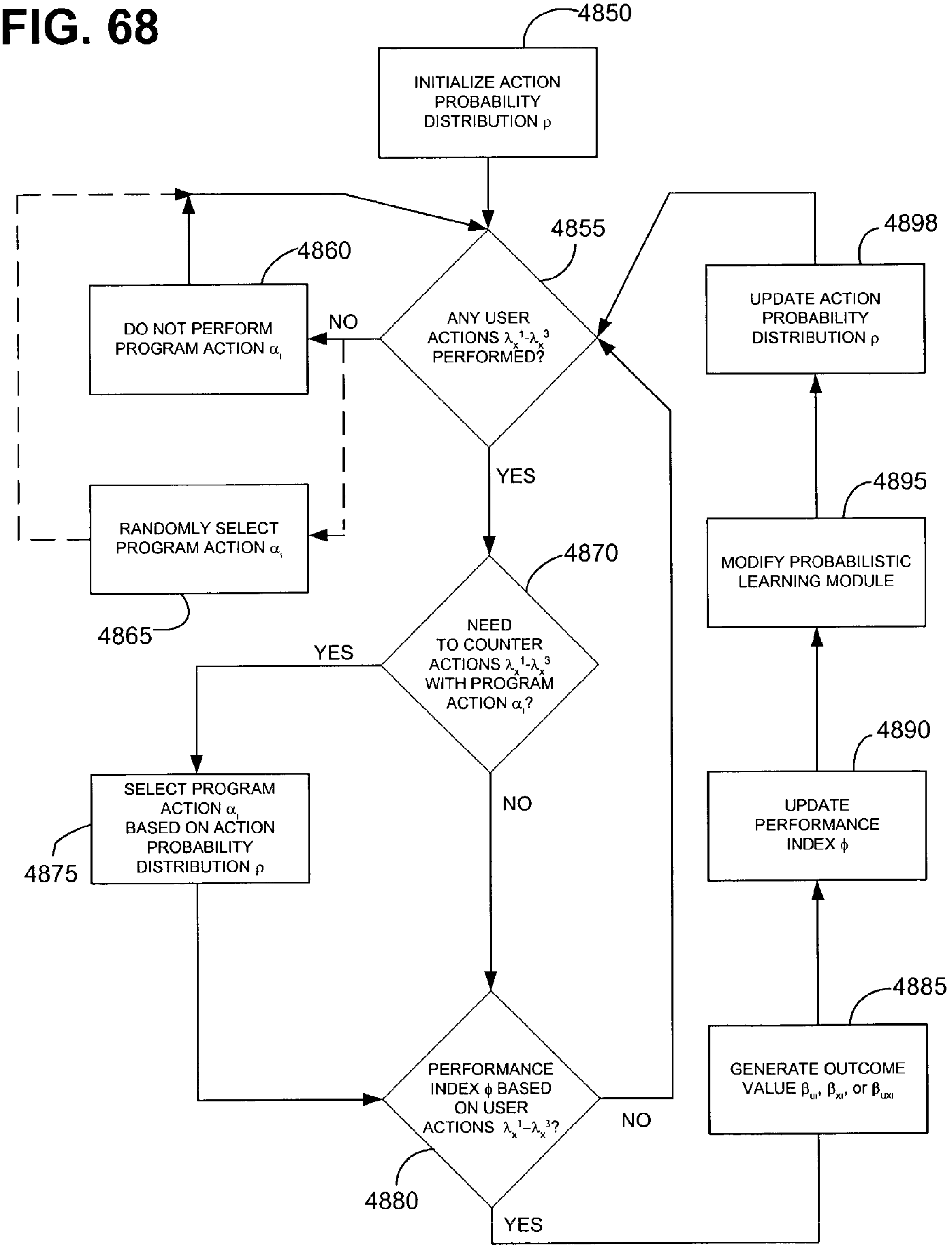
FIG. 68 is a flow diagram illustrating a preferred method performed by the program of FIG. 67.

The various different types of learning methodologies previously described herein can be applied to the probabilistic learning module 4810. The operation of the program 4800 is similar to that of the program 2200 described with respect to FIG. 31, with the exception that the program 4800 treats an action pair or trio as an action. Specifically, referring to FIG. 68, the probability update module 4820 initializes the action probability distribution p (step 4850) similarly to that described with respect to step 150 of FIG. 4. The action selection module 4825 then determines if one or more of the user actions $\lambda_x^1$-$\lambda_x^3$ have been selected by the users 4805(1)-(3) from the respective user action sets $\lambda^1$-$\lambda^3$ (step 4855). If not, the program 4800 does not select a processor action $\alpha_l$ from the processor action set α (step 4860), or alternatively selects a processor action $\alpha_l$, e.g., randomly, notwithstanding that none of the user actions $\lambda_x^1$-$\lambda_x^3$ has been selected (step 4865), and then returns to step 4855 where it again determines if one or more of the user actions $\lambda_x^1$-$\lambda_x^3$ have been selected. If one or more of the user actions $\lambda_x^1$-$\lambda_x^3$ have been performed at step 4855, the action selection module 4825 determines the nature of the selected ones of the user actions $\lambda_x^1$-$\lambda_x^3$.

Specifically, the action selection module 4825 determines whether any of the selected ones of the user actions $\lambda_x^1$-$\lambda_x^3$ are of the type that should be countered with a processor action $\alpha_l$ (step 4870). If so, the action selection module 4825 selects a processor action $\alpha_l$ from the processor action set α based on the action probability distribution p (step 4875). The probability values $p_{ut}$ within the action probability distribution p will correspond to the user/processor action pairs $\alpha_{ut}$. Alternatively, an action probability distribution p containing probability values $p_{uxi}$ corresponding to user/user action/processor action trios $\alpha_{uxi}$ can be used, or in the case of a single user, probability values $p_{xi}$ corresponding to user action/processor action pairs $\alpha_{li}$. After the performance of step 4875, or if the action selection module 4825 determines that none of the selected user actions $\lambda_x^1$-$\lambda_x^3$ is of the type that should be countered with a processor action $\alpha_l$, the action selection module 4825 determines if any of the selected user actions $\lambda_x^1$-$\lambda_x^3$ are of the type that the performance index φ is based on (step 4880).

If not, the program 4800 returns to step 4855 to determine again whether any of the user actions $\lambda_x^1$-$\lambda_x^3$ have been selected. If so, the outcome evaluation module 4830 quantifies the performance of the previously selected processor action $\alpha_l$ relative to the currently selected user actions $\lambda_x^1$-$\lambda_x^3$ by generating outcome values β ($\beta_{ut}$, $\beta_{xl}$ or $\beta_{uxt}$) (step 4885). The intuition module 4815 then updates the performance index φ based on the outcome values β unless the performance index φ is an instantaneous performance index that is represented by the outcome values β themselves (step 4890), and modifies the probabilistic learning module 4810 by modifying the functionalities of the probability update module 4820, action selection module 4825, or outcome evaluation module 4830 (step 4895). The probability update module 4820 then, using any of the updating techniques described herein, updates the action probability distribution p based on the generated outcome values ,i(step 4898).

The program 4800 then returns to step 4855 to determine again whether any of the user actions $\lambda_x^1$-$\lambda_x^3$ have been selected. It should be noted that the order of the steps described in FIG. 68 may vary depending on the specific application of the program 4800.

Multi-Player Game Program (Single Game Move-Teacher Action Pair)

Figure 69:
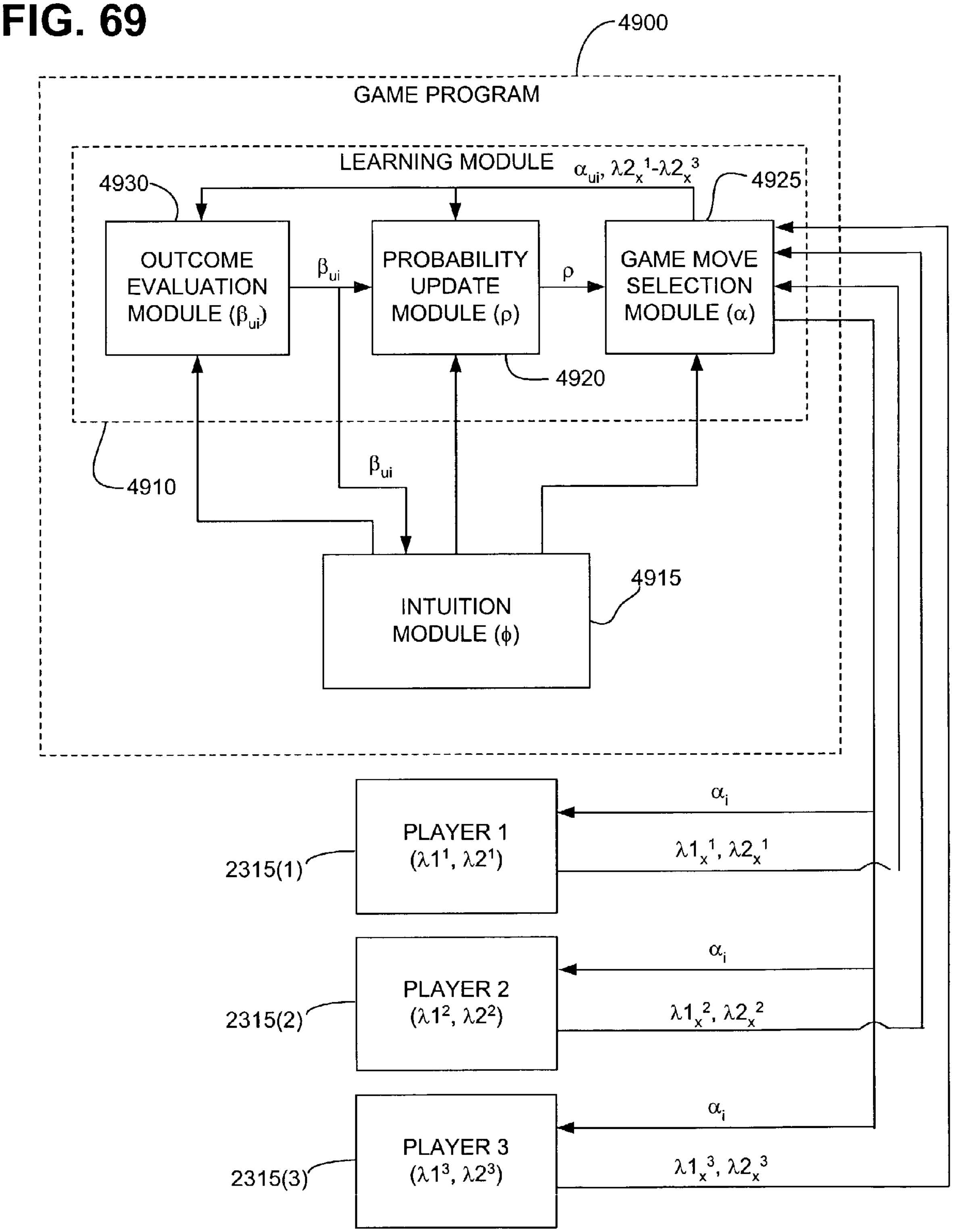
FIG. 69 is a block diagram of a multiple-player game program that can be employed in the duck hunting game of FIG. 32 to which the generalized program of FIG. 67 can be applied.

Having now generally described the components and functionality of the learning program 4800, we now describe one of its various applications. Referring to FIG. 69, a multiple-player game program 4900 developed in accordance with the present inventions is described in the context of the previously described duck hunting game 2300 (see FIG. 32).

The game program 4900 generally includes a probabilistic learning module 4910 and an intuition module 4915, which are specifically tailored for the game 2300. The probabilistic learning module 4910 comprises a probability update module 4920, a game move selection module 4925, and an outcome evaluation module 4930 that are similar to the previously described probability update module 2420, game move selection module 2425, and outcome evaluation module 2430, with the exception that the probability update module 4920 updates probability values corresponding to player/game move pairs, rather than single game moves. The game move probability distribution p that the probability update module 4920 generates and updates can be represented by the following equation:

$$p(k)=[p_{1,1}(k),p_{1,2}(k),p_{1,3}(k)\ldots p_{2,1}(k),p_{2,2}(k),p_{2,3}(k)\ldots p_{mn}(k)], \quad [46]$$

where $p_{ui}$ is the game move probability value assigned to a specific player/game move pair $\alpha_{uix}$; m is the number of players; n is the number of game moves $\alpha_i$ within the game move set $\alpha$, and k is the incremental time at which the game move probability distribution was updated.

The game program 4900 may employ the following P-type Teacher Action Pair (TAP) SISO equations:

$$p_{ui}(k+1) = p_{ui}(k) + \sum_{\substack{t,s=1,1 \\ t,s\neq u,i}}^{n,m} g_{ts}(p(k)); \text{ if } \alpha(k)=\alpha_{ui} \text{ and } \beta_{ui}(k)=1 \quad [47]$$

$$p_{ut}(k+1)=p_{ut}(k)-g_{ut}(p(k)), \text{ if } \alpha(k)\neq\alpha_{ut} \text{ and } \beta_{ut}(k)=1 \quad [48]$$

$$p_{ui}(k+1) = p_{ui}(k) - \sum_{\substack{t,s=1,1 \\ t,s\neq u,i}}^{n,m} h_{ts}(p(k)); \text{ if } \alpha(k)=\alpha_{ui} \text{ and } \beta_{ui}(k)=0 \quad [49]$$

$$p_{ut}(k+1)=p_{ut}(k)+h_{ut}(p(k)), \text{ if } \alpha(k)\neq\alpha_{ut} \text{ and } \beta_{ut}(k)=0 \quad [50]$$

where $p_{ut}(k+1)$ and $p_{ut}(k)$, m, and n have been previously defined, $g_{ut}(p(k))$ and $h_{ut}(p(k))$ are respective reward and penalty functions, u is an index for the player, i is an index for the currently selected game move $\alpha_i$, and $\beta_{uix}(k)$ is the outcome value based on a selected game move $\alpha_i$ relative to an action $\lambda_x$ selected by the player.

As an example, if there are a total of three players and ten game moves, the game move probability distribution p will have probability values $p_{ut}$ corresponding to player/game move pairs $\alpha_{ut}$, as set forth in Table 22.

TABLE 22

Probability Values for Player/Game Move Pairs Given Ten Moves and Three Players

| | $\alpha_1$ | $\alpha_2$ | $\alpha_3$ | $\alpha_4$ | $\alpha_5$ | $\alpha_6$ | $\alpha_7$ | $\alpha_8$ | $\alpha_9$ | $\alpha_{10}$ |
|---|---|---|---|---|---|---|---|---|---|---|
| P1 | $p_{1,1}$ | $p_{1,2}$ | $p_{1,3}$ | $p_{1,4}$ | $p_{1,5}$ | $p_{1,6}$ | $p_{1,7}$ | $p_{1,8}$ | $p_{1,9}$ | $p_{1,10}$ |
| P2 | $p_{2,1}$ | $p_{2,2}$ | $p_{2,3}$ | $p_{2,4}$ | $p_{2,5}$ | $p_{2,6}$ | $p_{2,7}$ | $p_{2,8}$ | $p_{2,9}$ | $p_{2,10}$ |
| P3 | $p_{3,1}$ | $p_{3,2}$ | $p_{3,3}$ | $p_{3,4}$ | $p_{3,5}$ | $p_{3,6}$ | $p_{3,7}$ | $p_{3,8}$ | $p_{3,9}$ | $p_{3,10}$ |

Figure 70:
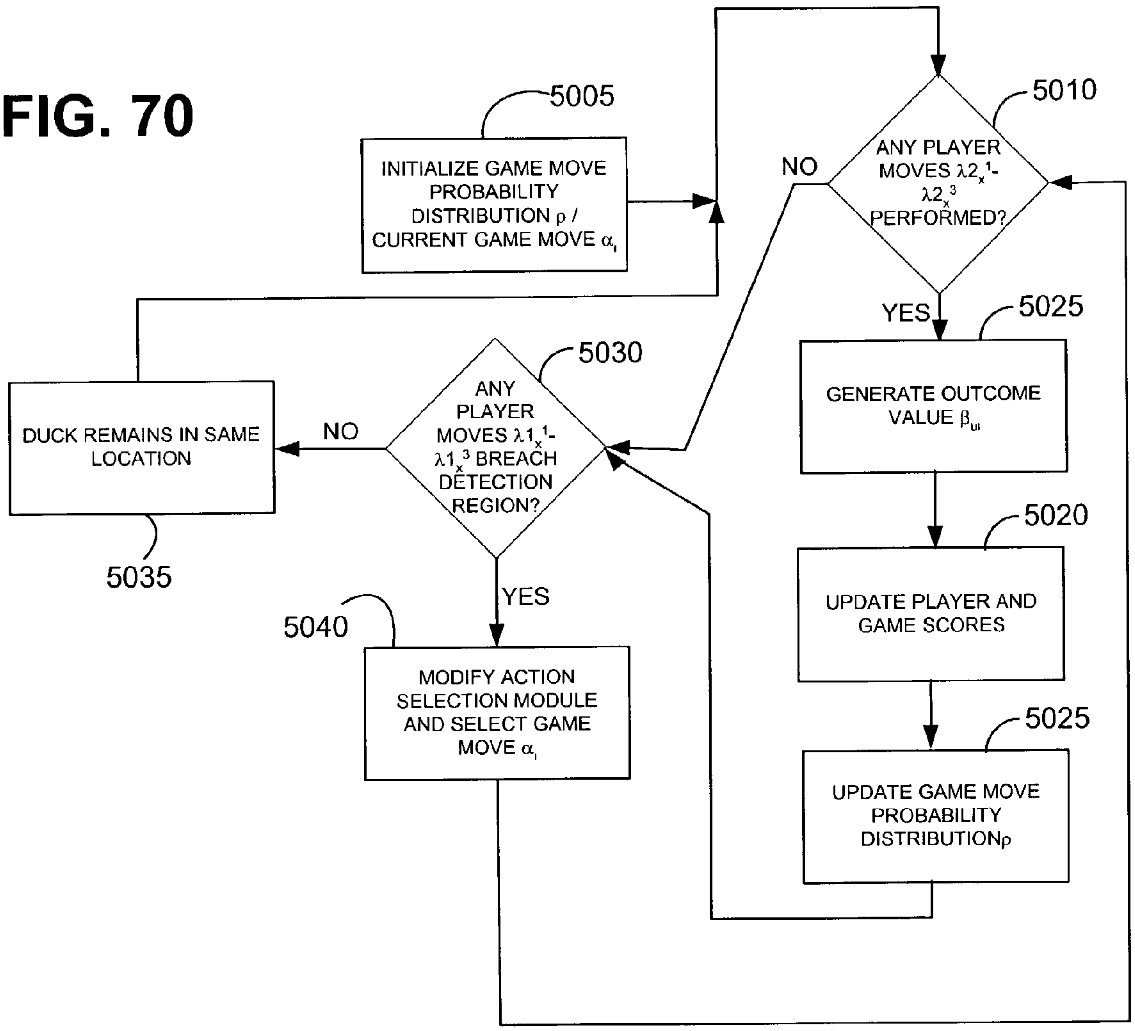
FIG. 70 is a flow diagram illustrating a preferred method performed by the game program of FIG. 69.

Having now described the structure of the game program 4900, the steps performed by the game program 4900 will be described with reference to FIG. 70. First, the probability update module 4920 initializes the game move probability distribution p and current game move $\alpha_i$ (step 5005) similarly to that described in step 405 of FIG. 9. Then, the game move selection module 4925 determines whether one of the player moves $\lambda2_x^1$-$\lambda2_x^3$ has been performed, and specifically whether one of the guns 2325(1)-(3) has been fired (step 5010). If one of the player moves $\lambda2_x^1$-$\lambda2_x^3$ has been performed, the outcome evaluation module 4930 generates the corresponding outcome value $\beta_{ut}$ for the performed one of the player moves $\lambda2_x^1$-$\lambda2_x^3$ (step 5015), and the intuition module 4915 then updates the corresponding one of the player scores 2360(1)-(3) and duck scores 2365(1)-(3) based on the outcome value $\alpha_{ut}$ (step 5020), similarly to that described in steps 415 and 420 of FIG. 9. The probability update module 4920 then, using the TAP SISO equations [47]-[50], updates the game move probability distributionp based on the generated outcome value $\beta_{ut}$, (step 5025).

After step 5025, or if none of the player moves $\lambda2_x^1$-$\lambda2_x^3$ has been performed at step 5010, the game move selection module 4925 determines if any of the player moves $\lambda1_l^1$-$\lambda1_l^3$ have been performed, i.e., guns 2325(1)-(3), have breached the gun detection region 270 (step 5030). If none of the guns 2325(1)-(3) has breached the gun detection region 270, the game move selection module 4925 does not select a game move $\alpha_i$ from the game move set $\alpha$ and the duck 2320 remains in the same location (step 5035). Alternatively, the game move $\alpha_i$ may be randomly selected, allowing the duck 2320 to dynamically wander. The game program 4900 then returns to step 5010 where it is again determined if any of the player moves $\lambda1_l^1$-$\lambda1_l^3$ has been performed. If any of the guns 2325 (1)-(3) have breached the gun detection region 270 at step 5030, the intuition module 4915 modifies the functionality of the game move selection module 4925 based on the performance index $\phi$, and the game move selection module 4925 selects a game move $\alpha_i$ from the game move set $\alpha$ in the manner previously described with respect to steps 440-470 of FIG. 9 (step 5040). It should be noted that, rather than use the game move subset selection technique, other afore-described techniques used to dynamically and continuously match the skill level of the players 2315(1)-(3) with the skill level of the game 2300, such as that illustrated in FIG. 10, can be alternatively or optionally be used as well in the game program 3900.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims. All publications, patents, and patent applications cited herein are hereby incorporated by reference in their entirety for all purposes.

What is claimed is:

1. A processing device having one or more objectives, comprising:

an executable probabilistic learning software module having a learning automaton configured to learn a plurality of processor actions in response to a plurality of actions performed by a user, wherein the probabilistic learning software module includes an action probability distribution comprising a plurality of probability values corresponding to said plurality of processor actions;

a user interface configured to communicate said processor actions to said user;

an executable intuition software module configured to modify a functionality of said probabilistic learning module based on said one or more objectives to prevent said action probability distribution from substantially converging to any processor action; and at least one or more hardware processors configured to execute said probabilistic learning software module and said intuition software module.

2. The processing device of claim 1, wherein said intuition module is deterministic.

3. The processing device of claim 1, wherein said intuition module is probabilistic.

4. The processing device of claim 1, wherein said intuition module comprises one or more of an expert system, a neural network, and fuzzy logic.

5. The processing device of claim 1, wherein said probabilistic learning module comprises:

an action selection module configured to select one of a plurality of processor actions based on the action probability distribution;

an outcome evaluation module configured to determine an outcome of one or both of said identified user action and said selected processor action; and a probability update module configured to update said action probability distribution based on said outcome.

6. The processing device of claim 5, wherein said outcome is of said identified user action.

7. The processing device of claim 5, wherein said outcome is of said selected processor action.

8. The processing device of claim 5, wherein said outcome is of said selected processor action relative to said identified user action.

9. The processing device of claim 5, wherein said intuition module is configured to modify a functionality of said action selection module based on said one or more objectives.

10. The processing device of claim 5, wherein said intuition module is configured to modify a functionality of said outcome evaluation module based on said one or more objectives.

11. The processing device of claim 5, wherein said intuition module is configured to modify a functionality of said probability update module based on said one or more objectives.

12. The processing device of claim 5, wherein said intuition module, for each iteration, is configured to modify said functionality of said probabilistic learning module independent of said processor action selection, said outcome determination, and said action probability distribution update.

13. The processing device of claim 1, wherein said intuition module is configured to select one of a predetermined plurality of algorithms employed by said learning module.

14. The processing device of claim 1, wherein said intuition module is configured to modify a parameter of an algorithm employed by said learning module.

15. The processing device of claim 1, wherein said processing device has a function independent of determining an optimum action, and said learning automaton is configured to affect said processing device function.

16. The processing device of claim 1, wherein said intuition software module configured to determine a performance index indicative of a performance of said probabilistic learning module relative to said one or more objectives and for modifying the functionality of said probabilistic learning module based on said performance index.

17. The processing device of claim 1, wherein said processing device is a computer gaming console, said user actions are player moves, and said processor actions are game moves.

18. The processing device of claim 1, wherein said processing device is an educational toy, said user actions are child actions, and said processor actions are toy actions.

19. The processing device of claim 1, wherein said processing device is a telephone system, said user actions are called phone numbers, and said processor actions are listed phone numbers.

20. The processing device of claim 1, wherein said processing device is a television channel control system, said user actions are watched television channels, and said processor actions are listed television channels.

* * * * *